(12) United States Patent
Ebrahimi Afrouzi et al.

(10) Patent No.: US 11,548,159 B1
(45) Date of Patent: Jan. 10, 2023

(54) MODULAR ROBOT

(71) Applicants: Ali Ebrahimi Afrouzi, San Jose, CA (US); Lukas Fath, York (CA); Chen Zhang, Richmond (CA); Brian Highfill, Castro Valley, CA (US); Amin Ebrahimi Afrouzi, San Jose, CA (US)

(72) Inventors: Ali Ebrahimi Afrouzi, San Jose, CA (US); Lukas Fath, York (CA); Chen Zhang, Richmond (CA); Brian Highfill, Castro Valley, CA (US); Amin Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 744 days.

(21) Appl. No.: 16/427,317

(22) Filed: May 30, 2019

Related U.S. Application Data

(60) Provisional application No. 62/746,688, filed on Oct. 17, 2018, provisional application No. 62/740,580, (Continued)

(51) Int. Cl.
*G05D 1/02* (2020.01)
*B25J 9/16* (2006.01)
(Continued)

(52) U.S. Cl.
CPC .............. *B25J 9/1697* (2013.01); *B25J 5/007* (2013.01); *B25J 9/1666* (2013.01); (Continued)

(58) Field of Classification Search
CPC ........ B25J 9/1697; B25J 5/007; B25J 9/1666; G06T 5/50; G06T 7/579; G06T 7/70; (Continued)

(56) References Cited

U.S. PATENT DOCUMENTS 6,781,338 B2  8/2004  Jones
7,211,980 B1  5/2007  Bruemmer
(Continued)

OTHER PUBLICATIONS

Bukhori et al. ("Detection Strategy for Kidnapped Robot Problem In Landmark-Based Map Monte Carlo Localization", 2015 IEEE International Symposium on Robotics and Intelligent Sensors (IEEE IRIS2015) (Year: 2015).*

*Primary Examiner* — Ryan Rink

(57) ABSTRACT

Provided is a robot including: a chassis; wheels; electric motors; a network card; sensors; a processor; and a tangible, non-transitory, machine readable medium storing instructions that when executed by the processor effectuates operations including: capturing, with at least one exteroceptive sensor, a first image and a second image; determining, with the processor, an overlapping area of the first image and the second image by comparing the raw pixel intensity values of the first image to the raw pixel intensity values of the second image; combining, with the processor, the first image and the second image at the overlapping area to generate a digital spatial representation of the environment; and estimating, with the processor using a statistical ensemble of simulated positions of the robot, a corrected position of the robot to replace a last known position of the robot within the digital spatial representation of the environment.

20 Claims, 146 Drawing Sheets

Related U.S. Application Data filed on Oct. 3, 2018, provisional application No. 62/740,573, filed on Oct. 3, 2018, provisional application No. 62/720,478, filed on Aug. 21, 2018, provisional application No. 62/702,148, filed on Jul. 23, 2018, provisional application No. 62/699,101, filed on Jul. 17, 2018, provisional application No. 62/688,497, filed on Jun. 22, 2018, provisional application No. 62/681,965, filed on Jun. 7, 2018, provisional application No. 62/678,921, filed on May 31, 2018.

(51) Int. Cl.
| | | |
|---|---|---|
| *G06T 5/50* | (2006.01) | |
| *G06T 7/579* | (2017.01) | |
| *B25J 5/00* | (2006.01) | |
| *G06T 7/70* | (2017.01) | |
| *G06V 20/10* | (2022.01) | |

(52) U.S. Cl.
CPC ............ *G05D 1/0246* (2013.01); *G06T 5/50* (2013.01); *G06T 7/579* (2017.01); *G06T 7/70* (2017.01); *G06V 20/10* (2022.01); *G06T 2207/10028* (2013.01); *G06T 2207/20221* (2013.01)

(58) Field of Classification Search
CPC .......... G06T 2207/10028; G06T 2207/20221; G06V 20/10; G05D 1/0246
See application file for complete search history.

(56) References Cited

U.S. PATENT DOCUMENTS

| | | |
|---|---|---|
| 7,689,321 B2 | 3/2010 | Karlsson |
| 7,826,926 B2 | 11/2010 | Myeong |
| 7,957,836 B2 | 6/2011 | Myeong |
| 8,452,450 B2 | 5/2013 | Dooley |
| 9,427,874 B1 | 8/2016 | Rublee |
| 11,320,828 B1* | 5/2022 | Ebrahimi Afrouzi ..................... B25J 9/1664 |
| 11,340,079 B1* | 5/2022 | Ebrahimi Afrouzi ..... G06T 7/70 |
| 2004/0158354 A1 | 8/2004 | Lee |
| 2008/0075357 A1 | 3/2008 | Yoon |
| 2008/0232678 A1 | 9/2008 | Yoon |
| 2010/0152945 A1 | 6/2010 | Park |
| 2010/0256908 A1 | 10/2010 | Shimshoni |
| 2011/0082585 A1* | 4/2011 | Sofman .................. B25J 9/0003 700/258 |
| 2012/0083923 A1* | 4/2012 | Matsumoto .......... G05D 1/0274 901/1 |
| 2012/0213443 A1 | 8/2012 | Shin |
| 2013/0138247 A1 | 5/2013 | Gutmann |
| 2014/0129027 A1* | 5/2014 | Schnittman .......... G05D 1/0242 700/253 |
| 2014/0207282 A1* | 7/2014 | Angle ................ G06Q 10/1095 901/1 |
| 2014/0350839 A1 | 11/2014 | Pack |
| 2016/0063309 A1* | 3/2016 | Konolige ................ G06T 7/593 901/14 |
| 2016/0063705 A1* | 3/2016 | Xu ............. G06T 5/50 382/199 |
| 2018/0077534 A1* | 3/2018 | Le Grand ............ G01C 21/206 |
| 2019/0227545 A1* | 7/2019 | Yoo ..................... G01C 21/3602 |
| 2020/0275814 A1* | 9/2020 | Jo ......................... G05D 1/0274 |
| 2020/0380270 A1* | 12/2020 | Cox ....................... G06V 10/80 |

* cited by examiner

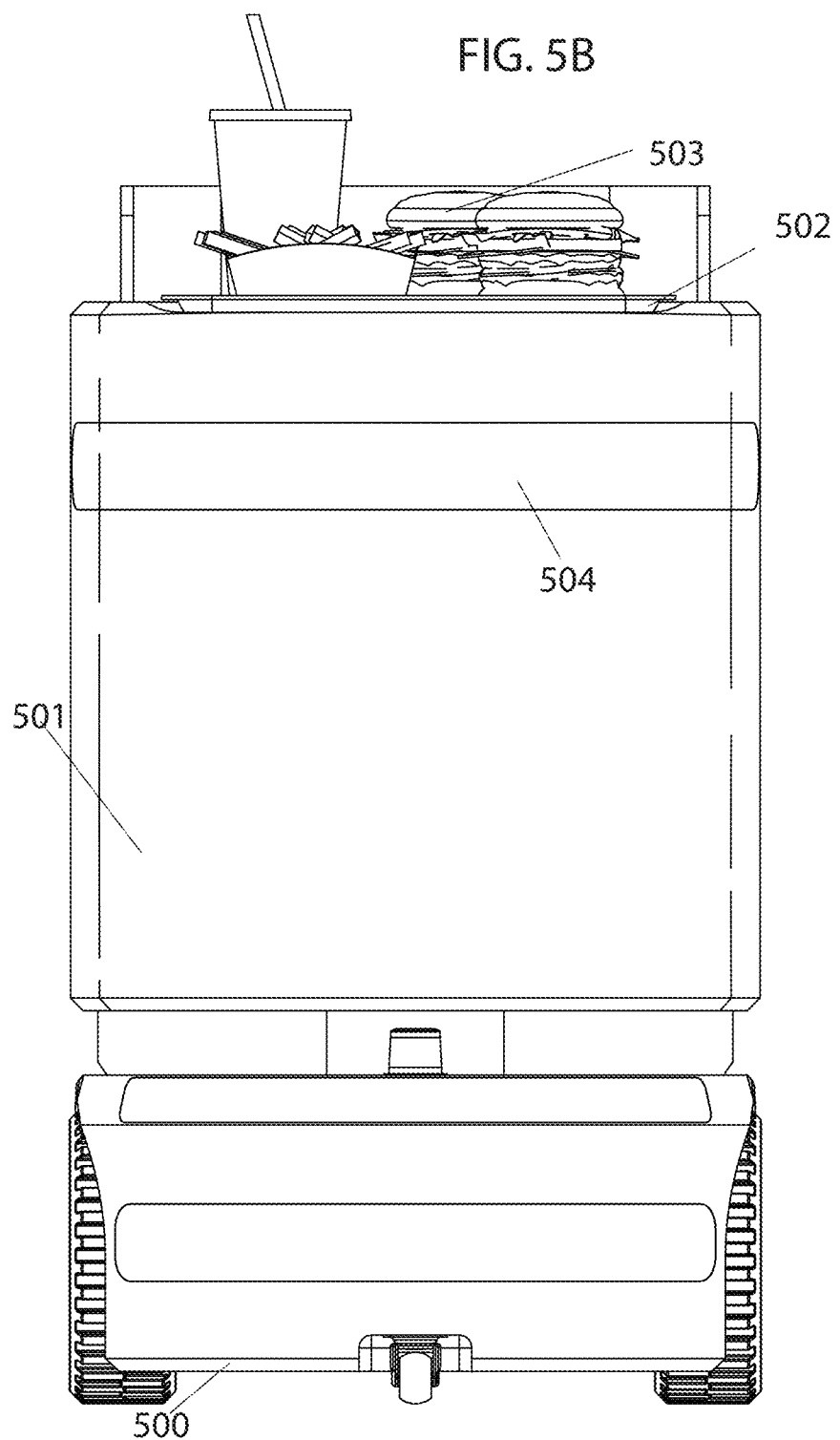

FIG. 33A
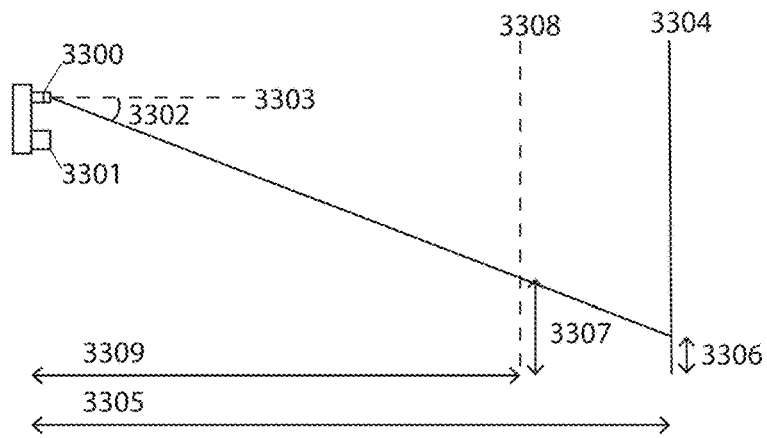
FIG. 33B
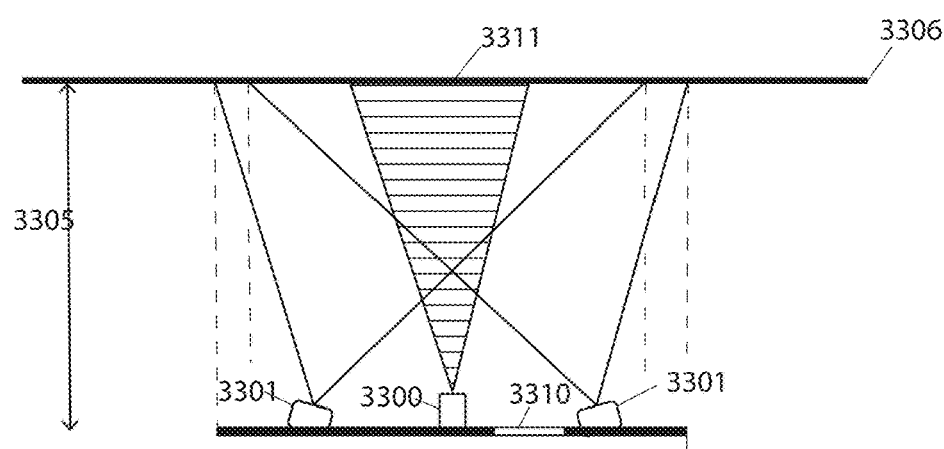
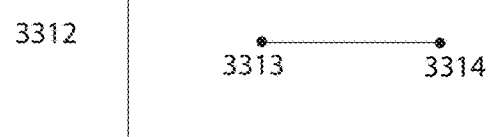
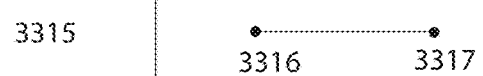
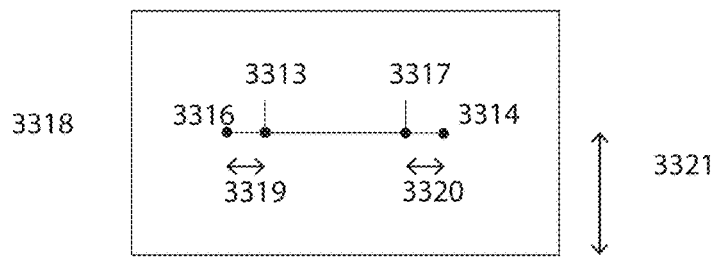
FIG. 33C

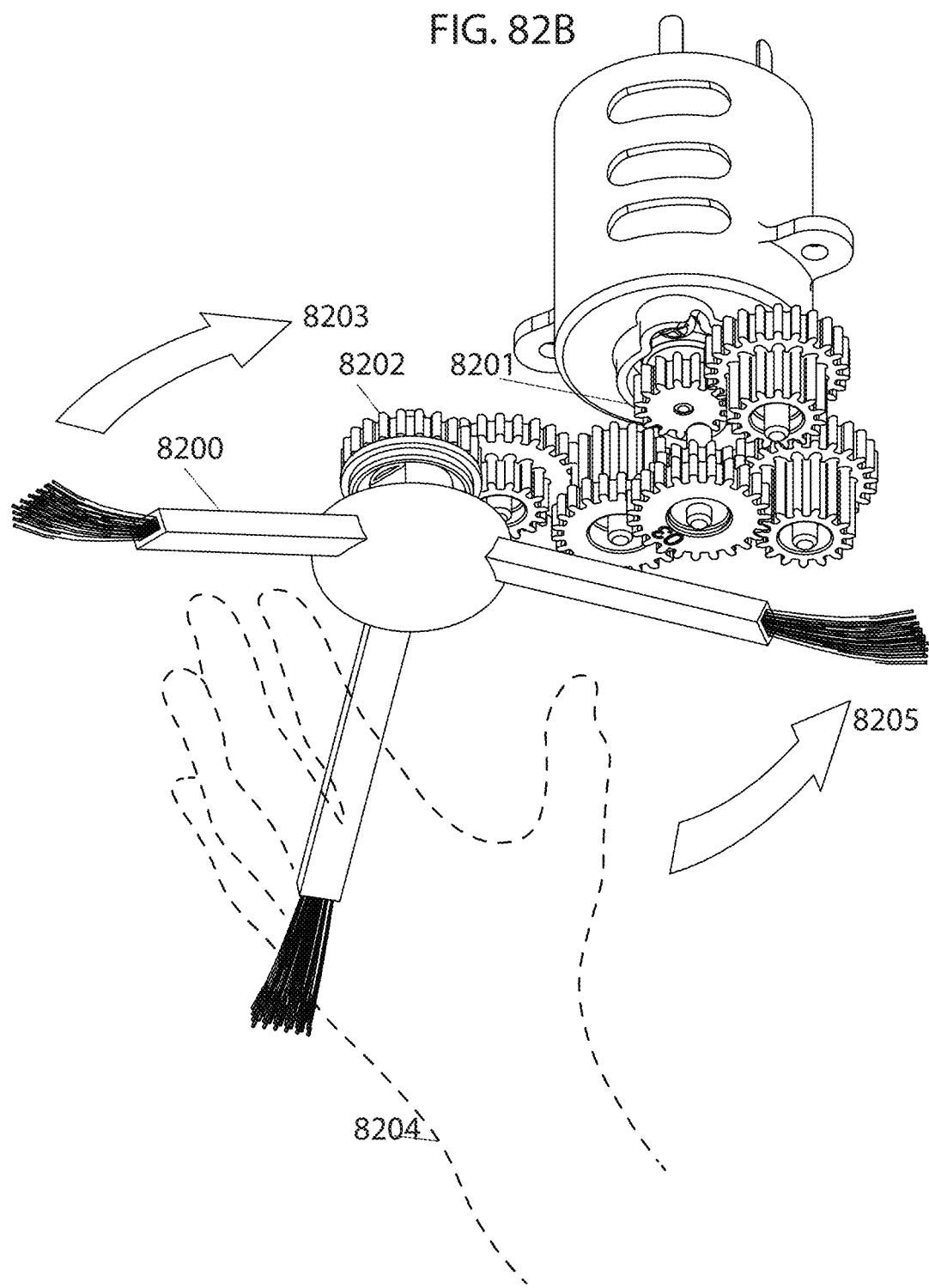

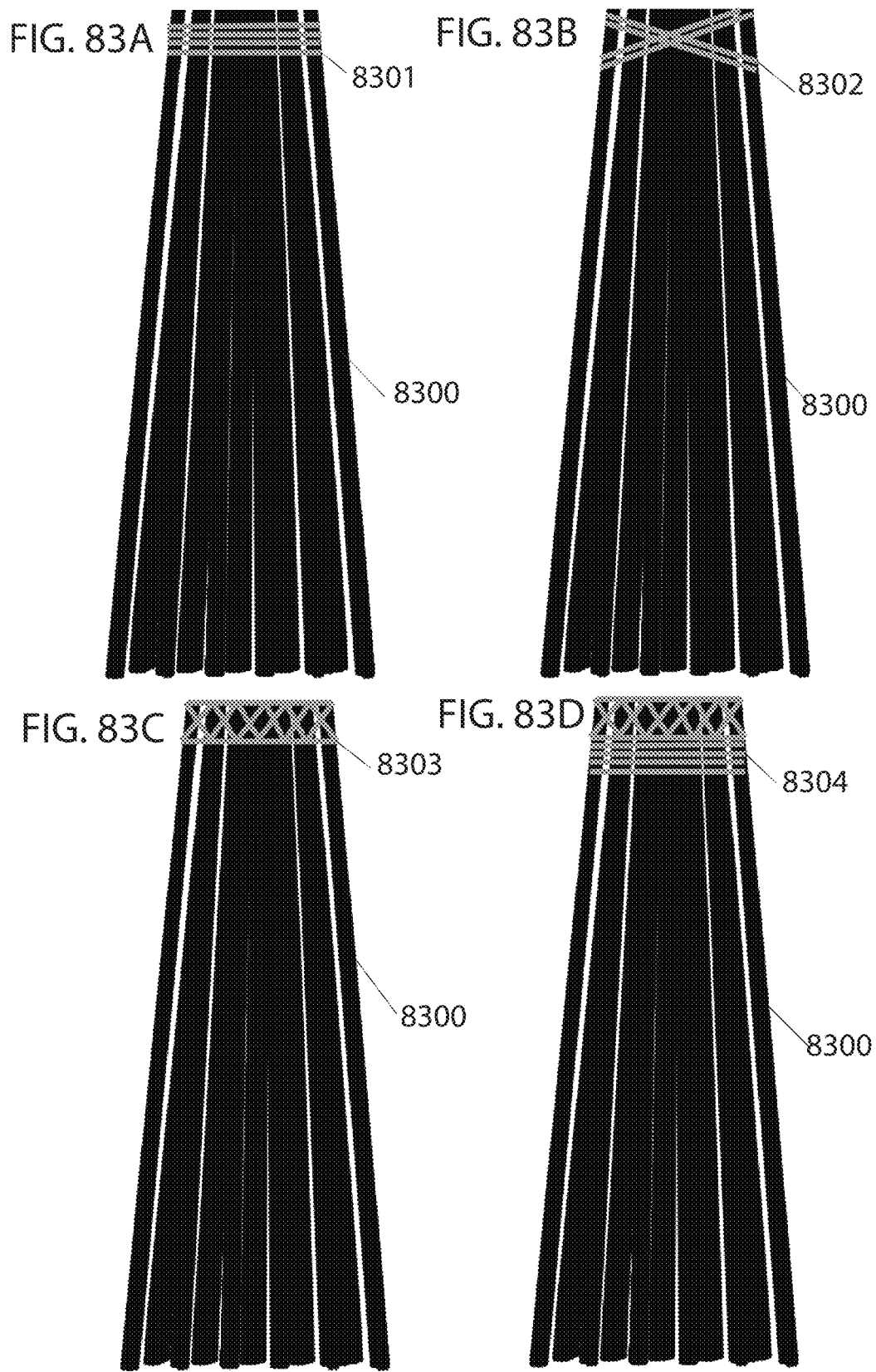

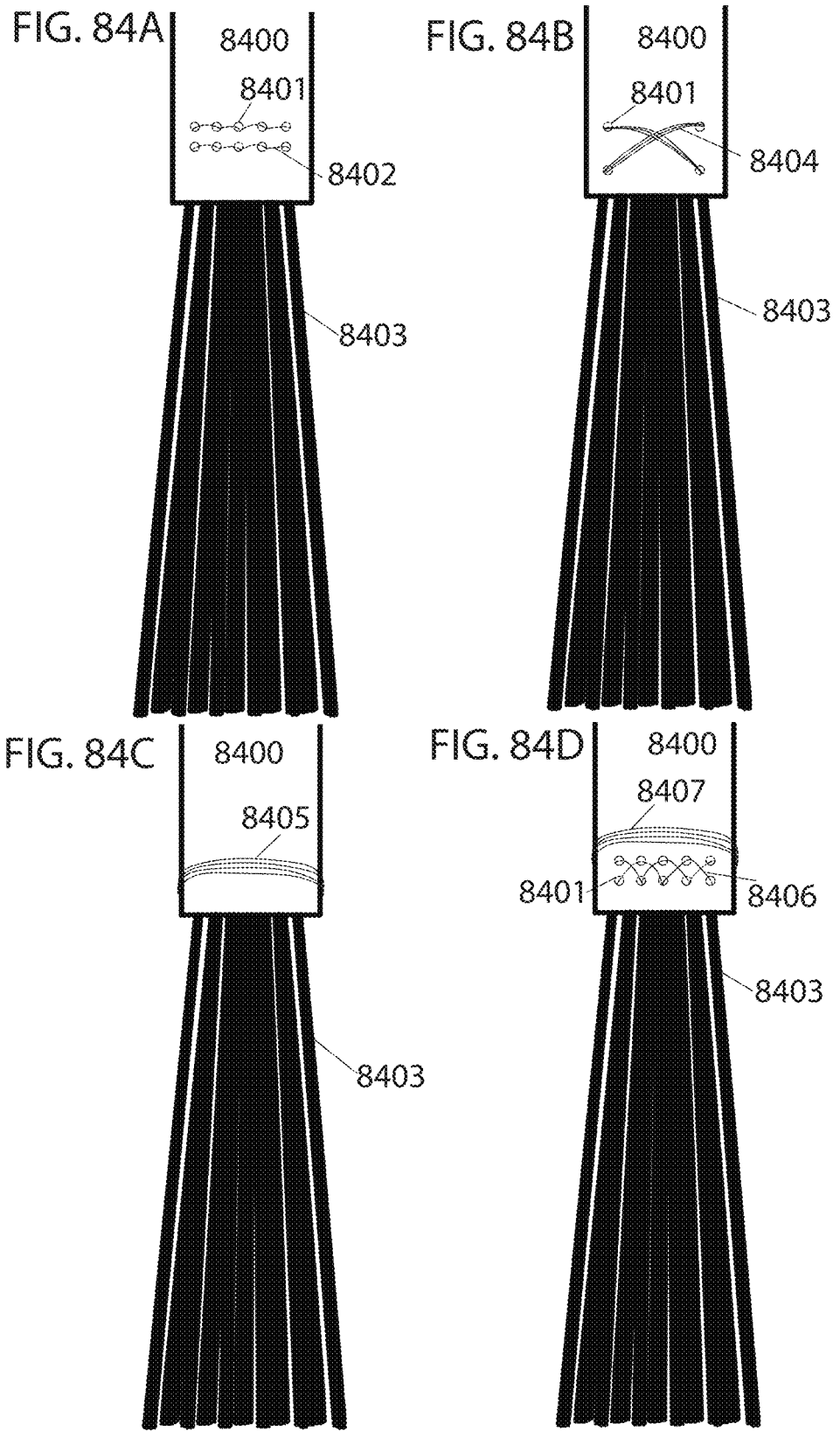

MODULAR ROBOT

CROSS-REFERENCE TO RELATED APPLICATIONS

This application claims the benefit of Provisional Patent Application Nos. 62/746,688, filed Oct. 17, 2018, 62/688,497, filed Jun. 22, 2018, 62/740,573, filed Oct. 3, 2018, 62/740,580, filed Oct. 3, 2018, 62/678,921, filed May 31, 2018, 62/681,965, filed Jun. 7, 2018, 62/702,148, filed Jul. 23, 2018, 62/699,101, filed Jul. 17, 2018, and 62/720,478, filed Aug. 21, 2018, each of which is hereby incorporated by reference.

In this patent, certain U.S. patents, U.S. patent applications, or other materials (e.g., articles) have been incorporated by reference. Specifically, U.S. patent application Ser. Nos. 15/272,752, 15/949,708, 16/048,179, 16/048,185, 16/163,541, 16/163,562, 16/163,508, 16/185,000, 16/041,286, 15/406,890, 14/673,633, 16/163,530, 16/297,508, 15/955,480, 15/425,130, 15/955,344, 15/243,783, 15/954,335, 15/954,410, 15/257,798, 15/674,310, 15/224,442, 15/683,255, 14/817,952, 15/619,449, 16/198,393, 62/740,558, 15/447,450, 15/447,623, 15/951,096, 15/924,176, 16/024,263, 16/203,385, 15/647,472, 16/239,410, 62/720,521, and 16/389,797, are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The present disclosure relates to robots.

BACKGROUND

Autonomous or semi-autonomous robots are increasingly used within consumer homes and commercial establishments. In several instances, robots are desirable for the convenience they provide to a user. For example, autonomous robots may be used to autonomously execute actions such as sweeping, mopping, dusting, scrubbing, power washing, transportation, towing, snow plowing, salt distribution, mining, surgery, delivery, painting, and other actions traditionally executed by humans themselves or human-operated machines. Autonomous robots may efficiently execute such actions using a map of an environment generated by the robot for navigation and localization of the robot. The map may be further used to optimize execution of actions by dividing the environment into subareas and choosing an optimal navigation path. With robots being increasingly used for multiple functions, a modular robot that may be used for multiple applications may be advantageous.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Provided is a robot, comprising: a chassis; a set of wheels coupled to the chassis; one or more electric motors electrically coupled to the set of wheels; a network card providing wireless connectivity to the internet; a plurality of sensors; a processor electronically coupled to the plurality of sensors and configured to receive sensor readings; and a tangible, non-transitory, machine readable medium storing instructions that when executed by the processor effectuates operations including: capturing, with at least one exteroceptive sensor, a first image and a second image, wherein: the first image is captured from a first position and orientation and the second image is captured from a second position and orientation, different from the first position and orientation; and the first image and second image include unprocessed raw pixel intensity values or processed depth values; determining, with the processor, an overlapping area of a field of view of the first image and of a field of view of the second image by comparing the raw pixel intensity values or depth values of the first image to the raw pixel intensity values or depth values of the second image; combining, with the processor, the first image and the second image at the overlapping area to generate a digital spatial representation of the environment, wherein: the digital spatial representation of the environment includes areas of the environment already explored by the robot; and the digital spatial representation indicates locations of physical objects and boundaries of the environment already explored by the robot; and estimating, with the processor using a statistical ensemble of simulated positions of the robot, a corrected position of the robot within the digital spatial representation of the environment to replace a last known position of the robot within the digital spatial representation of the environment, wherein: estimating the corrected position occurs if the processor loses knowledge of the position of the robot in the digital spatial representation of the environment during a movement from the last known position to a new intended position while performing a task; the processor loses the position of the robot due to a drift in intended trajectory; each simulated position includes a function of angular and linear error in trajectory convolved with the new intended position; and the processor checks sensor readings received from at least one sensor against each simulated digital spatial representation of the environment corresponding with a perspective of each simulated position of the robot to choose a most feasible position of the robot as the corrected position within the digital spatial representation of the environment.

Provided is 1 tangible, non-transitory, machine readable medium storing instructions that when executed by a processor effectuates operations including: capturing, with at least one exteroceptive sensor, a first image and a second image, wherein: the first image is captured from a first position and orientation and the second image is captured from a second position and orientation, different from the first position and orientation; and the first image and second image include unprocessed raw pixel intensity values or processed depth values; determining, with the processor, an overlapping area of a field of view of the first image and of a field of view of the second image by comparing the raw pixel intensity values or depth values of the first image to the raw pixel intensity values or depth values of the second image; combining, with the processor, the first image and the second image at the overlapping area to generate a digital spatial representation of the environment, wherein: the digital spatial representation of the environment includes areas of the environment already explored by the robot; and the digital spatial representation indicates locations of physical objects and boundaries of the environment already explored by the robot; and estimating, with the processor using a statistical ensemble of simulated positions of the robot, a corrected position of the robot within the digital spatial representation of the environment to replace a last known position of the robot within the digital spatial representation of the environment, wherein: estimating the corrected position occurs if the processor loses knowledge of the position of the robot in the digital spatial representation of the environment during a movement from the last known position to a new intended position while performing a task; the processor loses the position of the robot due to a drift in intended trajectory; each simulated position includes a function of angular and linear error in trajectory convolved with the new intended position; and the processor checks sensor readings received from the at least one sensor against each simulated digital spatial representation of the environment corresponding with a perspective of each simulated position of the robot to choose a most feasible position of the robot as the corrected position within the digital spatial representation of the environment.

BRIEF DESCRIPTION OF DRAWINGS

FIGS. 5A-5C illustrate an example of a food delivery robotic device, according to some embodiments.

FIGS. 33A-33C illustrate an example of distance estimation using a variation of a depth perceiving device, according to some embodiments.

FIGS. 82A and 82B illustrate a peripheral brush with a gear train comprising spur gears capable of rotation in two directions, according to some embodiments.

FIGS. 83A-83D and 84A-84D illustrate examples of different stitching techniques for stitching bristles together and/or to the one or more arm of the peripheral brush, according to some embodiments.

DETAILED DESCRIPTION OF SOME EMBODIMENTS

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments include a robot with communication, actuation, mobility, and processing elements. In some instances, the module robot may include, but is not required to include (which is not to suggest that any other described feature is required in all embodiments), a casing (like a shell), a chassis, a set of wheels, one or more motors to drive the wheels, a suspension system, one or more processors, memory, one or more controllers, a network card for wireless communications, sensors, a rechargeable power source (solar, electrical, or both), a clock or other synchronizing device, radio frequency (RF) transmitter and receiver, infrared (IR) transmitter and receiver, a user interface, etc. Examples of sensors include infrared (IR) sensors, tactile sensors, sonar sensors, gyroscopes, ultrasonic sensors, cameras, odometer sensors, optical flow sensors, light detection and ranging (LIDAR) sensors, depth cameras, imaging sensors, light illuminators, depth or distance sensors, optical encoders, time-of-light sensors, TSSP sensors, etc. Other types of modular robots with other configurations may also be used.

Figure 1A:
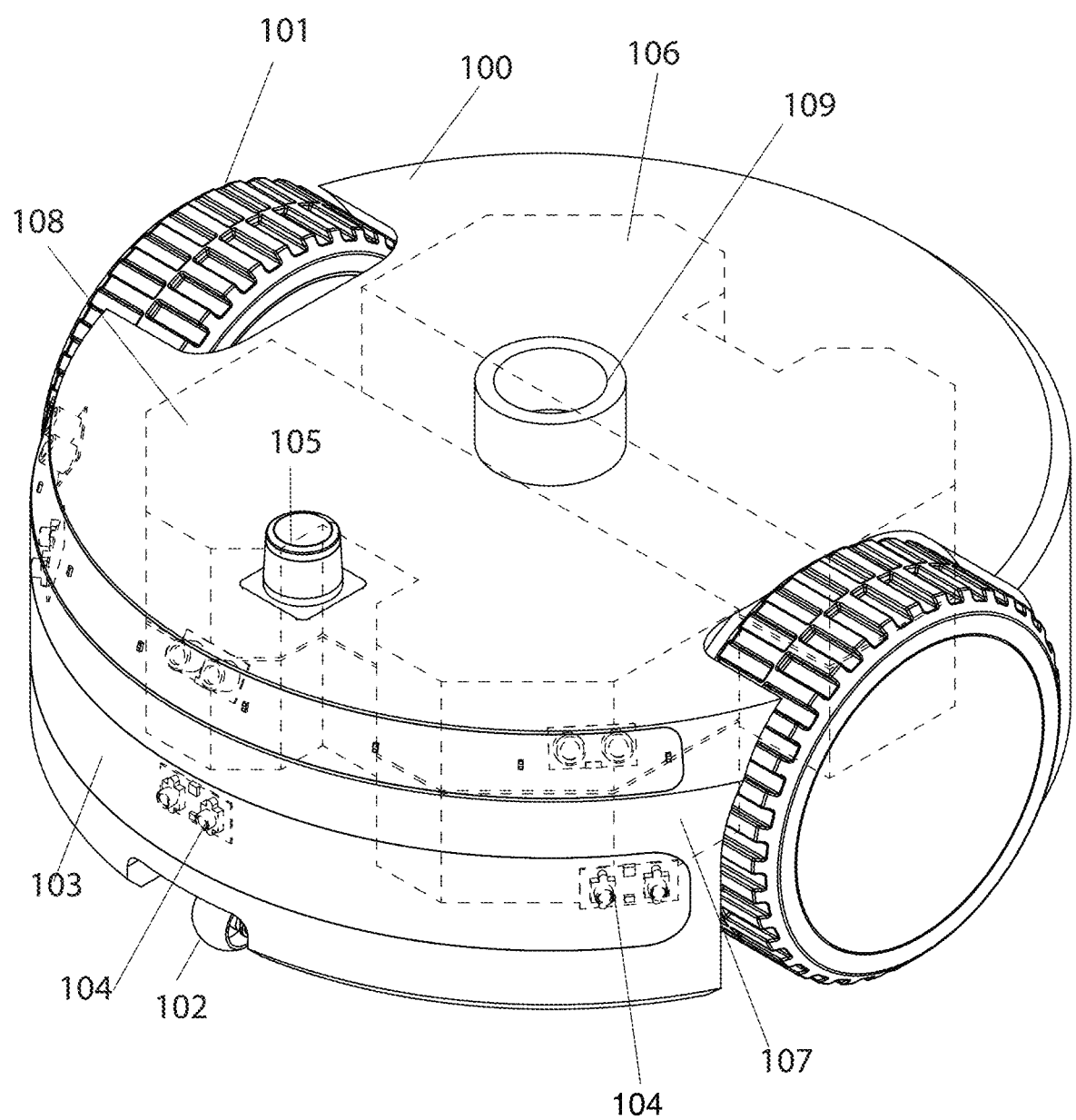
FIGS. 1A-1D illustrate an example of a modular robot, according to some embodiments.
Figure 1B:
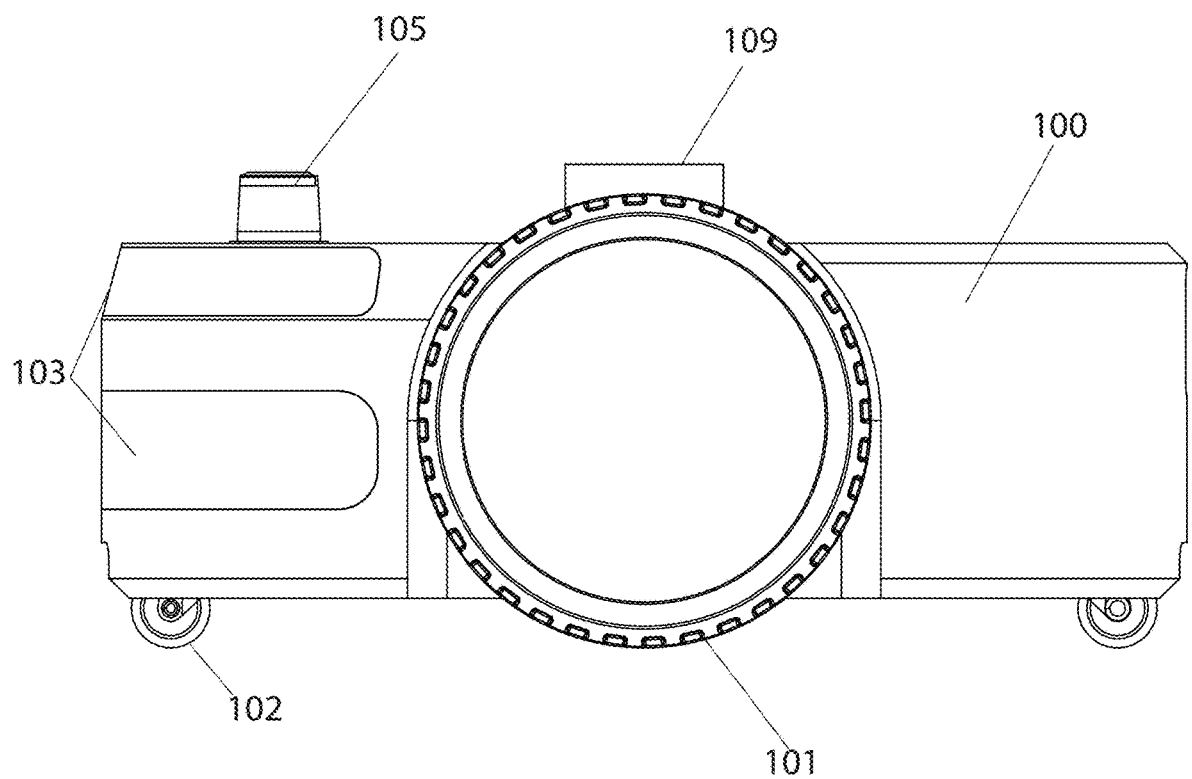
Figure 1C:
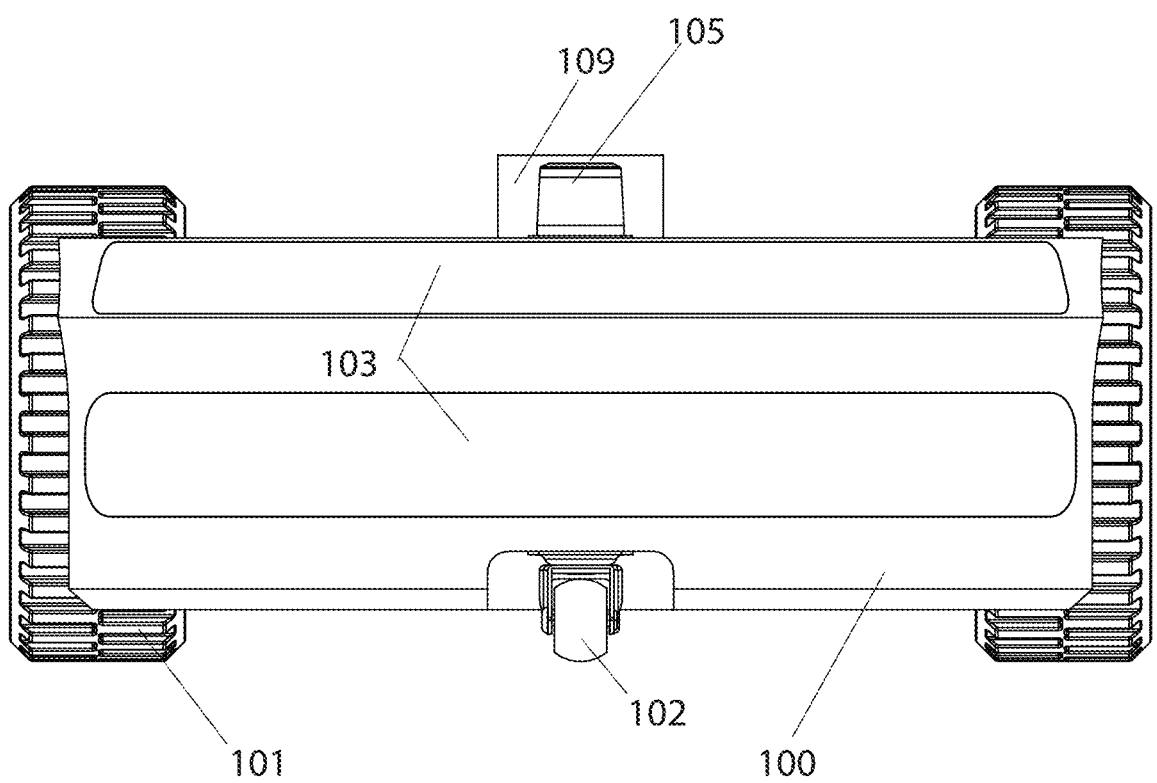
Figure 1D:
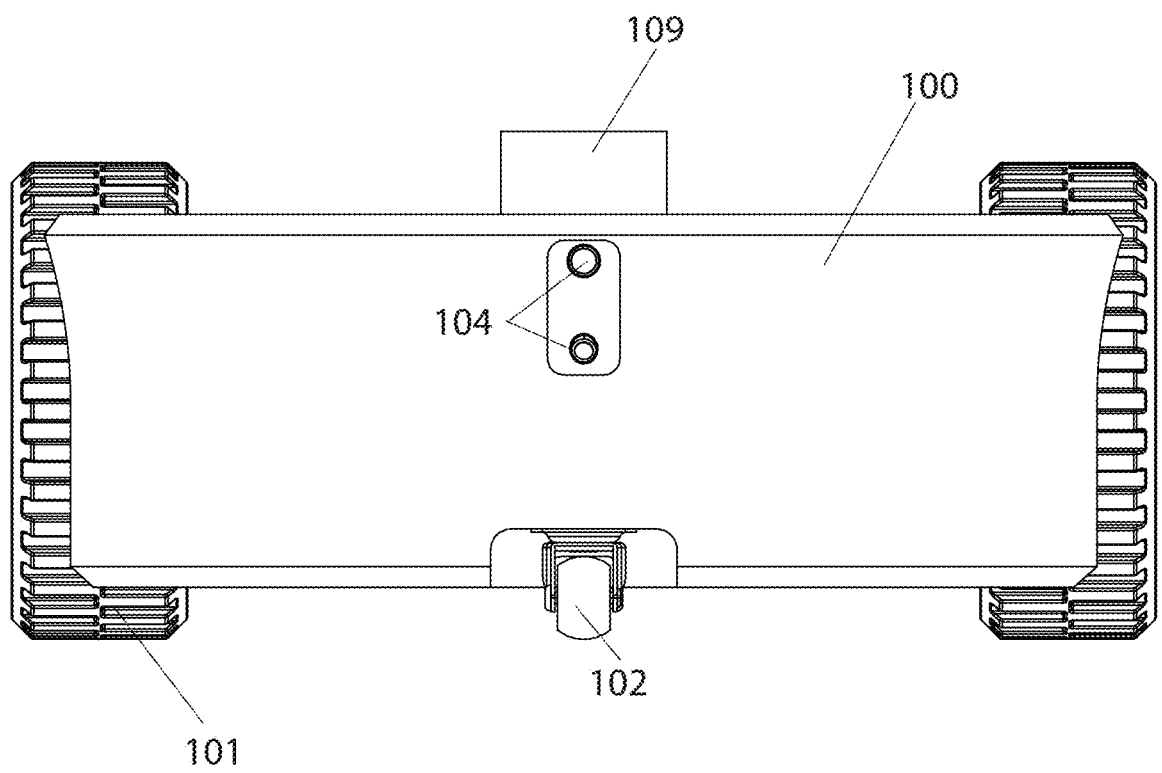
Figure 2A:
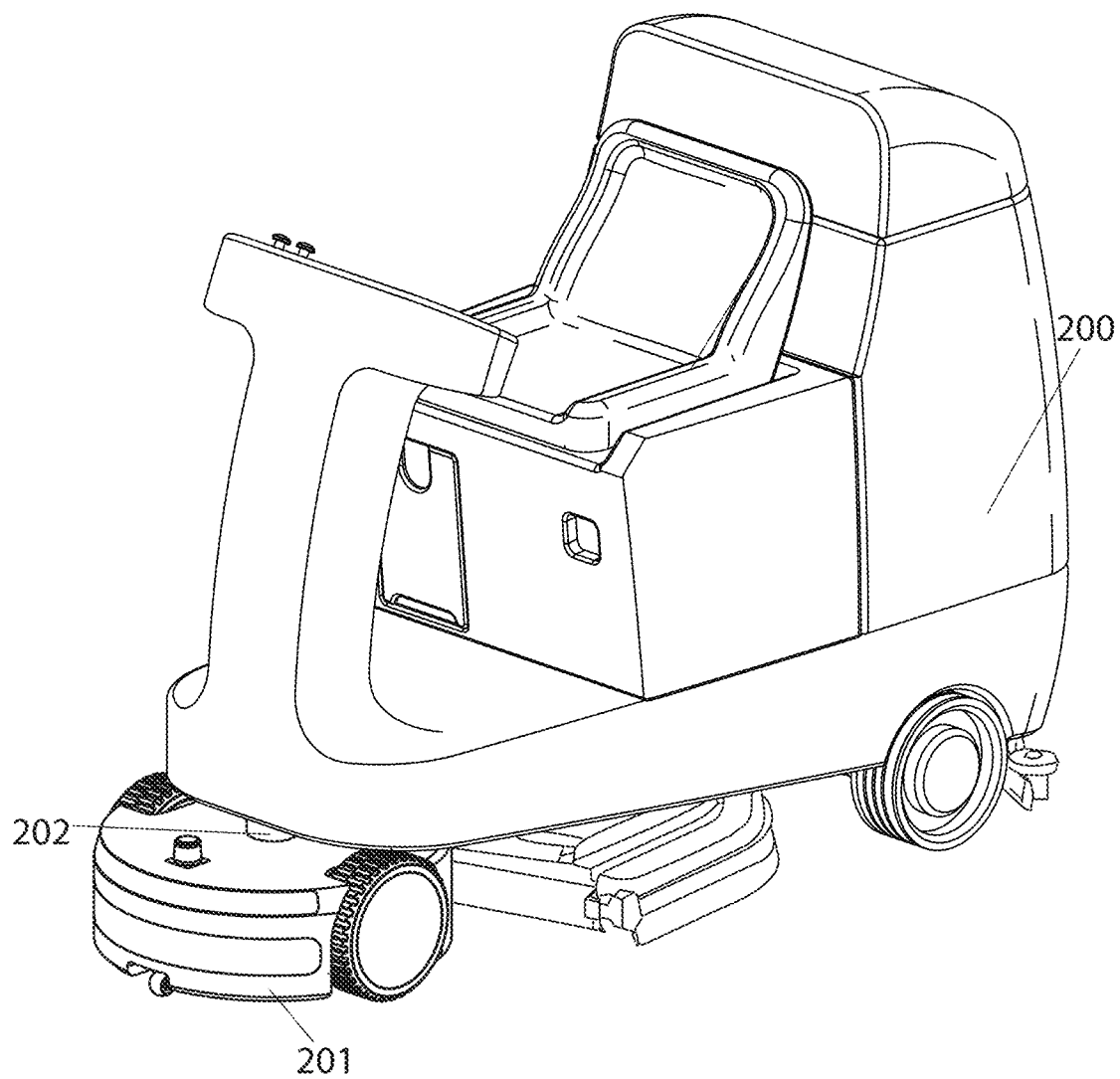
FIGS. 2A and 2B illustrate an example of a robotic scrubber, according to some embodiments.
Figure 2B:
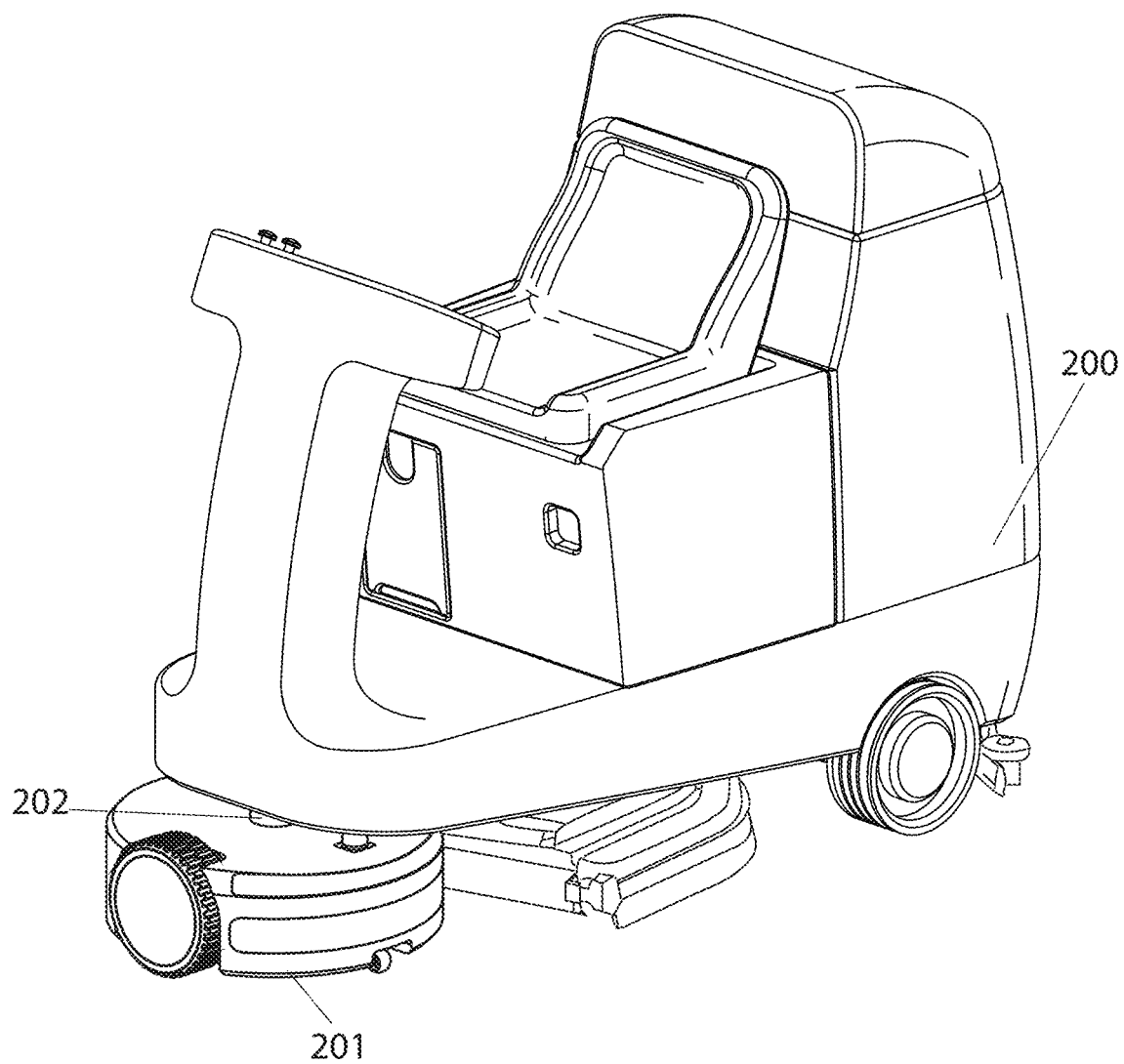
Figure 3A:
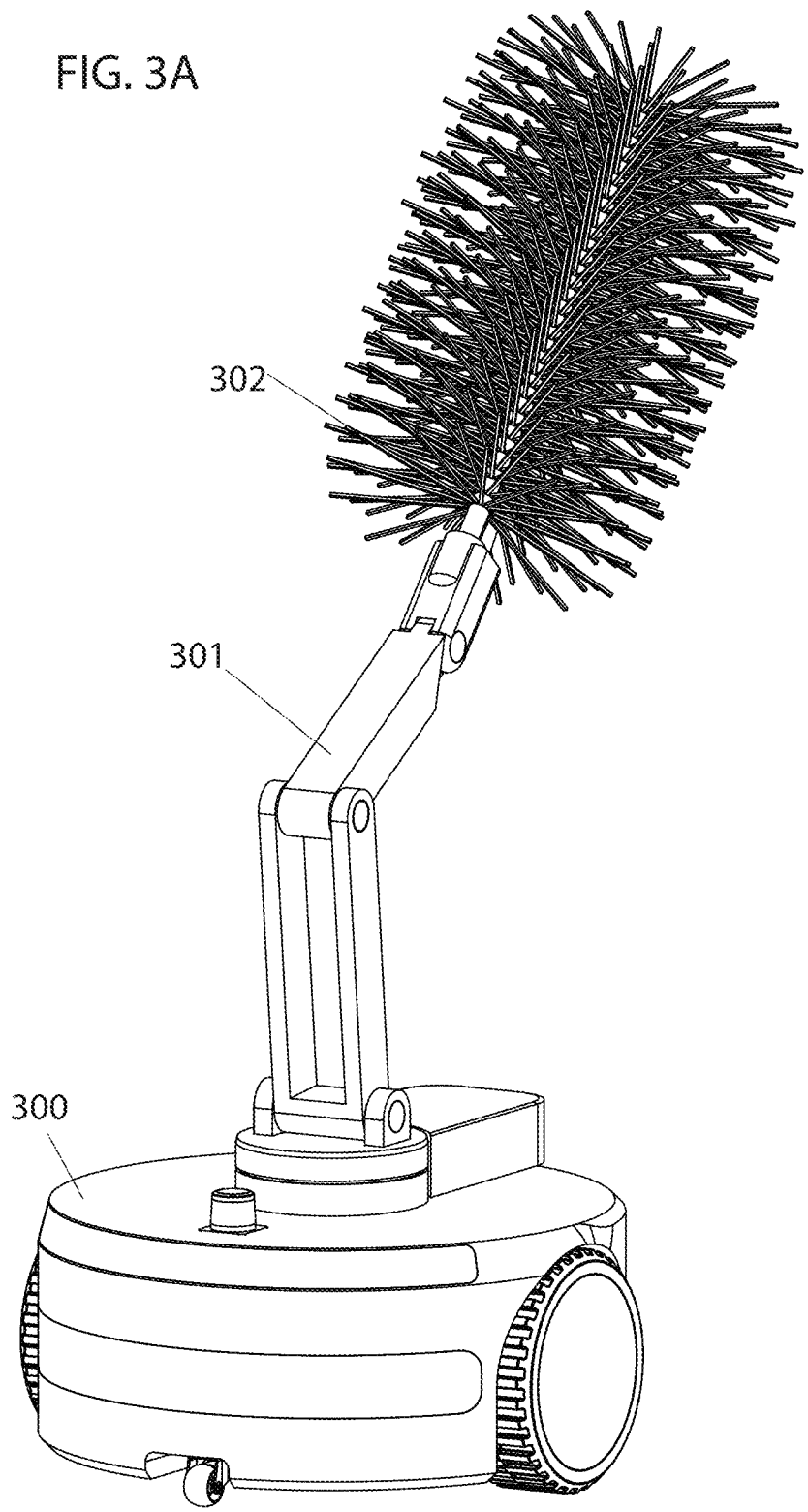
FIGS. 3A-3C illustrate an example of a car washing robot, according to some embodiments.
Figure 3B:
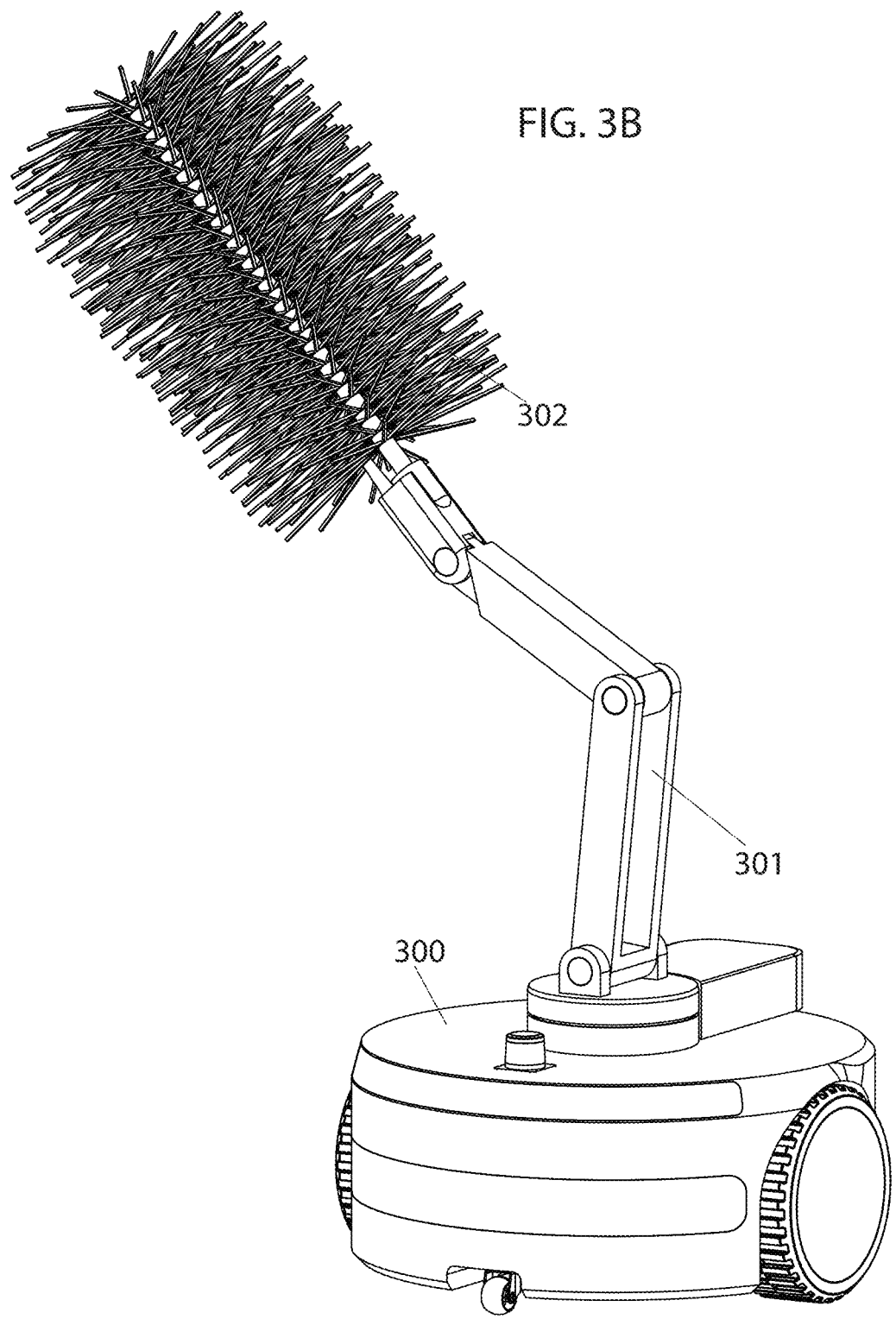
Figure 3C:
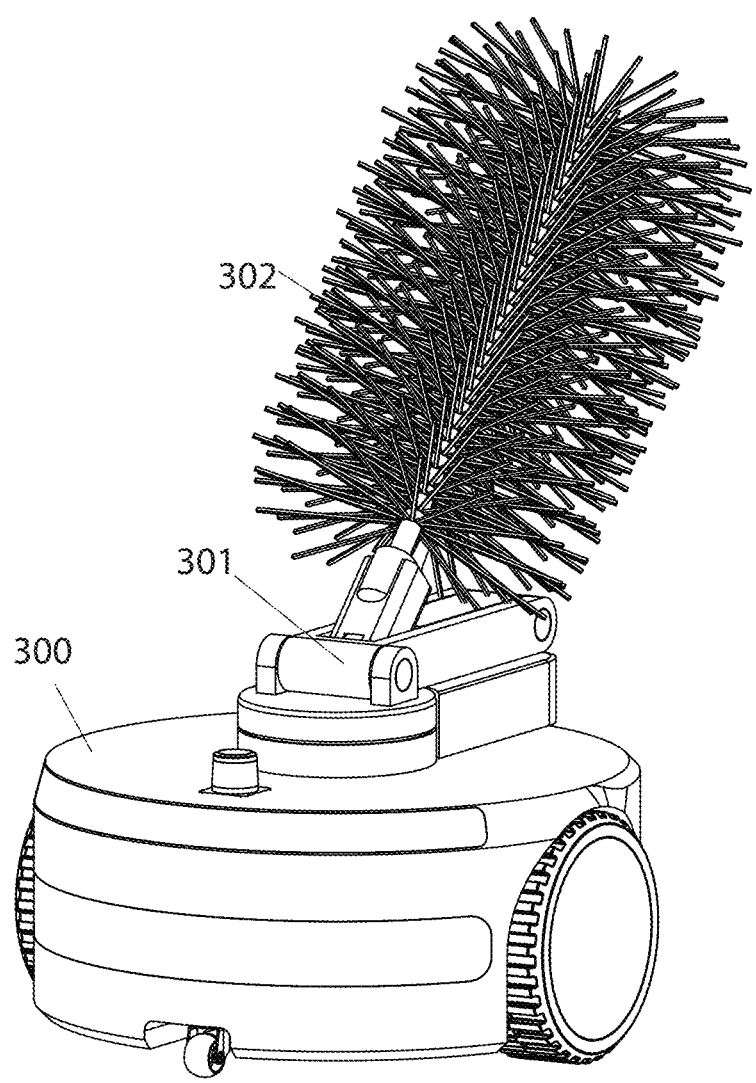
Figure 4A:
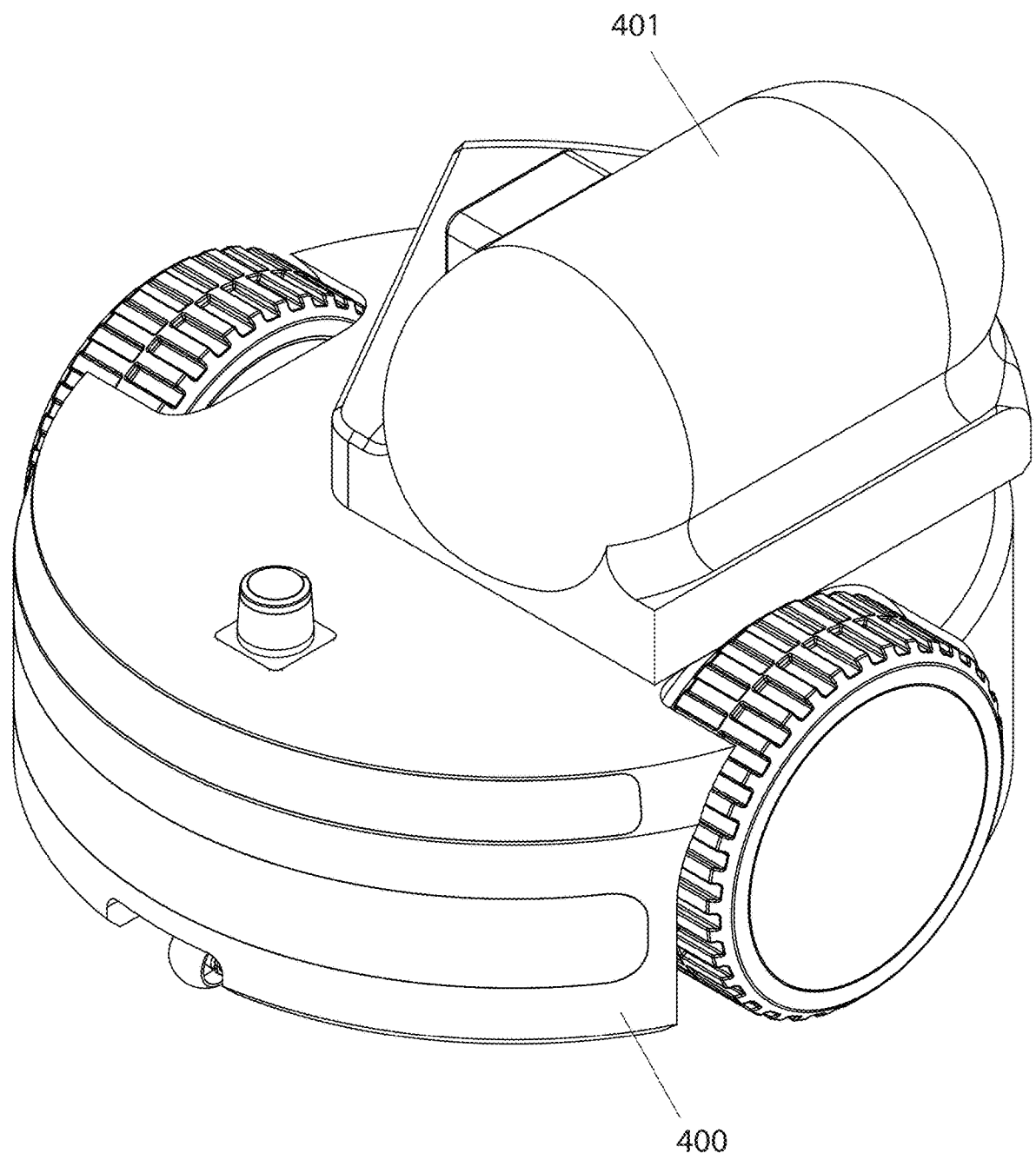
FIGS. 4A and 4B illustrate an example of an air compressor robot, according to some embodiments.
Figure 4B:
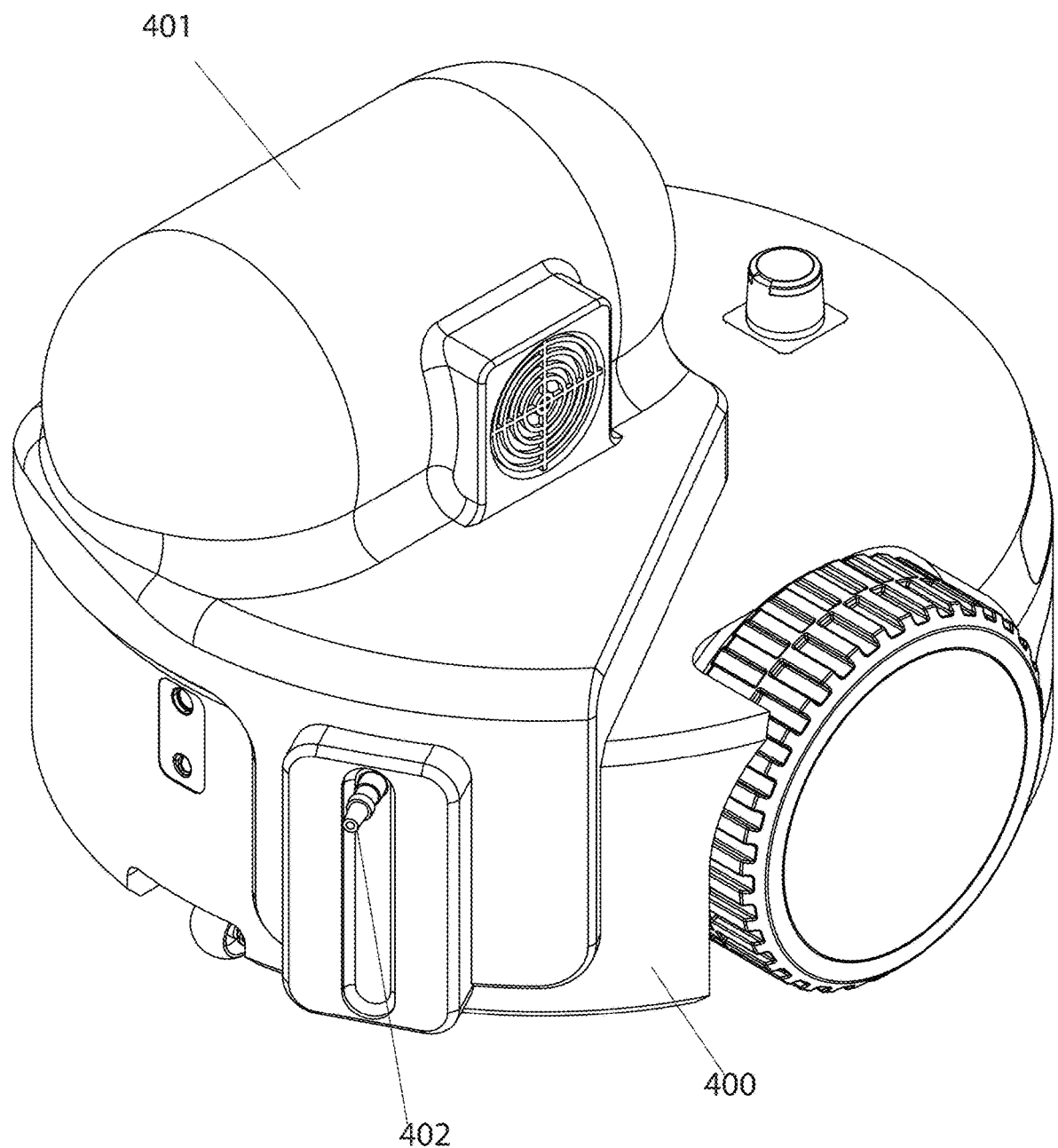
Figure 5A:
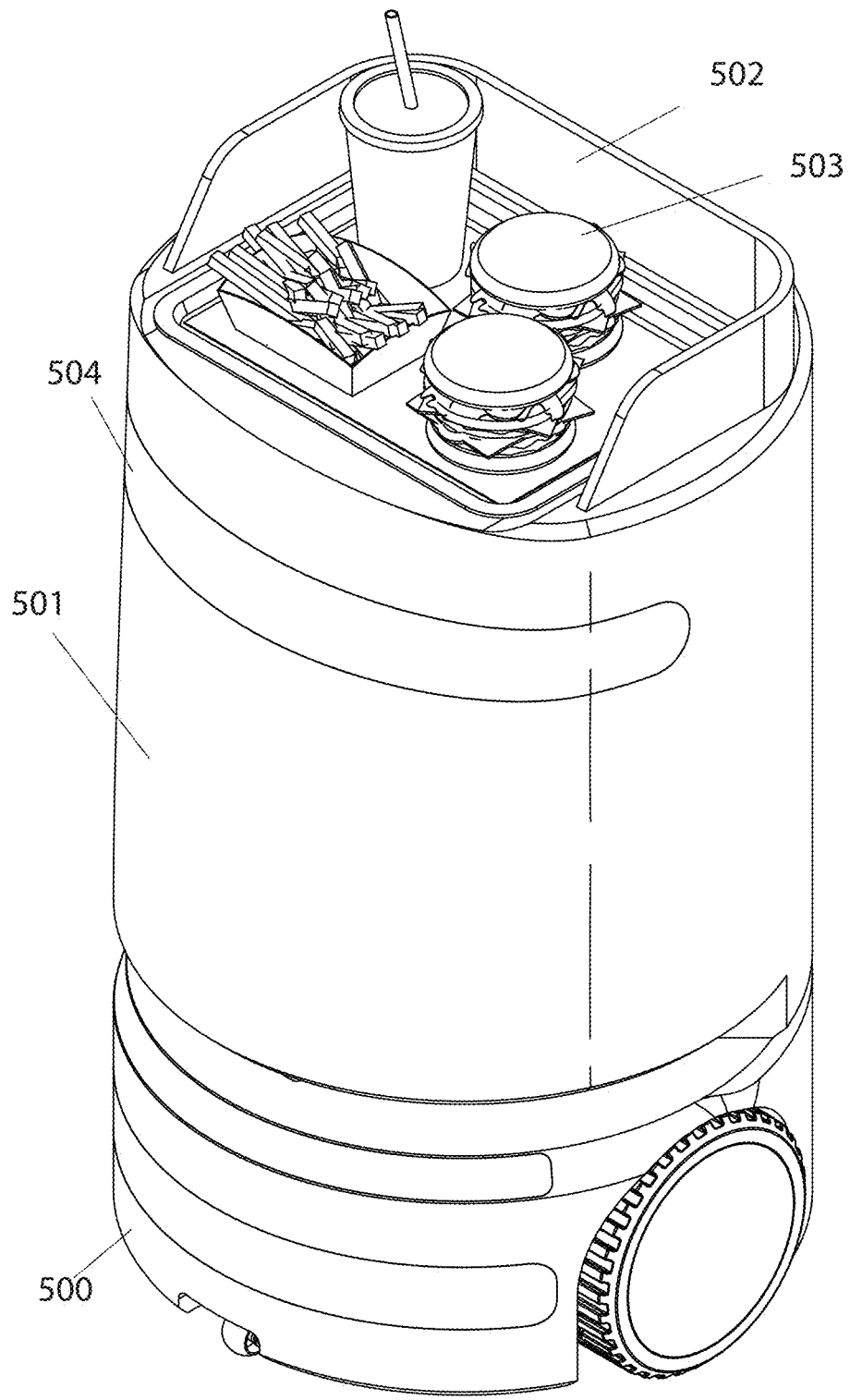
Figure 5C:
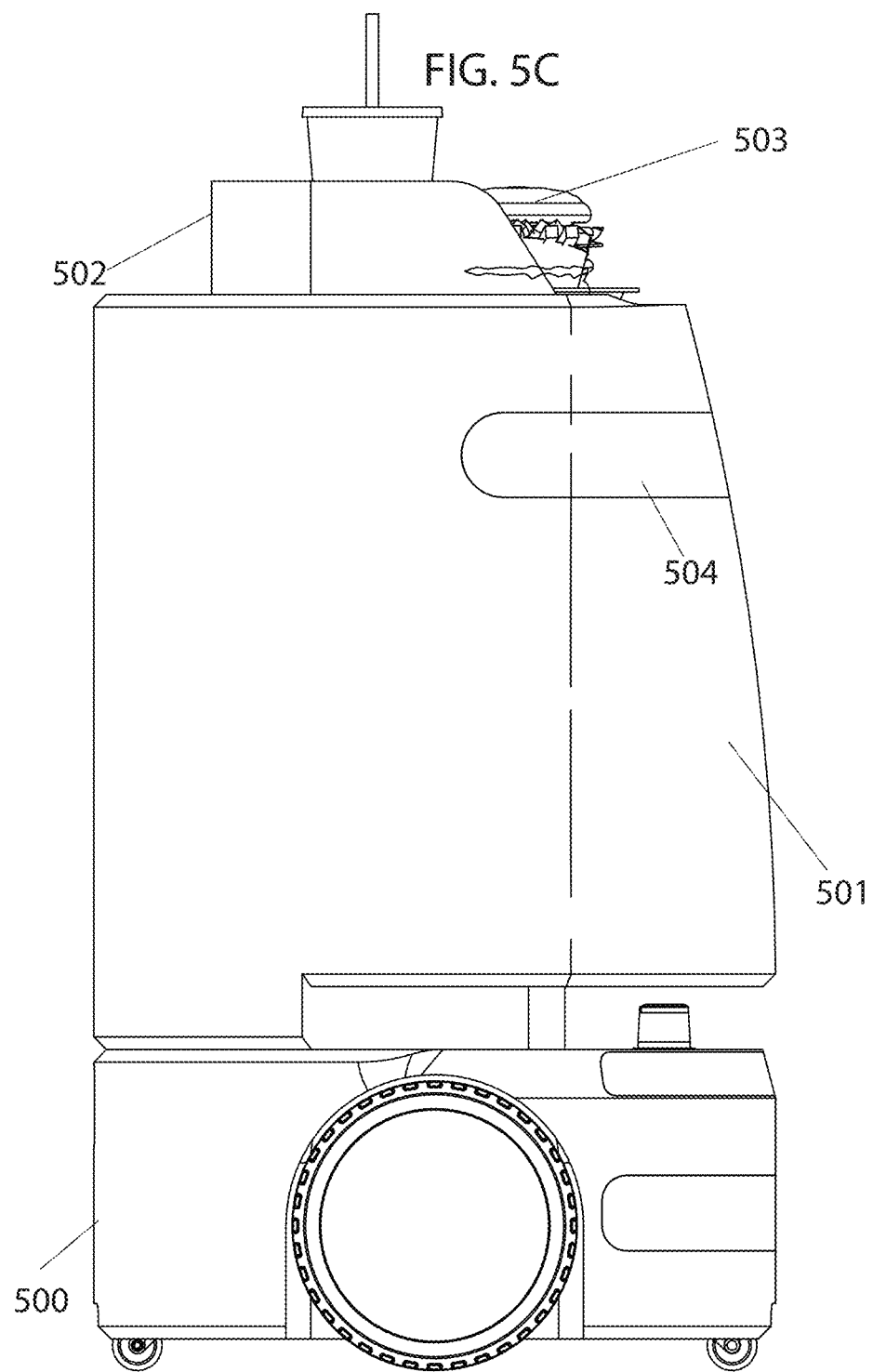
Figure 6A:
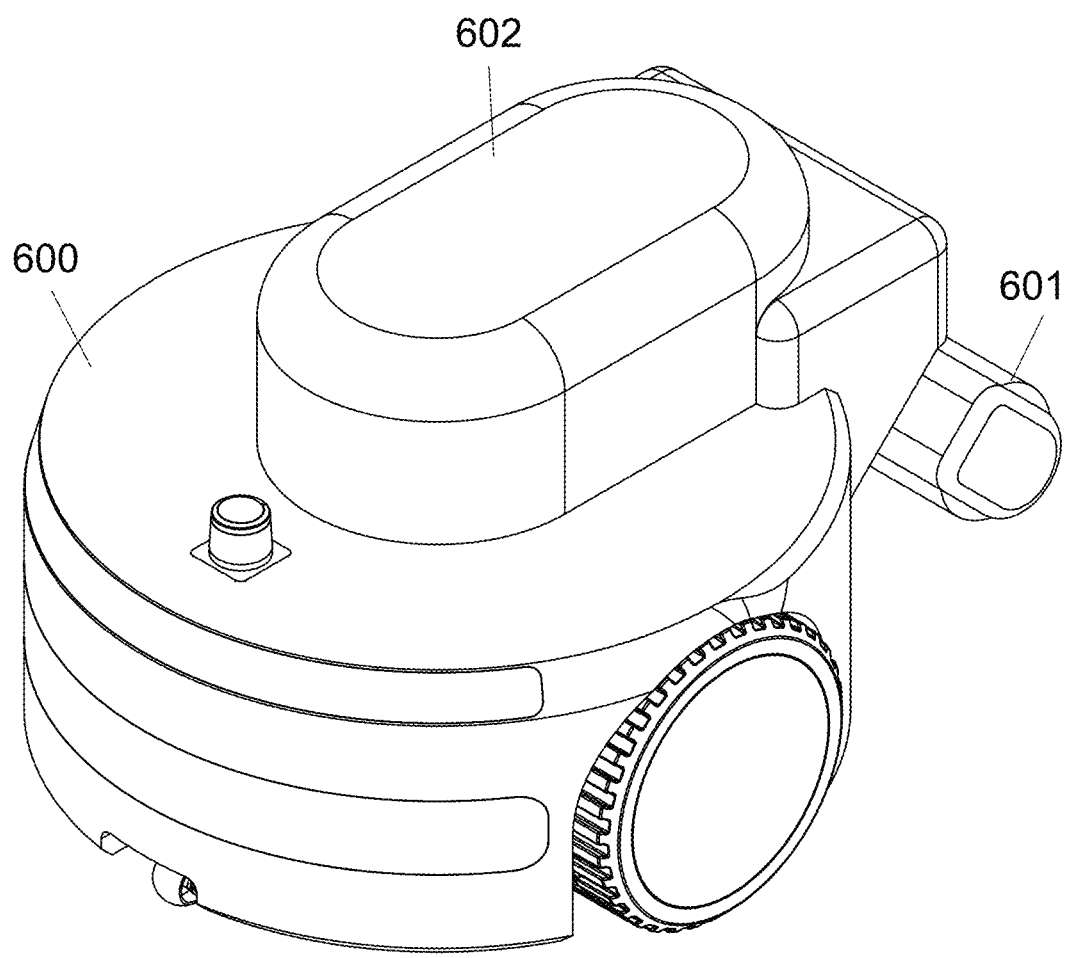
FIGS. 6A-6F illustrate an example of a painting robotic device, according to some embodiments.
Figure 6B:
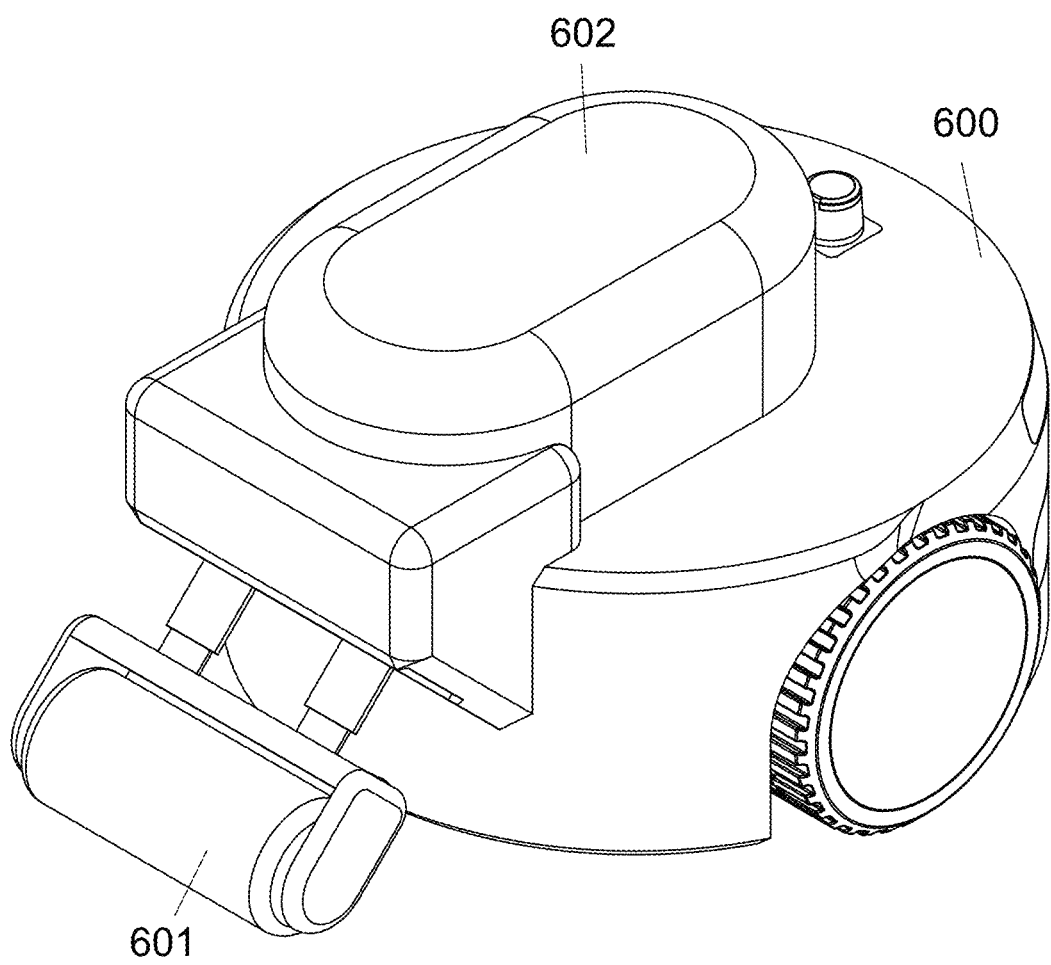
Figure 6C:
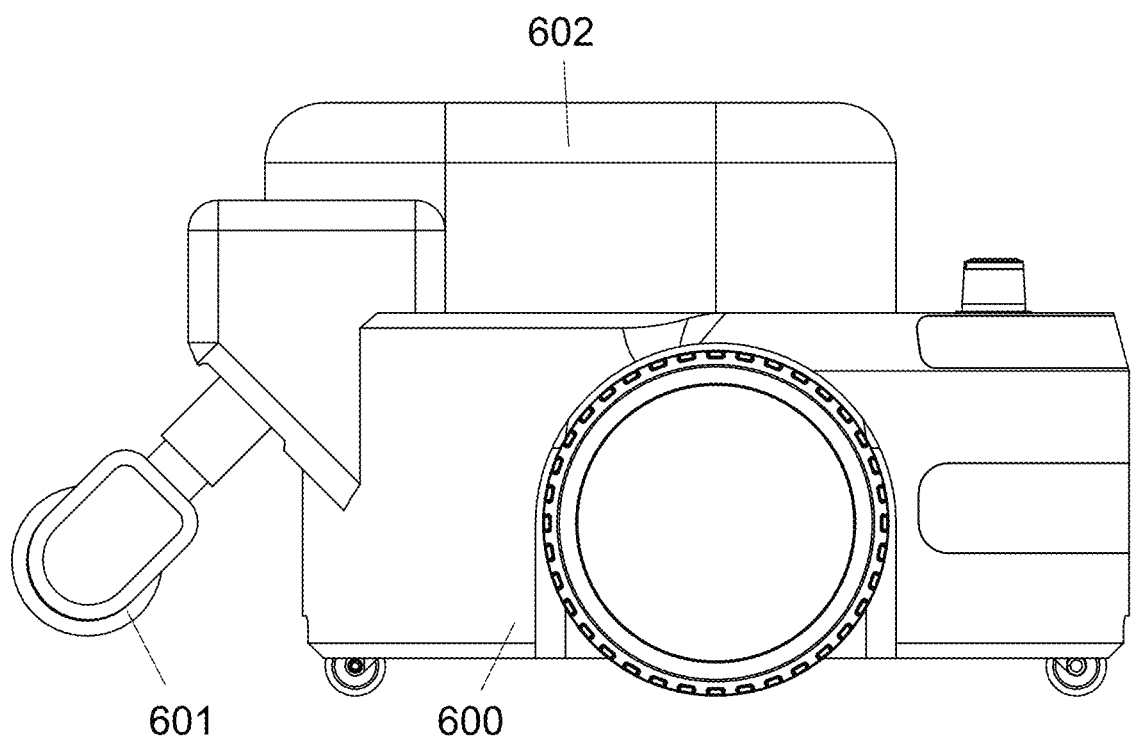
Figure 6D:
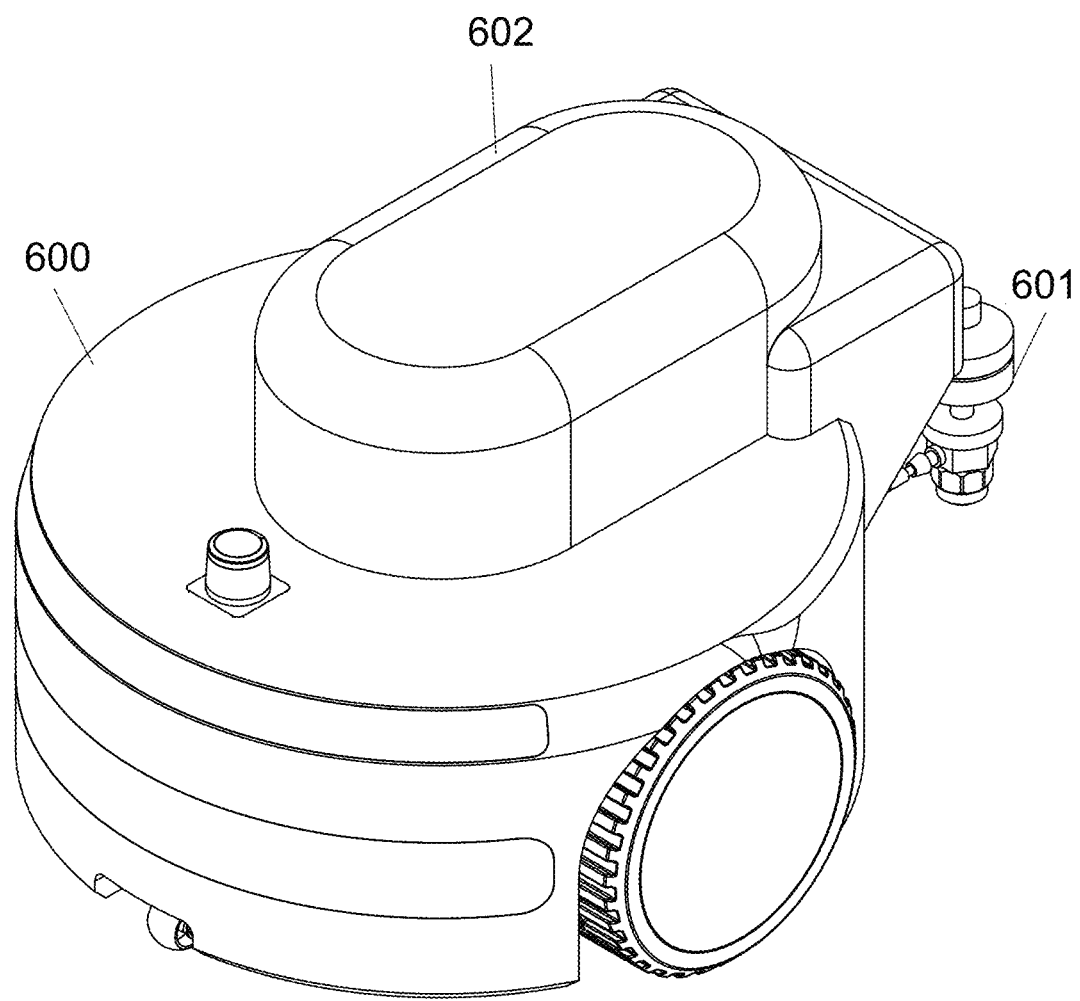
Figure 6E:
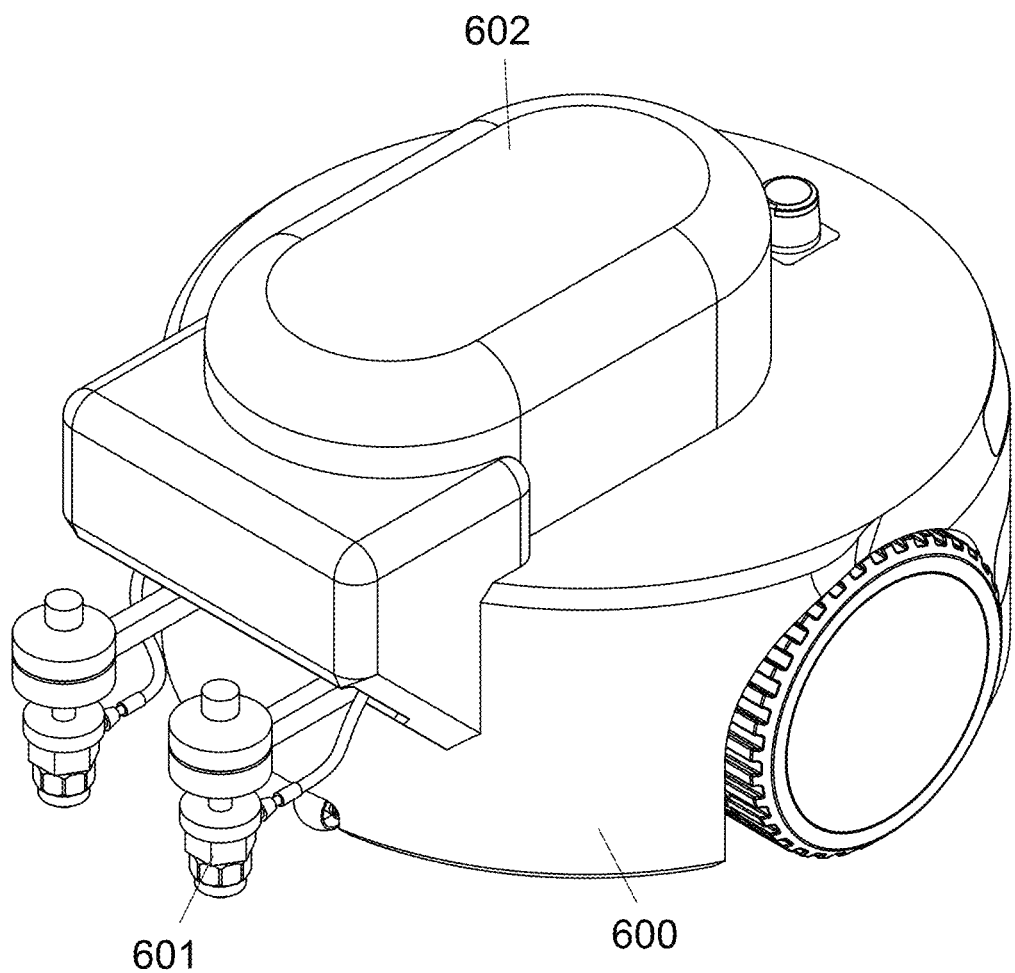
Figure 6F:
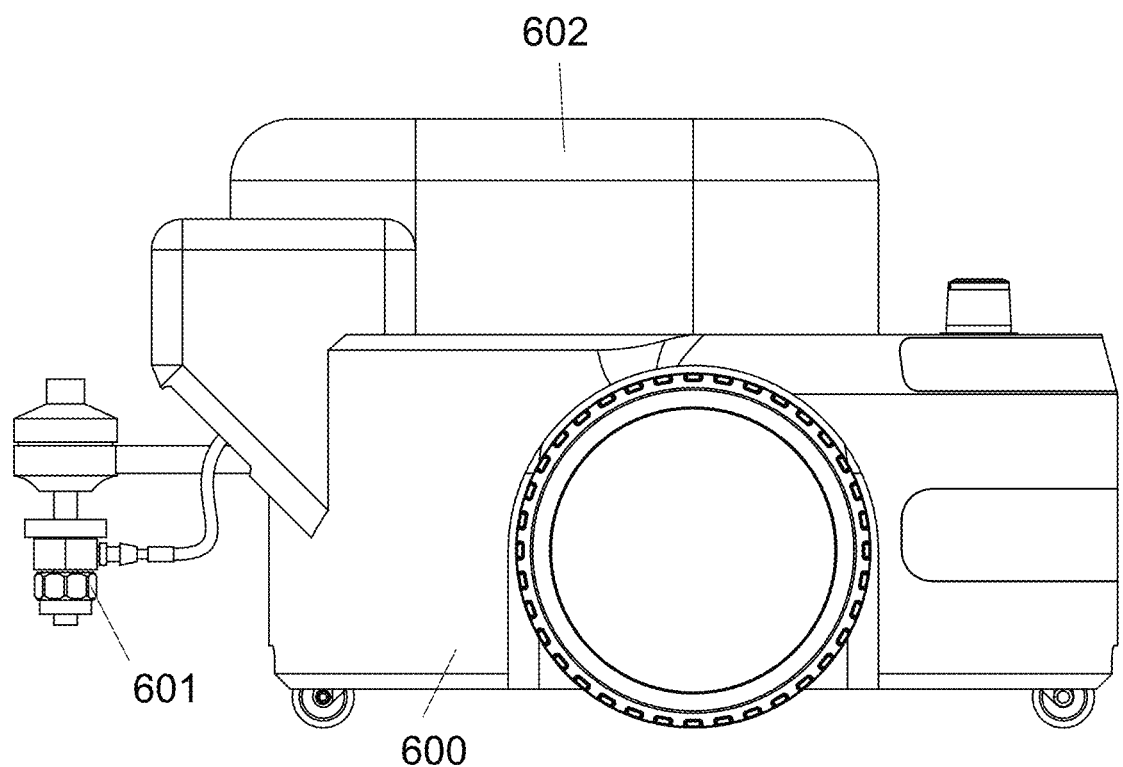

In some embodiments, the robot is a modular robot with a connector to which different structures may be coupled to customize the function of the modular robot. FIG. 1A illustrates an example of a modular robot including a casing 100, drive wheels 101, castor wheels 102, sensor windows 103, sensors 104, LIDAR 105, battery 106, memory 107, processor 108, and connector 109, that may implement the methods and techniques described herein. FIGS. 1B-1D illustrate the modular robot without internal components shown from a side, front, and rear view, respectively. The sensors 104 shown in FIG. 1D in the rear view of the modular robot may include a line laser and image sensor that may be used by the processor of the modular robot to align the robot with payloads, charging station, or other machines. In some embodiments, program code stored in the memory 107 and executed by the processor 108 may effectuate the operations described herein. In some embodiments, connector 109 may be used to connect different components to the modular robot, such that it may be customized to provide a particular function. For example, FIG. 2A illustrates a robotic scrubber 200 pivotally coupled to modular robot 201, such as the modular robot in FIGS. 1A-1D, using connector 202. The modular robot is customized to provide surface cleaning via the coupled robotic scrubber 200. Modular robot 201 navigates throughout the environment while towing robotic scrubber 200 which scrubs the driving surface while being towed by modular robot 201. FIG. 2B illustrates modular robot 202 rotated towards a side to change the driving direction of itself and the robotic scrubber 200 being towed. In other instances, modular robot 201 may tow other objects such as a vehicle, another robot, a cart of items, a wagon, a trailer, etc. In another example, FIGS. 3A-3C illustrate a modular robot 300 customized to provide car washing via a robotic arm 301 with brush 302 coupled to the modular robot 300 using a connector. In some instances, robotic arm 301 has six degrees of freedom and is installed on top of the modular robot 300. In some instances, the end of robotic arm 301 includes the rotating brush 302 for cleaning cars. In some cases, there may be a spray nozzle near the brush 302 to spray cleaning liquid while brush 302 is spinning. FIGS. 4A and 4B illustrate a front and rear perspective view another example, with a modular robot 400 fitted with an air compressor 401. FIG. 4B shows nozzle 402 of air compressor 401. In some instances, the modular robot 400 maps an area around a vehicle, for example, and autonomously connects nozzle 402 to the tires of the vehicle to fill them with air. In some cases, air compressor 401 includes an air pressure sensor such that tires may autonomously be filled to a particular pressure. In another example, FIGS. 5A-5C illustrate modular robot 500 customized to provide food delivery. In some cases, main compartment 501 may be one or more of: a fridge, a freezer, an oven, a warming oven, a cooler, or other food preparation or maintenance equipment. For example, the food delivery robot may cook a pizza in an oven on route to the delivery destination such that it is freshly cooked for the customer. A tray 502 for food items 503 may also be included for delivery to tables of customers in cases where the food delivery robot functions as a server. Due to the increased height, main compartment 501 may also include additional sensors 504 that operate in conjunction with modular robot 500. FIGS. 6A-6C illustrates yet another example, wherein modular robot 600 is customized to functions as a painting robot including a paint roller 601 for painting streets or roofs, for example, and paint tank 602. FIGS. 6D-6F illustrate an alternative painting robot wherein nozzles 603 are used instead of paint roller 601.

Figure 7A:
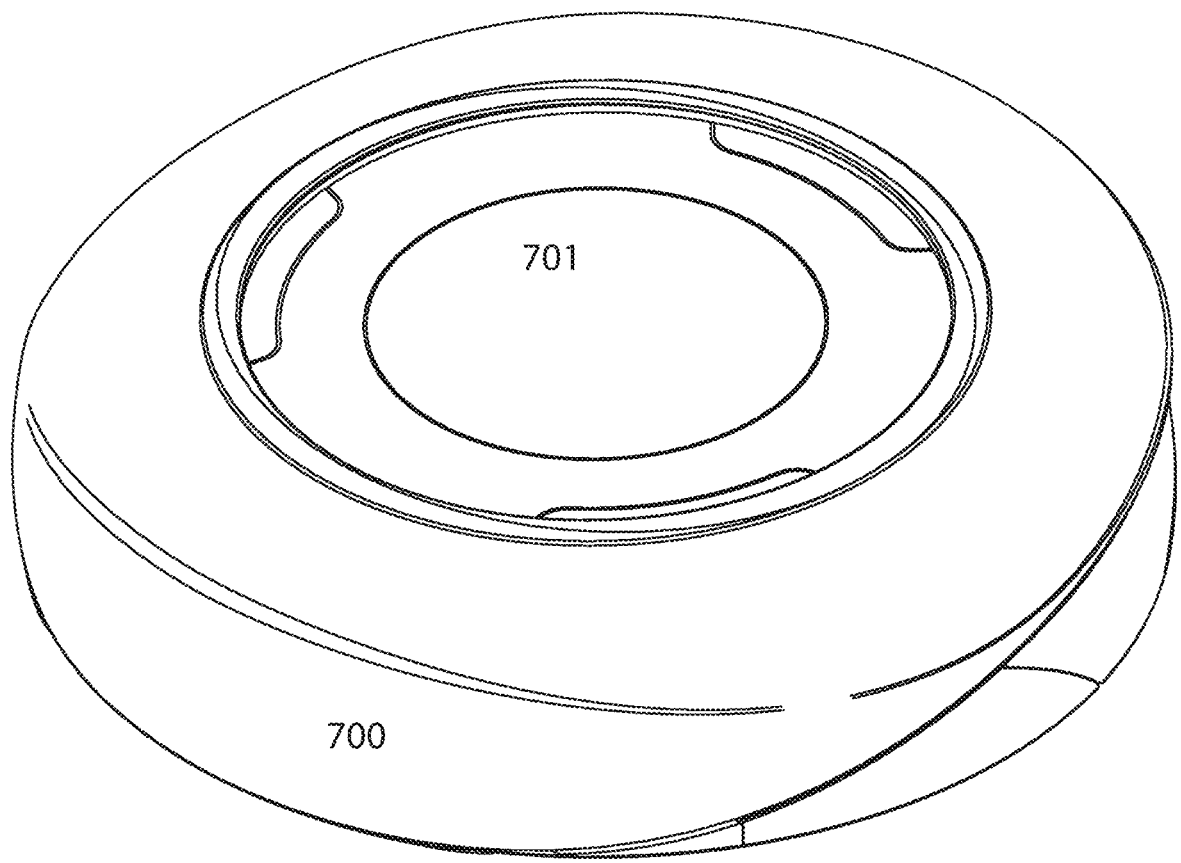
FIGS. 7A-7E illustrate an example of a robotic vacuum, according to some embodiments.
Figure 7B:
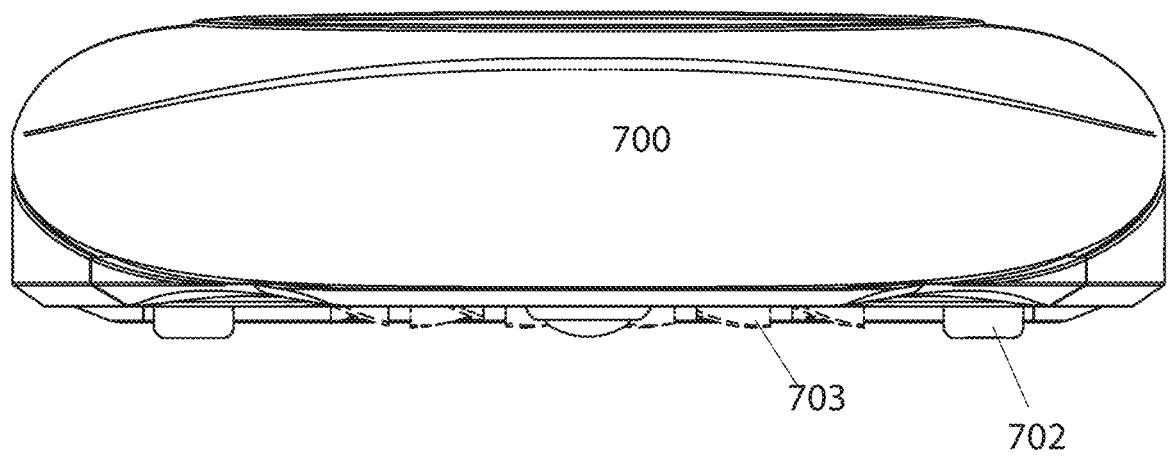
Figure 7C:
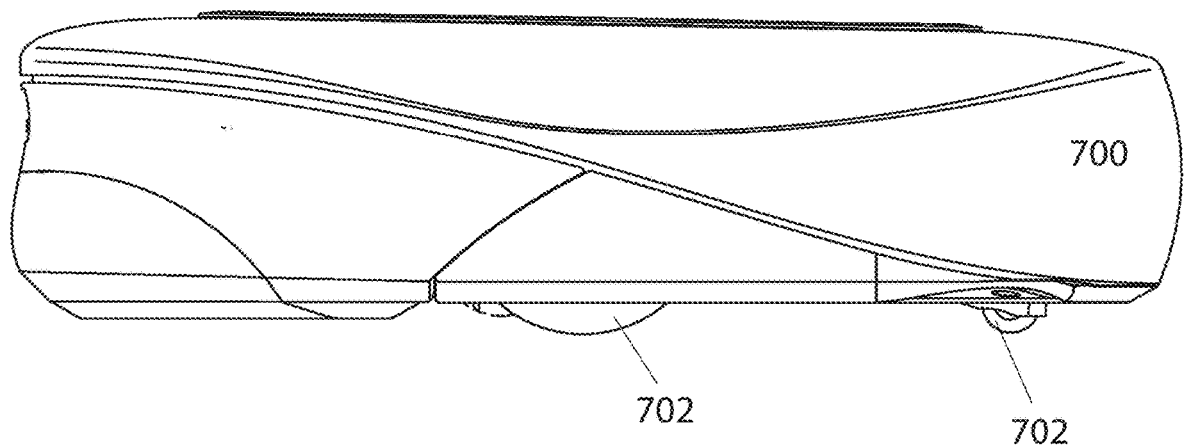
Figure 7D:
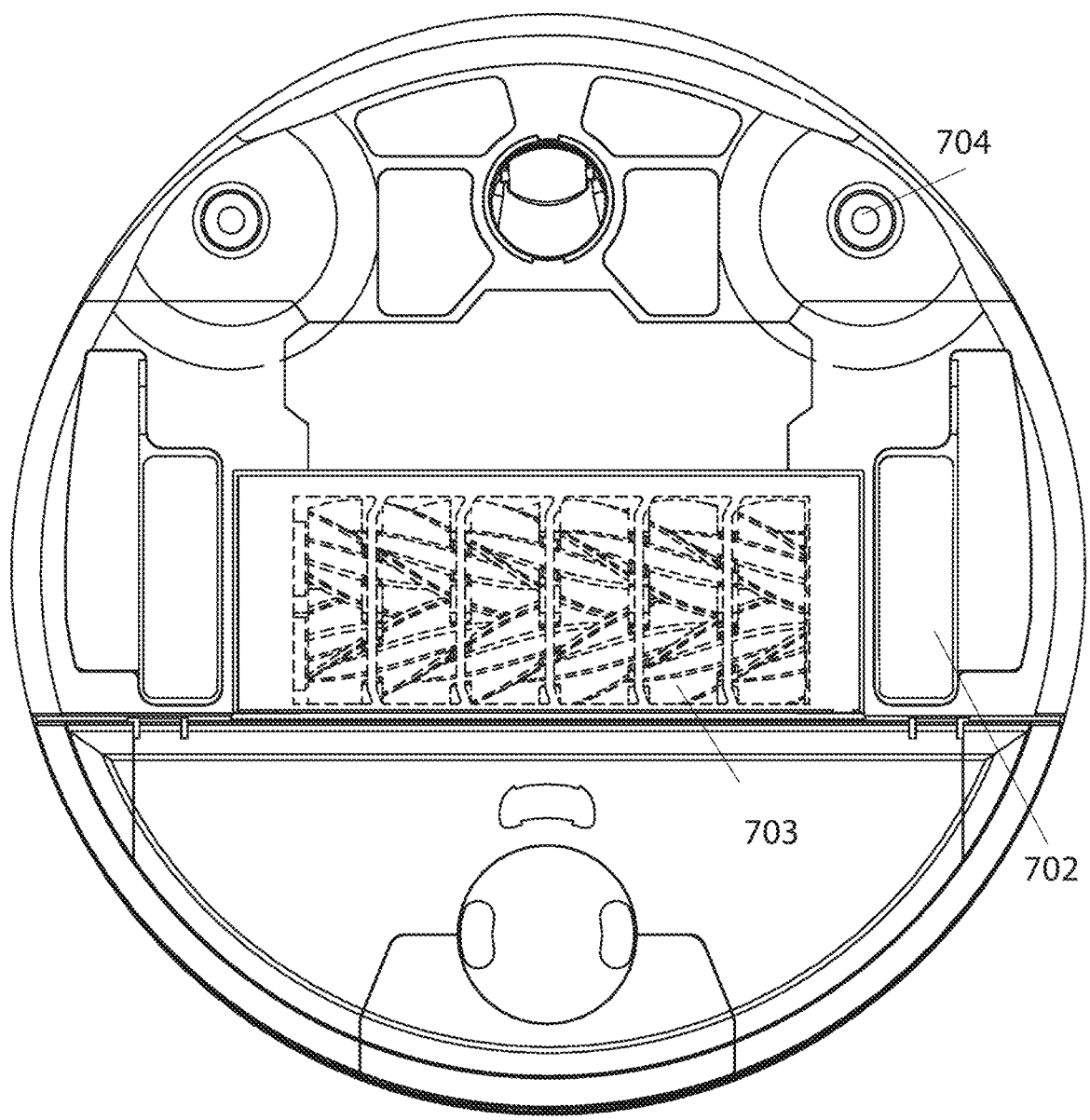
Figure 7E:
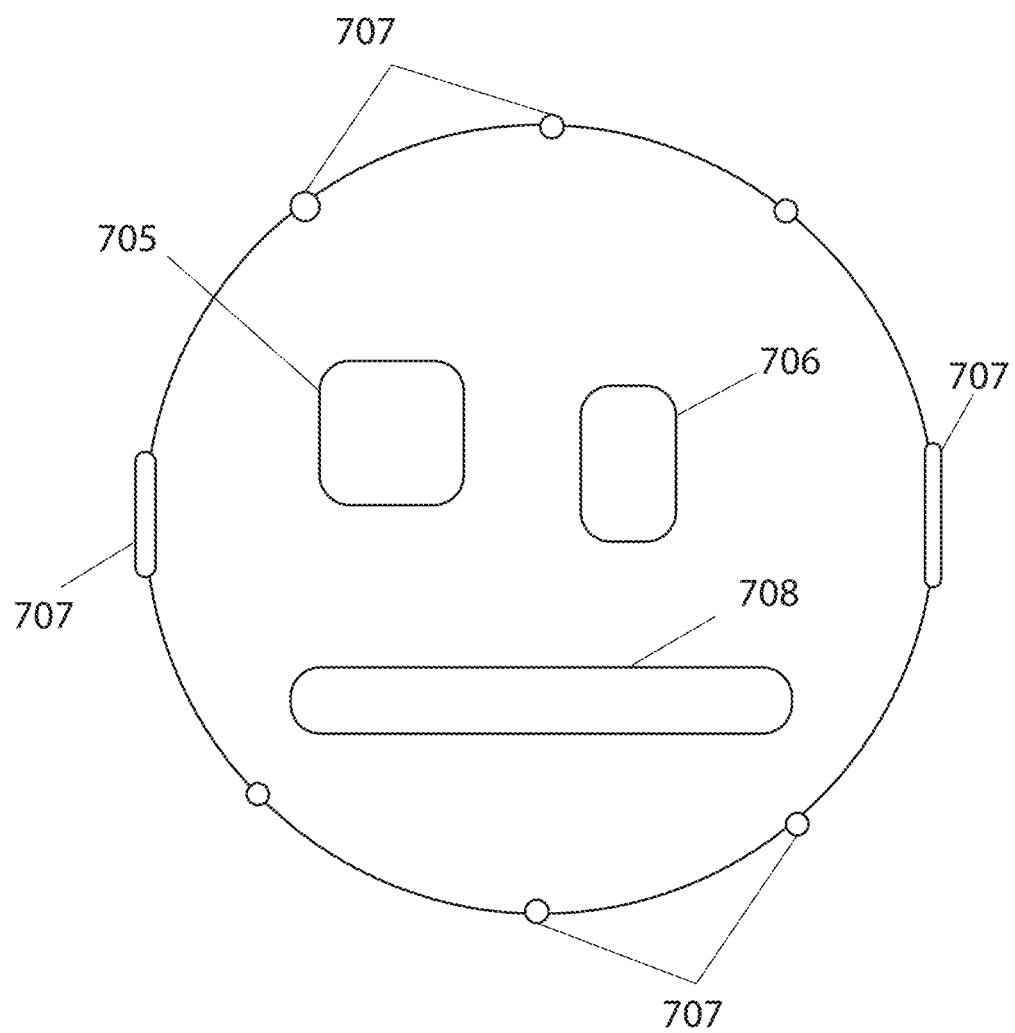
Figure 8A:
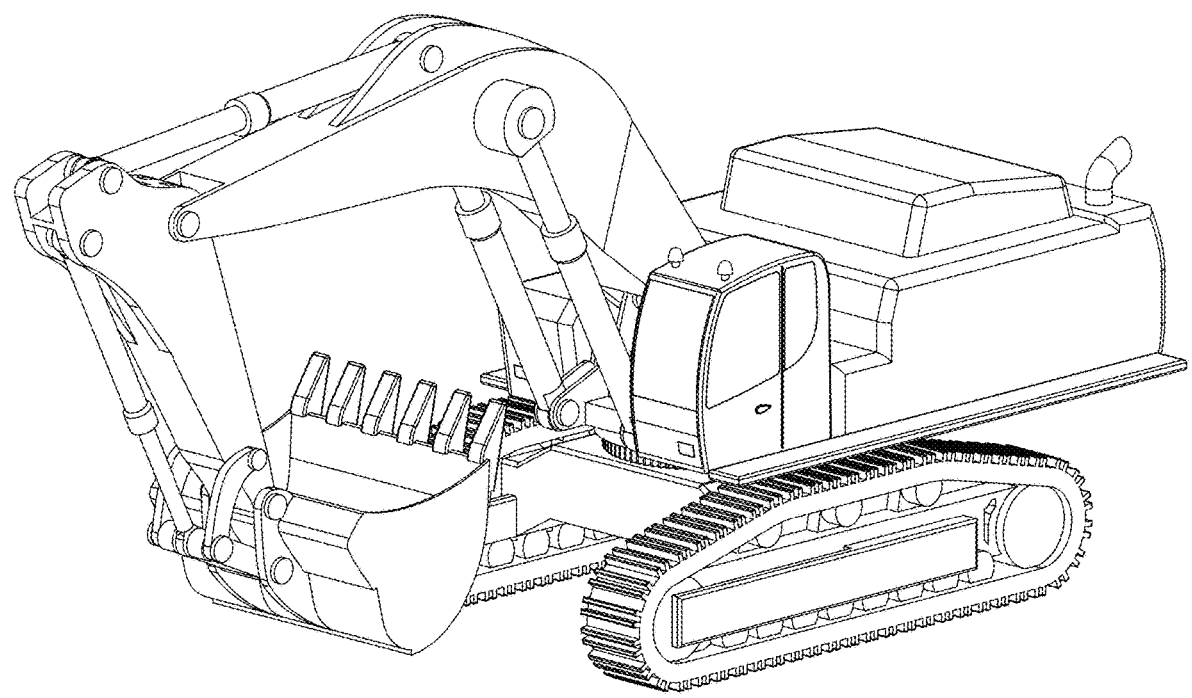
FIGS. 8A and 8B illustrate an example of a robotic excavator, according to some embodiments.
Figure 8B:
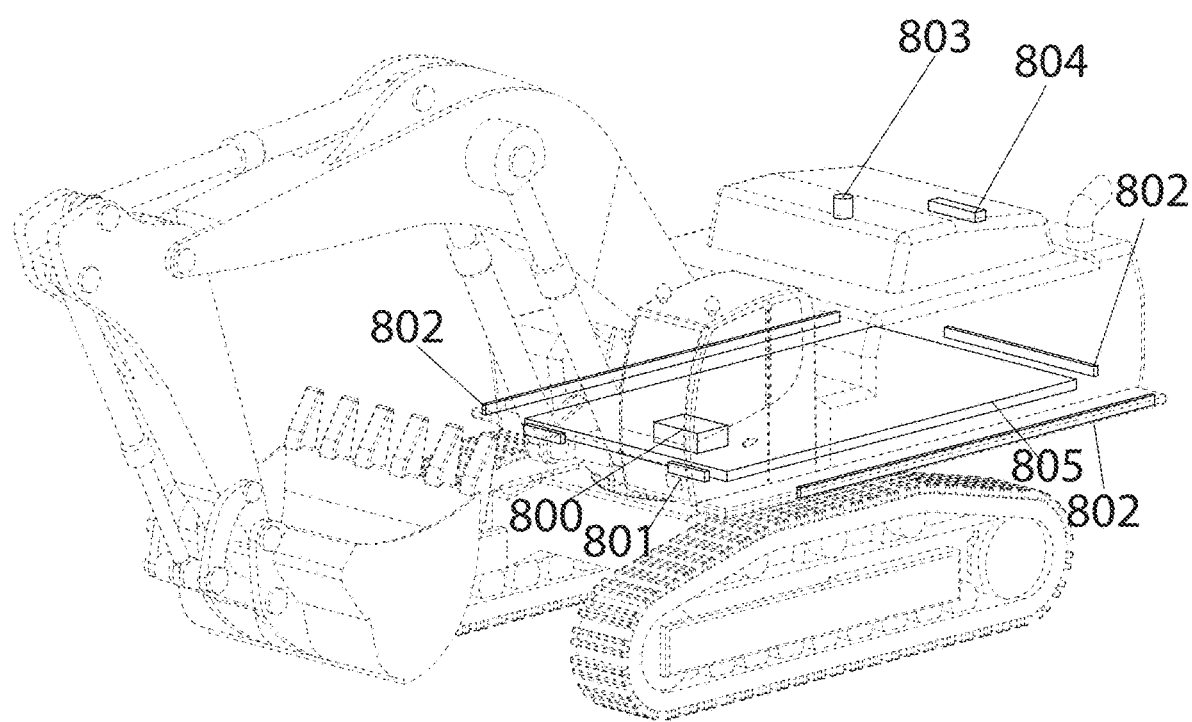
Figure 9A:
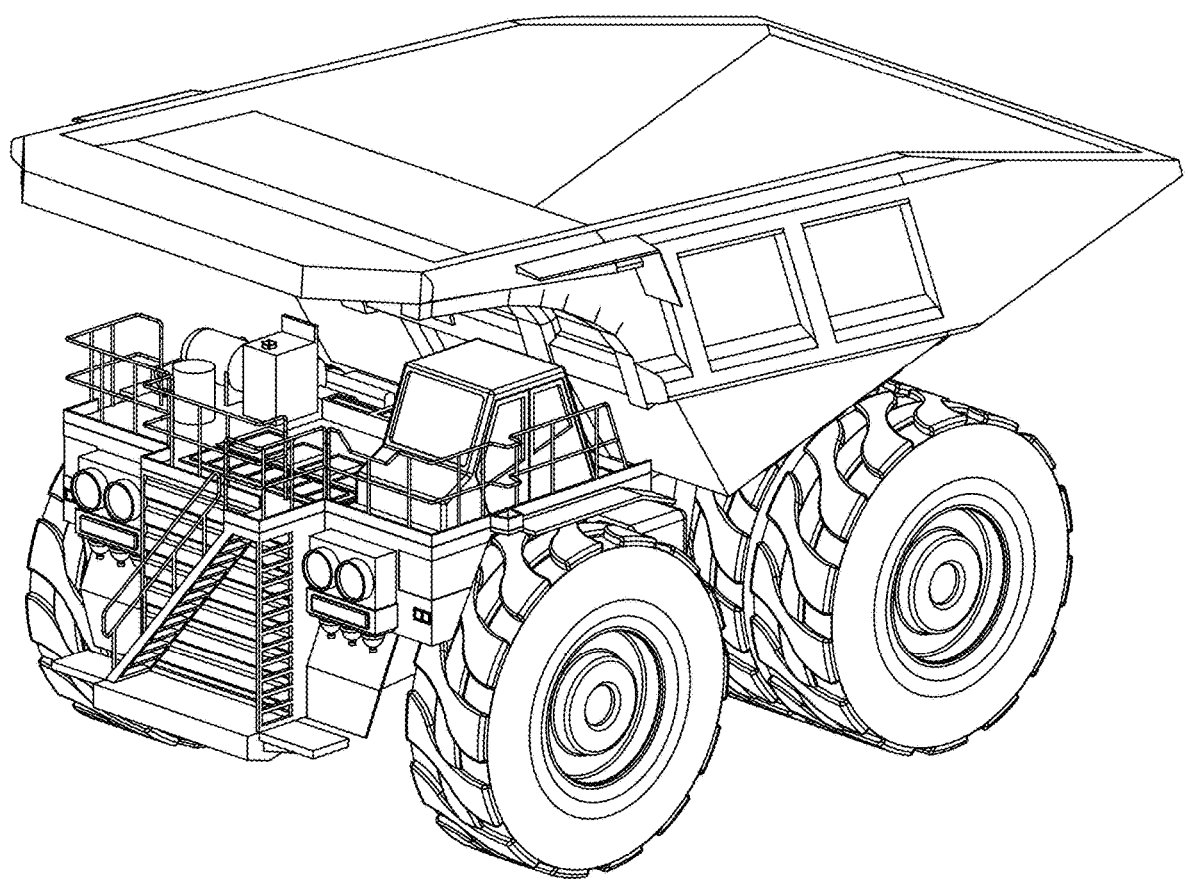
FIGS. 9A and 9B illustrate an example of a robotic dump truck, according to some embodiments.
Figure 9B:
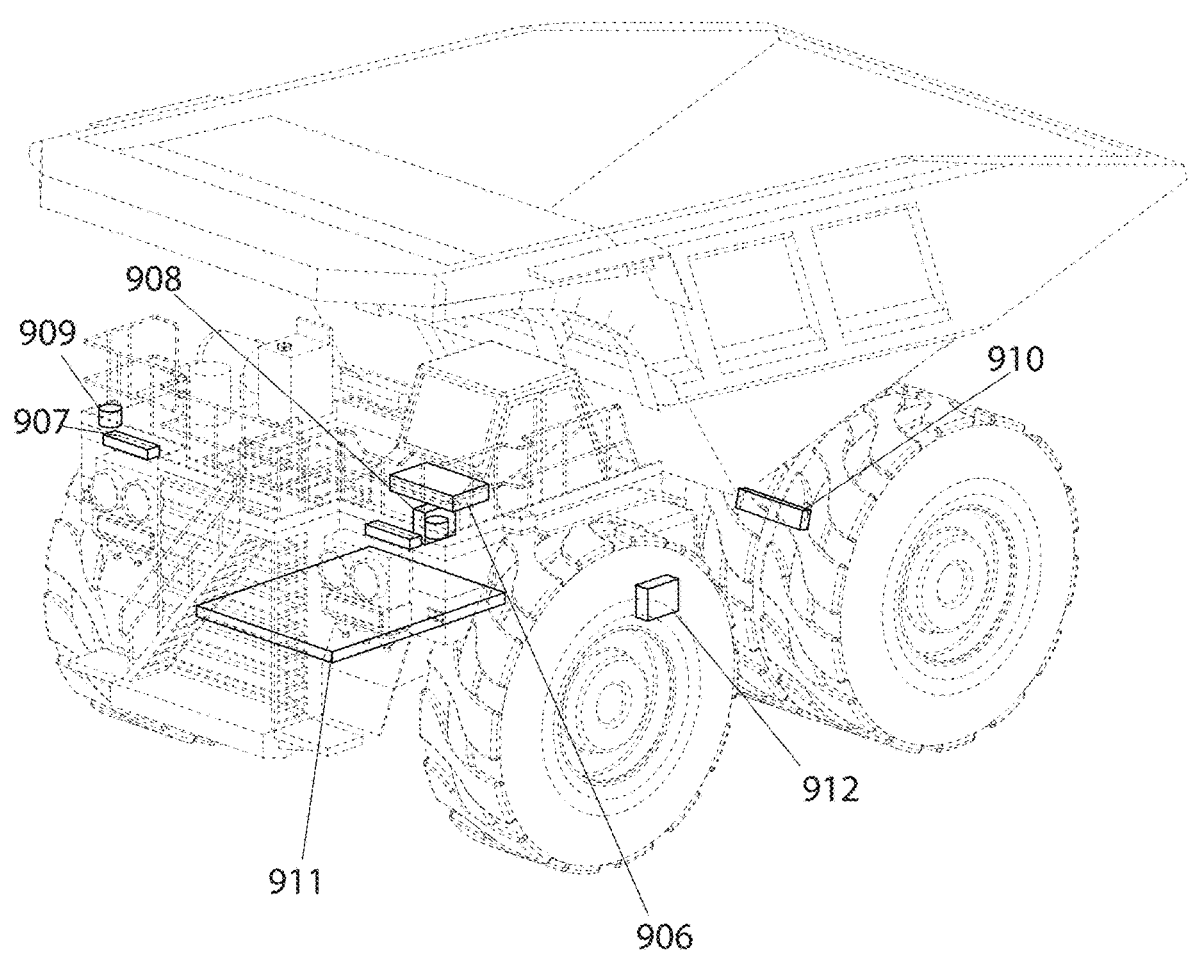
Figure 10A:
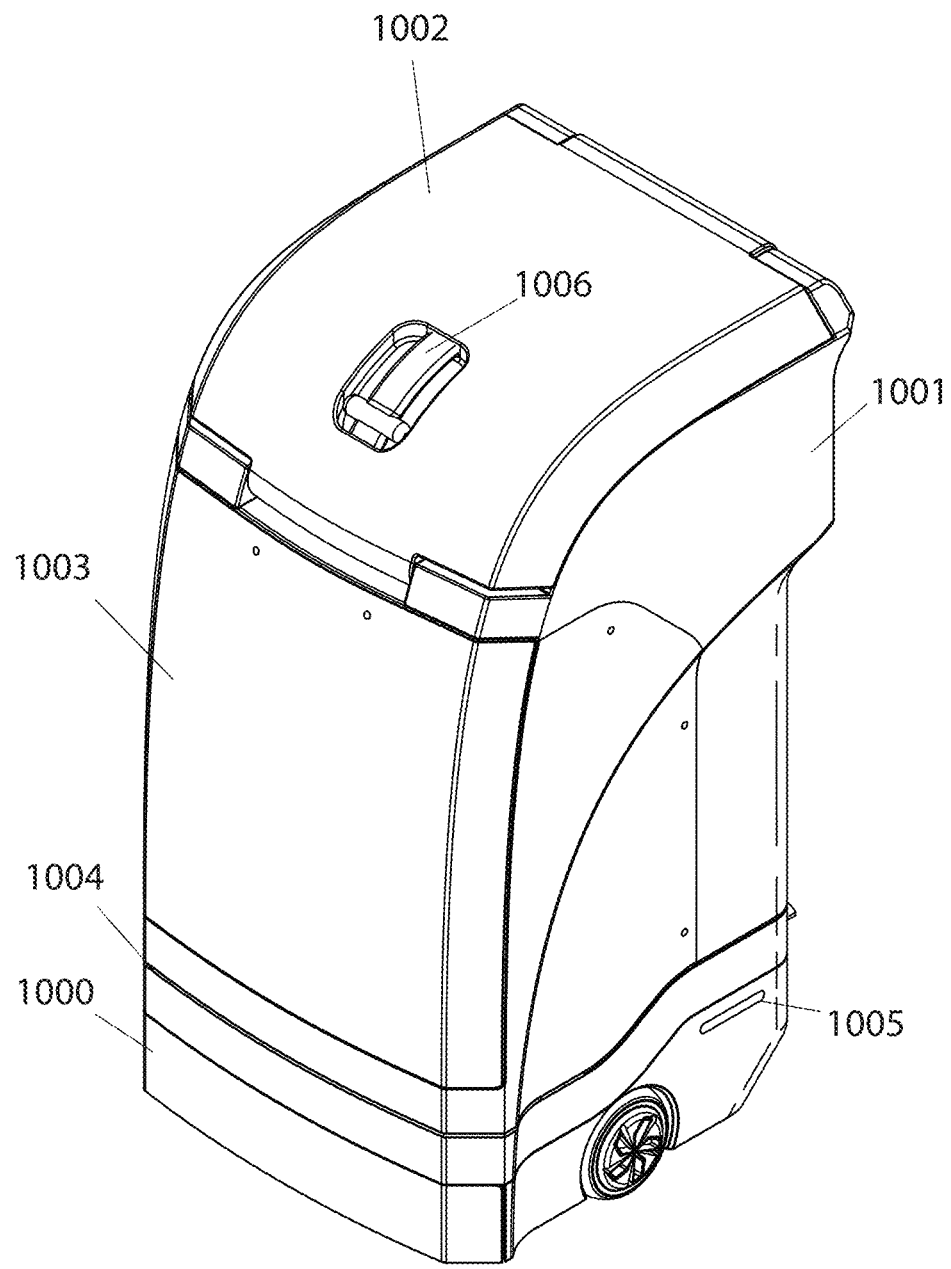
FIGS. 10A-10C illustrate an example of a smart bin, according to some embodiments.
Figure 10B:
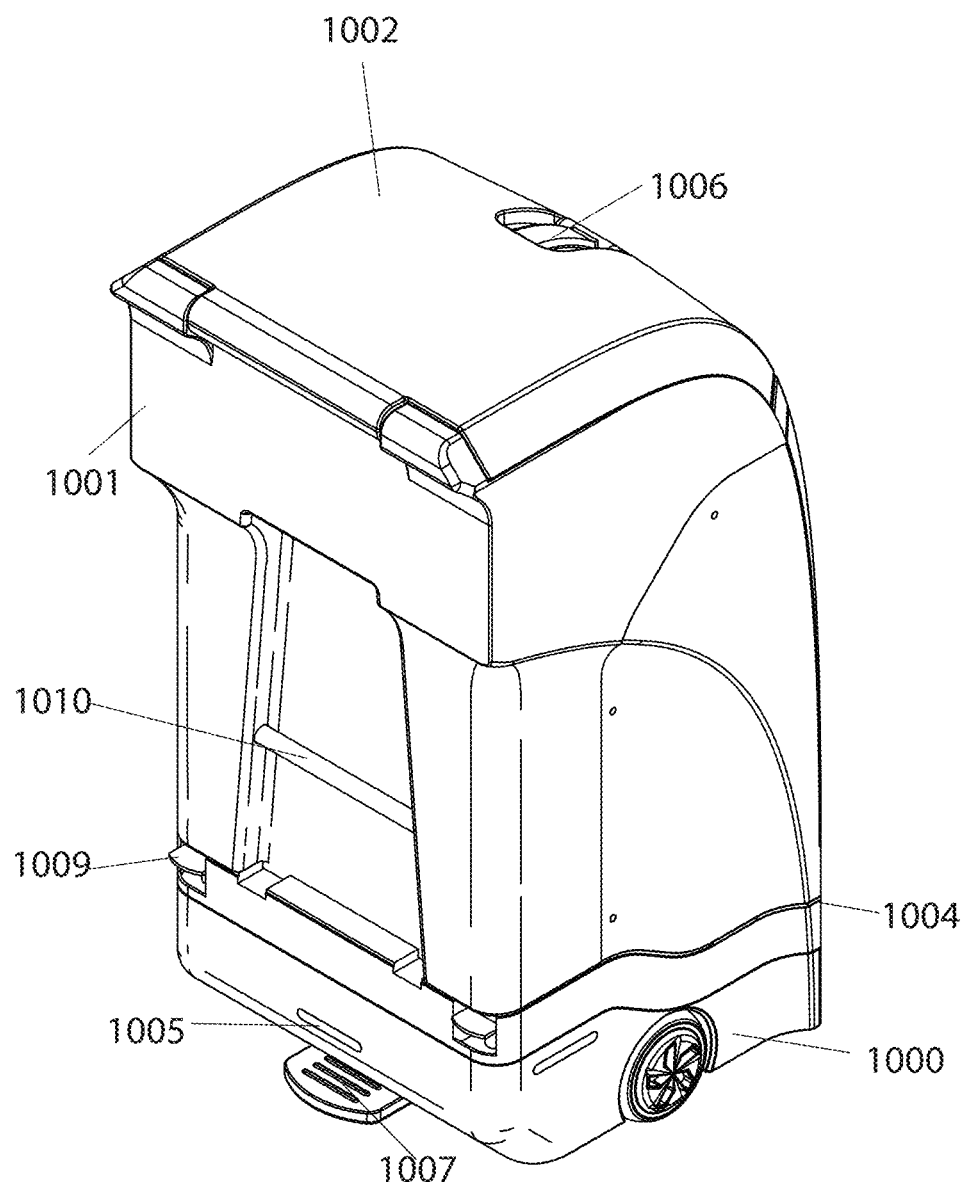
Figure 10C:
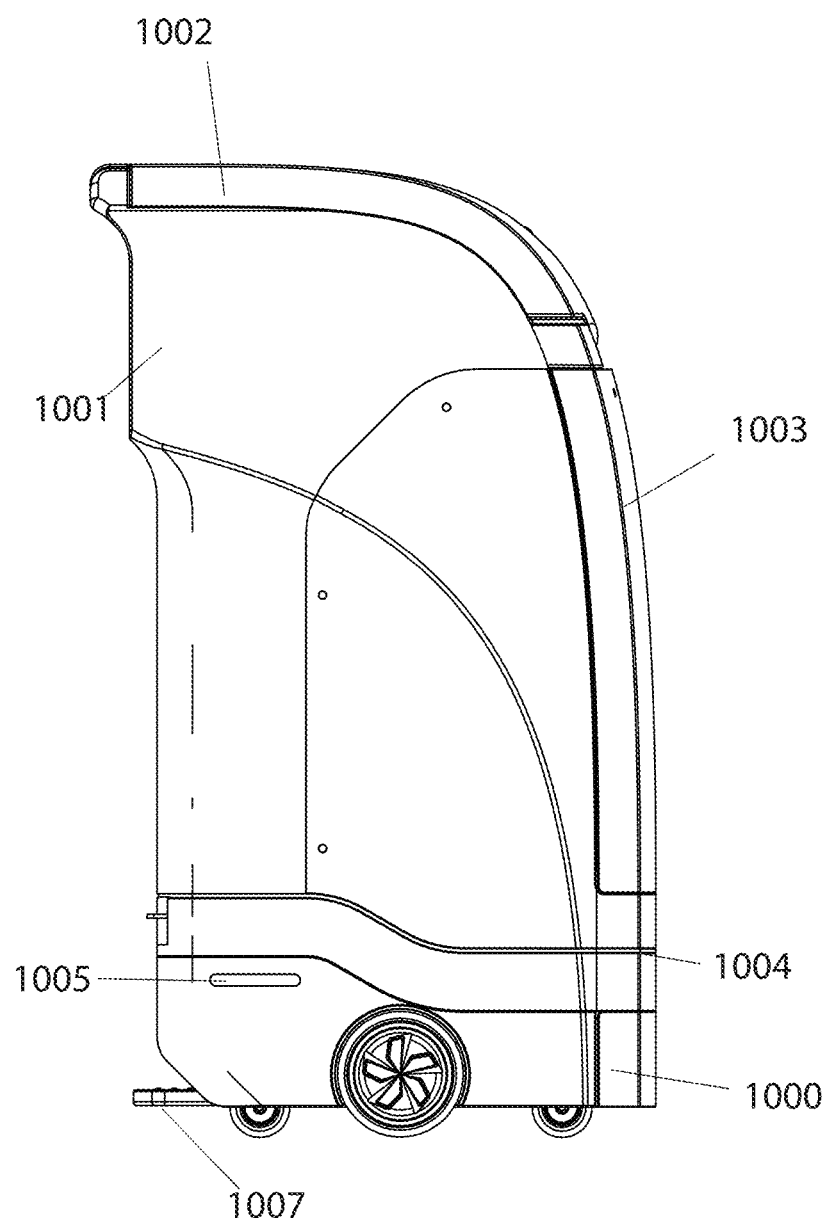
Figure 11A:
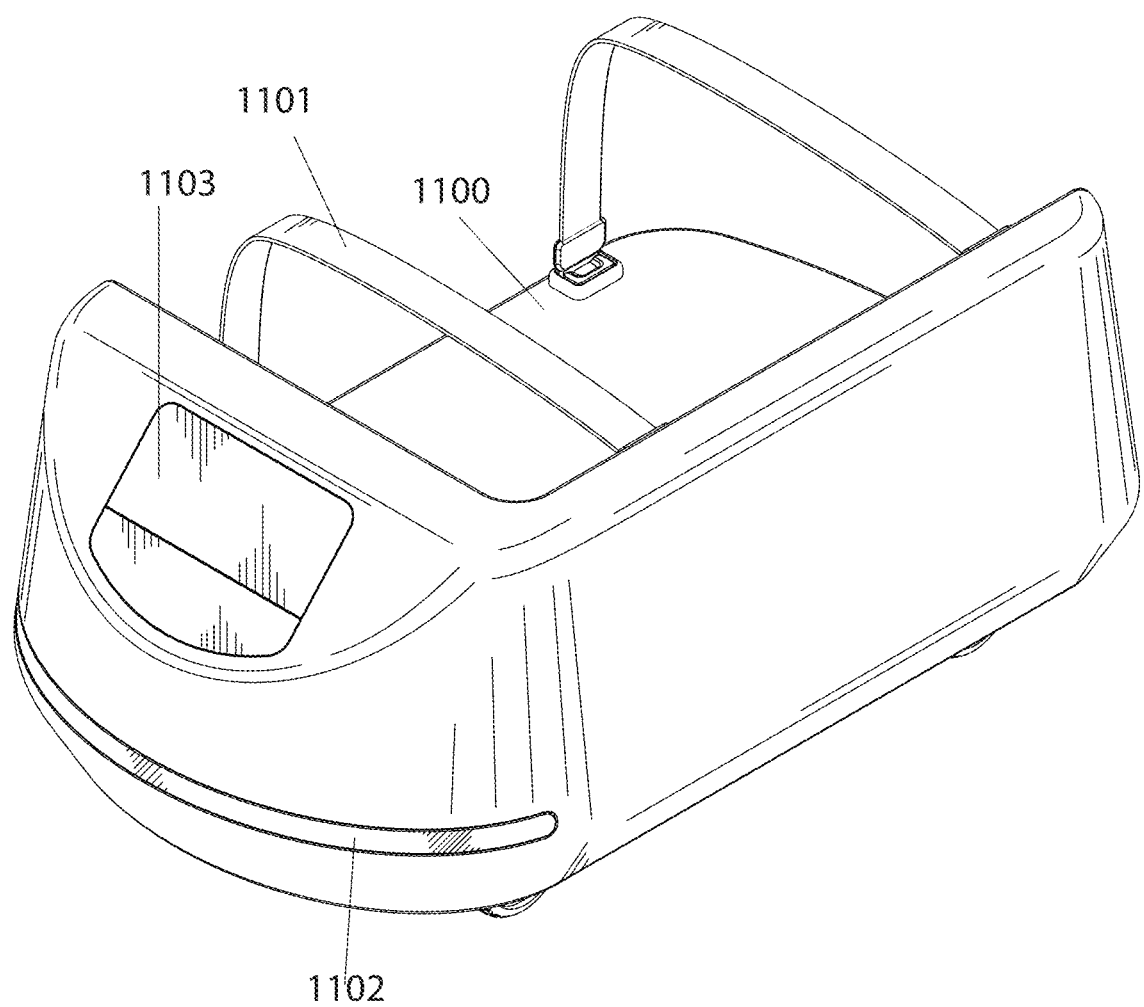
FIGS. 11A-11C illustrate an example of a luggage robot, according to some embodiments.
Figure 11B:
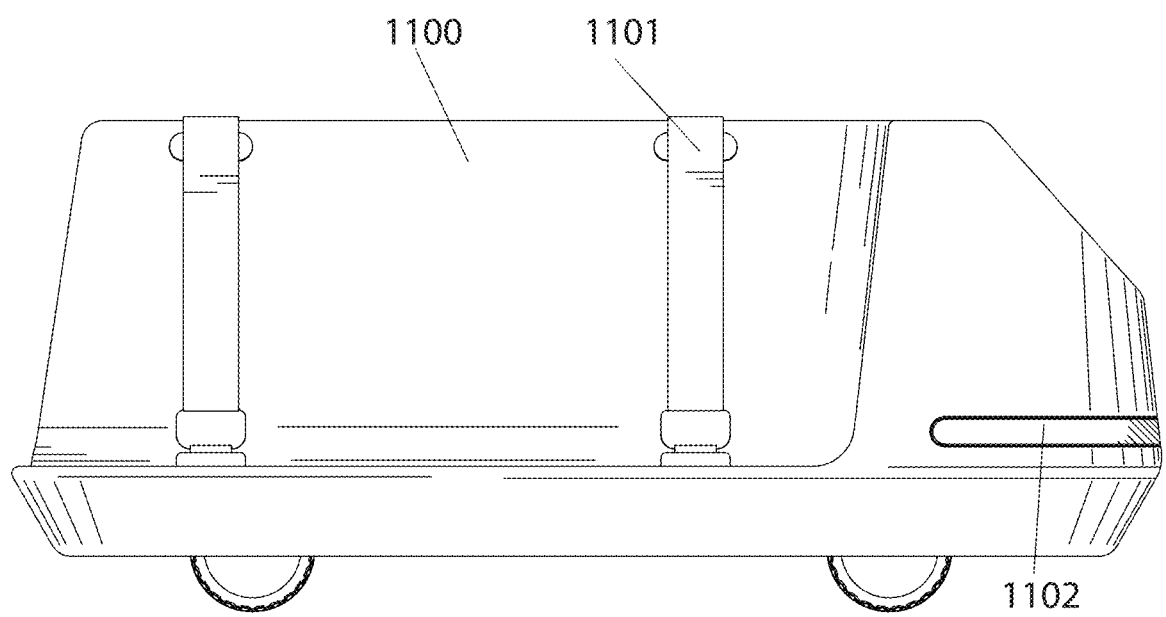
Figure 11C:
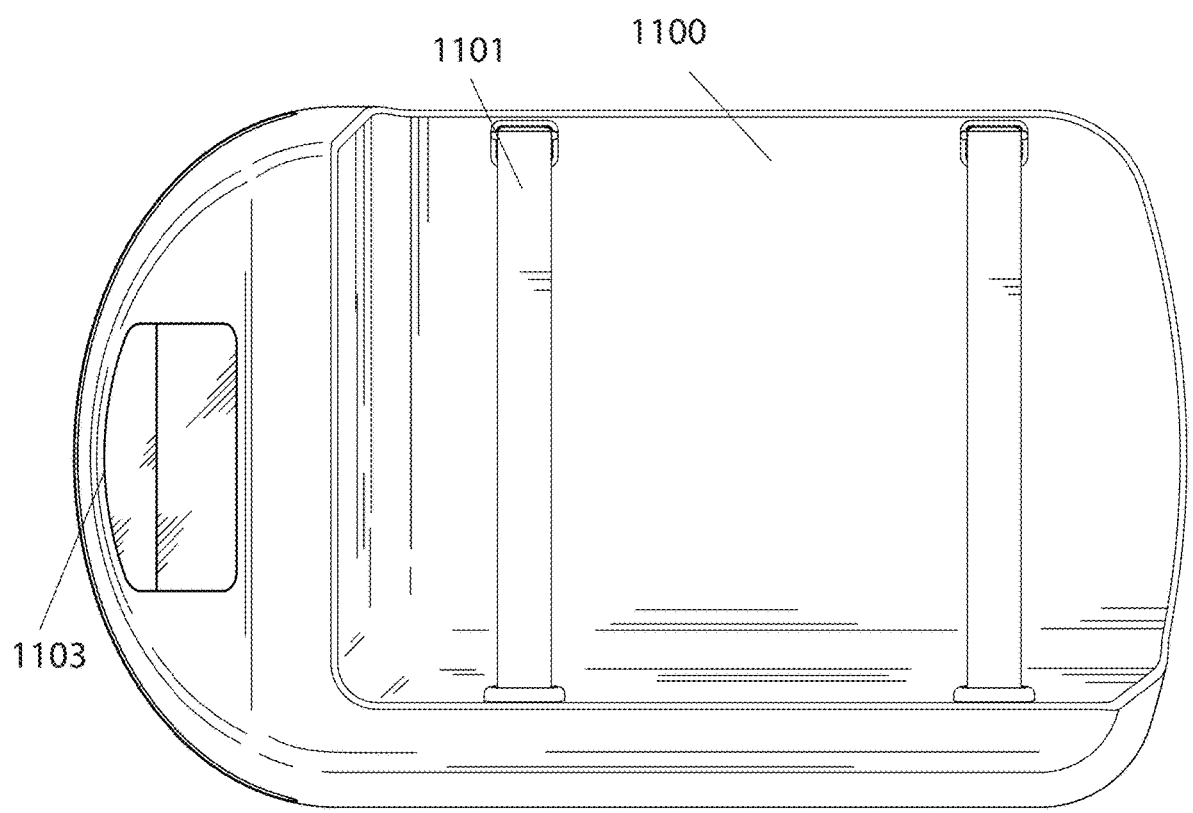
Figure 12A:
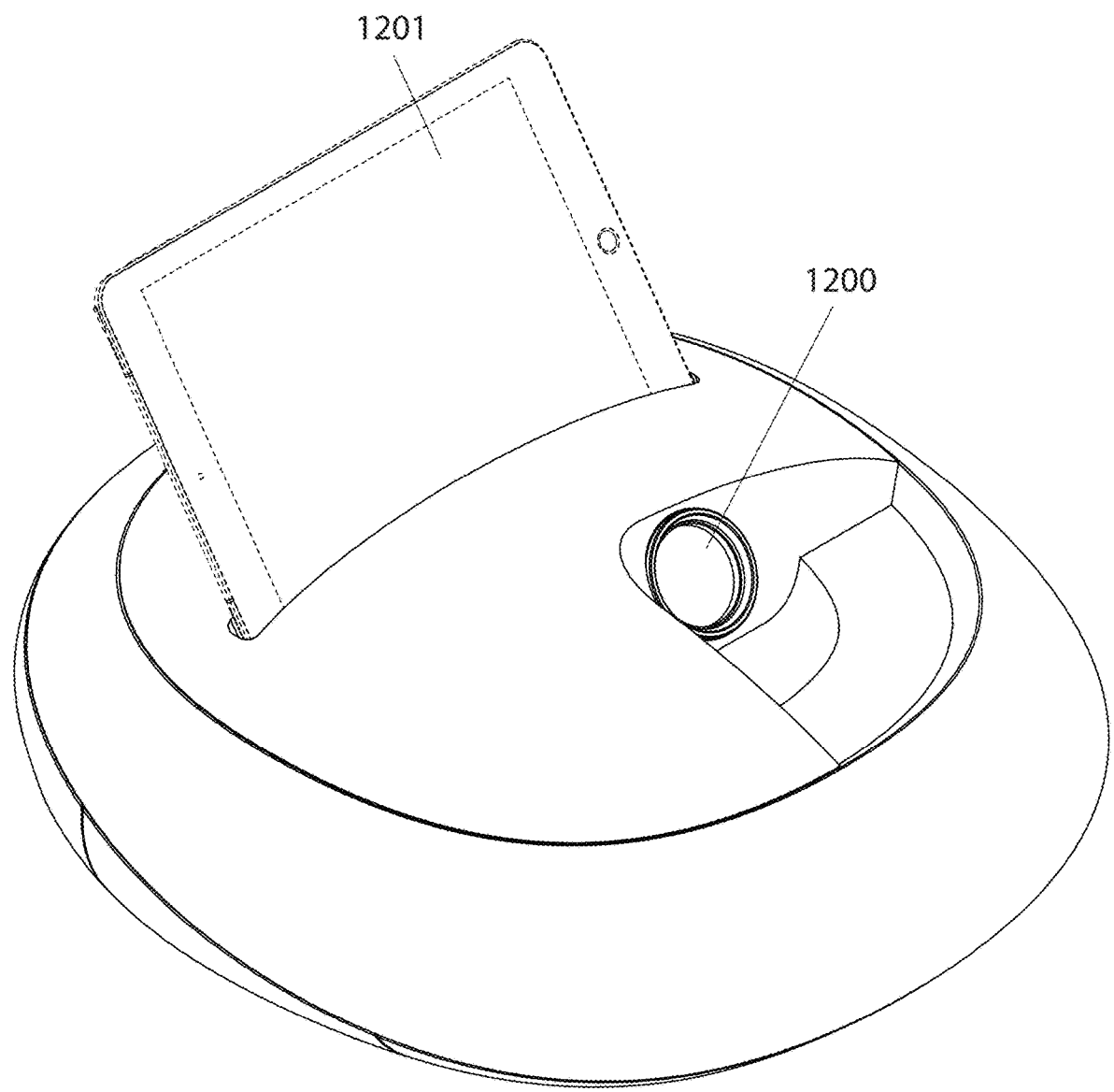
FIGS. 12A and 12B illustrate an example of an audio and video robot, according to some embodiments.
Figure 12B:
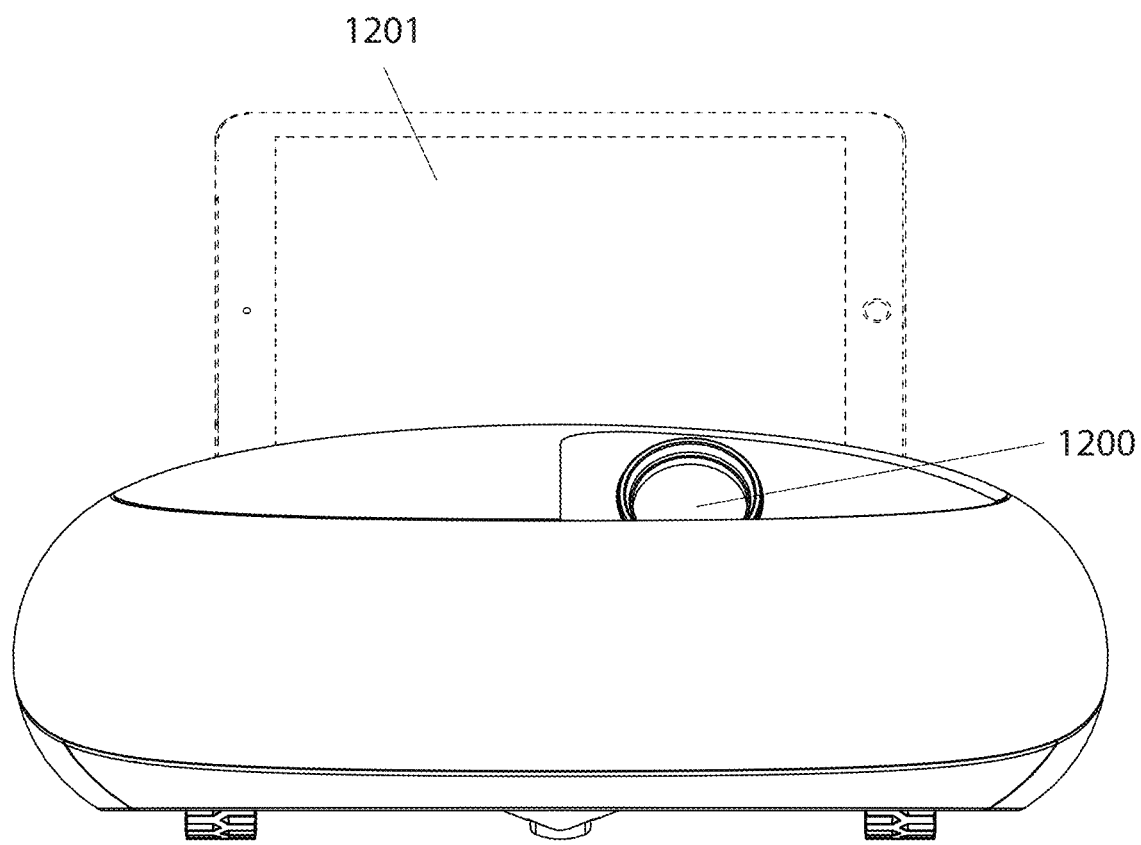
Figure 13A:
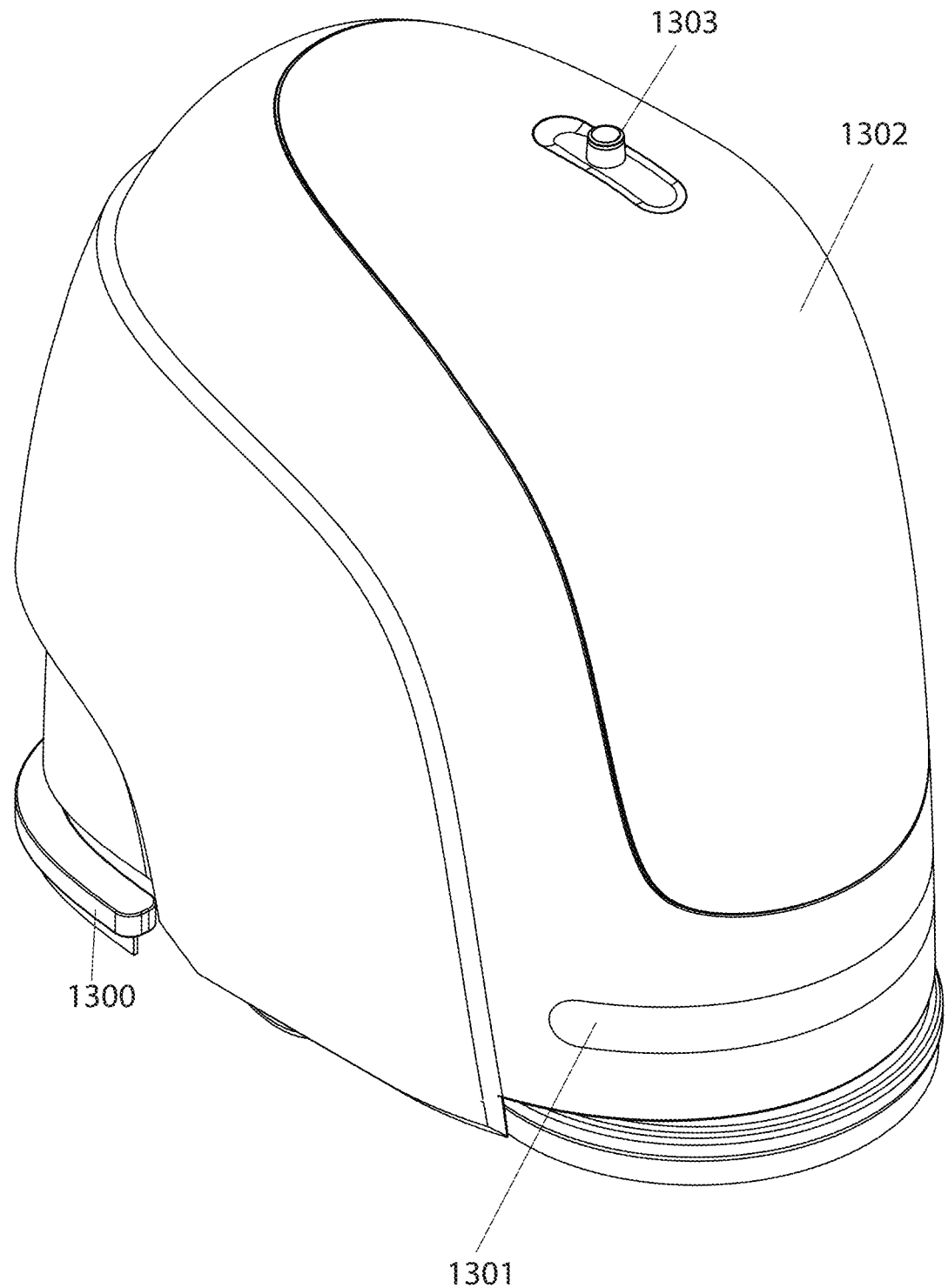
FIGS. 13A and 13B illustrate an example of commercial cleaning robot, according to some embodiments.
Figure 13B:
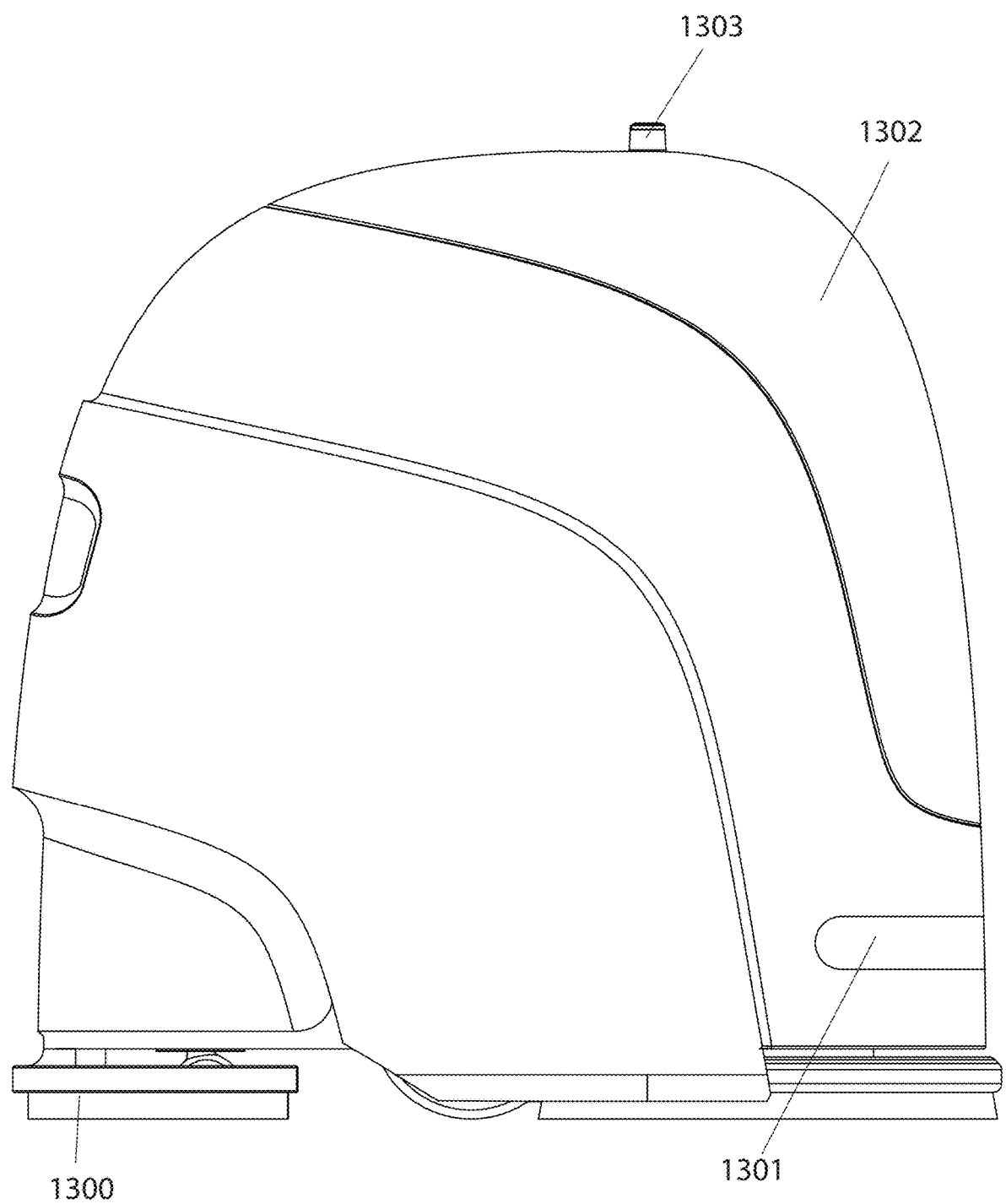

While various embodiments in the disclosure are described and illustrated using a modular robot, various other types of robots may implement the techniques and methods described throughout the entire disclosure. For example, FIG. 7 illustrates an example of a robotic vacuum that may implement the techniques and methods described herein, including bumper 700, graphical user interface 701, wheels 702, cleaning tool 703, and sensors 704. FIG. 7E illustrates components within the robotic surface cleaner including a processor 705, a memory 706, sensors 707, and battery 708. Another example includes a robotic excavator illustrated in FIG. 8A. FIG. 8B illustrates some components of the robotic excavator including a compartment 800 including a processor, memory, network card, and controller, a camera 801 (the other is unlabeled due to spacing), sensor arrays 802 (e.g., TOF sensors, sonar sensors, IR sensors, etc.), a LIDAR 803, rear rangefinder 804, and battery 805. FIG. 9A illustrates an example of a robotic dump truck that may also implement the techniques and methods described within the disclosure. FIG. 9B illustrates some components of the robotic dump truck including a compartment 106 including a processor, memory, and controller, a camera 907 (the other is unlabeled due to spacing), sensor array 908 (e.g., TOF sensors, sonar sensors, IR sensors, etc.), a LIDAR 909, rear rangefinder 910, battery 911, and movement measurement device 912. Another example includes a smart bin in FIG. 10A including a robotic platform 1000, bin 1001 with bin lid 1002, bumper 1003, LIDAR window 1004, sensor window 1005, and lid handle 1006. FIG. 10B illustrates a rear perspective view of the smart bin with manual brake 1007, lift handle 1008 for the bin 1001, sensor window 1005, foot pedals 1009 that control pins (not shown) used to hold the bin in place, and lift handle 1010. FIG. 10C illustrates a side view of the smart bin. Different types of sensors, as described above, are positioned behind sensor windows. Other examples include a robotic airport luggage holder in FIGS. 11A-11C including luggage platform 1100, luggage straps 1101, sensor window 1102 behind which sensors are positioned, and graphical user interface 1103 that a user may use to direct the robot to a particular location in an airport; a mobile audio and video robot in FIGS. 12A and 12B including a projector 1200 for projecting videos and holder for a communication device, such as a tablet 1201 that may display a video or play music through speakers of the robot or the tablet; and a commercial cleaning robot in FIGS. 13A and 13B including cleaning tool 1300, sensor windows 1301 behind which sensors are positioned, bumper 1302, and LIDAR 1303. Other examples of robots include a lawn mowing robot, a pizza delivery robot with an oven for baking the pizza, a grocery delivery robot, a shopping cart robot with a freezer compartment for frozen food, a fire proof first aid robot including first aid supplies, a defibrillator robot, a hospital bed robot, a pressure cleaner robot, a dog walking robot, a marketing robot, an ATM machine robot, a snow plowing and salt spreading robot, and a passenger transporting robot.

Figure 14A:
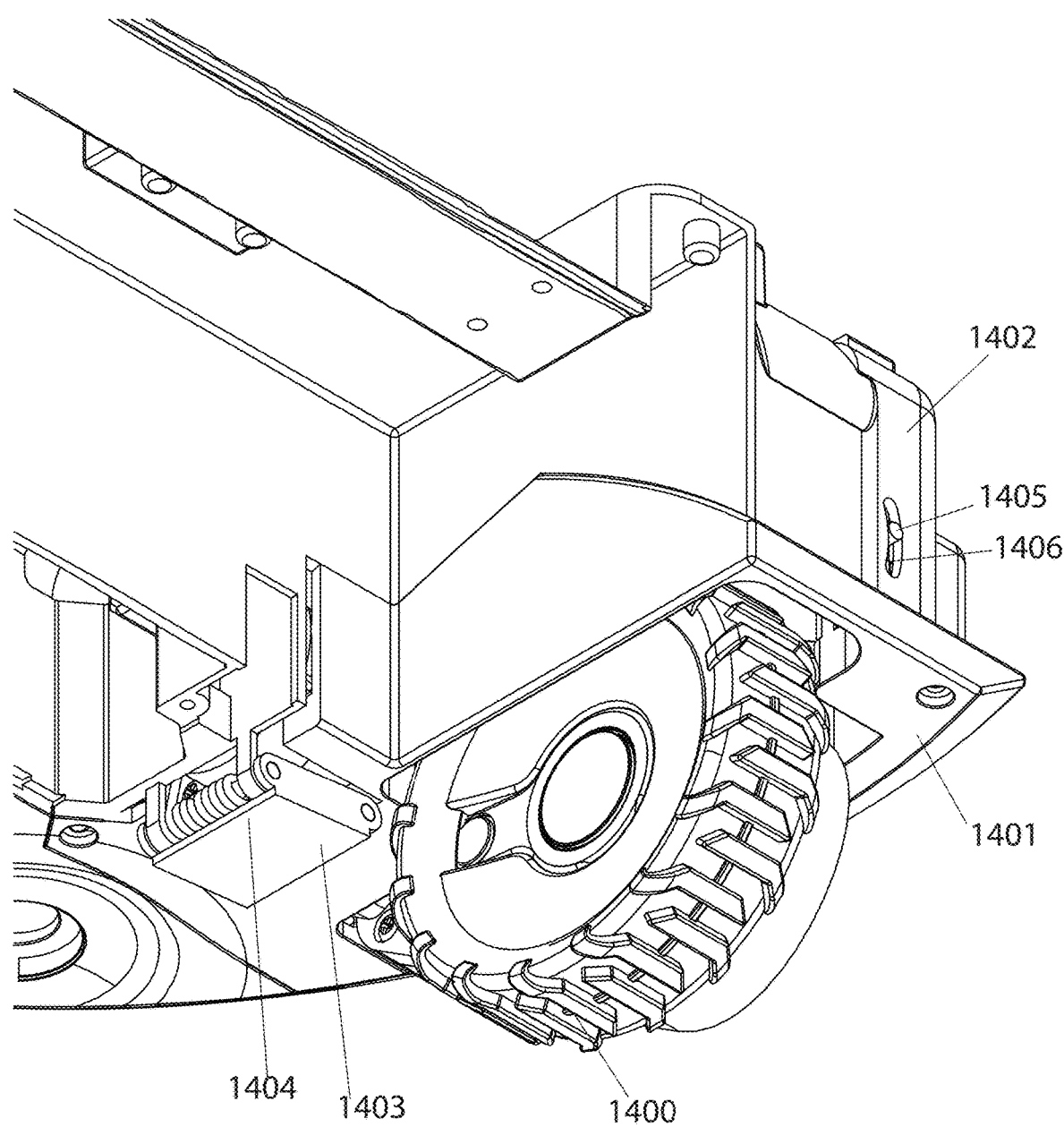
FIGS. 14A-14G illustrate an example of a wheel suspension system, according to some embodiments.
Figure 14B:
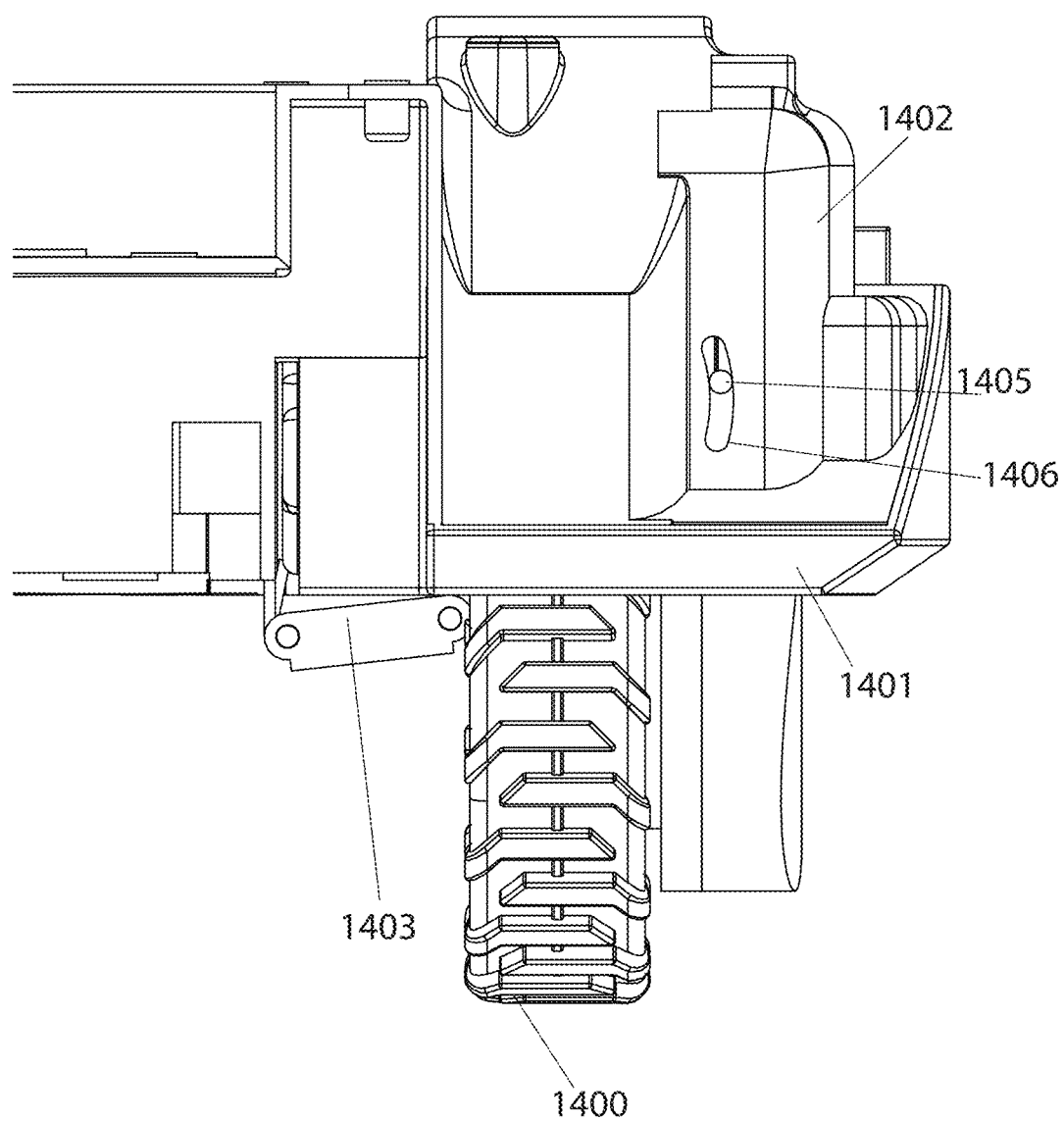
Figure 14C:
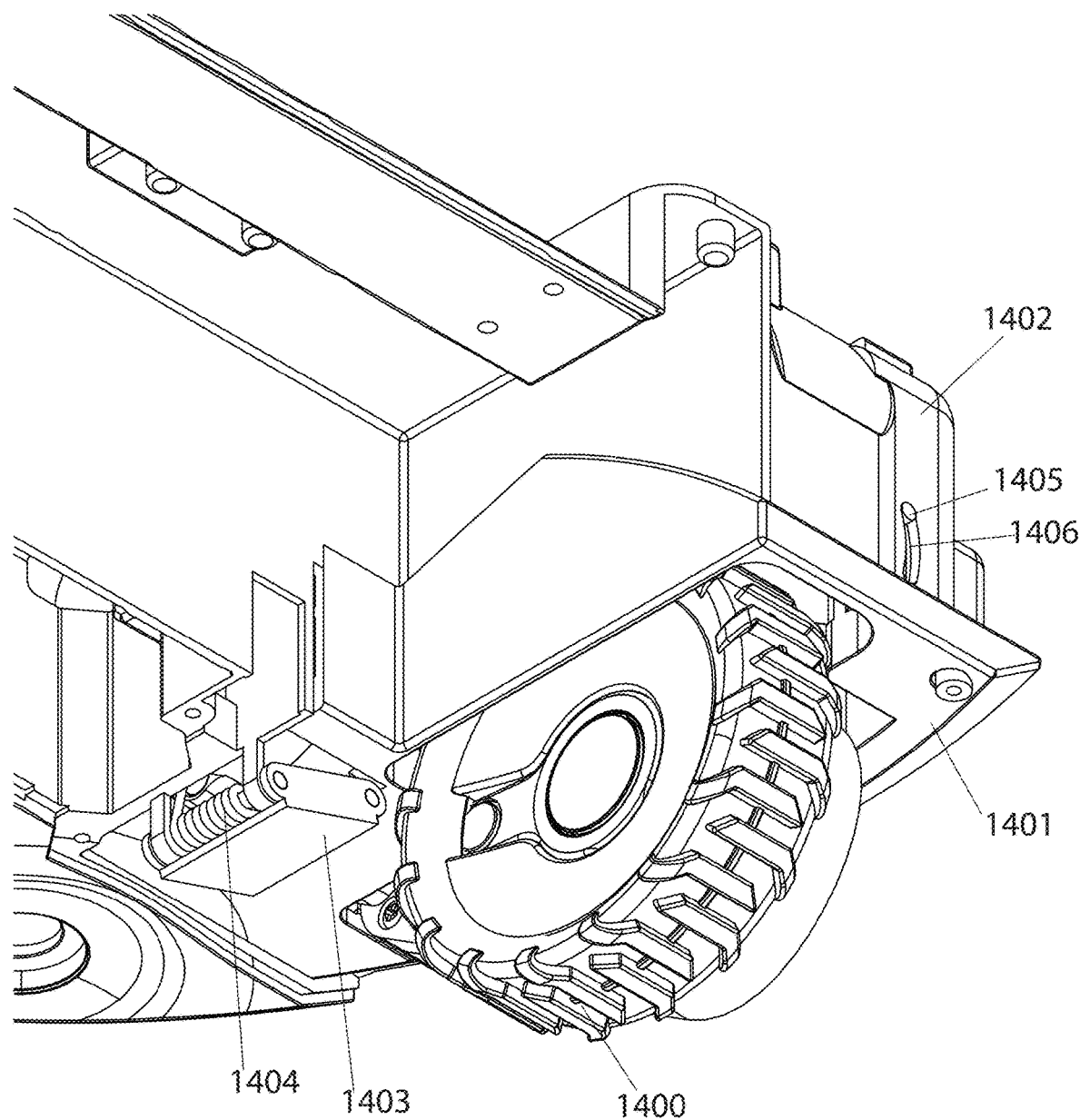
Figure 14D:
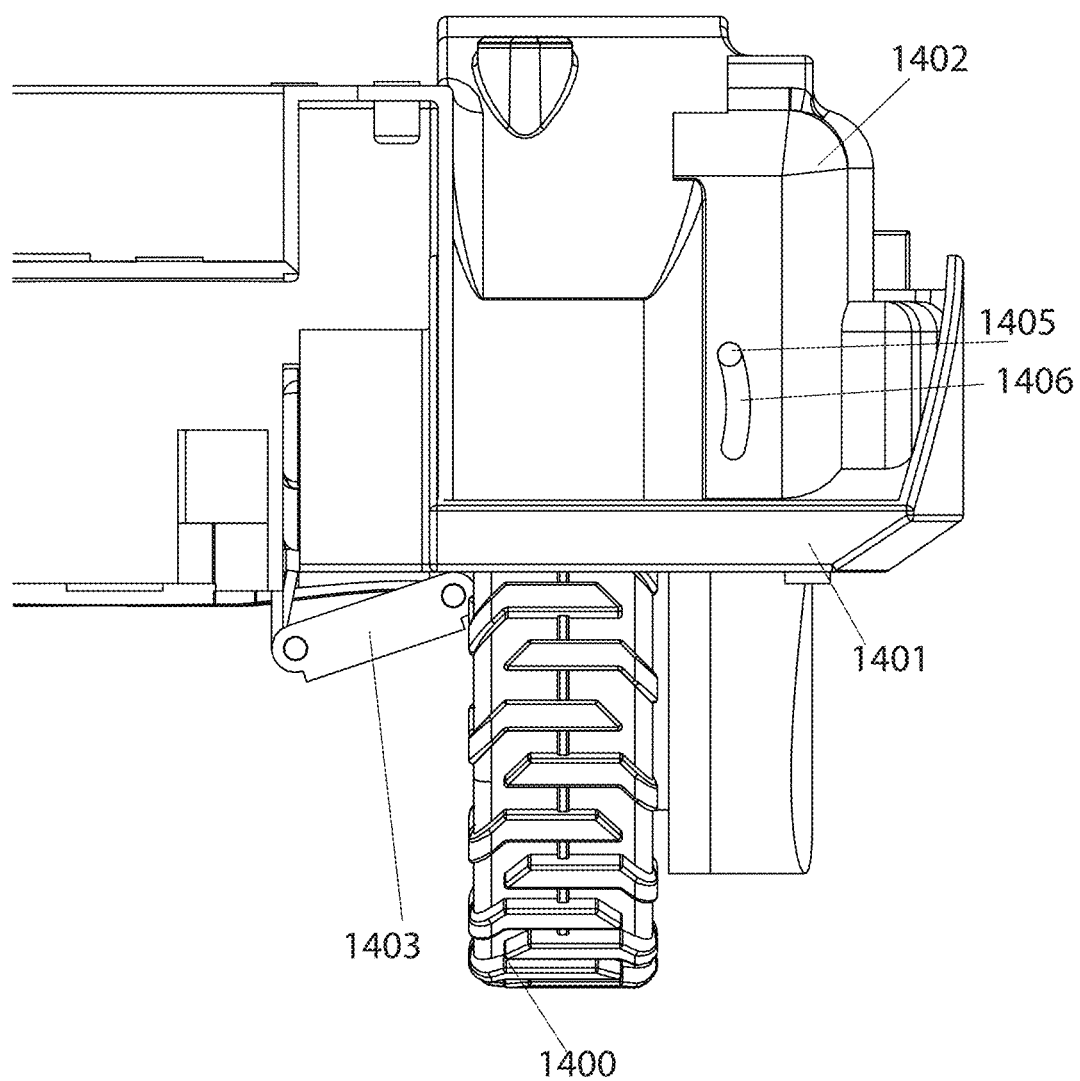
Figure 14E:
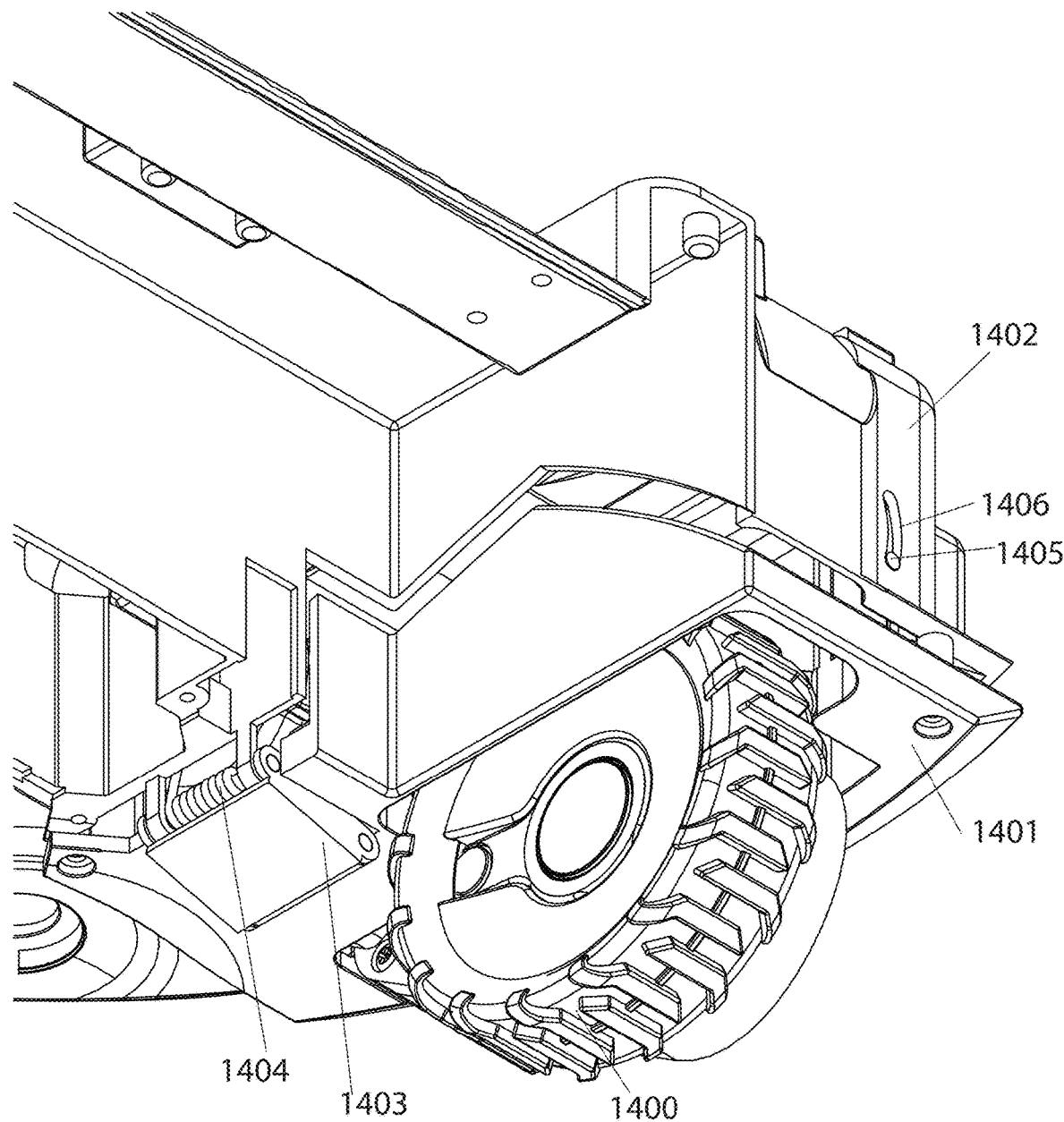
Figure 14F:
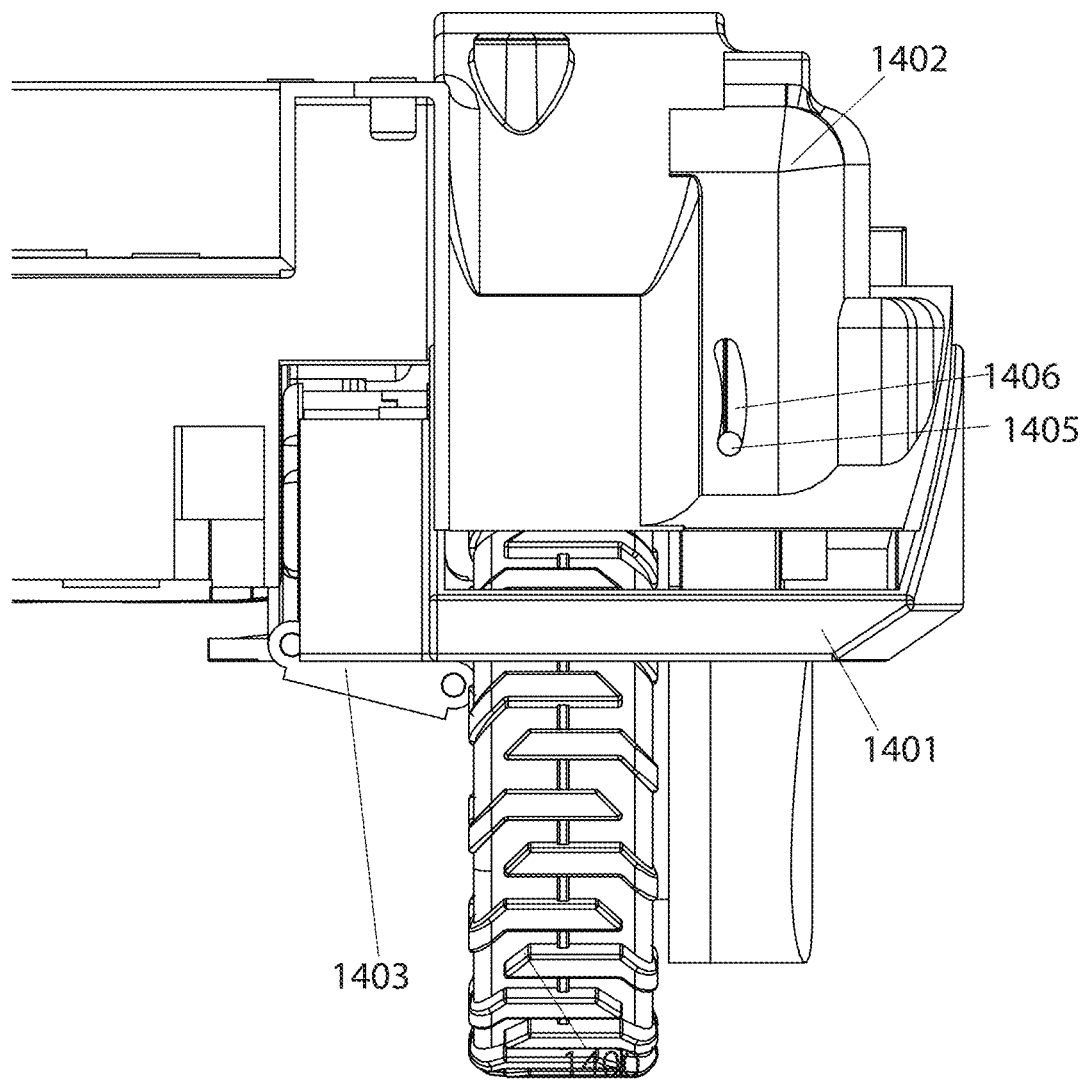
Figure 14G:
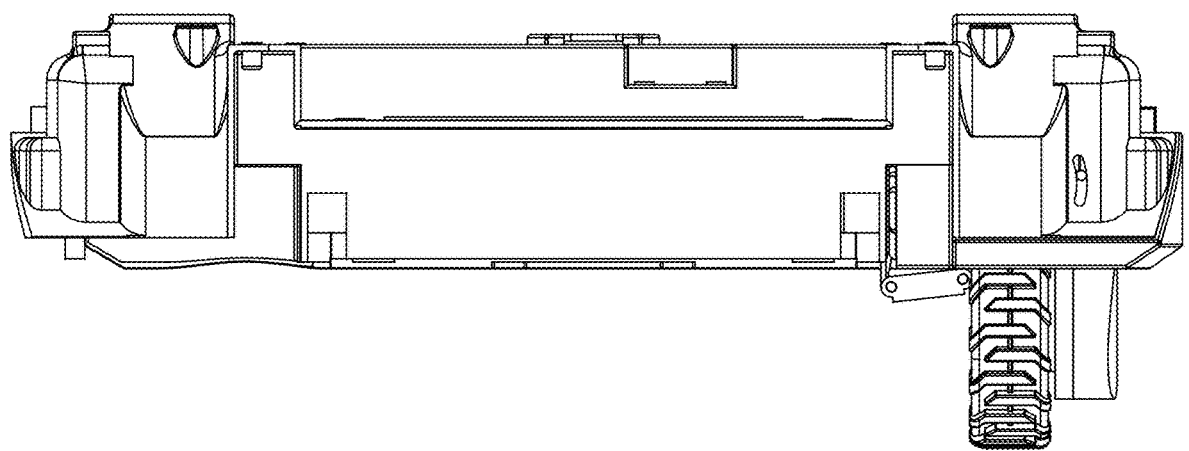

In some embodiments, the modular robot (or any other type of robot that implements the methods and techniques described in the disclosure) includes a wheel suspension system. For example, FIGS. 14A and 14B illustrate a wheel suspension system including a wheel 1400 mounted to a wheel frame 1401 slidingly coupled with a chassis 1402 of a robot, a control arm 1403 coupled to the wheel frame 1401, and a torsion spring 1404 positioned between the chassis 1402 and the control arm 1403. Wheel frame 1401 includes coupled pin 1405 that fits within and slides along slot 1406 of chassis 1402. When the robot is on the driving surface, the spring is slightly compressed due to the weight of the robot acting on the torsion spring 1404, and the pin 1405 is positioned halfway along slot 1406, as illustrated in FIGS. 14A and 14B. When the wheel 1400 encounters an obstacle such as a bump, for example, the wheel retracts upwards towards the chassis 1402 causing the torsion spring 1404 to compress and pin 1405 to reach the highest point of slot 1406, as illustrated in FIGS. 14C and 14D. When the wheel 1400 encounters an obstacle such as a hole, for example, the wheel extends downwards away from the chassis 1402 causing the torsion spring 1404 to decompress and pin 1405 to reach the lowest point of slot 1406, as illustrated in FIGS. 14E and 14F. The pin 1405 and the slot 1406 control the maximum vertical displacement of the wheel 1400 in an upwards and downwards direction as slot 1406 prevents pin 1405 attached to wheel frame 1401 with wheel 1400 from physically displacing past its limits. Therefore, the slot may be altered to choose the desired maximum displacement in either direction. Further, torsion springs with different spring stiffness may be chosen, which varies the position of the pin when the robot is on the driving surface and hence the maximum displacement in the upwards and downwards directions. In some embodiments, the wheel suspension system is configured such that displacement may only occur in one direction or displacement occurs in two directions. In some embodiments, the wheel suspension system is configured such that maximum displacement upwards is equal to maximum displacement downwards or such that maximum displacements upwards and downwards are different. FIG. 14G illustrates the wheel suspension during normal driving conditions implemented on a robot.

Figure 15A:
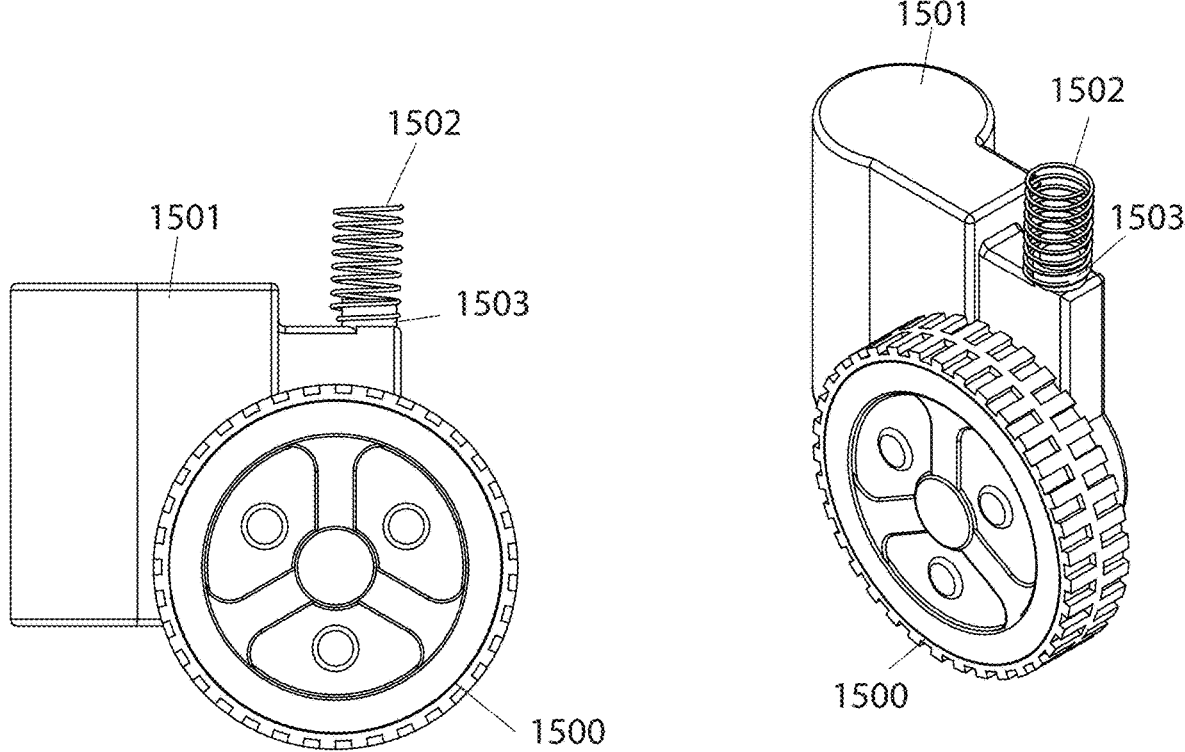
FIGS. 15A-15C illustrate an example of a wheel suspension system, according to some embodiments.
Figure 15B:
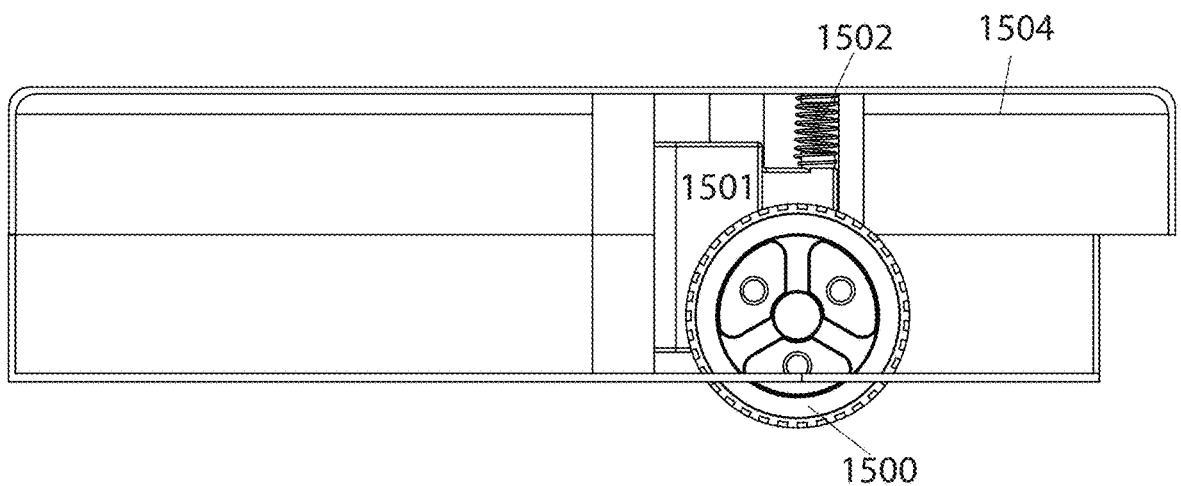
Figure 15C:
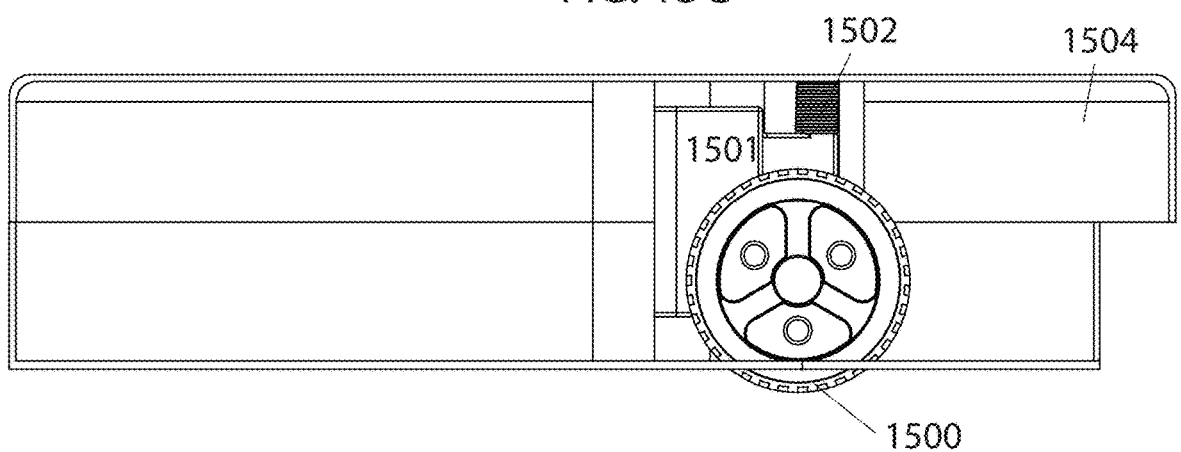
Figure 16A:
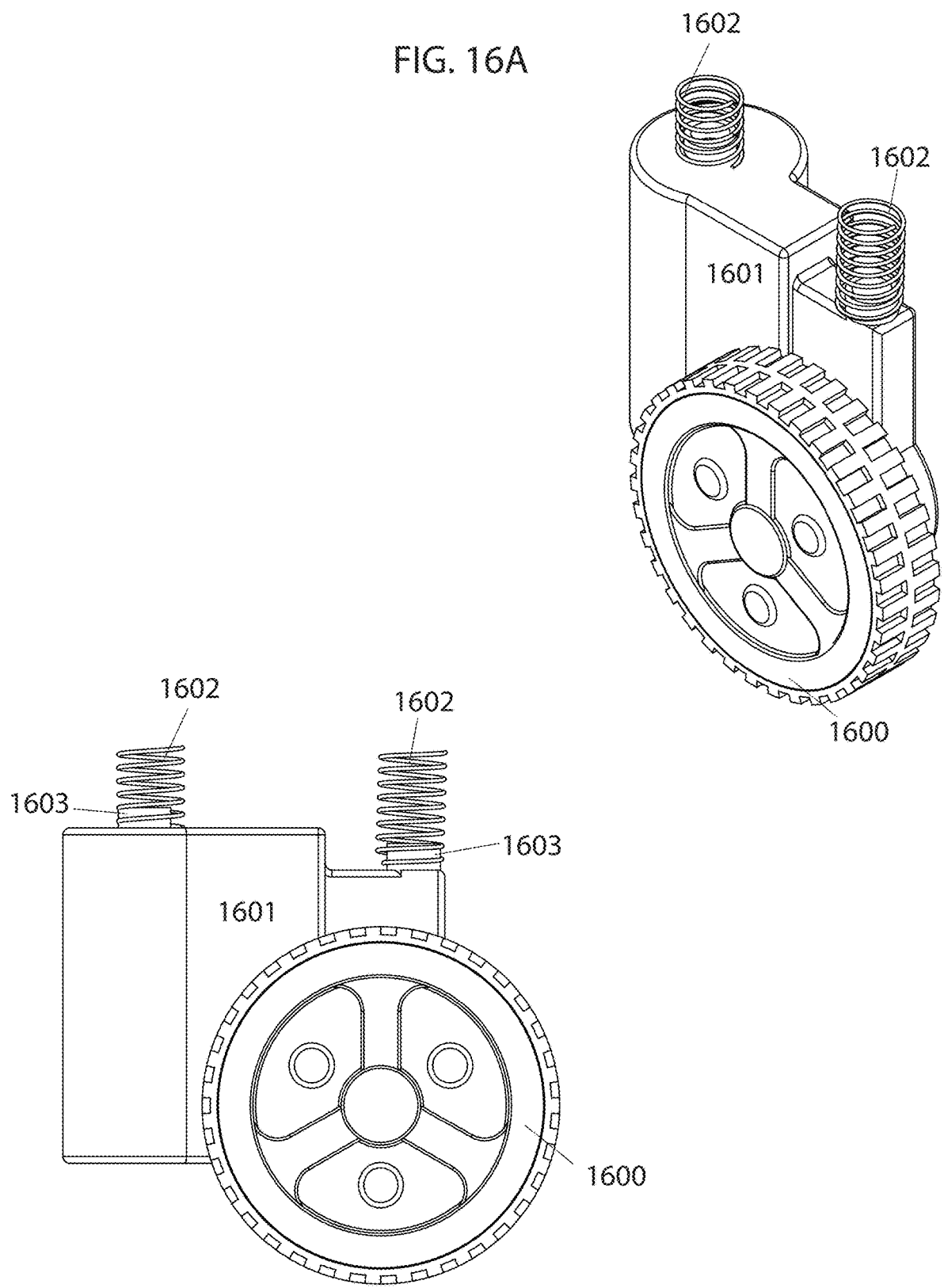
FIGS. 16A-16C illustrate an example of a wheel suspension system, according to some embodiments.
Figure 16B:
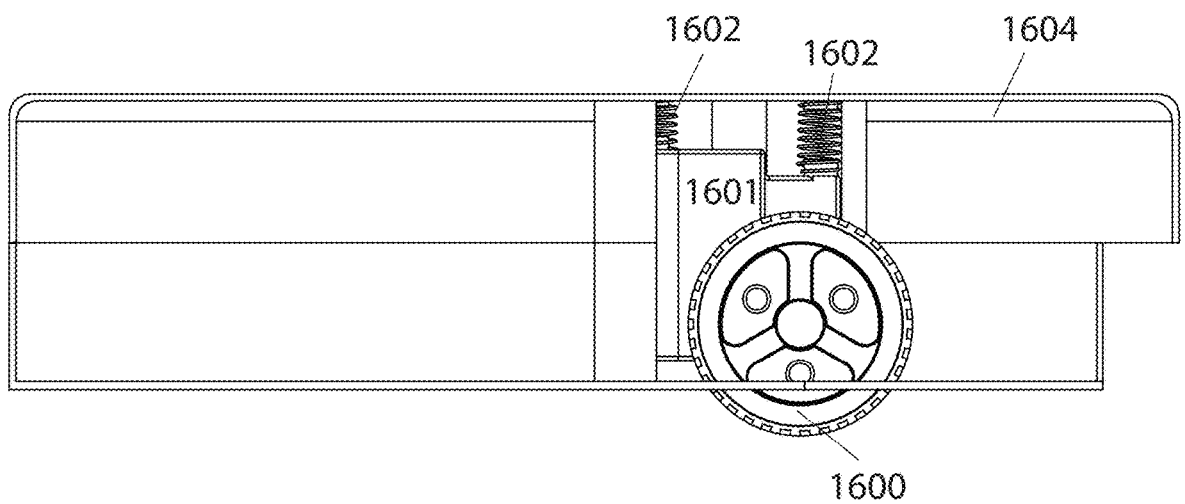
Figure 16C:
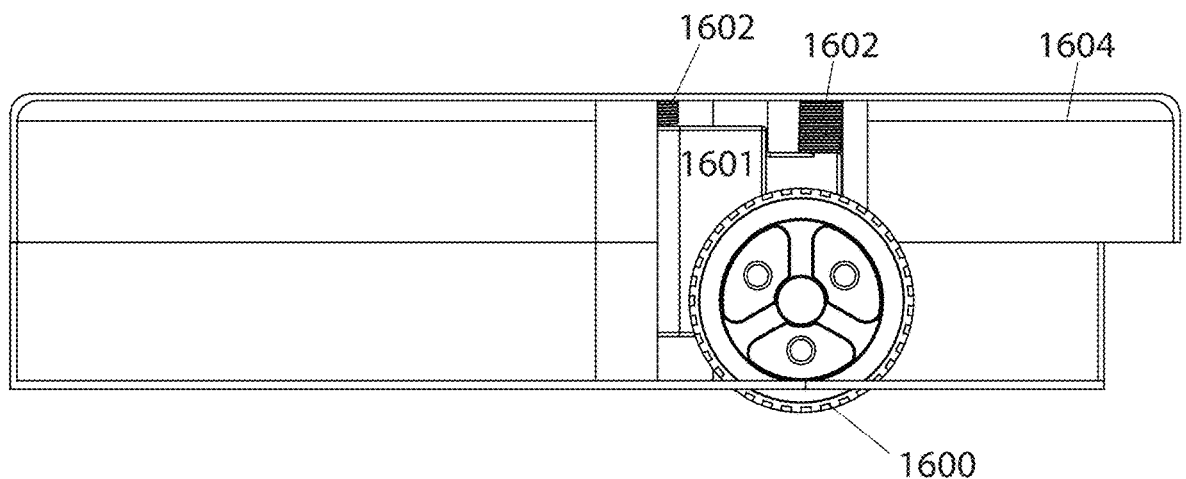

In another example, the wheel suspension includes a wheel coupled to a wheel frame. The wheel frame is slidingly coupled to the chassis of the modular robot. A spring is vertically positioned between the wheel frame and the chassis such that the wheel frame with coupled wheel can move vertically. FIG. 15A illustrates an example of a wheel suspension system with wheel 1500 coupled to wheel frame 1501 and spring 1502 positioned on pin 1503 of wheel frame 1501. FIG. 15B illustrates the wheel suspension integrated with a robot 1504, the wheel frame 1501 slidingly coupled with the chassis of robot 1504. A first end of spring 1502 rests against wheel frame 1501 and a second end against the chassis of robot 1504. Spring 1502 is in a compressed state such that is applies a downward force on wheel frame 1501 causing wheel 1500 to be pressed against the driving surface. FIG. 15C illustrates wheel 1500 after moving vertically upwards (e.g., due to an encounter with an obstacle) with spring 1502 compressed, allowing for the vertical movement. In some embodiments, a second spring is added to the wheel suspension. FIG. 16A illustrates an example of a wheel suspension system with wheel 1600 coupled to wheel frame 1601 and springs 1602 is positioned on respective pins 1603 of wheel frame 1601. FIG. 16B illustrates the wheel suspension integrated with a robot 1604, the wheel frame 1601 slidingly coupled with the chassis of robot 1604. A first end of each spring 1602 rests against wheel frame 1601 and a second end against the chassis of robot 1604. Springs 1602 are in a compressed state such that they apply a downward force on wheel frame 1601 causing wheel 1600 to be pressed against the driving surface. FIG. 16C illustrates wheel 1600 after moving vertically upwards (e.g., due to an encounter with an obstacle) with springs 1602 compressed, allowing for the vertical movement.

Figure 17A:
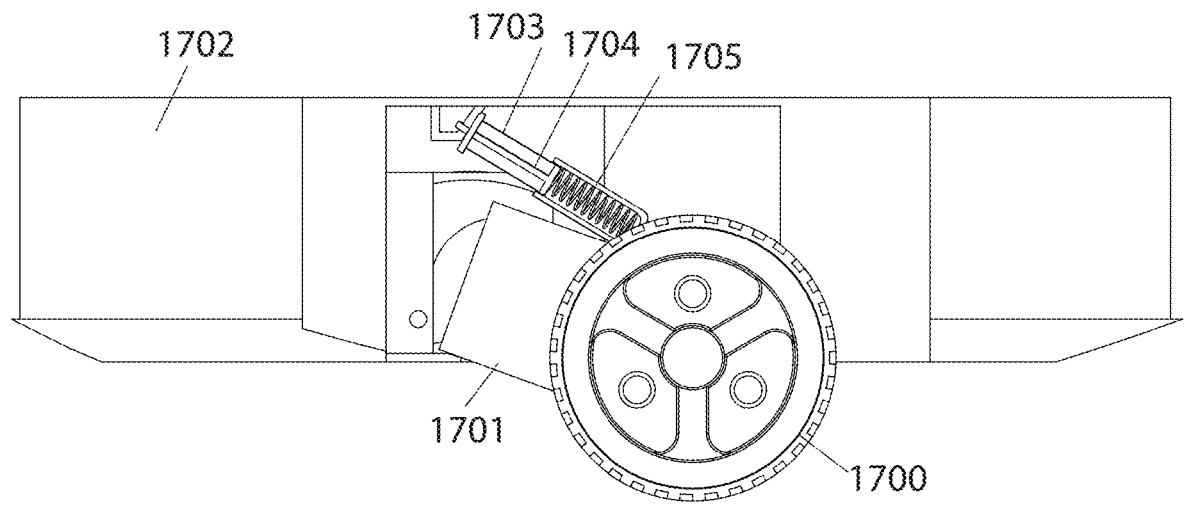
FIGS. 17A-17D illustrate an example of a wheel suspension system, according to some embodiments.
Figure 17B:
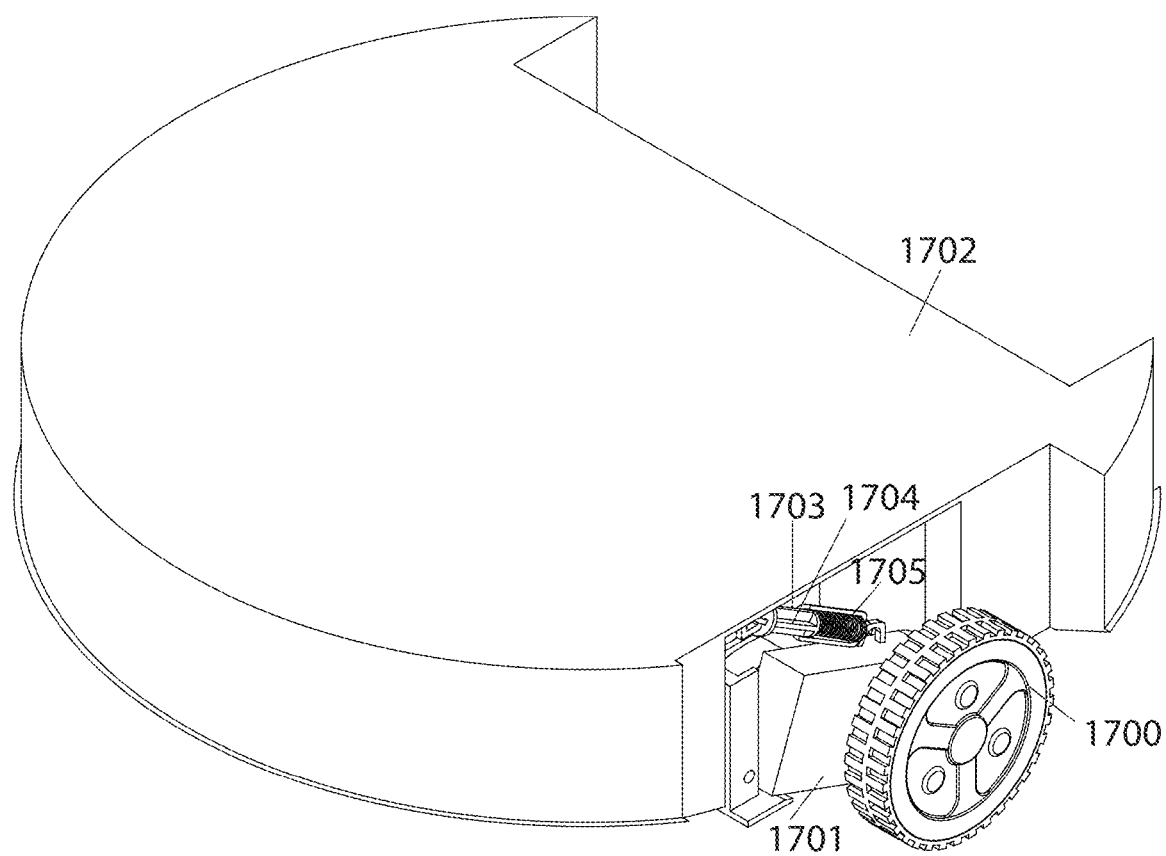
Figure 17C:
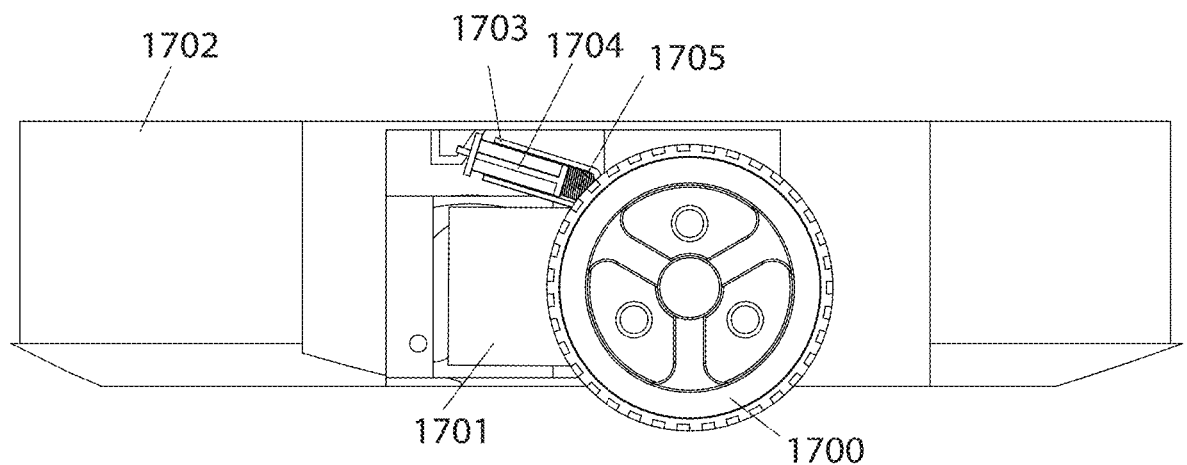
Figure 17D:
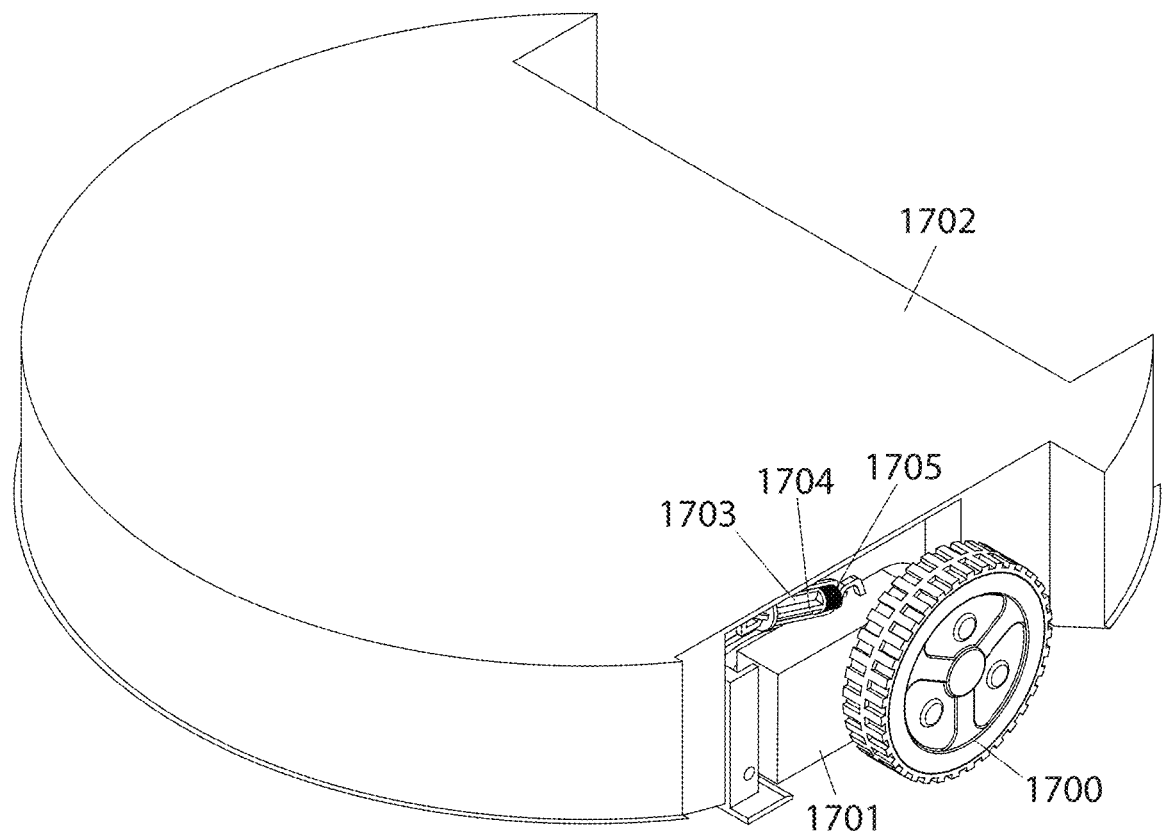

In one example, the wheel suspension includes a wheel coupled to a rotating arm pivotally attached to a chassis of the modular robot and a spring housing anchored to the rotating arm on a first end and the chassis on a second end. A plunger is attached to the spring housing at the first end and a spring is housed at the opposite end of the spring housing such that the spring is compressed between the plunger and the second end of the spring housing. As the compressed spring constantly attempts to decompress, a constant force is applied to the rotating arm causing it to pivot downwards and the wheel to be pressed against the driving surface. When the wheel retracts (e.g., when encountering a bump in the driving surface), the rotating arm pivots upwards, causing the plunger to further compress the spring. FIGS. 17A and 17B illustrate an example of a wheel suspension including a wheel 1700 coupled to a rotating arm 1701 pivotally attached to a chassis 1702 of a robot and a spring housing 1703 anchored to the rotating arm 1701 on a first end and the chassis 1702 on a second end. A plunger 1704 is rests within the spring housing 1703 of the first end and a spring 1705 is positioned within the spring housing 1703 on the second end. Spring 1705 is compressed by the plunger 1704. As spring 1705 attempts to decompress it causes rotating arm 1701 to pivot in a downwards direction and hence the wheel 1700 to be pressed against the driving surface. FIGS. 17C and 17D illustrate the wheel 1700 retracted. When an obstacle such as a bump is encountered, for example, the wheel 1700 retracts as the rotating arm 1701 pivots in an upwards direction. This causes the spring 1705 to be further compressed by the plunger 1704. After overcoming the obstacle, the decompression of the spring 1705 causes the rotating arm 1701 to pivot in a downwards direction and hence the wheel 1700 to be pressed against the driving surface.

Figure 18A:
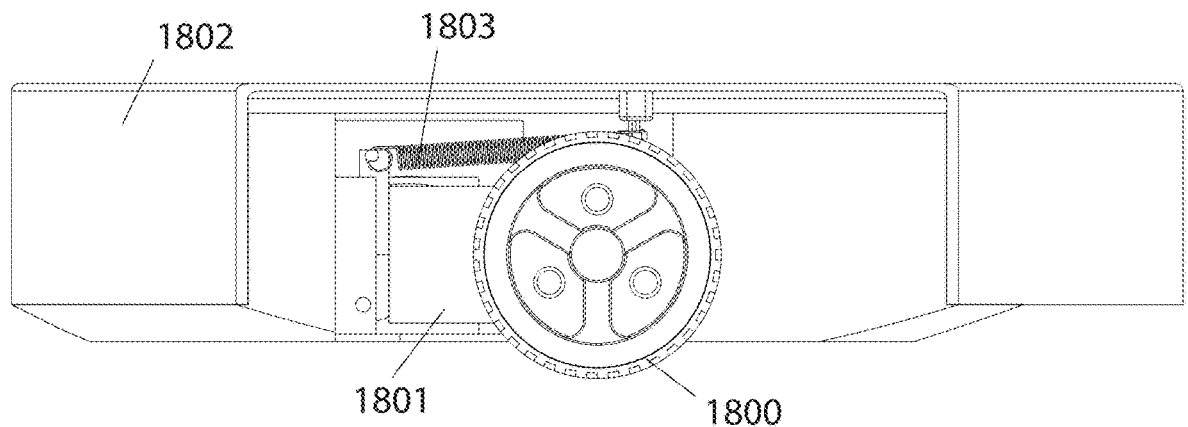
FIGS. 18A-18D illustrate an example of a wheel suspension system, according to some embodiments.
Figure 18B:
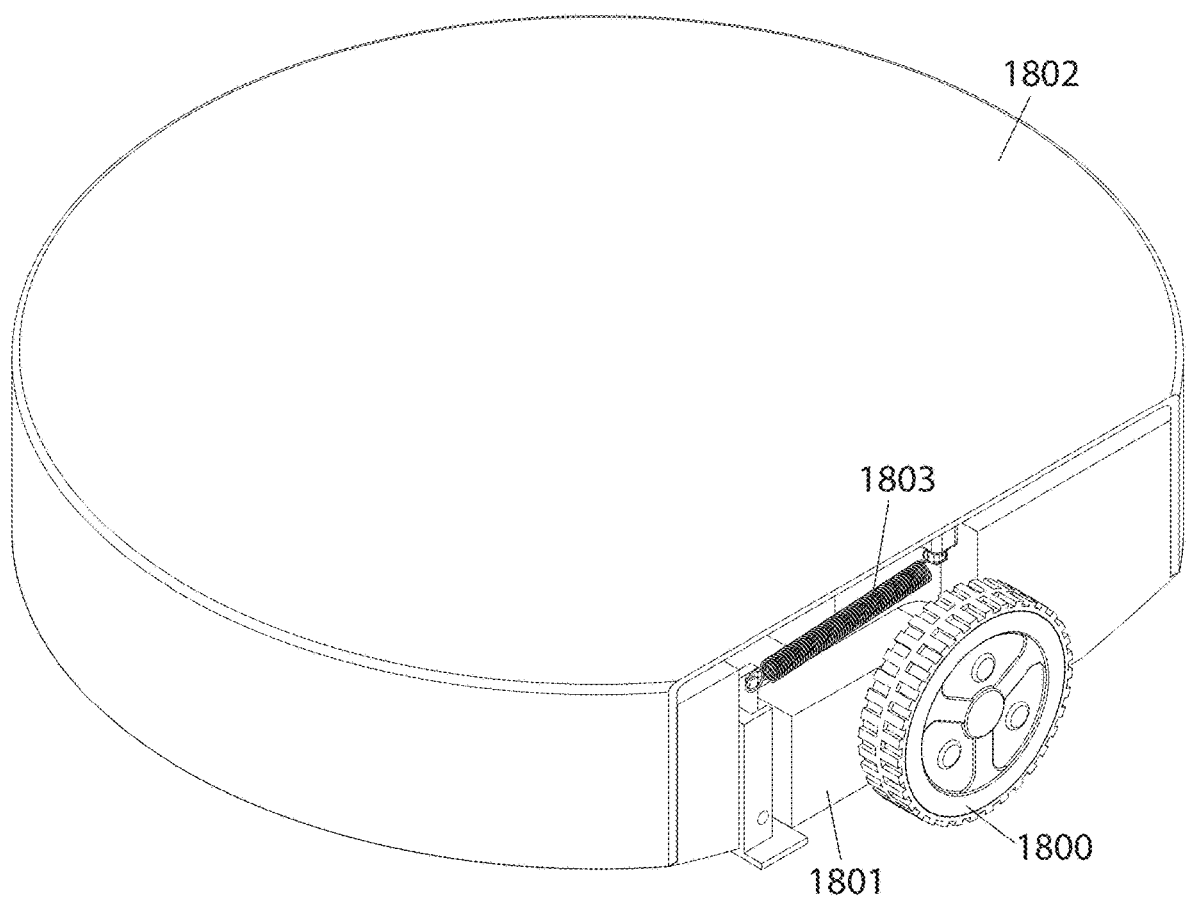
Figure 18C:
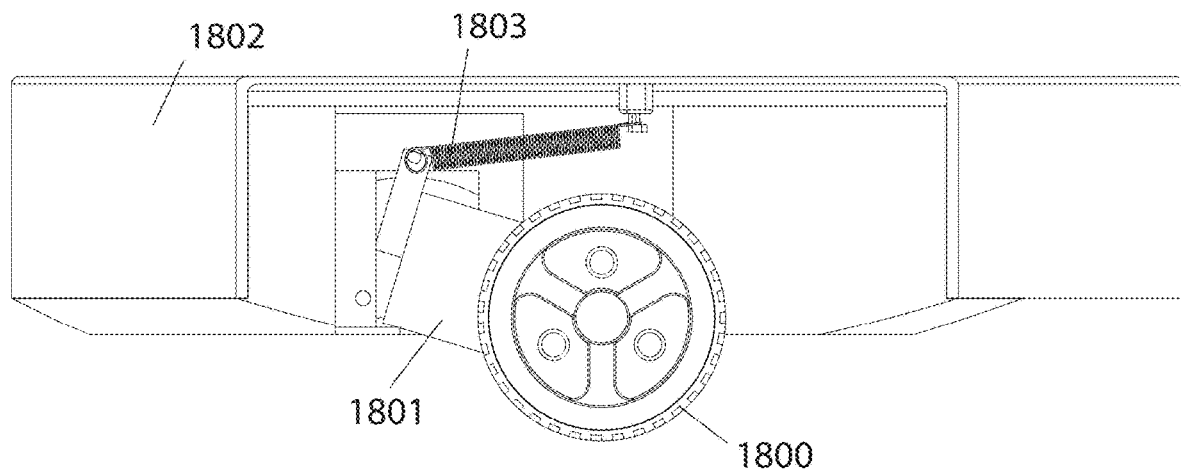
Figure 18D:
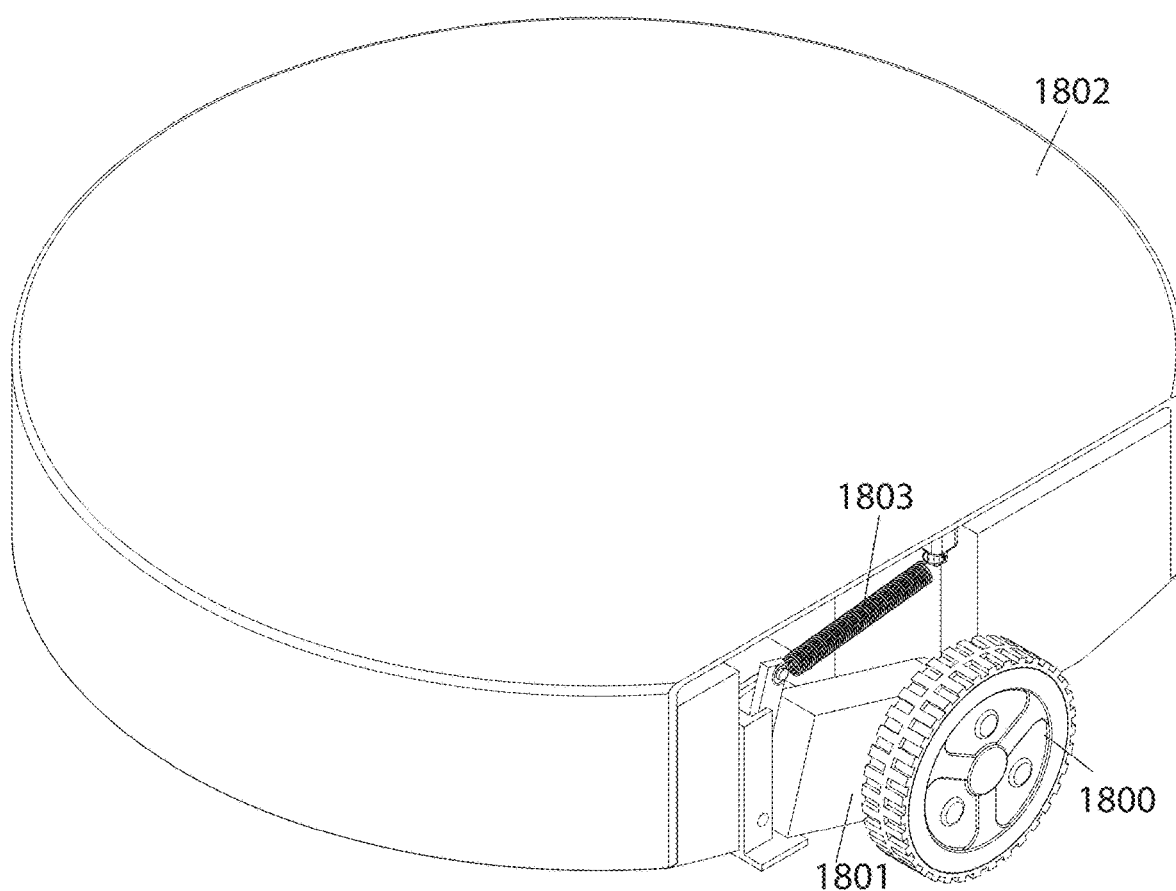

In yet another example, the wheel suspension includes a wheel coupled to a rotating arm pivotally attached to a chassis of the modular robot and a spring anchored to the rotating arm on a first end and the chassis on a second end. The spring is in an extended state. As the spring constantly attempts to reach an unstretched state it causes the rotating arm to pivot in a downward direction and the wheel to be therefore pressed against the driving surface. When the wheel encounters an obstacle, the wheel suspension causes the wheel to maintain contact with the driving surface. The further the wheel is extended, the closer the spring is at reaching an unstretched state. FIGS. 18A and 18B illustrate an example of a wheel suspension including a wheel 1800 coupled to a rotating arm 1801 pivotally attached to a chassis 1802 of a robot and a spring 1803 coupled to the rotating arm 1801 on a first end and the chassis 1802 on a second end. The spring 1803 is in an extended state and therefore constantly applies a force to the rotating arm 1801 to pivot in a downward direction as the spring attempts to reach an unstretched state, thereby causing the wheel 1800 to be constantly pressed against the driving surface. When an obstacle, such as a hole, is encountered, for example, the wheel extends as illustrated in FIGS. 18C and 18D. The spring 1803 causes the rotating arm 1801 to rotate further downwards as it attempts to return to an unstretched state. In some embodiments, the springs of the different suspension systems described herein may be replaced by other elastic elements such as rubber. In some embodiments, wheel suspension systems may be used independently or in combination. Additional wheel suspension systems are described in U.S. patent application Ser. Nos. 15/951,096, 16/389,797, and 62/720,521, the entire contents of which are hereby incorporated by reference.

Figure 19A:
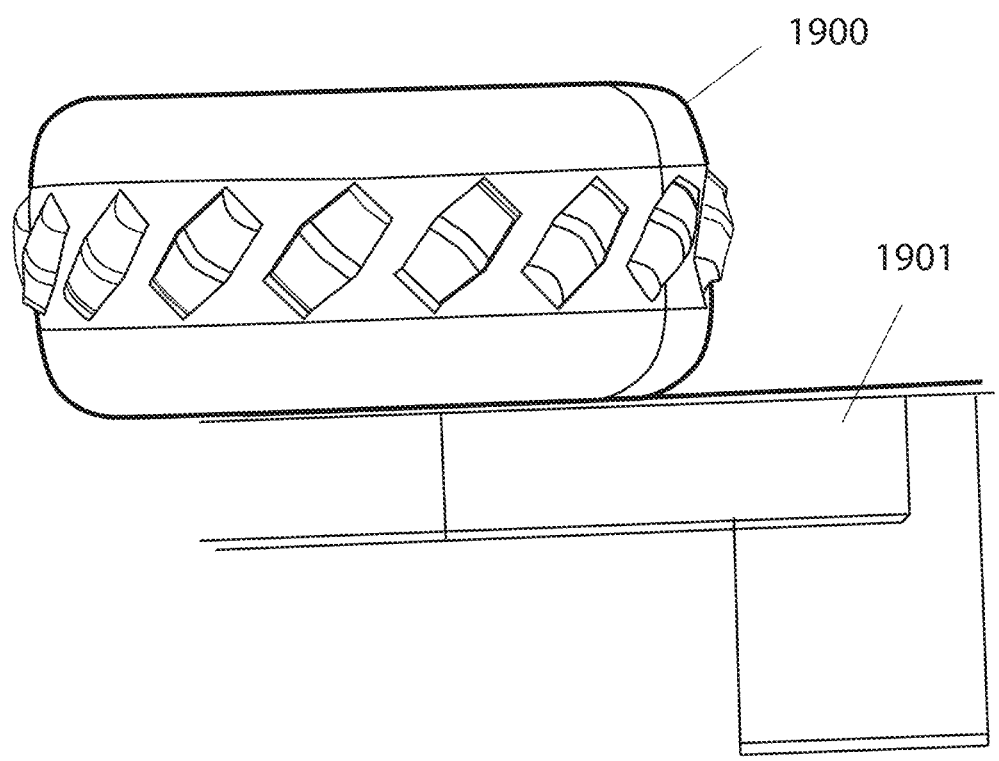
FIGS. 19A and 19B illustrate examples of mecanum wheels, according to some embodiments.
Figure 19B:
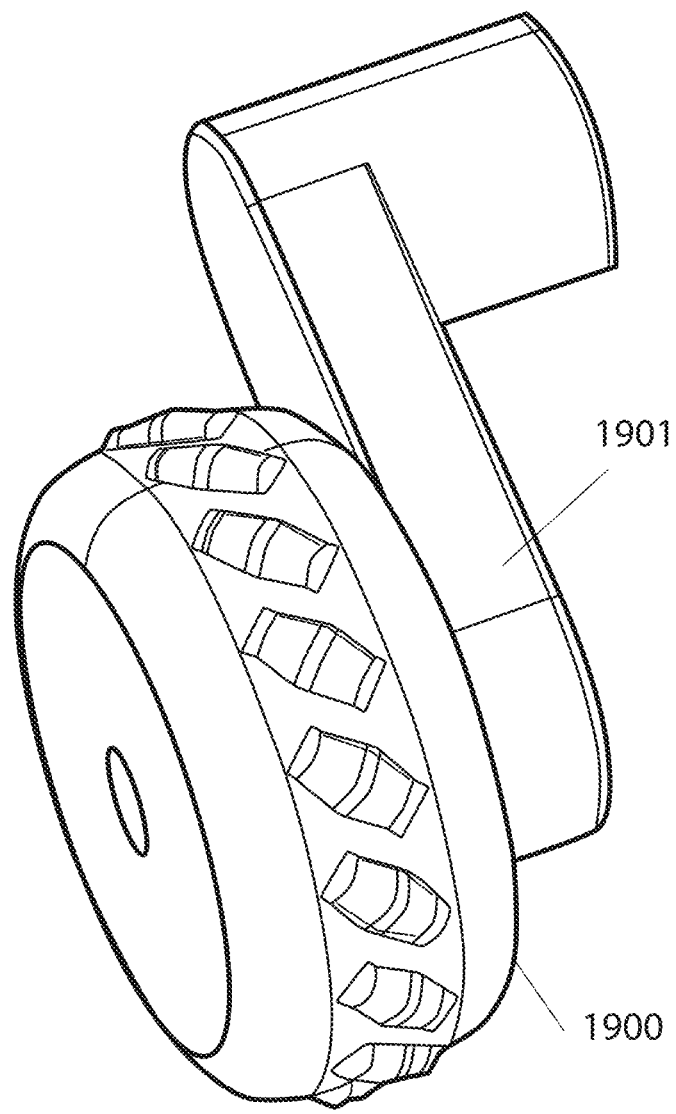
Figure 20A:
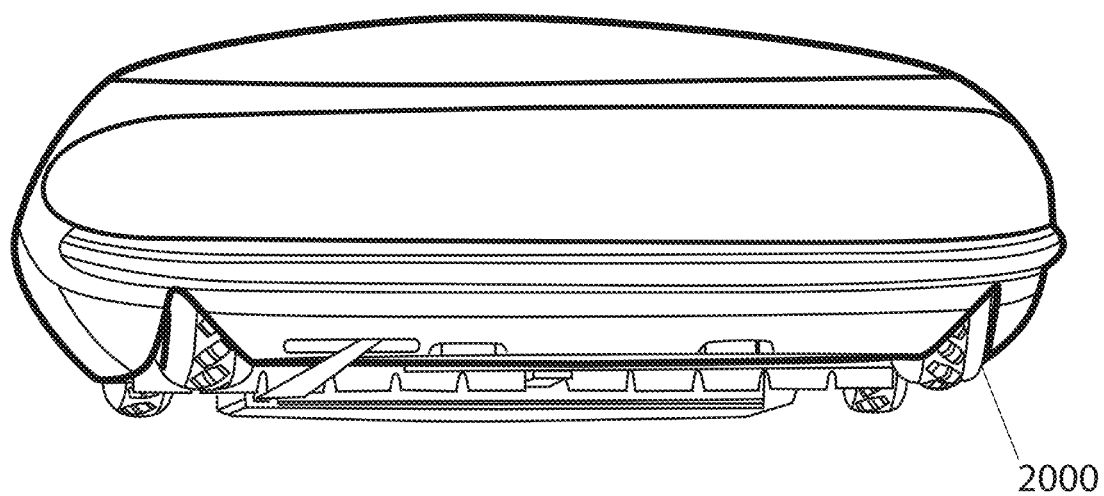
FIGS. 20A and 20B illustrate examples of a robotic device with mecanum wheels, according to some embodiments.
Figure 20B:
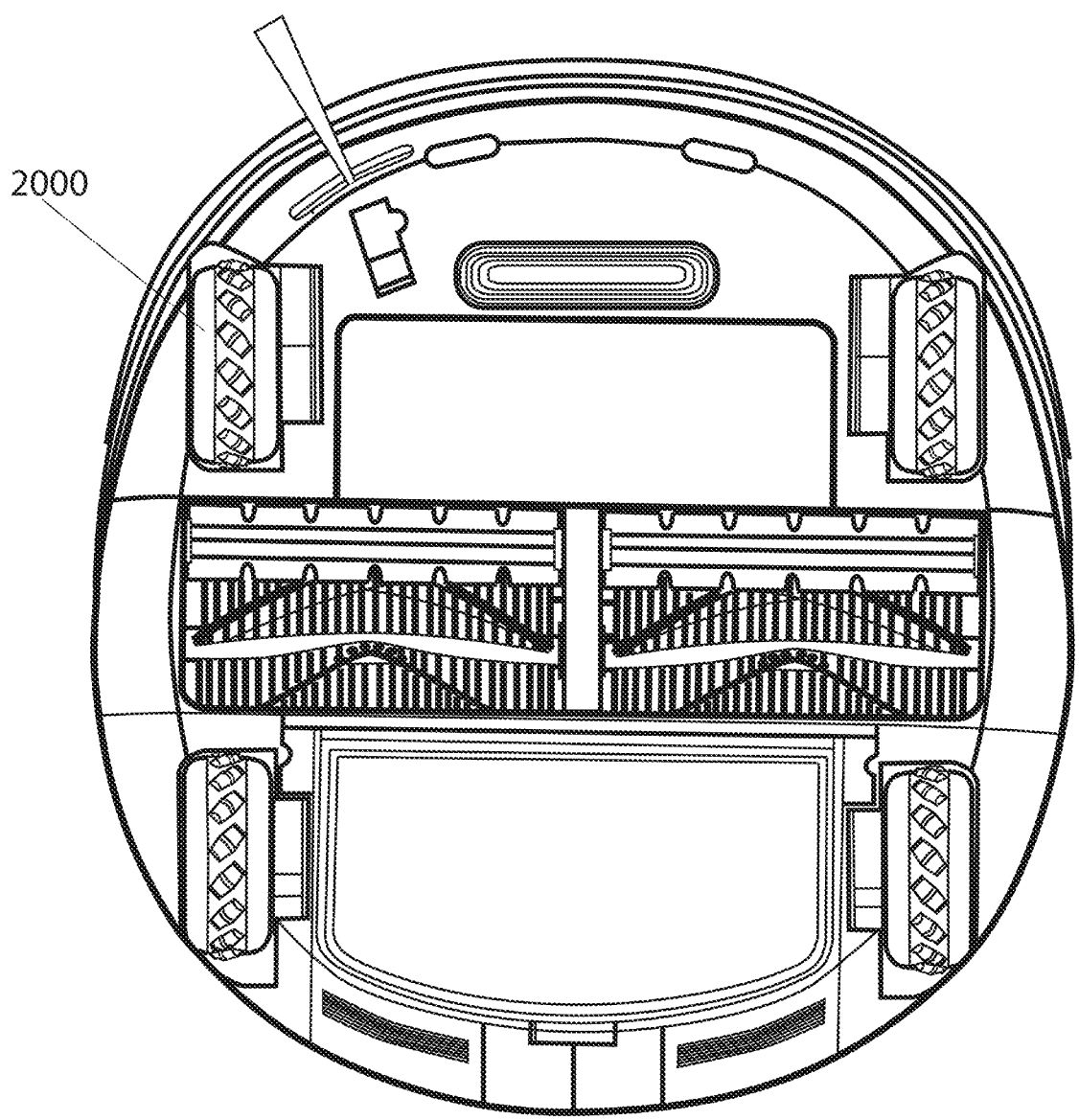

In some embodiments, the wheels used with the different suspension systems are mecanum wheels, allowing the modular robot to move in any direction. For example, the robot can travel diagonally by moving a front wheel and opposite rear wheel at one speed while the other wheels turn at a different speed, moving all four wheels in the same direction straight moving, running the wheels on one side in the opposite direction to those on the other side causing rotation, and running the wheels on one diagonal in the opposite direction to those on the other diagonal causes sideways movement. FIGS. 19A and 19B illustrate examples of a mecanum wheel 1900 attached to an arm 1901 of a robotic device. The arm may be coupled to a chassis of the robotic device. FIGS. 20A and 20B illustrate a front and bottom view of an example of a robotic device with mecanum wheels 2000, respectively, that allow the robotic device to move in any direction. In some embodiments, the wheels are expandable such that the robotic device may climb over larger obstacles. Examples of expandable mecanum wheels are described in U.S. patent application Ser. Nos. 15/447,450 and 15/447,623, the entire contents of which are hereby incorporated by reference.

Figure 21A:
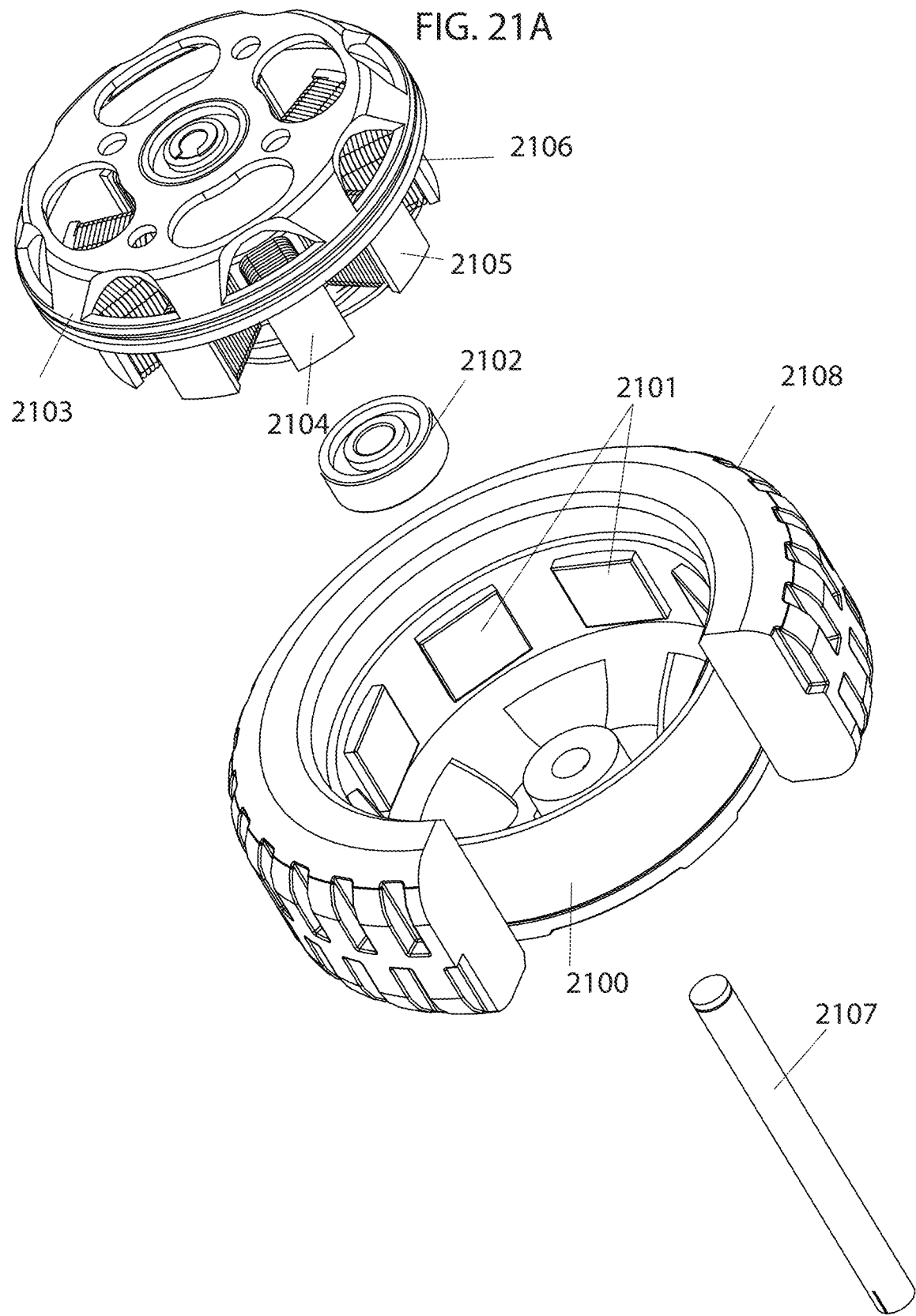
FIGS. 21A and 21B illustrate an example of a brushless DC wheel motor positioned within a wheel, according to some embodiments.
Figure 21B:
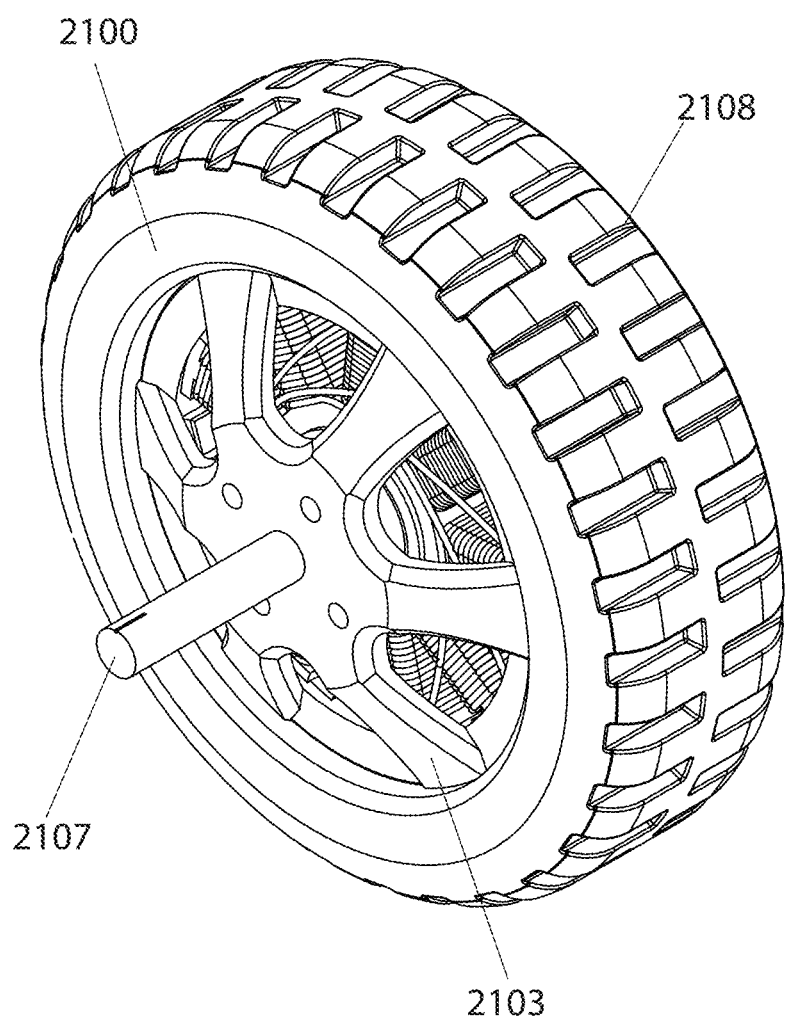

In some embodiments, the wheel motor is positioned within the wheel. For example, FIGS. 21A and 21B illustrate a wheel with a brushless DC motor positioned within the wheel. FIG. 21A illustrates an exploded view of the wheel with motor including a rotor 2100 with magnets 2101, a bearing 2102, a stator 2103 with coil sets 2104, 2105, and 2106, an axle 2107 and tire 2108 each attached to rotor 2100. Each coil set (2104, 2105, and 2106) include three separate coils, the three separate coils within each coil set being every third coil. The rotor 2100 acts as a permanent magnet. DC current is applied to a first set of coils 1604 causing the coils to energize and become an electromagnet. Due to the force interaction between the permanent magnet (i.e., the rotor 2100) and the electromagnet (i.e., the first set of coils 2104 of stator 2103), the opposite poles of the rotor 2100 and stator 2103 are attracted to each other, causing the rotor to rotate towards the first set of coils 2104. As the opposite poles of rotor 2100 approach the first set of coils 2104, the second set of coils 2105 are energized and so on, and so forth, causing the rotor to continuously rotate due to the magnetic attraction. Once the rotor 2100 is about to reach the first coil set 2104 a second time, the first coil set 2104 is energized again but with opposite polarity as the rotor has rotated 180 degrees. In some embodiments, the set of coils immediately following the set of coils being energized are energized as well to increase the torque. FIG. 21B illustrates a top perspective view of the constructed wheel with the motor positioned within the wheel. In some embodiments, the processor uses data of a wheel sensor (e.g., halls effect sensor) to determine the position of the rotor, and based on the position determines which pairs of coils to energize.

Figure 22A:
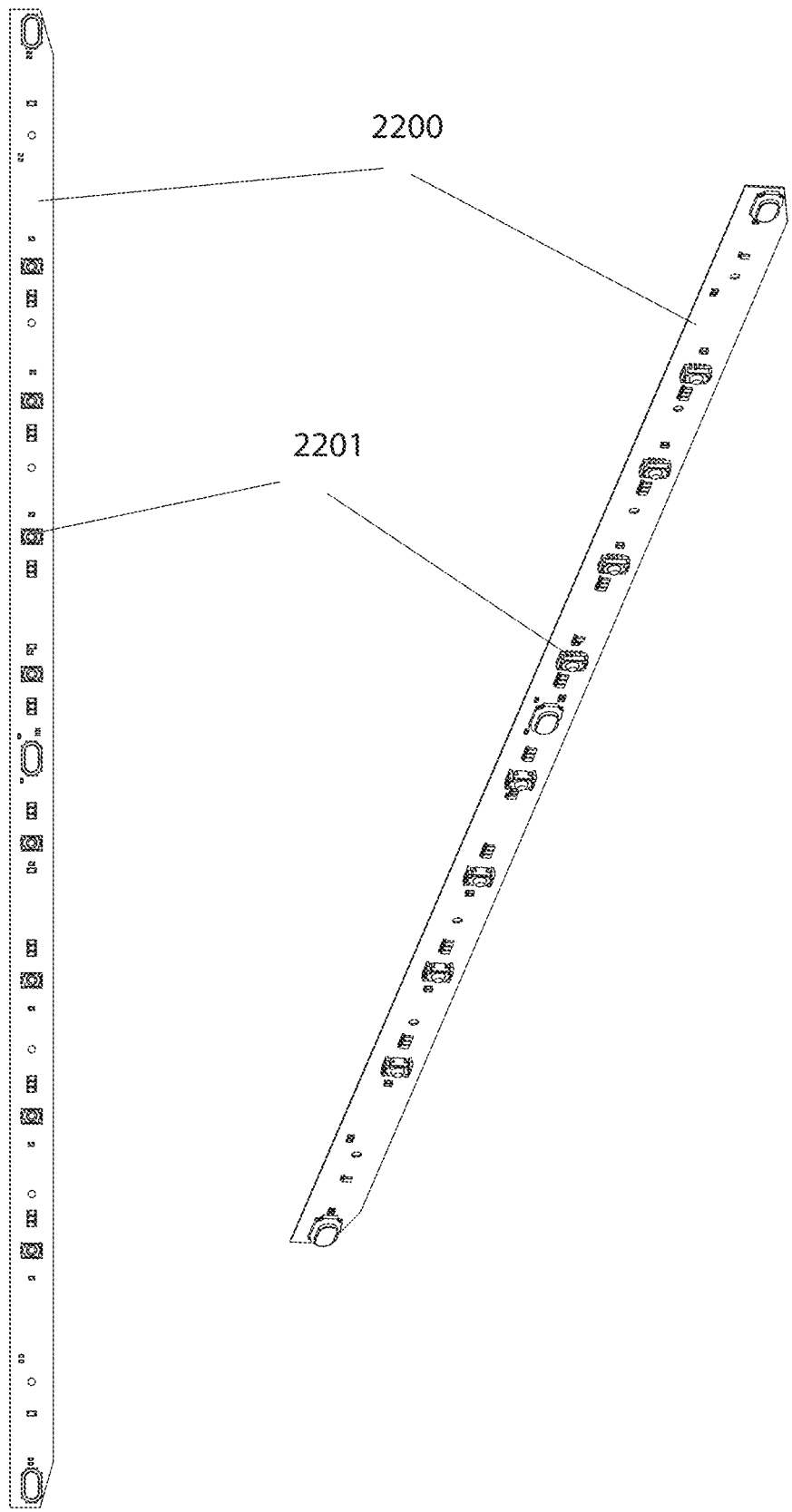
FIGS. 22A-22D illustrate an example of a sensor array, according to some embodiments.
Figure 22B:
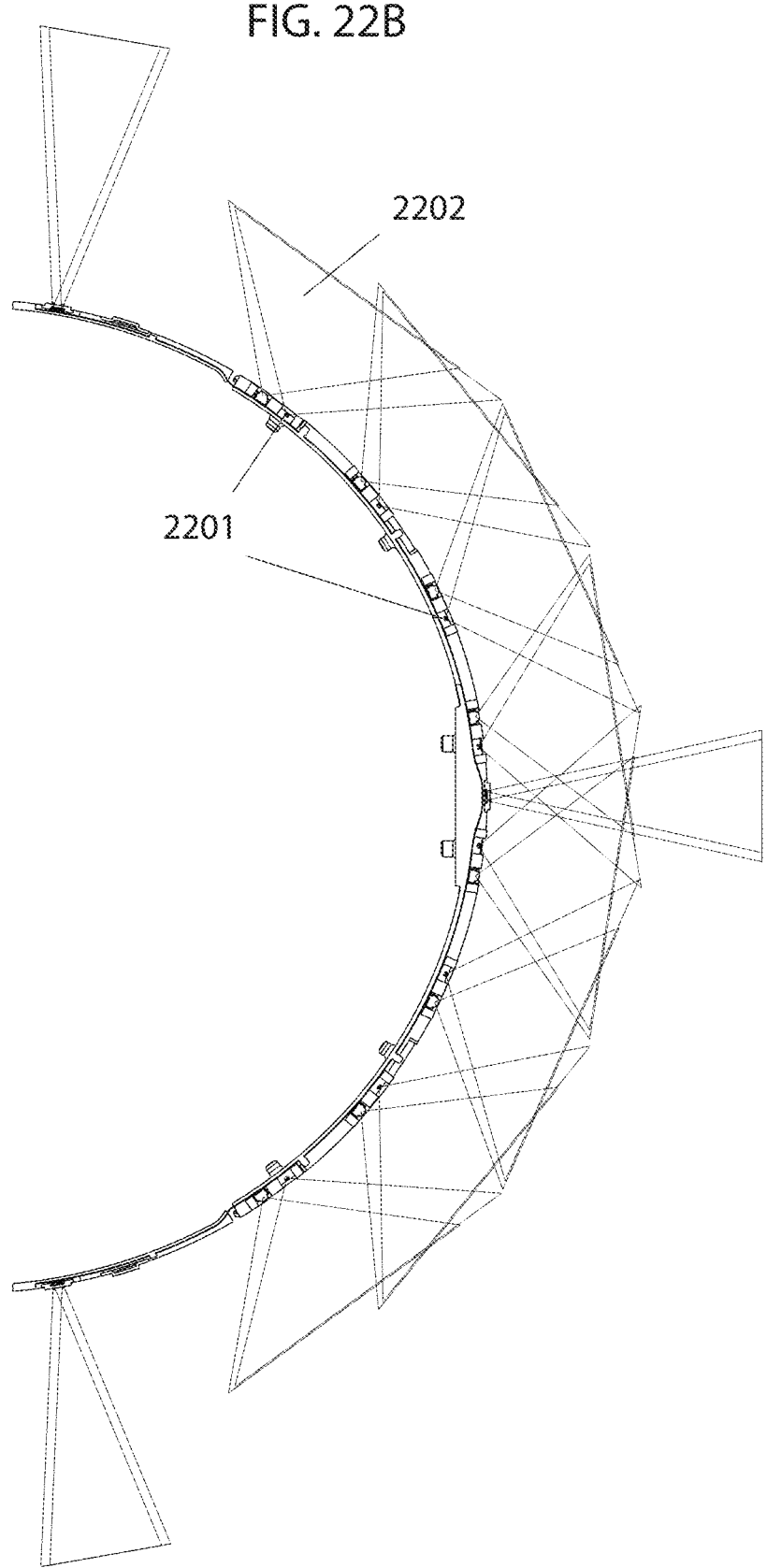
Figure 22C:
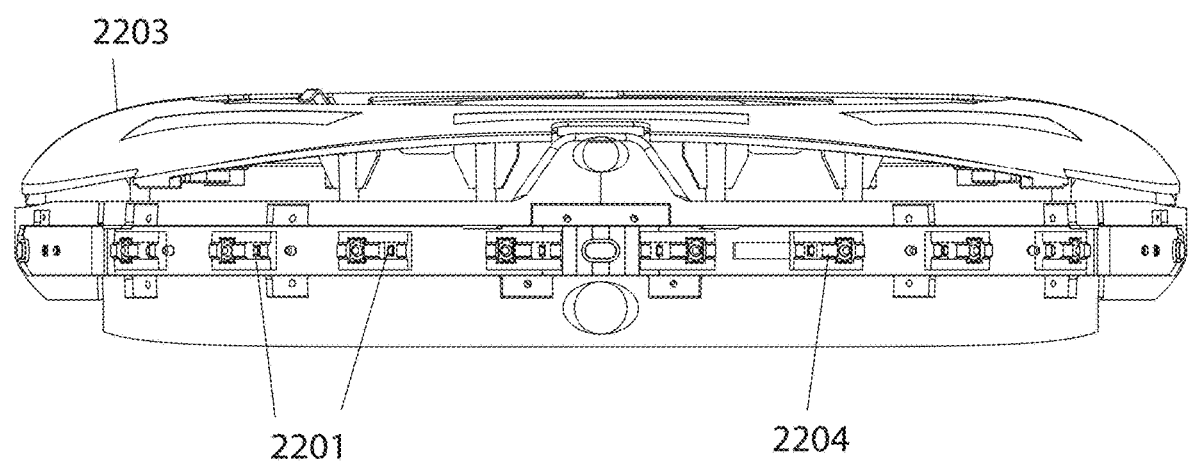
Figure 22D:
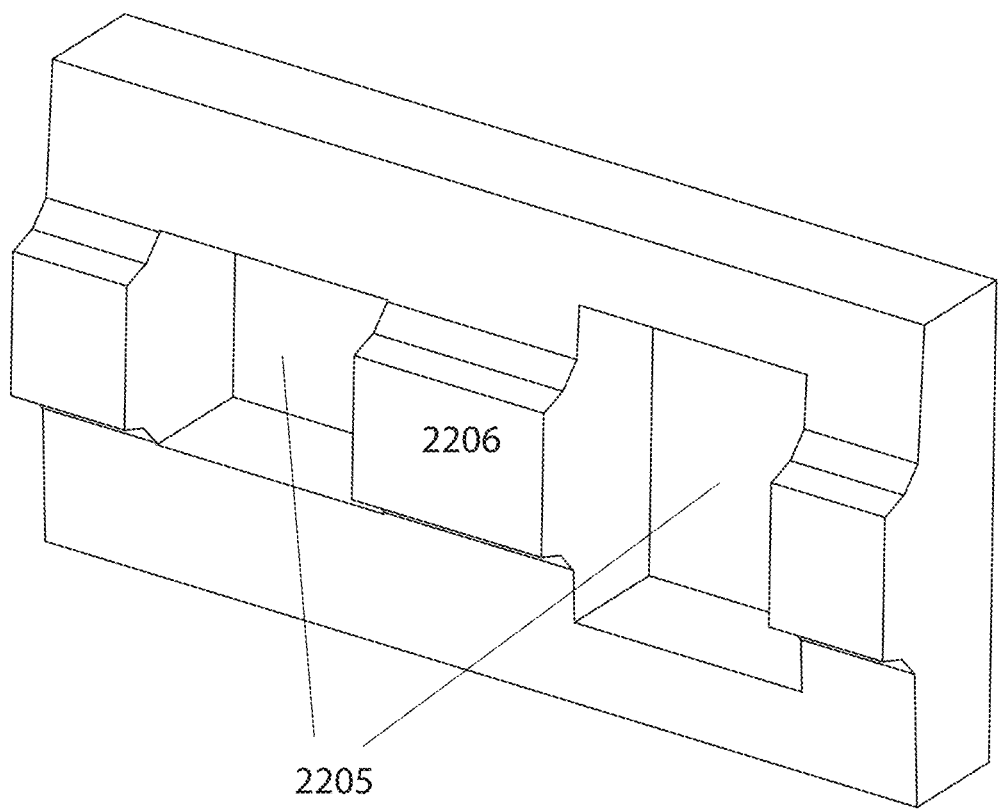

In some embodiments, the modular robot (or any other robot that implements the methods and techniques described herein), including any of its add-on structures, includes one or more sensor arrays. In some embodiments, a sensor array includes a flexible or rigid material (e.g., plastic or other type of material in other instances) with connectors for sensors (different or the same). In some embodiments, the sensor array is a flexible plastic with connected sensors. In some embodiments, a flexible (or rigid) isolation component is included in the sensor array. The isolation piece is meant to separate sensor sender and receiver components of the sensor array from each other to prevent a reflection of an incorrect signal from being received and a signal from being unintentionally rebounded off of the robotic platform rather than objects within the environment. In some embodiments, the isolation component separates two or more sensors. In some embodiments, the isolation component includes two or more openings, each of which is to house a sensor. In some embodiments, the sizes of the openings are the same. In alternative embodiments, the sizes of the openings are of various sizes. In some embodiments, the openings are of the same shape. In alternative embodiments, the openings are of various shapes. In some embodiments, a wall is used to isolate sensors from one another. In some embodiments, multiple isolation components are included on a single sensor array. In some embodiments, the isolation component is provided separate from sensor array. In some embodiments, the isolation component is rubber, Styrofoam, or another material and is placed in strategic locations in order to minimize the effect on the field of view of the sensors. In some embodiments, the sensors array is positioned around the perimeter of the robotic platform. In some embodiments, the sensor array is placed internal to an outer shell of the polymorphic robotic platform. In alternative embodiments, the sensor array is located on the external body of the mobile robotic device. FIG. 22A illustrates an example of a sensor array including a flexible material 2200 with sensors 2201 (e.g., LED and receiver). FIG. 22B illustrates the fields of view 2202 of sensors 2201. FIG. 22C illustrates the sensor array mounted around the perimeter of a chassis 2203 of a robotic device, with sensors 2201 and isolation components 2204. FIG. 22D illustrates one of the isolation components 2204 including openings 2205 for sensors 2201 (shown in FIG. 22C) and wall 2206 for separating the sensors 2201.

Figure 23:
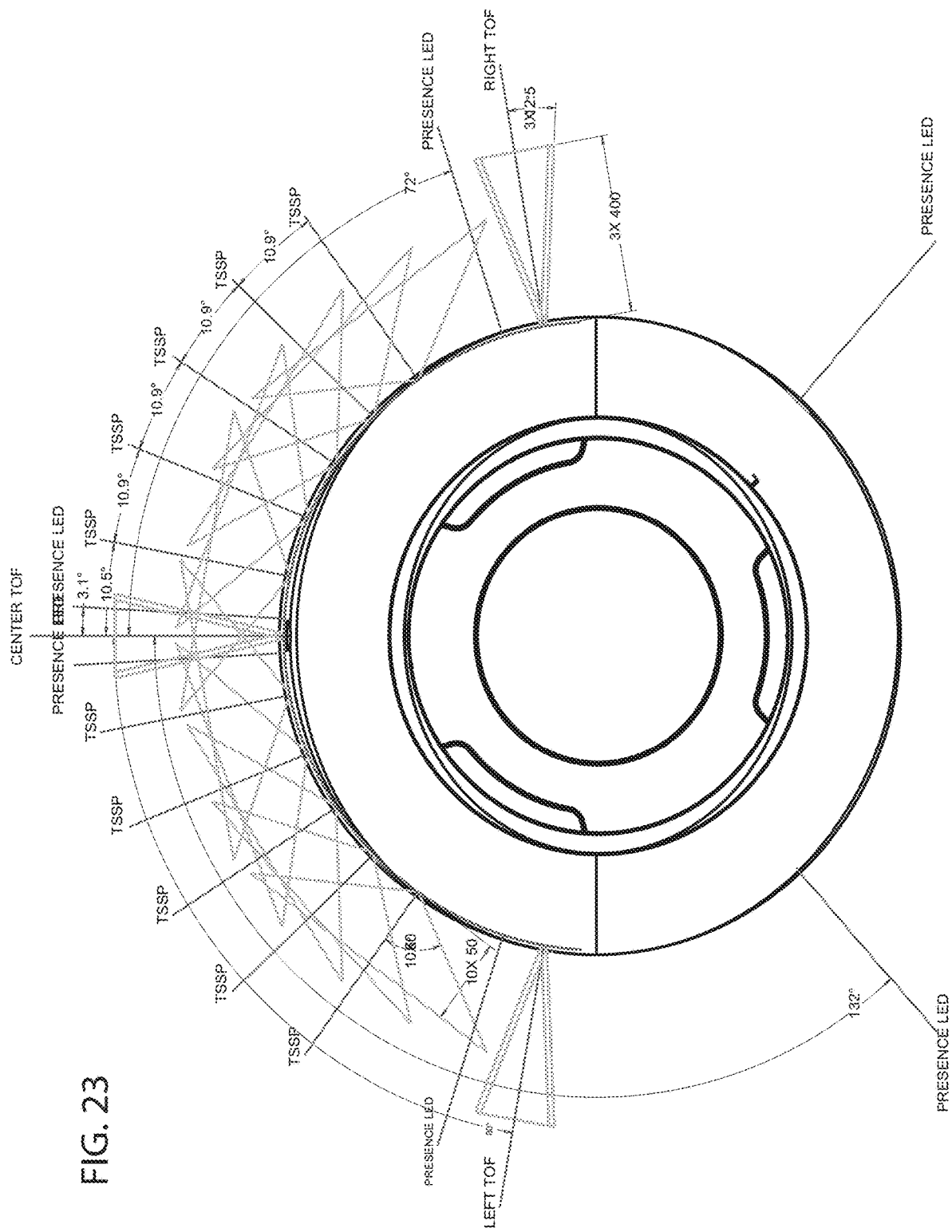
FIG. 23 illustrates an example of a sensor array, according to some embodiments.

In some embodiments, sensors of the robot are positioned such that the field of view of the robot is maximized while cross-talk between sensors is minimized. In some embodiments, sensor placement is such that the IR sensor blind spots along the perimeter of the robot in a horizontal plane (perimeter perspective) are minimized while at the same time eliminating or reducing cross talk between sensors by placing them far enough from one another. In some embodiments, an obstacle sensor (e.g., IR sensor, TOF sensor, TSSP sensor, etc.) is positioned along the front of the robot at the midpoint such that the vertical blind spot of the robot is minimized and such that the robot is intentionally blind to objects below a predetermined height relative to the driving surface. For example, the robot is blind to obstacles of certain size. In some embodiments, the predetermined height, below which the robot is blind, is smaller or equal to the height the robot is physically capable of climbing. This means that, for example, if the wheels (and suspension) are capable of climbing over objects 20 mm in height, the obstacle sensor should be positioned such that it can only detect obstacles equal to or greater than 20 mm in height. In some embodiments, a buffer is implemented and the predetermined height, below which the robot is blind, is smaller or equal to some percentage of the height the robot is physically capable of climbing (e.g., 80%, 90%, or 98% of the height the robotic device is physically capable of climbing). The buffer increases the likelihood of the robot succeeding at climbing over an obstacle if the processor decides to execute a climbing action. In some embodiments, at least one obstacle sensor (e.g., IR sensor, TOF sensor, TSSP sensor, etc.) is positioned in the front and on the side of the robot. In some embodiments, the obstacle sensor positioned on the side is positioned such that the data collected by the sensor can be used by the processor to execute accurate and straight wall following by the robot. In alternative embodiments, at least one obstacle sensor is positioned in the front and on either side of the robot. In some embodiments, the obstacle sensor positioned on the side is positioned such that the data collected by the sensor can be used by the processor to execute accurate and straight wall following by the robot. FIG. 23 illustrates an example of a sensor array showing the positioning and field of view of ten TSSP sensors, four presence LED sensors (e.g., IR transmitter), and three time-of-flight sensors. The position of the sensors allows for maximum combined field of view with minimal cross-talk among adjacent sensors. In some embodiments, TSSP sensors have an opening angle of 120 degrees and a depth of 3 to 5 cm, TOF sensors have an opening angle of 25 degrees and a depth of 40 to 45 cm, presence LED sensors have an opening angle of 120 degrees and a depth 50 to 55 cm.

Figure 24A:
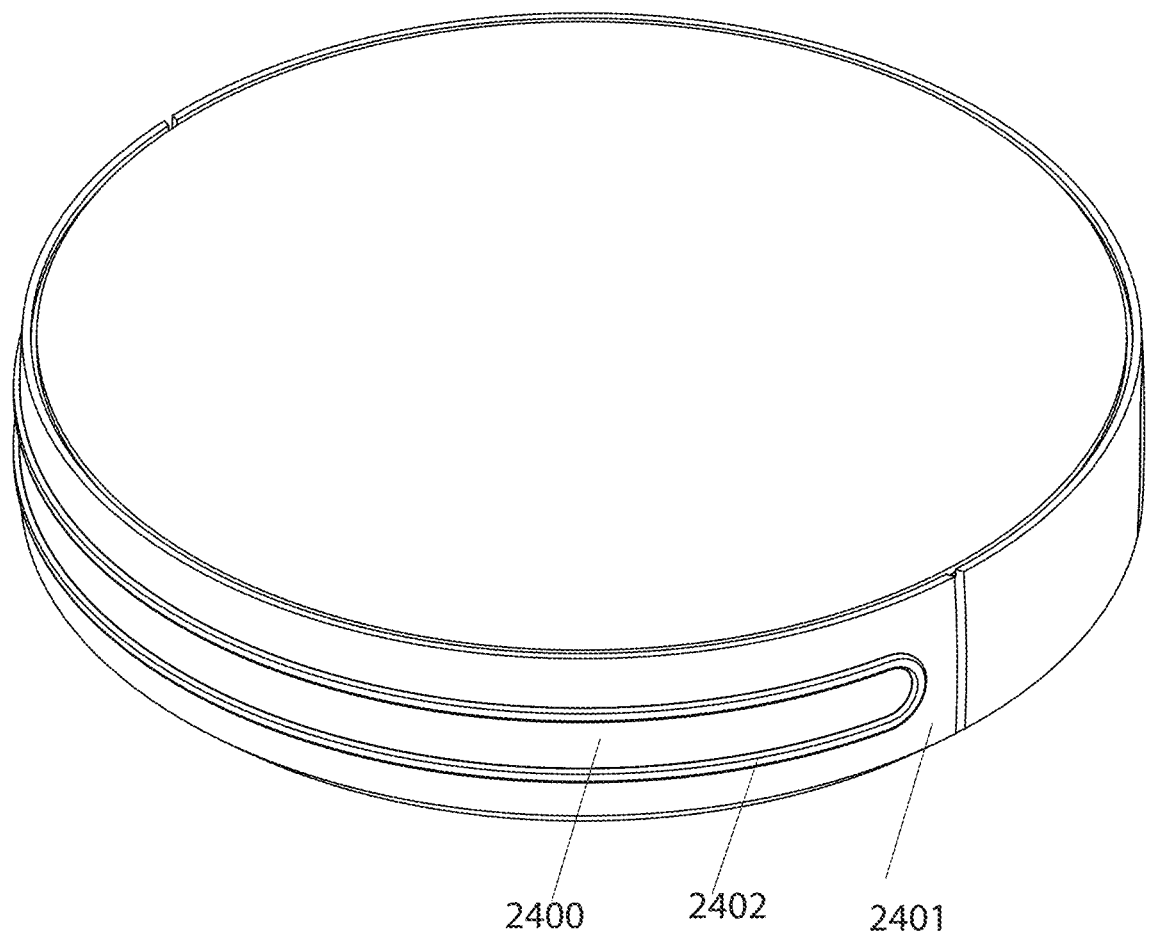
FIGS. 24A and 24B illustrates an example of a protective component for sensors and robot, according to some embodiments.
Figure 24B:
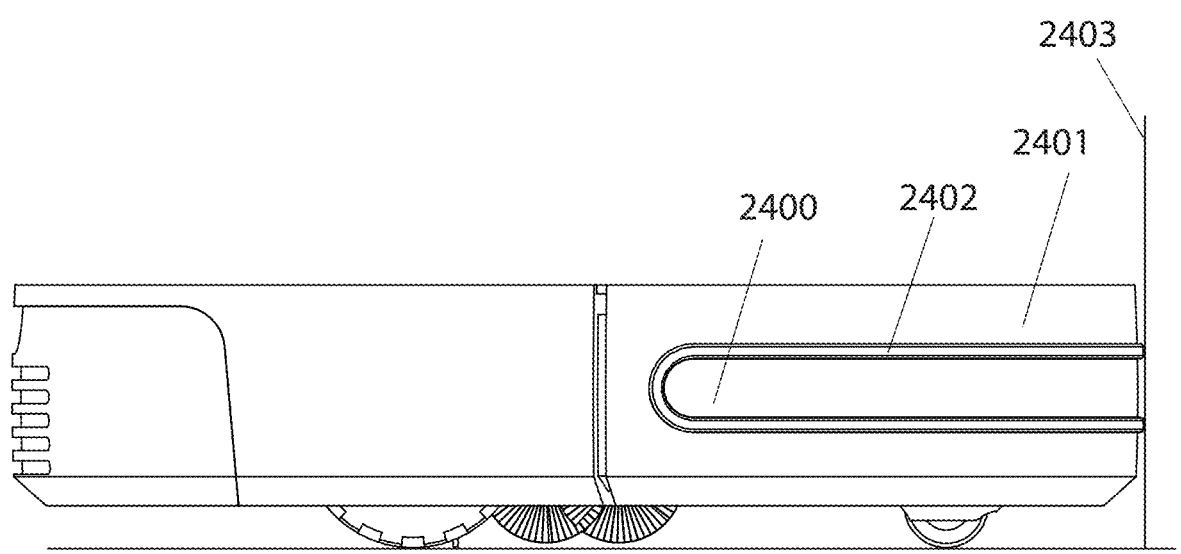

In some embodiments, a sensor cover is placed in front of one or more sensors to protect the sensor from damage and to limit any interference caused by dust accumulation. In some embodiments, the sensor cover is fabricated from a plastic or glass. In some embodiments, the sensor cover is one large cover placed in front of the sensor array (e.g., sensor window in FIG. 1A) or is an individual cover placed in front of one or more sensors. In some embodiments, a protective rubber (or other type of flexible or rigid material) is placed around the perimeter of the sensor cover to protect the sensor cover, the bumper, and objects within the environment, as it will be first to make contact with the object. FIG. 24A illustrates an example of a robot with sensor cover 2400, a bumper 2401, and protective component 2402 positioned around the perimeter of sensor cover 2400. FIG. 24B illustrates a side view of the robot, colliding with an object 2403. The protective component 2402 is first to make contact with object 2403, protecting sensor cover 2400 and bumper 2401.

In some embodiments, the processor of the modular robot (or any other robot that implements the methods and techniques described in the disclosure) is paired with an application of a communication device. Examples of a communication device include, a mobile phone, a tablet, a laptop, a desktop computer, a specialized computing device, a remote control, or other device capable of communication with the modular robot. In some embodiments, the application of the communication device may be used to communicate settings and operations to the processor. In some embodiments, the graphical user interface of the application is used by an operator to choose settings, operations, and preferences of the modular robot. In some instances, the application is used to display a map of the environment and the graphical user interface may be used by the operator to modify the map (e.g., modify, add, or delete perimeters, doorways, and objects and obstacles such as furniture, buildings, walls, etc.), modify or create a navigation path of the modular robot, create or modify subareas of the environment, label areas of an environment (e.g., kitchen, bathroom, streets, parks, airport terminal, etc., depending on the environment type), choose particular settings (e.g., average and maximum travel speed, average and maximum driving speed of an operational tool, RPM of an impeller, etc.) and operations (e.g., mowing, mopping, transportation of food, painting, etc.) for different areas of the environment, input characteristics of areas of an environment (e.g., obstacle density, floor or ground type, weather conditions, floor or ground transitions, etc.), create an operation schedule that is repeating or non-repeating for different areas of the environment (e.g., plow streets A and B in the morning on Wednesday), etc. Further descriptions of a graphical user interface of an application of a communication device that may be used are described in U.S. patent application Ser. Nos. 15/272,752 and 15/949,708, the entire contents of which are hereby incorporated by reference.

Figure 25A:
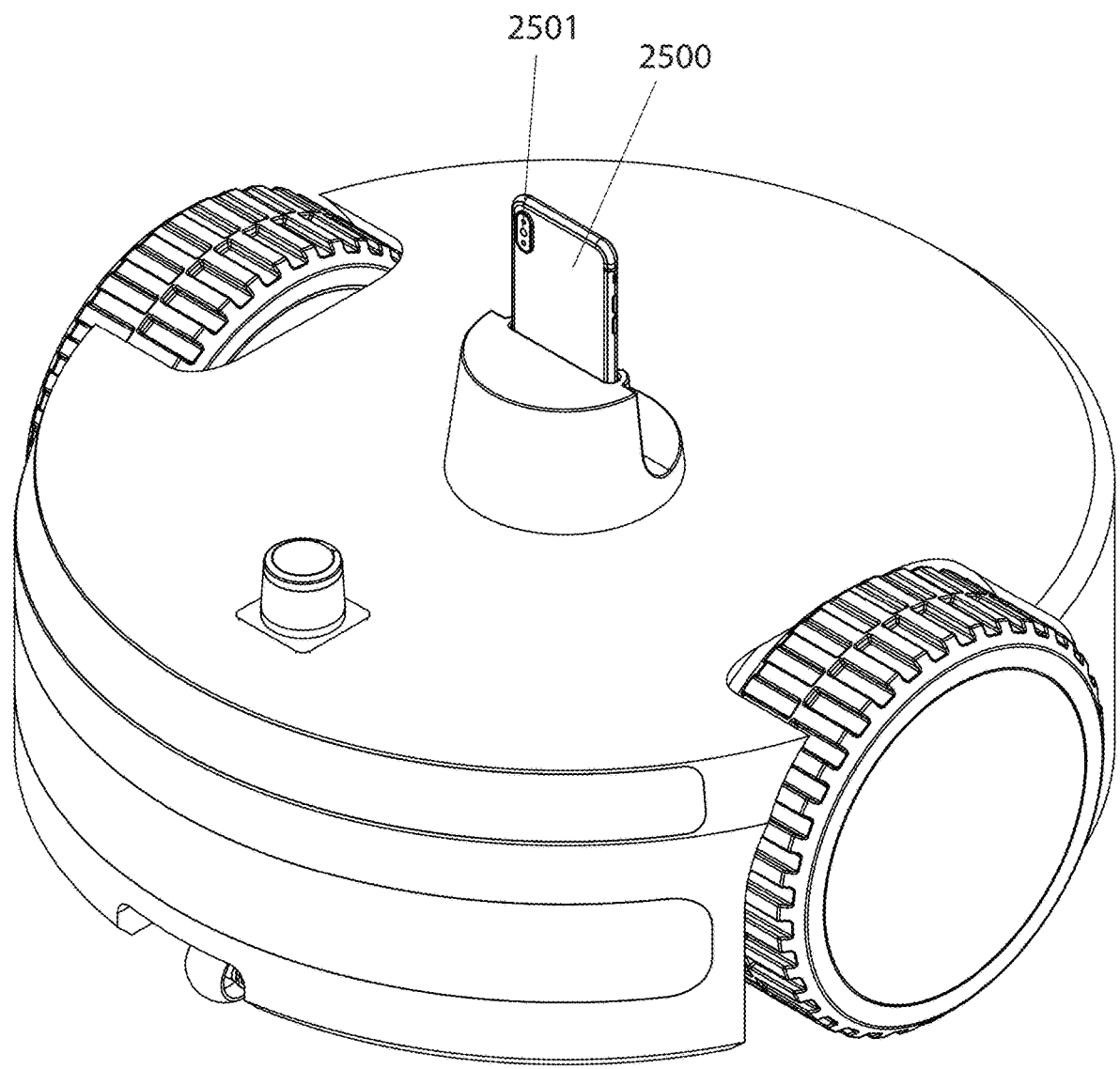
FIGS. 25A and 25B illustrate an example of a modular robot holding a communication device, according to some embodiments.
Figure 25B:
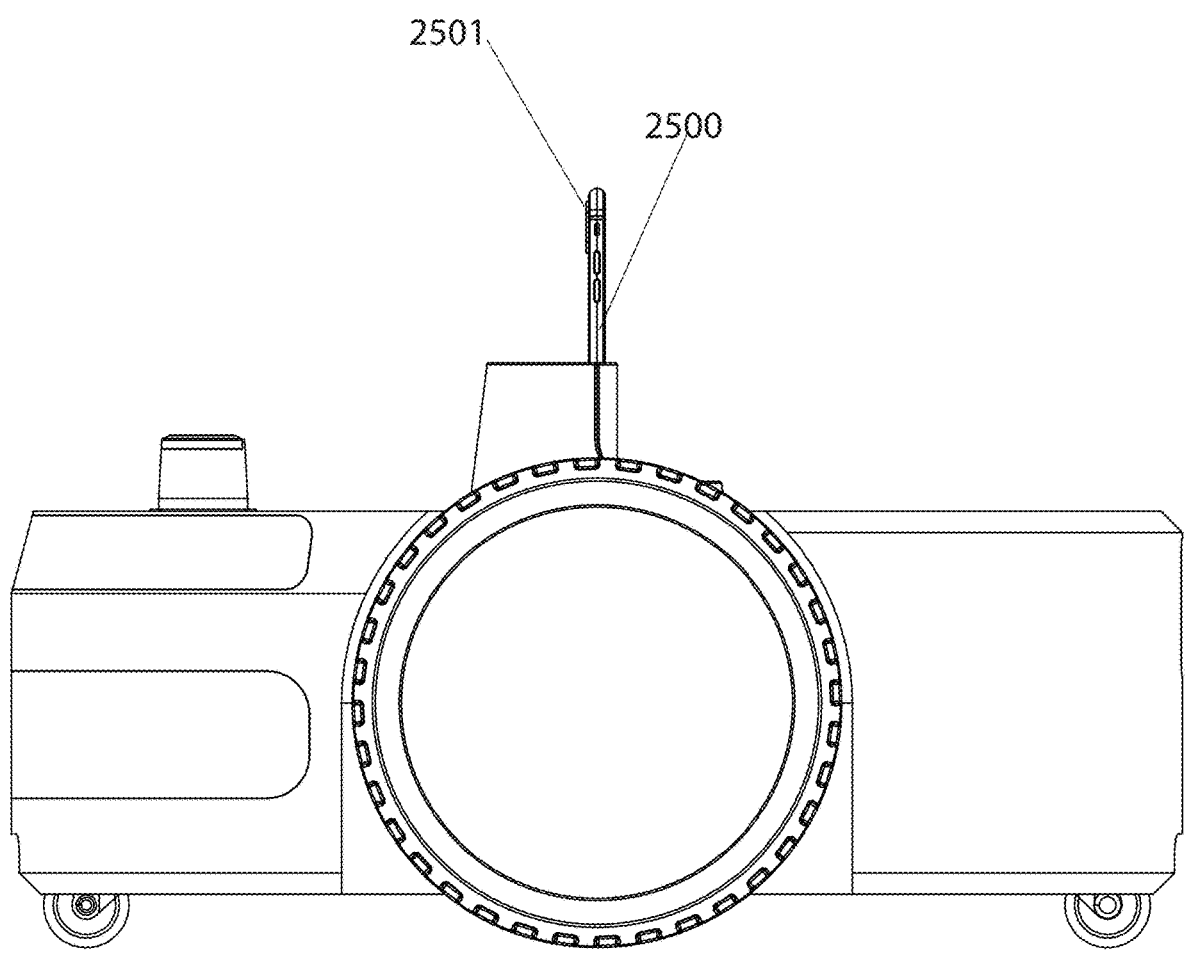
Figure 26A:
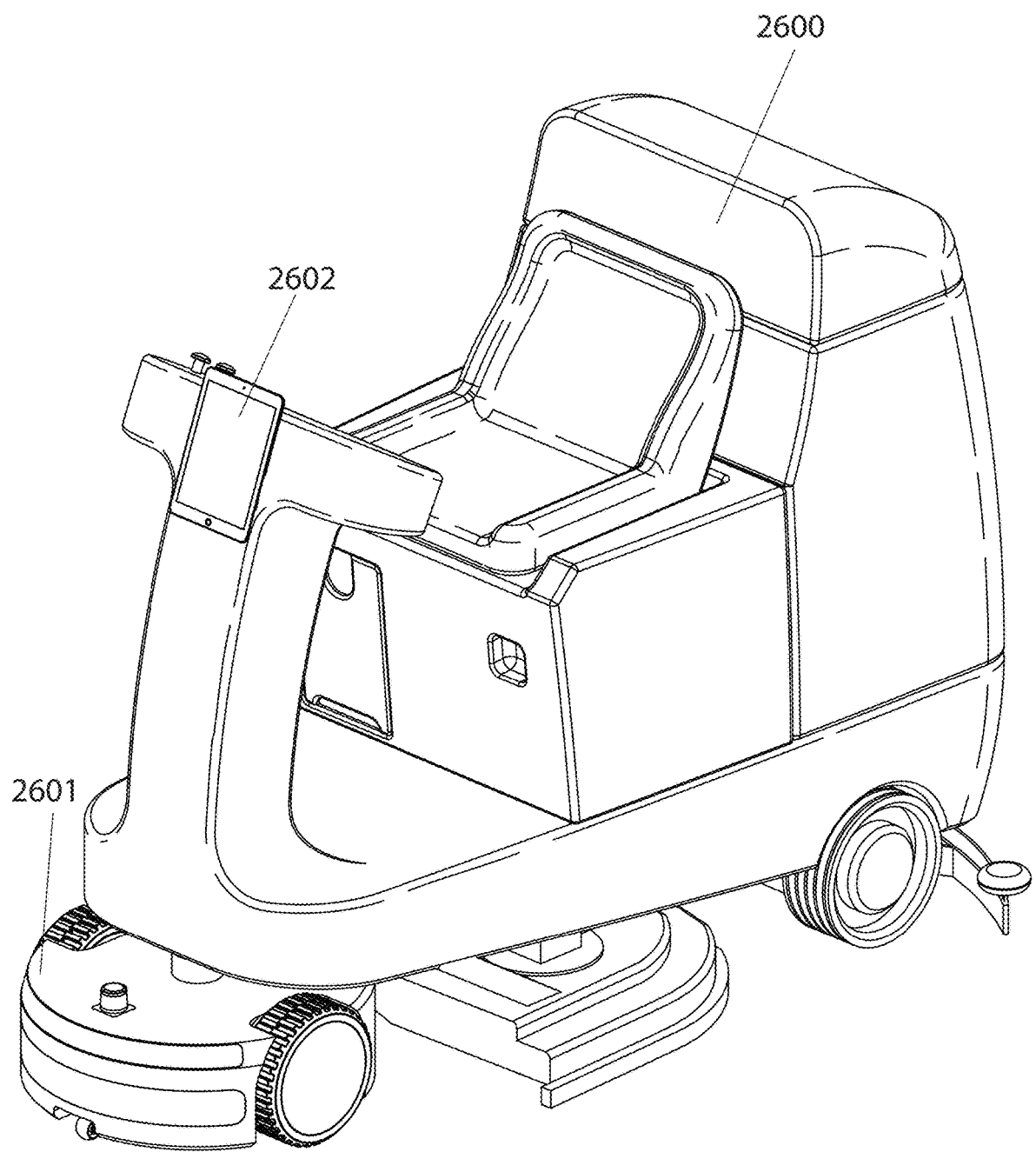
FIGS. 26A and 26B illustrate an example of a robotic scrubber coupled to a modular robot holding a communication device, according to some embodiments.
Figure 26B:
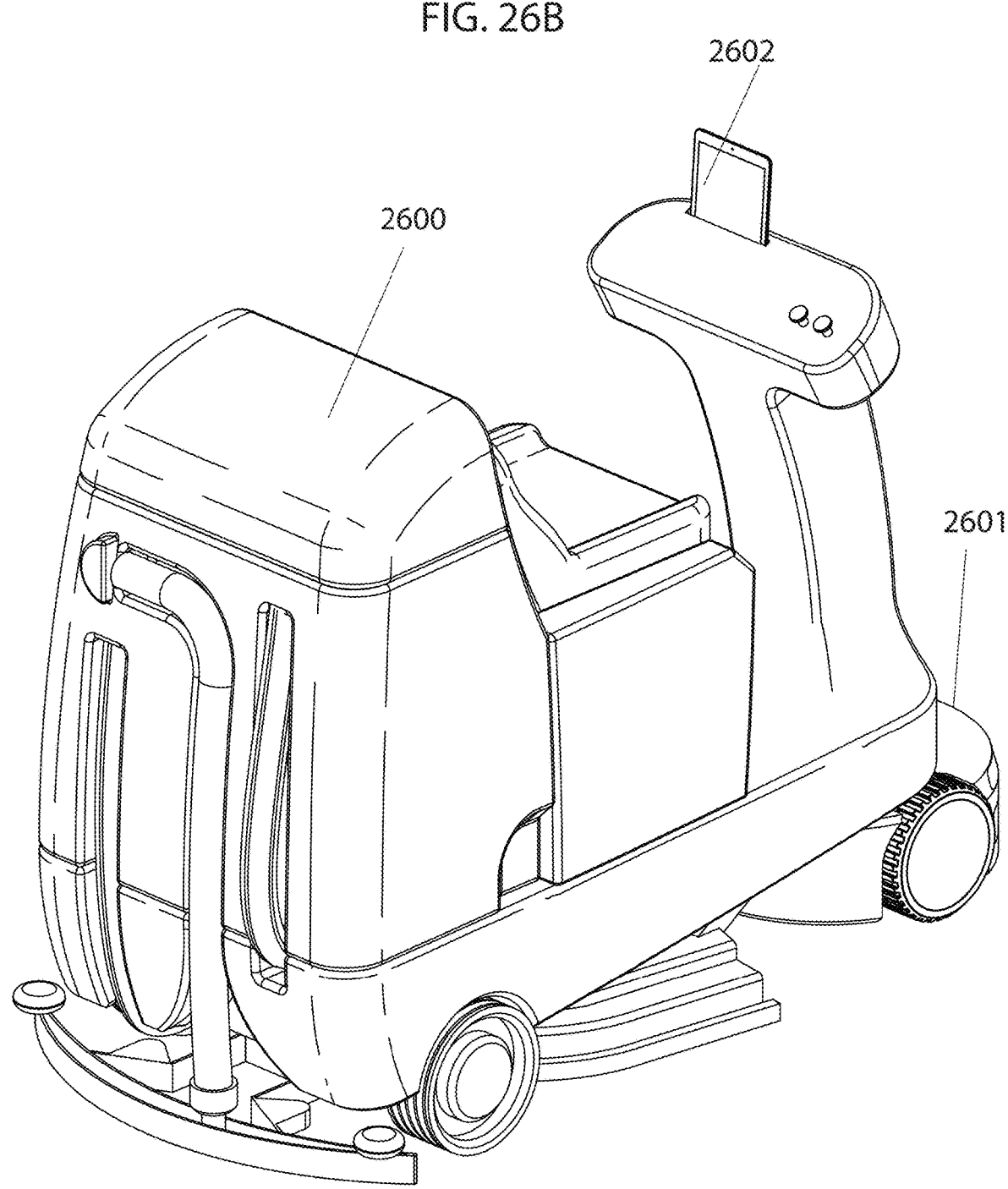
Figure 27A:
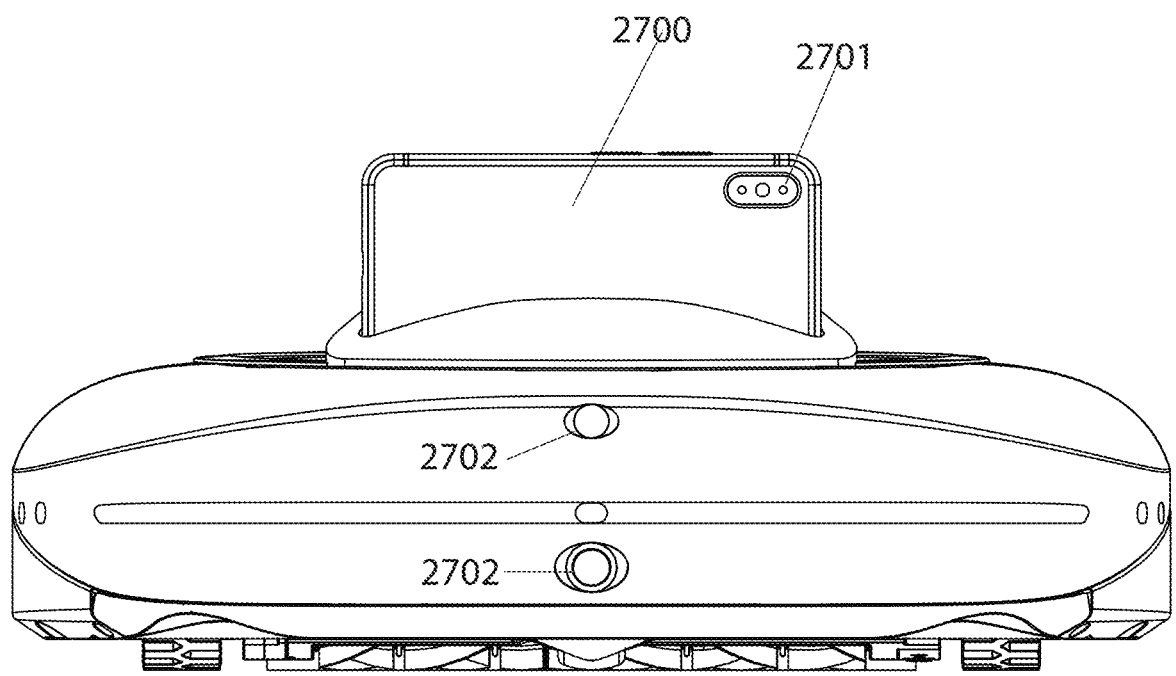
FIGS. 27A-27D illustrate an example of a robotic surface cleaner holding a communication device, according to some embodiments.
Figure 27B:
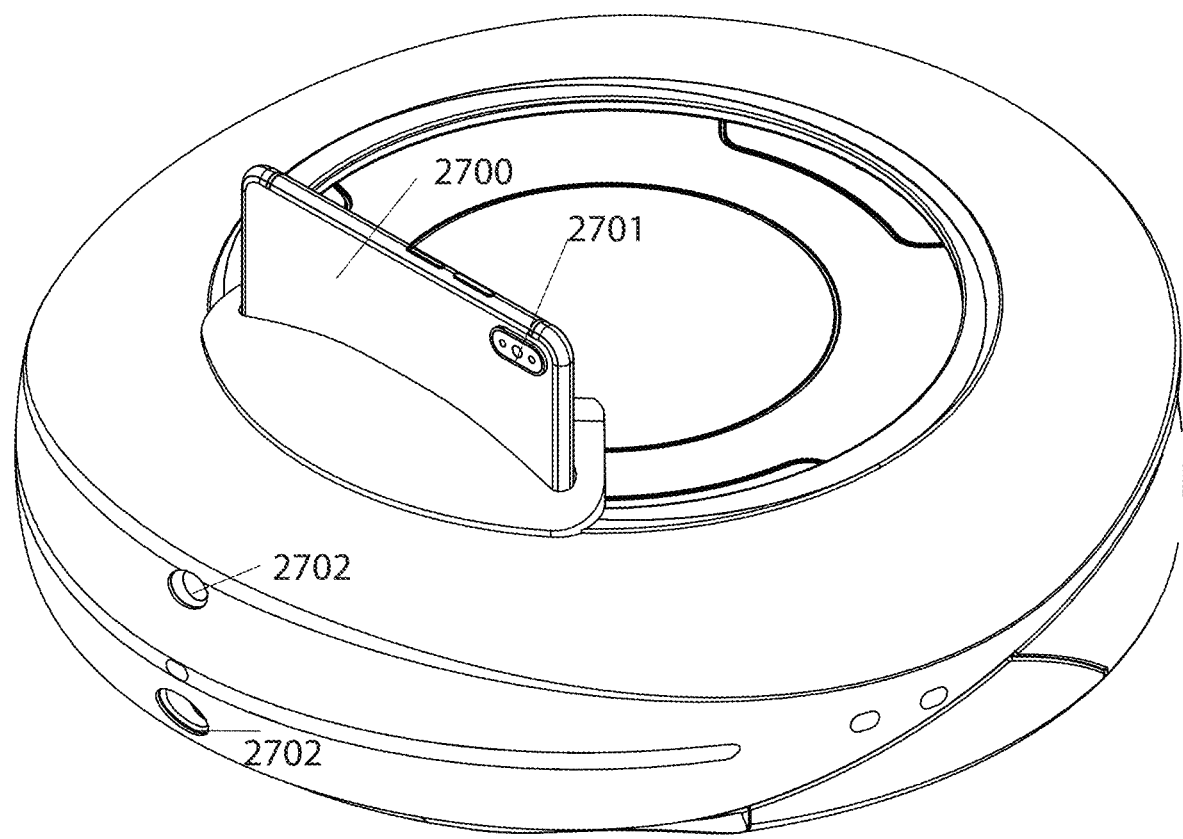
Figure 27C:
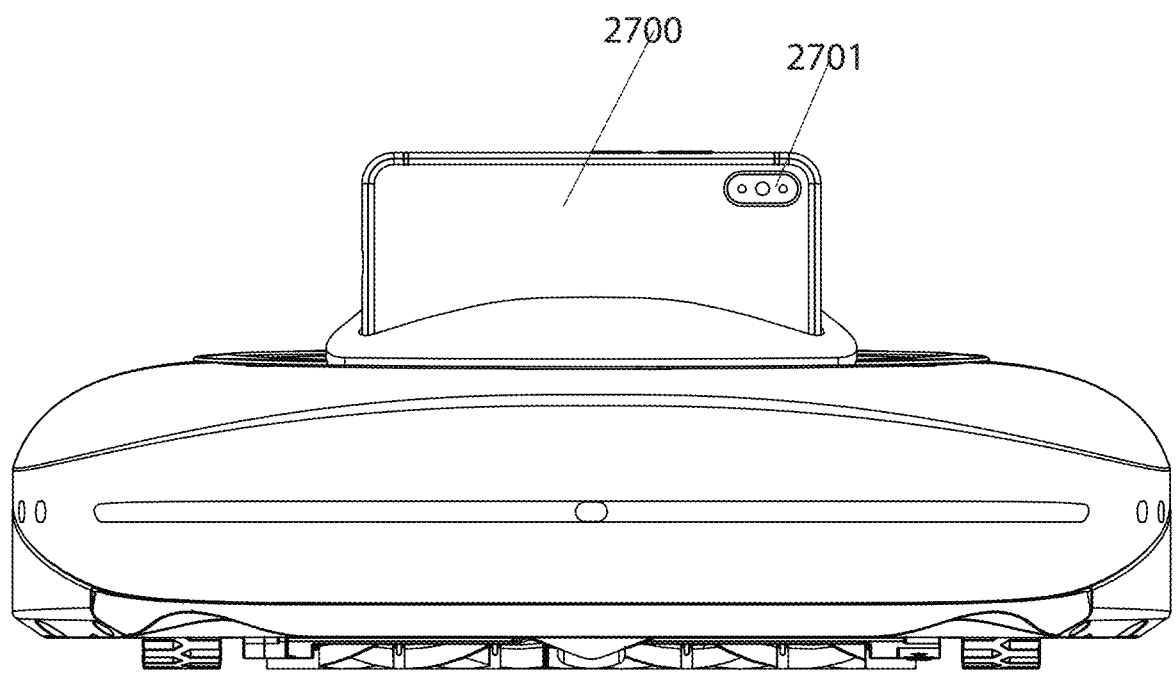
Figure 27D:
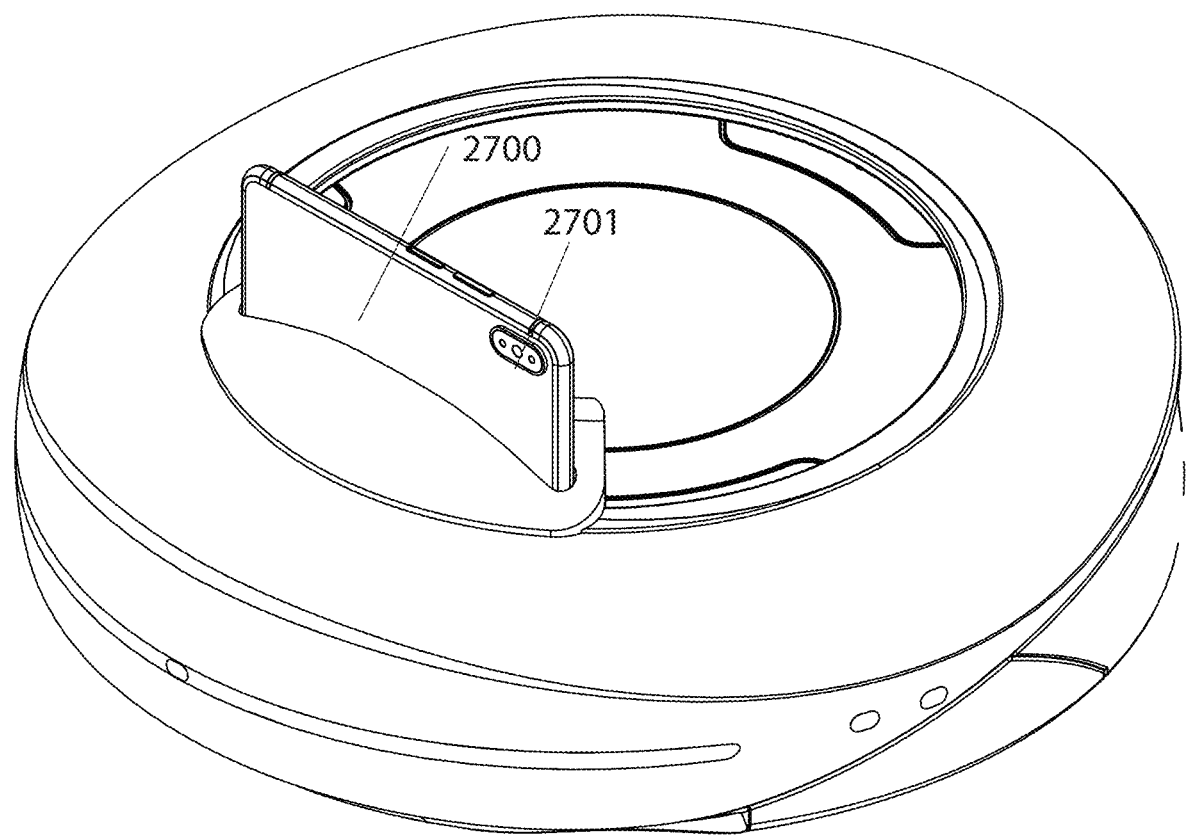

In some embodiments, the application of the communications device accesses the camera and inertial measurement unit (IMU) of the communication device to capture images (or a video) of the environment and movement of the communication device to create a map of the environment. In some embodiments, the operator moves around the environment while capturing images of the environment using the camera of the communication device. In other embodiments, the communication device is held by the modular robot and the camera captures images of the environment as the modular robot navigates around the environment. FIGS. 25A and 25B illustrate an example of a modular robot holding a communication device, in this case a mobile phone 2500 with camera 2501. In another example, FIGS. 26A and 26B illustrate two alternative examples of a robotic scrubber 2600 pivotally coupled to modular robot 2601 holding a communication device, in this case a tablet 2602 with a camera that is paired with the processor of modular robot 2601. Placing the tablet 2601 on the robotic scrubber 2600 provides better vision for navigation of the robot 2601 and towed robotic scrubber 2600, as the tablet 2602 is positioned higher. While various embodiments in the disclosure are described and illustrated using a modular robot, various other types of robot may implement the techniques and methods described throughout the entire disclosure. For example, FIGS. 27A and 27B illustrate a robotic surface cleaner holding a communication device 2700 with camera 2701. The robotic surface cleaner includes camera module 2702 that the processor of the robotic surface cleaner may use in combination with the camera 2701 of communication device 2700. In other instances, the processor of a robot may solely use the camera of a communication device. For example, FIGS. 27C and 27D illustrate the robotic surface cleaner holding the communication device 2700 with camera 2701, and in this case, the robotic surface cleaner does not include a camera module as in FIG. 27A. In some embodiments, the processor of the communication device uses the images to create a map of the environment while in other embodiments, the application of the communication device transmits the images to the modular robot and the processor generates the map of the environment. In some embodiments, a portion of the map is generated by the processor of the communication device and the processor of the modular robot. In some embodiments, the images are transmitted to another external computing device and at least a portion of the map is generated by the processor of the external computing device. In some embodiments, the map (or multiple maps) and images used in generating the map may be shared between the application of the communication device and the processor of the modular robot (and any other processor that contributes to mapping). In some embodiments, the application of the communication device notifies the operator that the camera is moving too quickly by, for example, an audible alarm, physical vibration of the communication device, or a warning message displayed on the screen of the communication device. In some embodiments, the camera captures images while moving the camera back and forth across the room in straight lines, such as in a boustrophedon pattern. In some embodiments, the camera captures images while rotating the camera 360 degrees. In some embodiments, the environment is captured in a continuous stream of images taken by the camera as it moves around the environment or rotates in one or more positions.

In some embodiments, the camera captures objects within a first field of view. In some embodiments, the image captured is a depth image, the depth image being any image containing data which may be related to the distance from the camera to objects captured in the image (e.g., pixel brightness, intensity, and color, time for light to reflect and return back to sensor, depth vector, etc.). In some embodiments, the camera rotates to observe a second field of view partly overlapping the first field of view and captures a depth image of objects within the second field of view (e.g., differing from the first field of view due to a difference in camera pose). In some embodiments, the processor compares the readings for the second field of view to those of the first field of view and identifies an area of overlap when a number of consecutive readings from the first and second fields of view are similar. The area of overlap between two consecutive fields of view correlates with the angular movement of the camera (relative to a static frame of reference of a room, for example) from one field of view to the next field of view. By ensuring the frame rate of the camera is fast enough to capture more than one frame of readings in the time it takes the camera to rotate the width of the frame, there is always overlap between the readings taken within two consecutive fields of view. The amount of overlap between frames may vary depending on the angular (and in some cases, linear) displacement of the camera, where a larger area of overlap is expected to provide data by which some of the present techniques generate a more accurate segment of the map relative to operations on data with less overlap. In some embodiments, wherein the modular robot is holding the communication device, the processor infers the angular disposition of the modular robot from the size of the area of overlap and uses the angular disposition to adjust odometer information to overcome the inherent noise of an odometer. Further, in some embodiments, it is not necessary that the value of overlapping readings from the first and second fields of view be the exact same for the area of overlap to be identified. It is expected that readings will be affected by noise, resolution of the equipment taking the readings, and other inaccuracies inherent to measurement devices. Similarities in the value of readings from the first and second fields of view can be identified when the values of the readings are within a tolerance range of one another. The area of overlap may also be identified by the processor by recognizing matching patterns among the readings from the first and second fields of view, such as a pattern of increasing and decreasing values. Once an area of overlap is identified, in some embodiments, the processor uses the area of overlap as the attachment point and attaches the two fields of view to form a larger field of view. Since the overlapping readings from the first and second fields of view within the area of overlap do not necessarily have the exact same values and a range of tolerance between their values is allowed, the processor uses the overlapping readings from the first and second fields of view to calculate new readings for the overlapping area using a moving average or another suitable mathematical convolution. This is expected to improve the accuracy of the readings as they are calculated from the combination of two separate sets of readings. The processor uses the newly calculated readings as the readings for the overlapping area, substituting for the readings from the first and second fields of view within the area of overlap. In some embodiments, the processor uses the new readings as ground truth values to adjust all other readings outside the overlapping area. Once all readings are adjusted, a first segment of the map is complete. In other embodiments, combining readings of two fields of view may include transforming readings with different origins into a shared coordinate system with a shared origin, e.g., based on an amount of translation or rotation of the camera between frames. The transformation may be performed before, during, or after combining. The method of using the camera to capture readings within consecutively overlapping fields of view and the processor to identify the area of overlap and combine readings at identified areas of overlap is repeated, e.g., until at least a portion of the environment is discovered and a map is constructed. Additional mapping methods that may be used by the processor to generate a map of the environment are described in U.S. patent application Ser. Nos. 16/048,179, 16/048,185, 16/163,541, 16/163,562, 16/163,508, and 16/185,000, the entire contents of which are hereby incorporated by reference.

In some embodiments, the processor identifies (e.g., determines) an area of overlap between two fields of view when (e.g., during evaluation a plurality of candidate overlaps) a number of consecutive (e.g., adjacent in pixel space) readings from the first and second fields of view are equal or close in value. Although the value of overlapping readings from the first and second fields of view may not be exactly the same, readings with similar values, to within a tolerance range of one another, can be identified (e.g., determined to correspond based on similarity of the values). Furthermore, identifying matching patterns in the value of readings captured within the first and second fields of view may also be used in identifying the area of overlap. For example, a sudden increase then decrease in the readings values observed in both depth images may be used to identify the area of overlap. Other patterns, such as increasing values followed by constant values or constant values followed by decreasing values or any other pattern in the values of the readings, can also be used to estimate the area of overlap. A Jacobian and Hessian matrix can be used to identify such similarities. In some embodiments, thresholding may be used in identifying the area of overlap wherein areas or objects of interest within an image may be identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. In some embodiments, a metric, such as the Szymkiewicz-Simpson coefficient, can be used to indicate how good of an overlap there is between the two sets of readings. Or some embodiments may determine an overlap with a convolution. Some embodiments may implement a kernel function that determines an aggregate measure of differences (e.g., a root mean square value) between some or all of a collection of adjacent readings in one image relative to a portion of the other image to which the kernel function is applied. Some embodiments may then determine the convolution of this kernel function over the other image, e.g., in some cases with a stride of greater than one pixel value. Some embodiments may then select a minimum value of the convolution as an area of identified overlap that aligns the portion of the image from which the kernel function was formed with the image to which the convolution was applied. In some embodiments, the processor determines the area of overlap based on translation and rotation of the camera between consecutive frames measured by an IMU. In some embodiments, the translation and rotation of the camera between frames is measured by two separate movement measurement devices (e.g., optical encoder and gyroscope of the modular robot, in the case where the robot is holding the camera or the camera of the robot is used) and the movement of the robot is the average of the measurements from the two separate devices. In some embodiments, the data from one movement measurement device is the movement data used and the data from the second movement measurement device is used to confirm the data of the first movement measurement device. In some embodiments, the processor uses movement of the camera between consecutive frames to validate the area of overlap identified between readings. Or, in some embodiments, comparison between the values of readings is used to validate the area of overlap determined based on measured movement of the camera between consecutive frames.

Figure 28A:
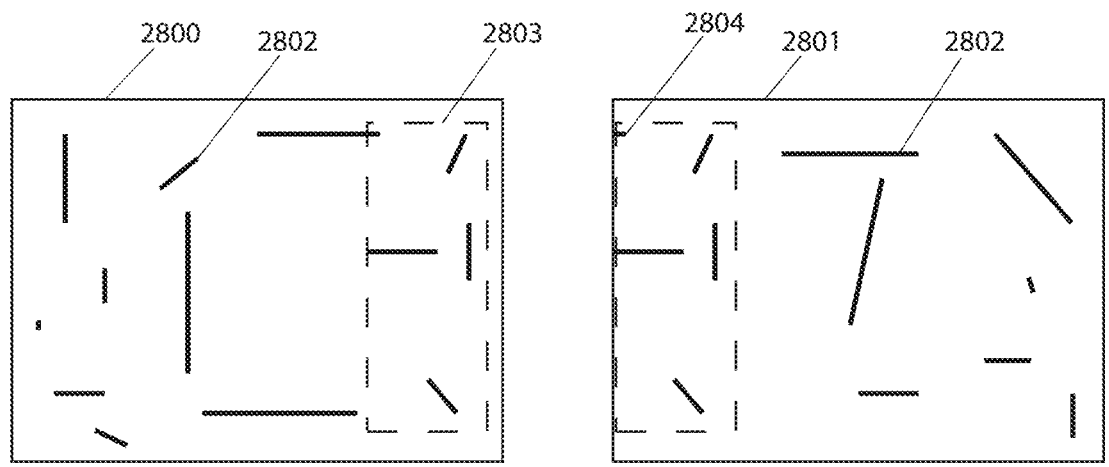
FIGS. 28A-28C illustrate how an overlapping area is detected in some embodiments using raw pixel intensity data and the combination of data at overlapping points.
Figure 28B:
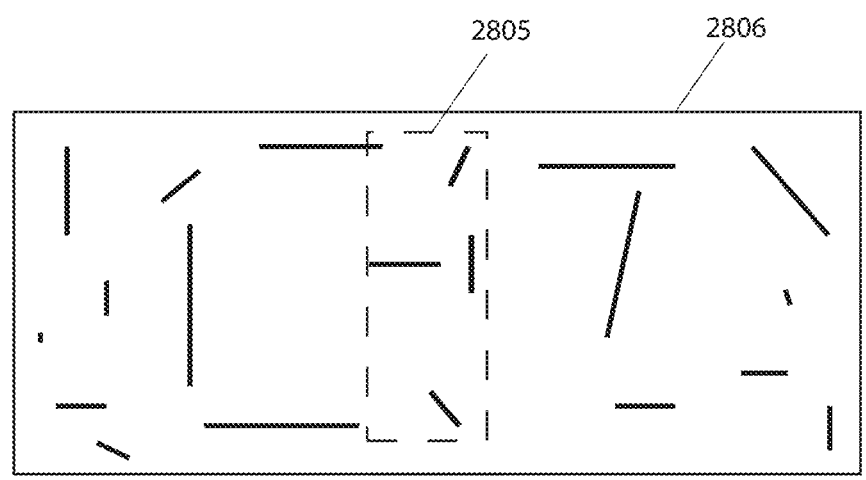
Figure 28C:
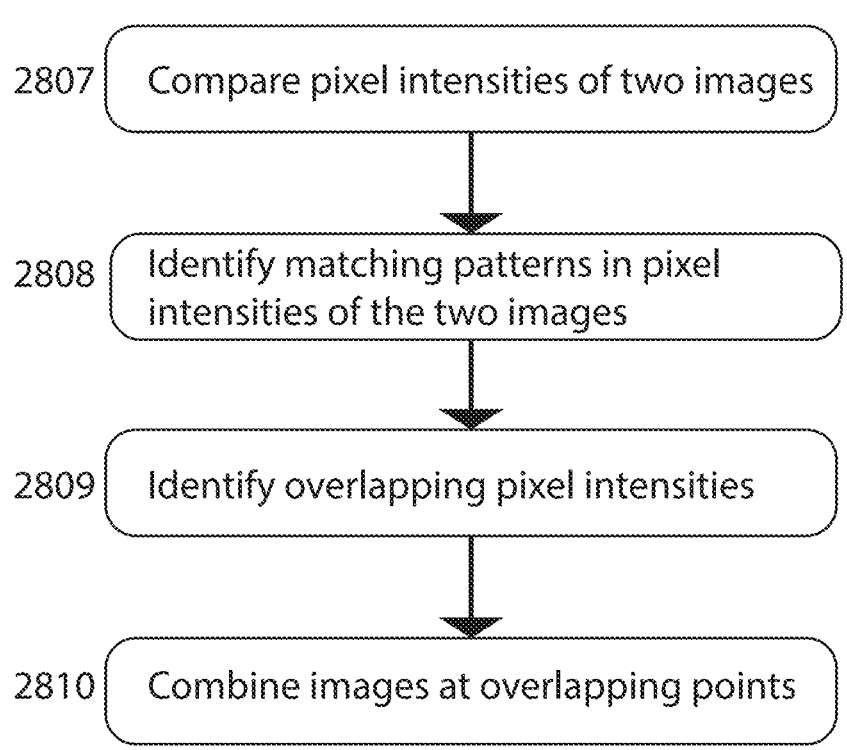

FIGS. 28A and 28B illustrate an example of identifying an area of overlap using raw pixel intensity data and the combination of data at overlapping points. In FIG. 28A, the overlapping area between overlapping image 2800 captured in a first field of view and image 2801 captured in a second field of view may be determined by comparing pixel intensity values of each captured image (or transformation thereof, such as the output of a pipeline that includes normalizing pixel intensities, applying Gaussian blur to reduce the effect of noise, detecting edges in the blurred output (such as Canny or Haar edge detection), and thresholding the output of edge detection algorithms to produce a bitmap like that shown) and identifying matching patterns in the pixel intensity values of the two images, for instance by executing the above-described operations by which some embodiments determine an overlap with a convolution. Lines 2802 represent pixels with high pixel intensity value (such as those above a certain threshold) in each image. Area 2803 of image 2800 and area 2804 of image 2801 capture the same area of the environment and, as such, the same pattern for pixel intensity values is sensed in area 2803 of image 2800 and area 2804 of image 2801. After identifying matching patterns in pixel intensity values in image 2800 and 2801, an overlapping area between both images may be determined. In FIG. 28B, the images are combined at overlapping area 2805 to form a larger image 2806 of the environment. In some cases, data corresponding to the images may be combined. For instance, depth values may be aligned based on alignment determined with the image. FIG. 28C illustrates a flowchart describing the process illustrated in FIGS. 28A and 28B wherein a processor of a robot at first stage 2807 compares pixel intensities of two images captured by a sensor of the robot, at second stage 2808 identifies matching patterns in pixel intensities of the two images, at third stage 2809 identifies overlapping pixel intensities of the two images, and at fourth stage 2810 combines the two images at overlapping points.

Figure 29A:
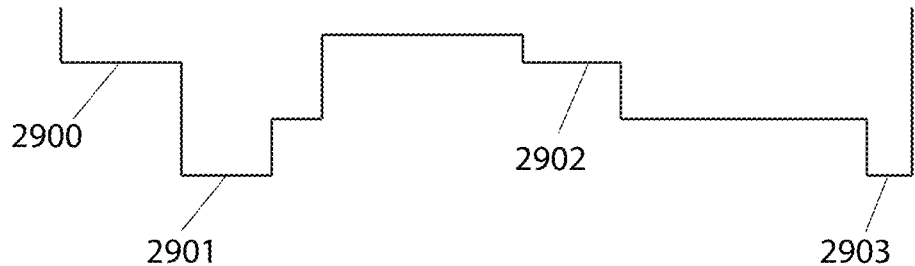
FIGS. 29A-29C illustrate how an overlapping area is detected in some embodiments using raw pixel intensity data and the combination of data at overlapping points.
Figure 29B:
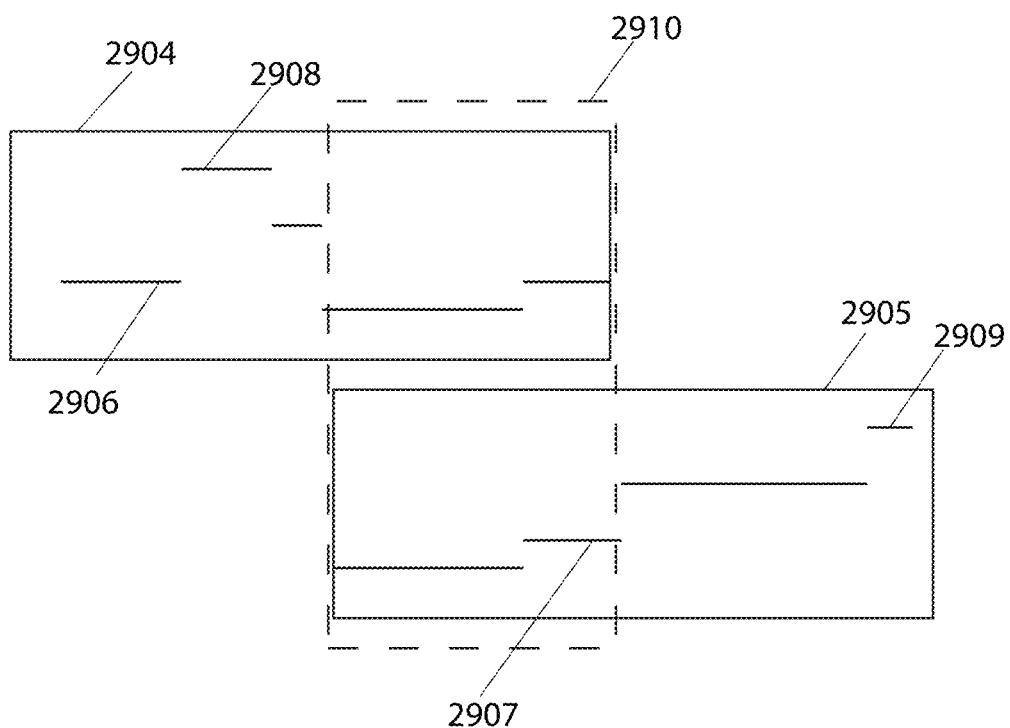
Figure 29C:
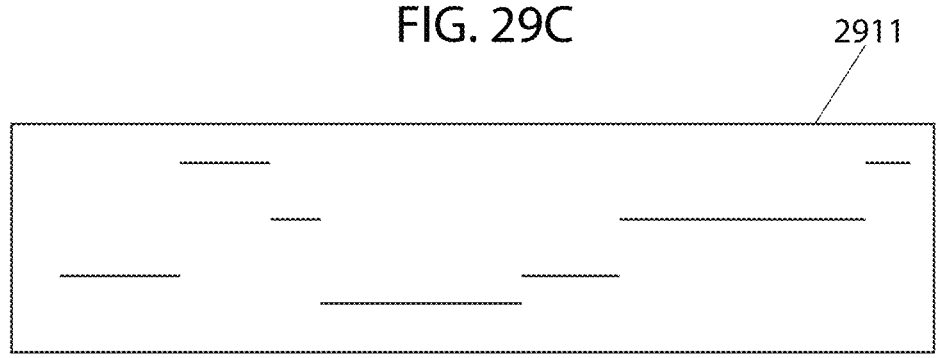

FIGS. 29A-29C illustrate another example of identifying an area of overlap using raw pixel intensity data and the combination of data at overlapping points. FIG. 29A illustrates a top (plan) view of an object, such as a wall, with uneven surfaces wherein, for example, surface 2900 is further away from an observer than surface 2901 or surface 2902 is further away from an observer than surface 2903. In some embodiments, at least one infrared line laser positioned at a downward angle relative to a horizontal plane coupled with at least one image sensor may be used to determine the depth of multiple points across the uneven surfaces from captured images of the line laser projected onto the uneven surfaces of the object. Since the line laser is positioned at a downward angle, the position of the line laser in the captured image will appear higher for closer surfaces and will appear lower for further surfaces. Similar approaches may be applied with lasers offset from an image sensor in the horizontal plane. The position of the laser line (or feature of a structured light pattern) in the image may be detected by finding pixels with intensity above a threshold. The position of the line laser in the captured image may be related to a distance from the surface upon which the line laser is projected. In FIG. 29B, captured images 2904 and 2905 of the laser line projected onto the object surface for two different fields of view are shown. Projected laser lines with lower position, such as laser lines 2906 and 2907 in images 2904 and 2905 respectively, correspond to object surfaces 2900 and 2902, respectively, further away from the infrared illuminator and image sensor. Projected laser lines with higher position, such as laser lines 2908 and 2909 in images 2904 and 2905 respectively, correspond to object surfaces 2901 and 2903, respectively, closer to the infrared illuminator and image sensor. Captured images 2904 and 2905 from two different fields of view may be combined into a larger image of the environment by finding an overlapping area between the two images and stitching them together at overlapping points. The overlapping area may be found by identifying similar arrangement of pixel intensities in both images, wherein pixels with high intensity may be the laser line. For example, areas of images 2904 and 2905 bound within dashed lines 2910 have similar arrangement of pixel intensities as both images captured a same portion of the object within their field of view. Therefore, images 2904 and 2905 may be combined at overlapping points to construct larger image 2911 of the environment shown in FIG. 29C. The position of the laser lines in image 2911, indicated by pixels with intensity value above a threshold intensity, may be used to infer depth of surfaces of objects from the infrared illuminator and image sensor (see, U.S. patent application Ser. No. 15/674,310, the entire contents of which is hereby incorporated by reference).

In some embodiments, the application of the communication device notifies the operator or processor of the robot if a gap in the map exists. In some embodiments, the camera is navigated to the area in which the gap exists for further exploration, capturing new images while exploring. New data is captured by the camera and combined with the existing map at overlapping points until the gap in the map no longer exists. In some embodiments, the processor identifies the gap in the map and navigates the camera to the area in which the gap exists.

Due to measurement noise, discrepancies between the value of readings within the area of overlap from the first field of view and the second field of view may exist and the values of the overlapping readings may not be the exact same. In such cases, new readings may be calculated, or some of the readings may be selected as more accurate than others. For example, the overlapping readings from the first field of view and the second field of view (or more fields of view where more images overlap, like more than three, more than five, or more than 10) may be combined using a moving average (or some other measure of central tendency may be applied, like a median or mode) and adopted as the new readings for the area of overlap. The minimum sum of errors may also be used to adjust and calculate new readings for the overlapping area to compensate for the lack of precision between overlapping readings perceived within the first and second fields of view. By way of further example, the minimum mean squared error may be used to provide a more precise estimate of readings within the overlapping area. Other mathematical methods may also be used to further process the readings within the area of overlap, such as split and merge algorithm, incremental algorithm, Hough Transform, line regression, Random Sample Consensus, Expectation-Maximization algorithm, or curve fitting, for example, to estimate more realistic readings given the overlapping readings perceived within the first and second fields of view. The calculated readings are used as the new readings for the overlapping area. In another embodiment, the k-nearest neighbors algorithm can be used where each new reading is calculated as the average of the values of its k-nearest neighbors. Some embodiments may implement DB-SCAN on readings and related values like pixel intensity, e.g., in a vector space that includes both depths and pixel intensities corresponding to those depths, to determine a plurality of clusters, each corresponding to readings of the same feature of an object. In some embodiments, a first set of readings is fixed and used as a reference while the second set of readings, overlapping with the first set of readings, is transformed to match the fixed reference. In some embodiments, the processor expands the area of overlap to include a number of readings immediately before and after (or spatially adjacent) readings within the identified area of overlap.

In some embodiments, the modular robot uses readings from its sensors to generate at least a portion of the map of the environment using the techniques described above (e.g., stitching readings together at overlapping points). In some embodiments, readings from other external sensors (e.g., closed circuit television) are used to generate at least a portion of the map. In some embodiments, a depth perceiving device is used to measure depth to objects in the environment and depth readings are used to generate a map of the environment. Depending on the type of depth perceiving device used, depth may be perceived in various forms. The depth perceiving device may be a depth sensor, a camera, a camera coupled with IR illuminator, a stereo-vision camera, a depth camera, a time-of-flight camera or any other device which can infer depths from captured depth images. For example, in one embodiment the depth perceiving device may capture depth images containing depth vectors to objects, from which the processor can calculate the Euclidean norm of each vector, representing the depth from the camera to objects within the field of view of the camera. In some instances, depth vectors originate at the depth perceiving device and are measured in a two-dimensional plane coinciding with the line of sight of the depth perceiving device. In other instances, a field of three-dimensional vectors originating at the depth perceiving device and arrayed over objects in the environment are measured. In another example, the depth perceiving device infers depth of an object based on the time required for a light (e.g., broadcast by a depth-sensing time-of-flight camera) to reflect off of the object and return. In a further example, depth to objects may be inferred using the quality of pixels, such as brightness, intensity, and color, in captured images of the objects, and in some cases, parallax and scaling differences between images captured at different camera poses For example, a depth perceiving device may include a laser light emitter disposed on a baseplate emitting a collimated laser beam creating a projected light point on surfaces substantially opposite the emitter, two image sensors disposed on the baseplate, positioned at a slight inward angle towards to the laser light emitter such that the fields of view of the two image sensors overlap and capture the projected light point within a predetermined range of distances, the image sensors simultaneously and iteratively capturing images, and an image processor overlaying the images taken by the two image sensors to produce a superimposed image showing the light points from both images in a single image, extracting a distance between the light points in the superimposed image, and, comparing the distance to figures in a preconfigured table that relates distances between light points with distances between the baseplate and surfaces upon which the light point is projected (which may be referred to as 'projection surfaces' herein) to find an estimated distance between the baseplate and the projection surface at the time the images of the projected light point were captured. In some embodiments, the preconfigured table may be constructed from actual measurements of distances between the light points in superimposed images at increments in a predetermined range of distances between the baseplate and the projection surface.

Figure 30A:
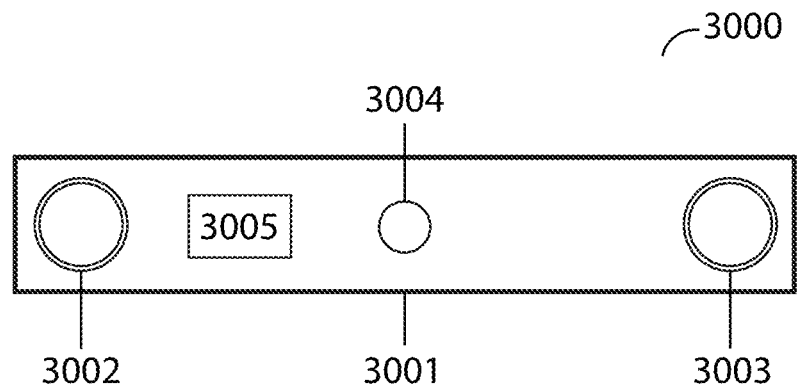
FIGS. 30A and 30B illustrates an example of a depth perceiving device, according to some embodiments.
Figure 30B:
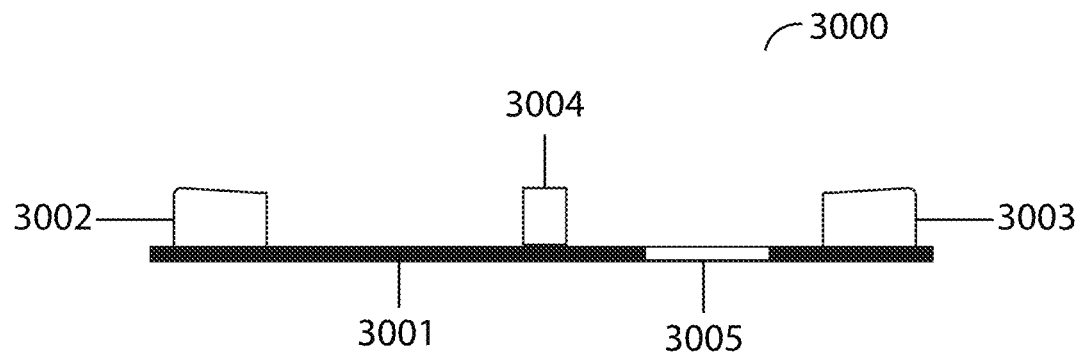
Figure 31:
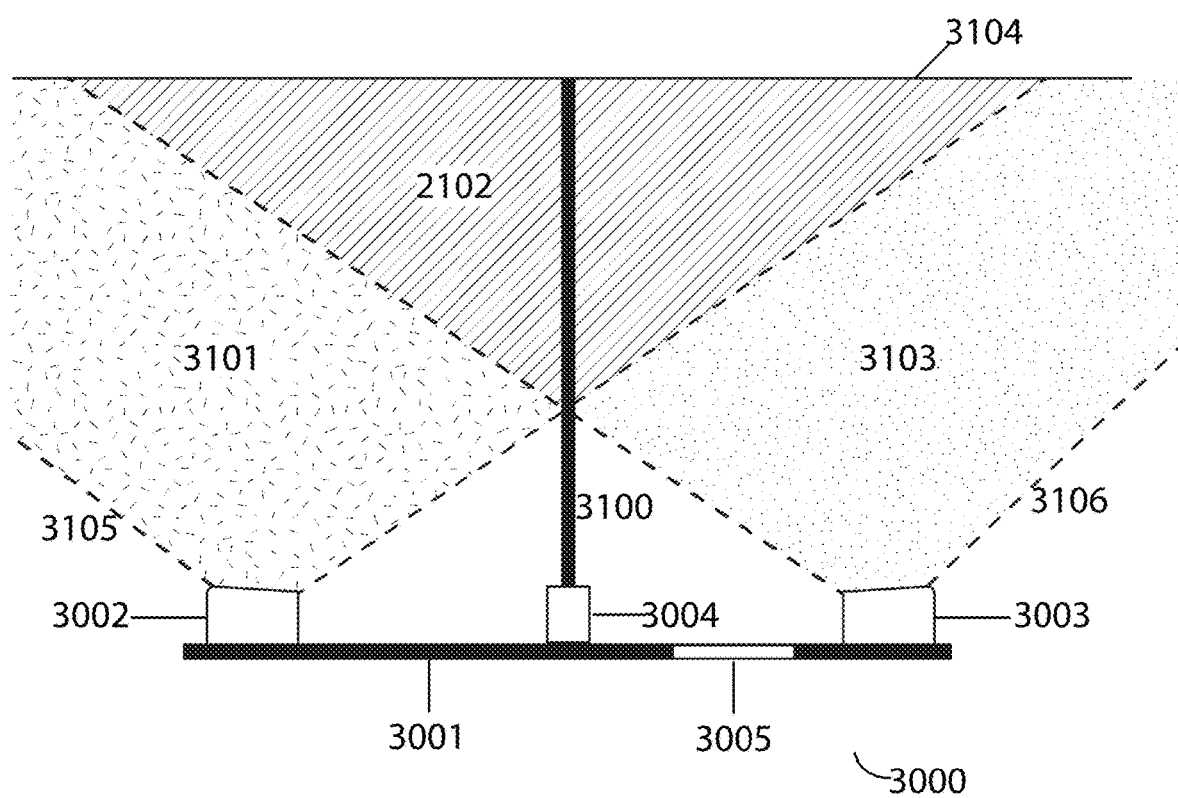
FIG. 31 illustrates an overhead view of an example of a depth perceiving device and fields of view of its image sensors, according to some embodiments.

FIGS. 30A and 30B illustrates a front elevation and top plan view of an embodiment of the depth perceiving device 3000 including baseplate 3001, left image sensor 3002, right image sensor 3003, laser light emitter 3004, and image processor 3005. The image sensors are positioned with a slight inward angle with respect to the laser light emitter. This angle causes the fields of view of the image sensors to overlap. The positioning of the image sensors is also such that the fields of view of both image sensors will capture laser projections of the laser light emitter within a predetermined range of distances. FIG. 31 illustrates an overhead view of depth perceiving device 3000 including baseplate 3001, image sensors 3002 and 3003, laser light emitter 3004, and image processor 3005. Laser light emitter 3004 is disposed on baseplate 3001 and emits collimated laser light beam 3100. Image processor 3005 is located within baseplate 3001. Area 3101 and 3102 together represent the field of view of image sensor 3002. Dashed line 3105 represents the outer limit of the field of view of image sensor 3002 (it should be noted that this outer limit would continue on linearly, but has been cropped to fit on the drawing page). Area 3103 and 3102 together represent the field of view of image sensor 3003. Dashed line 3106 represents the outer limit of the field of view of image sensor 3003 (it should be noted that this outer limit would continue on linearly, but has been cropped to fit on the drawing page). Area 3102 is the area where the fields of view of both image sensors overlap. Line 3104 represents the projection surface. That is, the surface onto which the laser light beam is projected.

In some embodiments, each image taken by the two image sensors shows the field of view including the light point created by the collimated laser beam. At each discrete time interval, the image pairs are overlaid creating a superimposed image showing the light point as it is viewed by each image sensor. Because the image sensors are at different locations, the light point will appear at a different spot within the image frame in the two images. Thus, when the images are overlaid, the resulting superimposed image will show two light points until such a time as the light points coincide. The distance between the light points is extracted by the image processor using computer vision technology, or any other type of technology known in the art. This distance is then compared to figures in a preconfigured table that relates distances between light points with distances between the baseplate and projection surfaces to find an estimated distance between the baseplate and the projection surface at the time that the images were captured. As the distance to the surface decreases the distance measured between the light point captured in each image when the images are superimposed decreases as well. In some embodiments, the emitted laser point captured in an image is detected by the image processor by identifying pixels with high brightness, as the area on which the laser light is emitted has increased brightness. After superimposing both images, the distance between the pixels with high brightness, corresponding to the emitted laser point captured in each image, is determined.

Figure 32A:
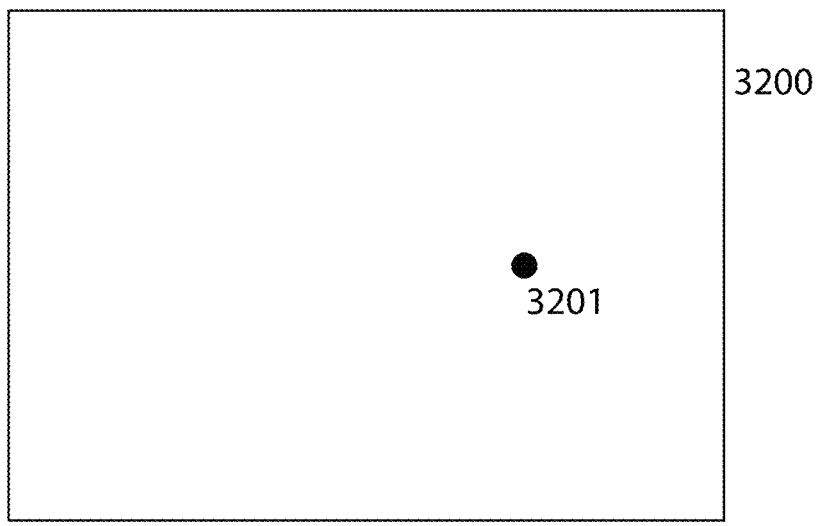
FIGS. 32A-32C illustrate an example of distance estimation using a variation of a depth perceiving device, according to some embodiments.
Figure 32B:
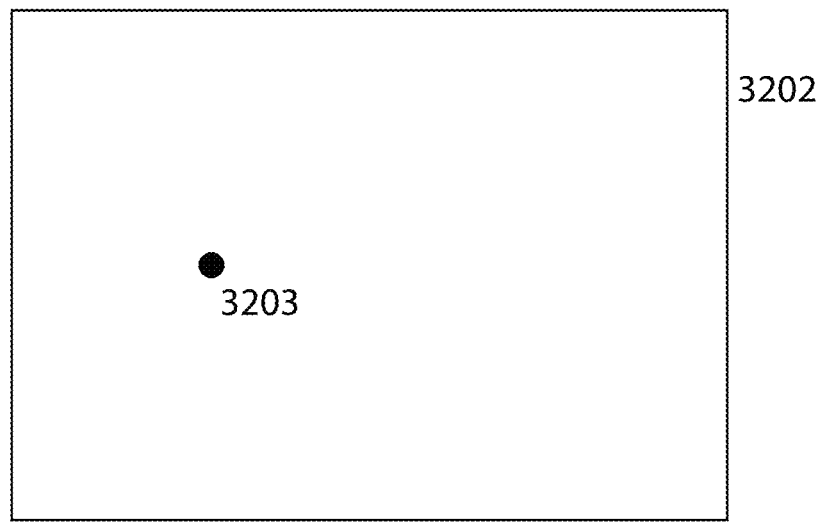
Figure 32C:
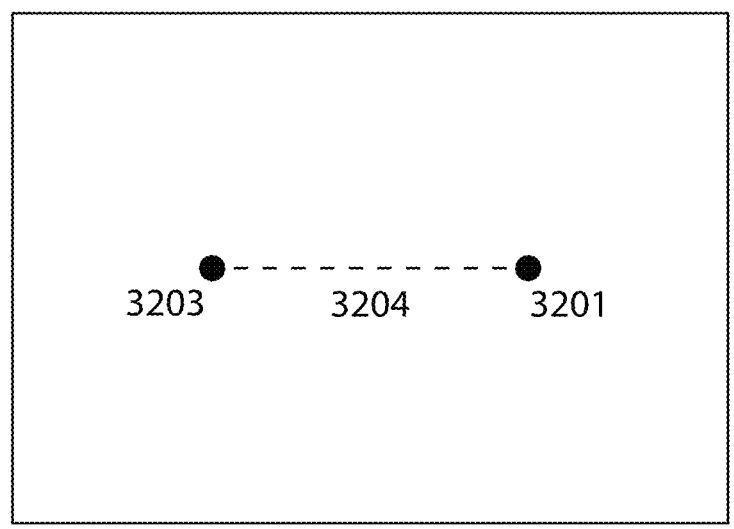

FIG. 32A illustrates an embodiment of the image captured by left image sensor 3002. Rectangle 3200 represents the field of view of image sensor 3002. Point 3201 represents the light point projected by laser beam emitter 3004 as viewed by image sensor 3002. FIG. 32B illustrates an embodiment of the image captured by right image sensor 3003. Rectangle 3202 represents the field of view of image sensor 3003. Point 3203 represents the light point projected by laser beam emitter 3004 as viewed by image sensor 3002. As the distance of the baseplate to projection surfaces increases, light points 3201 and 3203 in each field of view will appear further and further toward the outer limits of each field of view, shown respectively in FIG. 31 as dashed lines 3105 and 3106. Thus, when two images captured at the same time are overlaid, the distance between the two points will increase as distance to the projection surface increases. FIG. 32C illustrates the two images of FIG. 32A and FIG. 32B overlaid. Point 3201 is located a distance 3204 from point 3203, the distance extracted by the image processor 3005. The distance 3204 is then compared to figures in a preconfigured table that co-relates distances between light points in the superimposed image with distances between the baseplate and projection surfaces to find an estimate of the actual distance from the baseplate to the projection surface upon which the laser light was projected.

In some embodiments, the two image sensors are aimed directly forward without being angled towards or away from the laser light emitter. When image sensors are aimed directly forward without any angle, the range of distances for which the two fields of view may capture the projected laser point is reduced. In these cases, the minimum distance that may be measured is increased, reducing the range of distances that may be measured. In contrast, when image sensors are angled inwards towards the laser light emitter, the projected light point may be captured by both image sensors at smaller distances from the obstacle.

In some embodiments, the image sensors may be positioned at an angle such that the light point captured in each image coincides at or before the maximum effective distance of the distance sensor, which is determined by the strength and type of the laser emitter and the specifications of the image sensor used.

In some embodiments, the depth perceiving device further includes a plate positioned in front of the laser light emitter with two slits through which the emitted light may pass. In some instances, the two image sensors may be positioned on either side of the laser light emitter pointed directly forward or may be positioned at an inwards angle towards one another to have a smaller minimum distance to the object that may be measured. The two slits through which the light may pass results in a pattern of spaced rectangles. In some embodiments, the images captured by each image sensor may be superimposed and the distance between the rectangles captured in the two images may be used to estimate the distance to the projection surface using a preconfigured table relating distance between rectangles to distance from the surface upon which the rectangles are projected. The preconfigured table may be constructed by measuring the distance between rectangles captured in each image when superimposed at incremental distances from the surface upon which they are projected for a range of distances.

In some instances, a line laser is used in place of a point laser. In such instances, the images taken by each image sensor are superimposed and the distance between coinciding points along the length of the projected line in each image may be used to determine the distance from the surface using a preconfigured table relating the distance between points in the superimposed image to distance from the surface. In some embodiments, the depth perceiving device further includes a lens positioned in front of the laser light emitter that projects a horizontal laser line at an angle with respect to the line of emission of the laser light emitter. The images taken by each image sensor may be superimposed and the distance between coinciding points along the length of the projected line in each image may be used to determine the distance from the surface using a preconfigured table as described above. The position of the projected laser line relative to the top or bottom edge of the captured image may also be used to estimate the distance to the surface upon which the laser light is projected, with lines positioned higher relative to the bottom edge indicating a closer distance to the surface. In some embodiments, the position of the laser line may be compared to a preconfigured table relating the position of the laser line to distance from the surface upon which the light is projected. In some embodiments, both the distance between coinciding points in the superimposed image and the position of the line are used in combination for estimating the distance to the projection surface. In combining more than one method, the accuracy, range, and resolution may be improved.

FIG. 33A illustrates an embodiment of a side view of a depth perceiving device including a laser light emitter and lens 3300, image sensors 3301, and image processor (not shown). The lens is used to project a horizontal laser line at a downwards angle 3302 with respect to line of emission of laser light emitter 3303 onto object surface 3304 located a distance 3305 from the depth perceiving device. The projected horizontal laser line appears at a height 3306 from the bottom surface. As shown, the projected horizontal line appears at a height 3307 on object surface 3308, at a closer distance 3309 to laser light emitter 3300, as compared to object 3304 located a further distance away. Accordingly, in some embodiments, in a captured image of the projected horizontal laser line, the position of the line from the bottom edge of the image would be higher for objects closer to the distance estimation system. Hence, the position of the project laser line relative to the bottom edge of a captured image may be related to the distance from the surface FIG. 33B illustrates a top view of the depth perceiving device including laser light emitter and lens 3300, image sensors 3301, and image processor 3310. Horizontal laser line 3311 is projected onto object surface 3306 located a distance 3305 from the baseplate of the distance measuring system. FIG. 33C illustrates images of the projected laser line captured by image sensors 3301. The horizontal laser line captured in image 3312 by the left image sensor has endpoints 3313 and 3314 while the horizontal laser line captured in image 3315 by the right image sensor has endpoints 3316 and 3317. FIG. 33C illustrates images of the projected laser line captured by image sensors 3301. The horizontal laser line captured in image 3312 by the left image sensor has endpoints 3313 and 3314 while the horizontal laser line captured in image 3315 by the right image sensor has endpoints 3316 and 3317. FIG. 33C also illustrates the superimposed image 3318 of images 3312 and 3315. On the superimposed image, distances 3319 and 3320 between coinciding endpoints 3316 and 3313 and 3317 and 3314, respectively, along the length of the laser line captured by each camera may be used to estimate distance from the baseplate to the object surface. In some embodiments, more than two points along the length of the horizontal line may be used to estimate the distance to the surface. In some embodiments, the position of the horizontal line 3321 from the bottom edge of the image may be simultaneously used to estimate the distance to the object surface as described above. In some configurations, the laser emitter and lens may be positioned below the image sensors, with the horizontal laser line projected at an upwards angle with respect to the line of emission of the laser light emitter. In one embodiment, a horizontal line laser is used rather than a laser beam with added lens. Other variations in the configuration are similarly possible. For example, the image sensors may both be positioned to the right or left of the laser light emitter as opposed to either side of the light emitter as illustrated in the examples.

In some embodiments, noise, such as sunlight, may cause interference causing the image processor to incorrectly identify light other than the laser as the projected laser line in the captured image. The expected width of the laser line at a particular distance may be used to eliminate sunlight noise. A preconfigured table of laser line width corresponding to a range of distances may be constructed, the width of the laser line increasing as the distance to the obstacle upon which the laser light is projected decreases. In cases where the image processor detects more than one laser line in an image, the corresponding distance of both laser lines is determined. To establish which of the two is the true laser line, the image processor compares the width of both laser lines and compares them to the expected laser line width corresponding to the distance to the object determined based on position of the laser line. In some embodiments, any hypothesized laser line that does not have correct corresponding laser line width, to within a threshold, is discarded, leaving only the true laser line. In some embodiments, the laser line width may be determined by the width of pixels with high brightness. The width may be based on the average of multiple measurements along the length of the laser line.

In some embodiments, noise, such as sunlight, which may be misconstrued as the projected laser line, may be eliminated by detecting discontinuities in the brightness of pixels corresponding to the hypothesized laser line. For example, if there are two hypothesized laser lines detected in an image, the hypothesized laser line with discontinuity in pixel brightness, where for instance pixels 1 to 10 have high brightness, pixels 11-15 have significantly lower brightness and pixels 16-25 have high brightness, is eliminated as the laser line projected is continuous and, as such, large change in pixel brightness along the length of the line are unexpected. These methods for eliminating sunlight noise may be used independently, in combination with each other, or in combination with other methods during processing.

Figure 34:
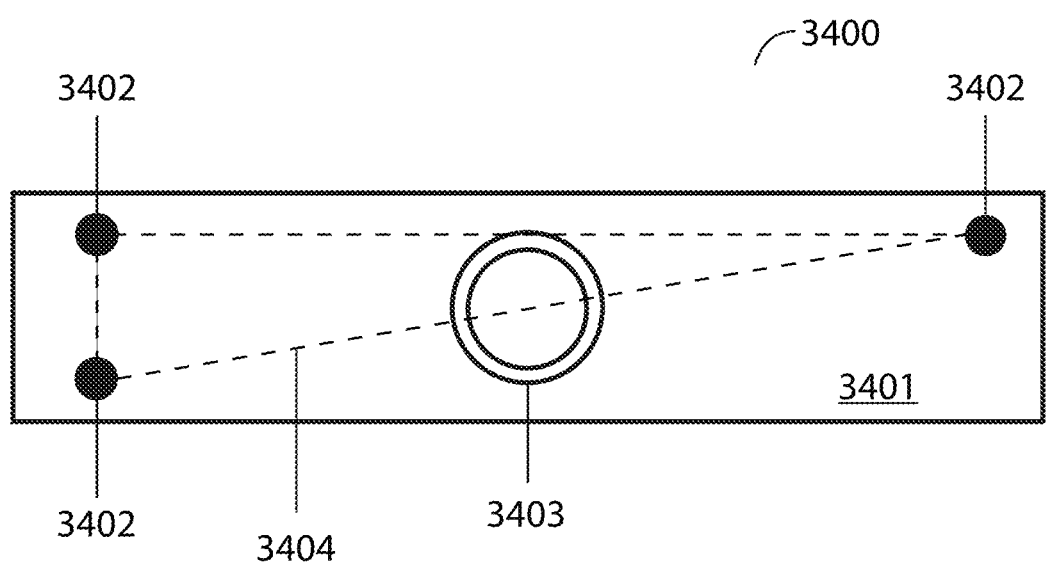
FIG. 34 illustrates an example of a depth perceiving device, according to some embodiments.
Figure 35:
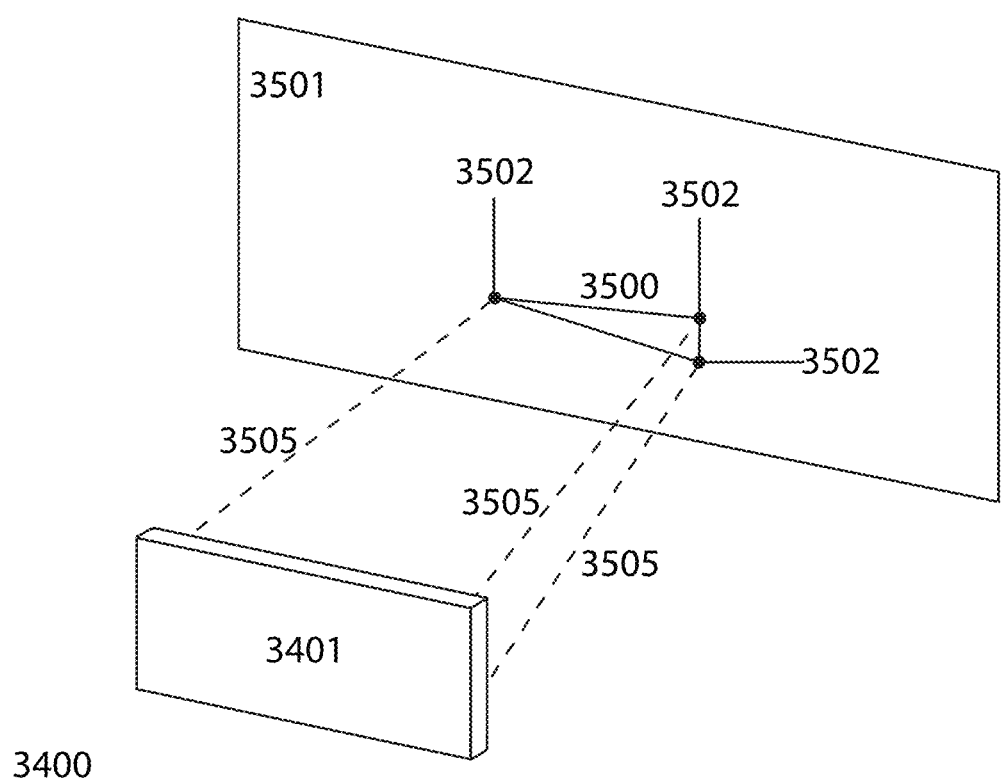
FIG. 35 illustrates a schematic view of a depth perceiving device and resulting triangle formed by connecting the light points illuminated by three laser light emitters, according to some embodiments.

In another example, a depth perceiving device includes an image sensor, an image processor, and at least two laser emitters positioned at an angle such that they converge. The laser emitters project light points onto an object, which is captured by the image sensor. The image processor may extract geometric measurements and compare the geometric measurement to a preconfigured table that relates the geometric measurements with depth to the object onto which the light points are projected. In cases where only two light emitters are used, they may be positioned on a planar line and for three or more laser emitters, the emitters are positioned at the vertices of a geometrical shape. For example, three emitters may be positioned at vertices of a triangle or four emitters at the vertices of a quadrilateral. This may be extended to any number of emitters. In these cases, emitters are angled such that they converge at a particular distance. For example, for two emitters, the distance between the two points may be used as the geometric measurement. For three of more emitters, the image processer measures the distance between the laser points (vertices of the polygon) in the captured image and calculates the area of the projected polygon. The distance between laser points and/or area may be used as the geometric measurement. The preconfigured table may be constructed from actual geometric measurements taken at incremental distances from the object onto which the light is projected within a specified range of distances. Regardless of the number of laser emitters used, they shall be positioned such that the emissions coincide at or before the maximum effective distance of the depth perceiving device, which is determined by the strength and type of laser emitters and the specifications of the image sensor used. Since the laser light emitters are angled toward one another such that they converge at some distance, the distance between projected laser points or the polygon area with projected laser points as vertices decrease as the distance from the surface onto which the light is projected increases. As the distance from the surface onto which the light is projected increases the collimated laser beams coincide and the distance between laser points or the area of the polygon becomes null. FIG. 34 illustrates a front elevation view of a depth perceiving device 3400 including a baseplate 3401 on which laser emitters 3402 and an image sensor 3403 are mounted. The laser emitters 3402 are positioned at the vertices of a polygon (or endpoints of a line, in cases of only two laser emitters). In this case, the laser emitters are positioned at the vertices of a triangle 3404. FIG. 35 illustrates the depth perceiving device 3400 projecting collimated laser beams 3505 of laser emitters 3402 (not shown) onto a surface 3501. The baseplate 3401 and laser emitters (not shown) are facing a surface 3501. The dotted lines 3505 represent the laser beams. The beams are projected onto surface 3501, creating the light points 3502, which, if connected by lines, form triangle 3500. The image sensor (not shown) captures an image of the projection and sends it to the image processing unit (not shown). The image processing unit extracts the triangle shape by connecting the vertices to form triangle 3500 using computer vision technology, finds the lengths of the sides of the triangle, and uses those lengths to calculate the area within the triangle. The image processor then consults a pre-configured area-to-distance table with the calculated area to find the corresponding distance.

Figure 36:
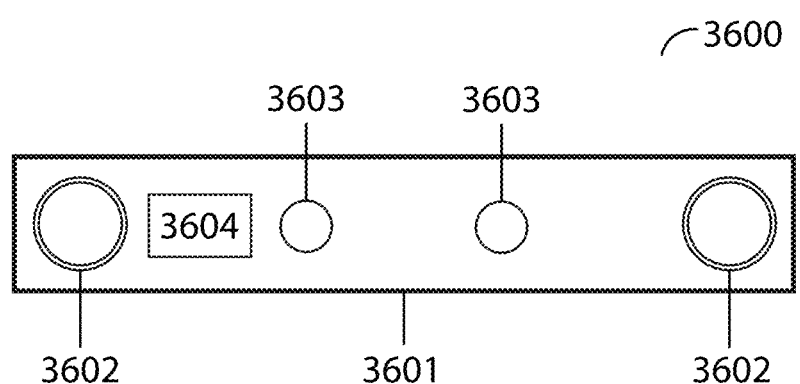
FIG. 36 illustrates an example of a depth perceiving device, according to some embodiments.
Figure 37:
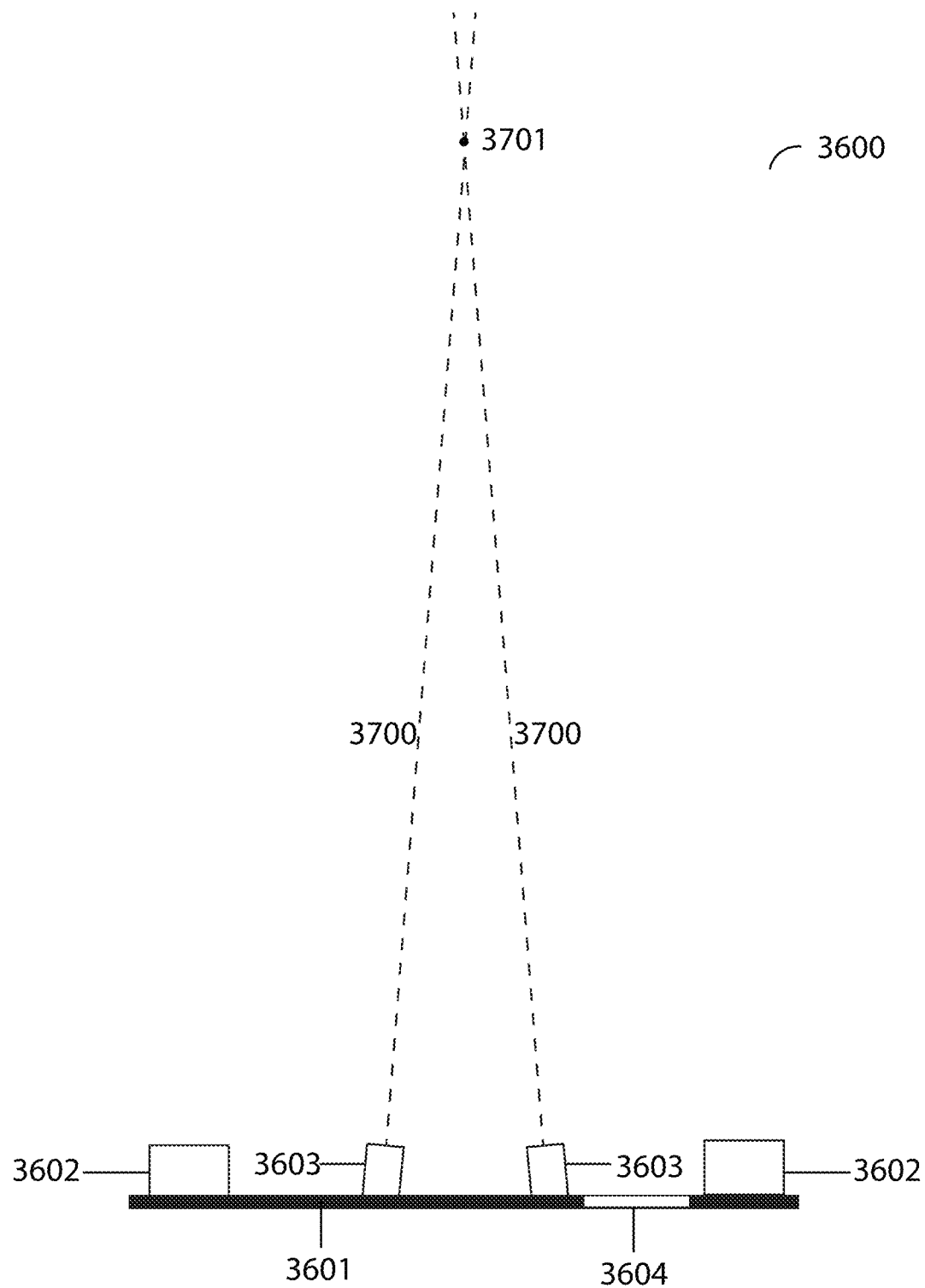
FIG. 37 illustrates an example of a depth perceiving device, according to some embodiments.

In some embodiments, a second image sensor is included to improve accuracy of the depth perceiving device. FIG. 36 illustrates a front elevation view of an example of a depth perceiving device 3600 including a baseplate 3601, image sensors 3602, laser light emitters 3603, and image processors 3604. The laser light emitters 3603 are positioned with a slight inward angle toward each other, with the point of convergence being a predetermined distance from the baseplate. The one or more image sensors shall be positioned such that the fields of view thereof will capture laser projections of the laser light emitters within a predetermined range of distances. FIG. 37 illustrates an overhead view of the depth perceiving device. Laser light emitters 3603 are disposed on baseplate 3601 and emit collimated laser light beams 3700, which converge at point 3701. Image sensors 3602 are located on either side of the laser light emitters. Image processor 3604 is located within baseplate 3601. In some embodiments, the maximum effective distance of the depth perceiving device is at the point where the laser beams coincide. In other embodiments, using different wavelengths in each laser light emitter will allow the image processor to recognize the distances between the light points after the point of convergence as being further from the baseplate than the identical distances between the light points that will occur before the point of convergence. In distances beyond point 201, the laser beam from the right-most laser emitter will appear on the left side, and the laser beam from the left-most laser emitter will appear on the right side. Upon identifying the switch in locations of the laser beams, the image processor will determine that the extracted distance is occurring after the point of convergence.

Figure 38:
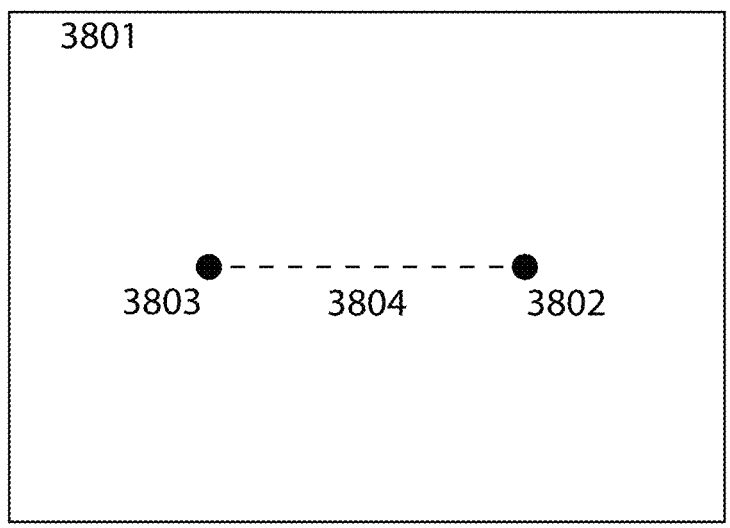
FIG. 38 illustrates an image captured by an image sensor, according to some embodiments.

In some embodiments, the one or more image sensors simultaneously and iteratively capture images at discrete time intervals. FIG. 38 illustrates an image 3800 captured by image sensor 3602. Rectangle 3801 represents the field of view of image sensor 3602. Points 3802 and 3803 represent the light points projected by the laser light emitters 3603. As the distance of the baseplate to projection surfaces increases, the light points 3802, 3803 will appear closer and closer together until the distance between them is null, after which point the light points will diverge from each other. Thus, the distance 3804 between the two points may be analyzed to determine the distance to the projection surface at the time that an image is captured. The image 3801 is sent to the image processor, which extracts the distance 3804 between the two points (if any). The distance 3804 is then compared to figures in a preconfigured table that co-relates distances between light points in the system with distances between the baseplate and projection surfaces to find an estimate of the actual distance from the baseplate to the projection surface at the time the image of the laser light projections was captured. In some embodiments, the process of capturing an image, sending it to an image processor, and extracting the distance between the light points is performed simultaneously using a second image sensor, and the data extracted from images from the first image sensor is combined with the data extracted from the second image sensor to obtain a more accurate aggregate reading before consulting the preconfigured table.

Figure 39A:
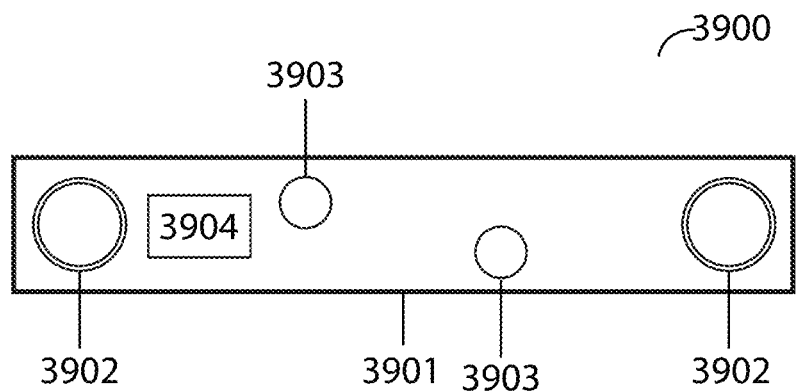
FIGS. 39A and 39B illustrate an example of a depth perceiving device, according to some embodiments.
Figure 39B:
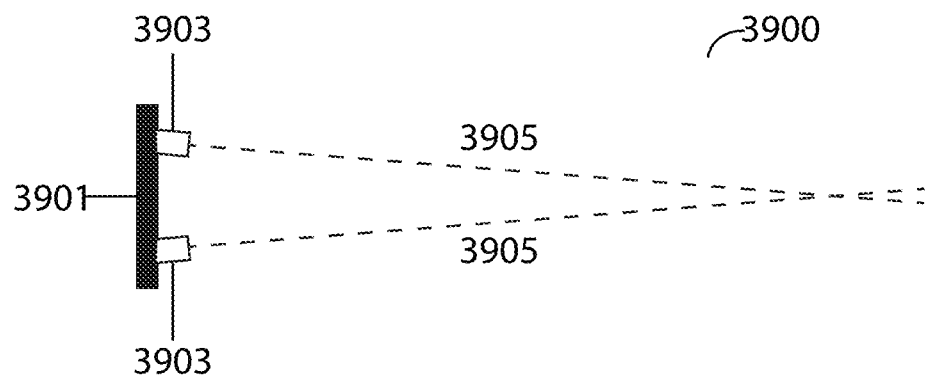
Figure 40A:
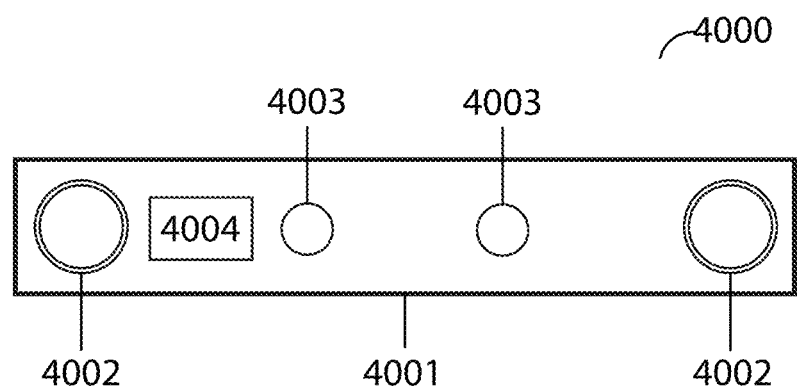
FIGS. 40A and 40B illustrate an example of a depth perceiving device, according to some embodiments.
Figure 40B:
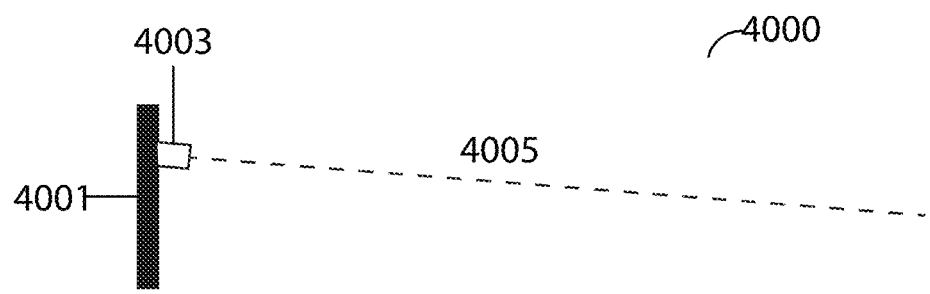

Other configurations of the laser light emitters are possible. For example, in FIG. 39A a depth perceiving device 3900 includes laser light emitters 3903 positioned at different heights on the baseplate 3901, image sensors 3902 and image processor 3904. The laser beams will still converge, but the light points will move in a vertical plane in addition to a horizontal plane of captured images as the distance to the projection surface changes. This additional data will serve to make the system more accurate. FIG. 39B illustrates a side view of the depth perceiving device 3900 wherein the laser beam emissions 3905 can be seen converging in a vertical plane. In another example, in FIG. 40A a depth perceiving device 4000 includes laser light emitters 4003 positioned on baseplate 4001 at a downward angle with respect to a horizontal plane, image sensors 4002, and image processor 4004. The laser beams will still converge, but, in a similar manner as previously described, the light points will move in a vertical plane in addition to a horizontal plane of the image as the distance to the projection surface changes. FIG. 40B illustrates a side view of the depth perceiving device 4000, wherein the laser beam emissions 4005 can be seen angled downward.

In some embodiments, ambient light may be differentiated from illumination of a laser in captured images by using an illuminator which blinks at a set speed such that a known sequence of images with and without the illumination is produced. For example, if the illuminator is set to blink at half the speed of the frame rate of a camera to which it is synched, the images captured by the camera produce a sequence of images wherein only every other image contains the illumination. This technique allows the illumination to be identified as the ambient light would be present in each captured image or would not be contained in the images in a similar sequence as to that of the illumination. In embodiments, more complex sequences may be used. For example, a sequence wherein two images contain the illumination, followed by three images without the illumination and then one image with the illumination may be used. A sequence with greater complexity reduces the likelihood of confusing ambient light with the illumination. This method of eliminating ambient light may be used independently, or in combination with other methods for eliminating sunlight noise. For example, in some embodiments, the depth perceiving device further includes a band-pass filter to limit the allowable light.

Traditional spherical camera lenses are often affected by spherical aberration, an optical effect that causes light rays to focus at different points when forming an image, thereby degrading image quality. In cases where, for example, the distance is estimated based on the position of a projected laser point or line, image resolution is important. To compensate for this, in some embodiments, a camera lens with uneven curvature may be used to focus the light rays at a single point. Further, with traditional spherical camera lens, the frame will have variant resolution across it, the resolution being different for near and far objects. To compensate for this uneven resolution, in some embodiments, a lens with aspherical curvature may be positioned in front of the camera to achieve uniform focus and even resolution for near and far objects captured in the frame. In some embodiments both cameras (or otherwise imaging sensors of the depth perceiving device) are placed behind a single camera lens.

In some embodiments, two-dimensional imaging sensors may be used. In other embodiments, one-dimensional imaging sensors may be used. In some embodiments, one-dimensional imaging sensors may be combined to achieve readings in more dimensions. For example, to achieve similar results as two-dimensional imaging sensors, two one-dimensional imaging sensors may be positioned perpendicularly to one another. In some instances, one-dimensional and two-dimensional imaging sensors may be used together.

In some embodiments, two CMOS cameras combined into one special chip may be used. Alternatively, in some embodiments, a silicon based chip implementing a light (i.e., LED) transmitter and/or a camera or imager and/or a receiver may be used. In some embodiments, a camera implemented on a board or on a silicon chip or in combination with a silicon chip to provide RGB and depth information may be used. These embodiments may be implemented in a single independent frame such as a sensor module or system on a chip, or may be implemented into the body of a robot, using the chassis or body of the robot as a frame. The embodiments described herein may be implemented in a single chip or combined modules inside one chip. The embodiments described herein may be implemented in software and/or hardware. For example, methods and techniques for extracting 2D or 3D described may be implemented in various ways.

Figure 41A:
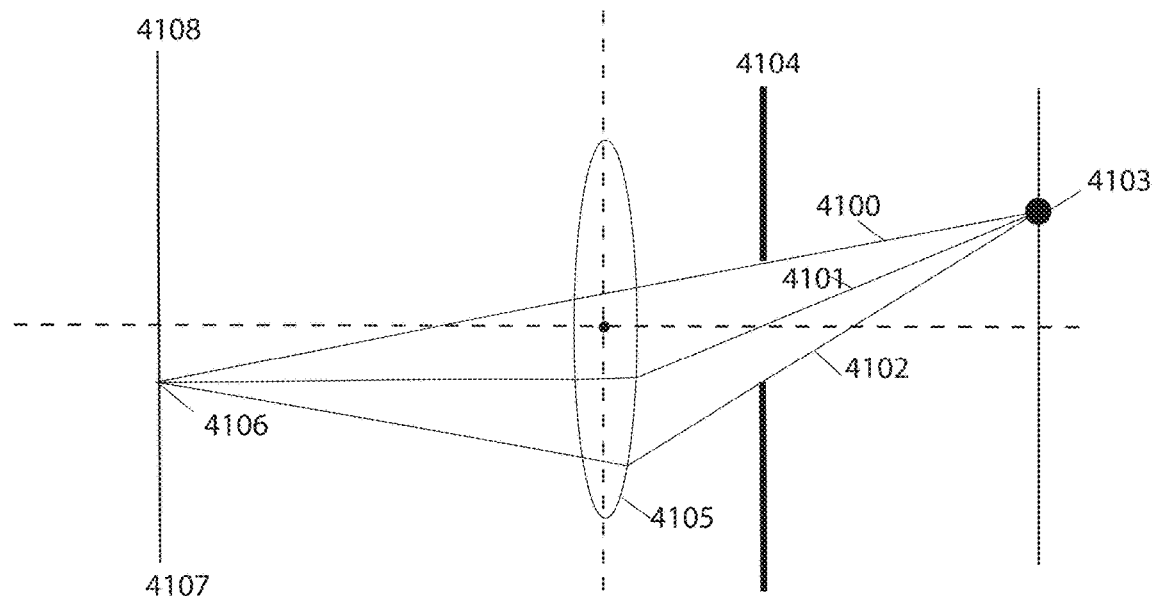
FIGS. 41A and 41B illustrate depth from de-focus technique, according to some embodiments.
Figure 41B:
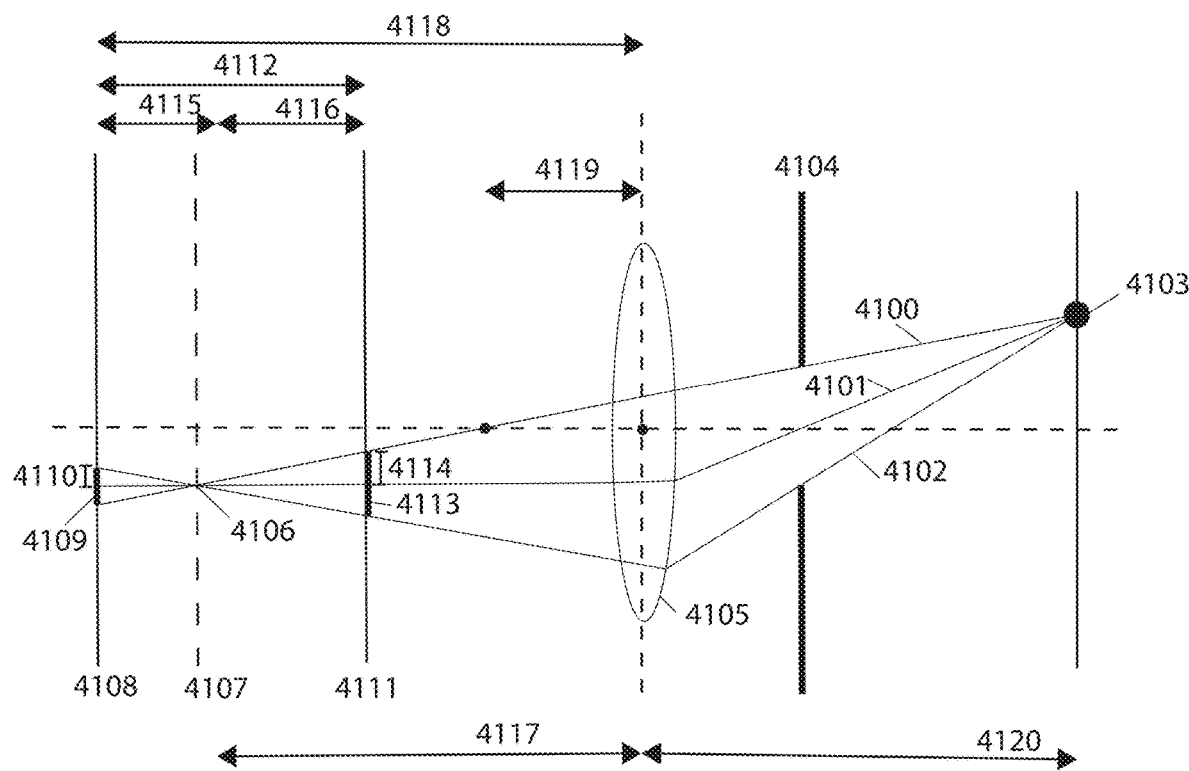

In some embodiments, depth from de-focus technique may be used to estimate the depths of objects captured in images. FIGS. 41A and 41B illustrate an embodiment using this technique. In FIG. 41A, light rays 4100, 4101, and 4102 are radiated by object point 4103. As light rays 4100, 4101 and 4102 pass aperture 4104, they are refracted by lens 4105 and converge at point 4106 on image plane 4107. Since image sensor plane 4108 coincides with image plane 4107, a clear focused image is formed on image plane 4107 as each point on the object is clearly projected onto image plane 4107. However, if image sensor plane 4108 does not coincide with image plane 4107 as is shown in FIG. 41B, the radiated energy from object point 4103 is not concentrated at a single point, as is shown at point 4106 in FIG. 41A, but is rather distributed over area 4109 thereby creating a blur of object point 4103 with radius 4110 on displaced image sensor plane 4108. In some embodiments, two de-focused image sensors may use the generated blur to estimate depth of an object, known as depth from de-focus technique. For example, with two image sensor planes 4108 and 4111 separated by known physical distance 4112 and with blurred areas 4109 having radii 4110 and 4113 having radii 4114, distances 4115 and 4116 from image sensor planes 4108 and 4111, respectively, to image plane 4107 may be determined using $$R_1 = \frac{L\delta_1}{2v}, R_2 = \frac{L\delta_2}{2v},$$

and $\beta = \delta_1 + \delta_2$. $R_1$ and $R_2$ are blur radii 4110 and 4114 determined from formed images on sensor planes 4108 and 4111, respectively. $\delta_1$ and $\delta_2$ are distances 4115 and 4116 from image sensor planes 4108 and 4111, respectively, to image plane 4107. L is the known diameter of aperture 4104, v is distance 4117 from lens 4105 to image plane 4107 and $\beta$ is known physical distance 4112 separating image sensor planes 4108 and 4111. Since the value of v is the same in both radii equations ($R_1$ and $R_2$), the two equations may be rearranged and equated and using $\beta = \delta_1 + \delta_2$, both $\delta_1$ and $\delta_2$ may be determined. Given $\gamma$, known distance 4118 from image sensor plane 4108 to lens 4105, v may be determined using $v = \gamma - \delta_1$. For a thin lens, v may be related to $f$, focal length 4119 of lens 4105 and u, distance 4120 from lens 4105 to object point 4103 using $$\frac{1}{f} = \frac{1}{v} + \frac{1}{u}.$$

Given that $f$ and v are known, the depth of the object u may be determined.

Other depth perceiving devices that may be used to collect data from which depth may be inferred are described in U.S. patent application Ser. Nos. 15/243,783, 15/954,335, 15/954,410, 15/257,798, 15/674,310, 15/224,442, and 15/683,255, the entire contents of which are hereby incorporated by reference.

Structure of data used in inferring readings may have various forms. For example, a matrix containing pixel position, color, brightness, and intensity or a finite ordered list containing x, y position and norm of vectors measured from the camera to objects in a two-dimensional plane or a list containing time-of-flight of light signals emitted in a two-dimensional plane between camera and objects in the environment. For ease of visualization, data from which depth is inferred may be converted and reported in the format of millimeters or inches of depth; however, this is not a requirement, which is not to suggest that other described features are required. For example, pixel intensities from which depth may be inferred may be converted into meters of depth for ease of visualization, or they may be used directly given that the relation between pixel intensity and depth is known. To reduce computational expense, the extra step of converting data from which depth may be inferred into a specific format can be eliminated, which is not to suggest that any other feature here may not also be omitted in some embodiments. It is noted that each step taken in the process of transforming raw readings into a depth value in millimeters or inches is a loss and computationally expensive compression and further reduces the state space in each step when digitizing each quality. In order to reduce the loss and computational expenses, it is desired and useful to omit intermediary steps if the goal can be accomplished without them. Based on information theory principal, it is beneficial to increase content for a given number of bits. For example, reporting depth in specific formats, such as metric units, is only necessary for human visualization. In implementation, such steps can be avoided to save computational expense and loss of information. The amount of compression and the amount of information captured and processed is a trade-off, which a person of ordinary skill in the art can balance to get the desired result with the benefit of this disclosure. Depths may be perceived (e.g., measured or otherwise inferred) in any form and be reported in any format. The methods of perceiving or otherwise inferring depths and the formats of reporting depths used herein are for illustrative purposes and are not intended to limit the invention, again which is not to suggest that other descriptions are limiting.

In some embodiments, the camera continues to capture images of the environment after the map is created such that any changes to the work environment are integrated into an updated map (e.g., a new piece of furniture being placed in a room). In some embodiments, the processor applies one or more filters to the images captured. In some embodiments, the processor may apply a filter to images to identify and extract the driving surface plane from the image based on the texture, color, shape and other distinguishable features of the floor that separate it from other objects (e.g., walls, furniture, buildings, cars, etc.). For example, the processor extracts a floor based on the assumption that the floor is homogenous in color and texture. The processor extracts the floor by examining pixel color of the pixels in the captured image, the color of each pixel given by (r, g, b) coordinate (red, green, blue) in an (r, g, b) coordinate system. Pixels with similar (r, g, b) coordinates form groups in the (r, g, b) coordinate system and may be identified by the processor as corresponding to the floor (or in other cases, as corresponding to some other object). For example, all pixels with one same pixel color will form a plane in the (r, g, b) coordinate system (e.g., a group of pixels with r=5 but different values for g and p, will form the plane r=5). All pixels with two same pixel colors form a line, while all pixels with all the same pixel colors will lie on a single point.

Figure 42A:
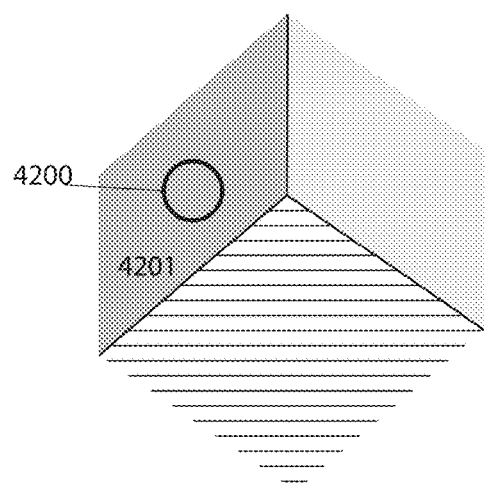
FIGS. 42A-42F illustrate an example of a corner detection method, according to some embodiments.
Figure 42B:
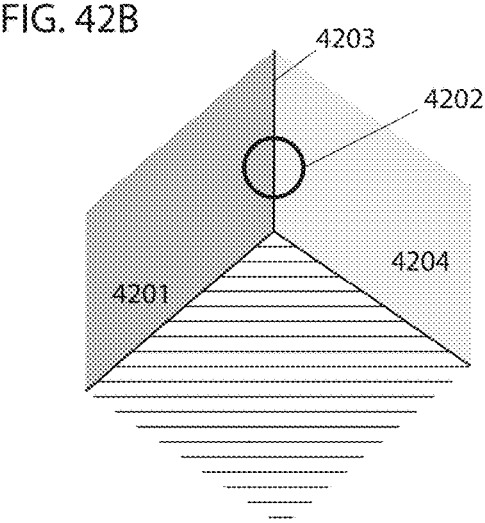
Figure 42C:
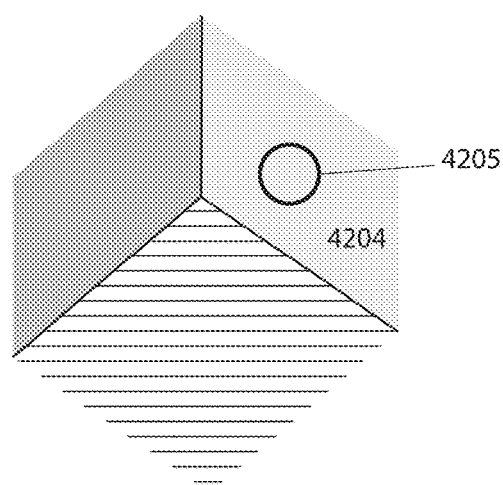
Figure 42D:
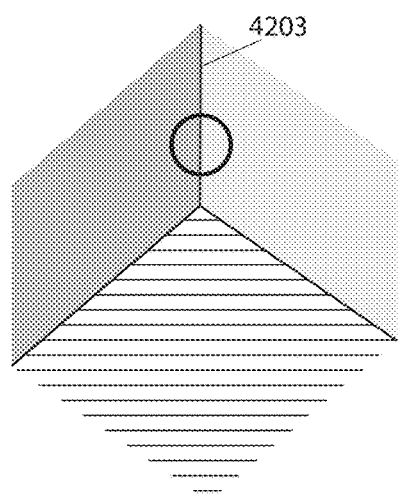
Figure 42E:
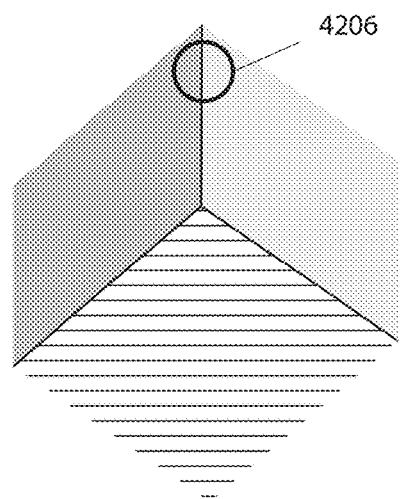
Figure 42F:
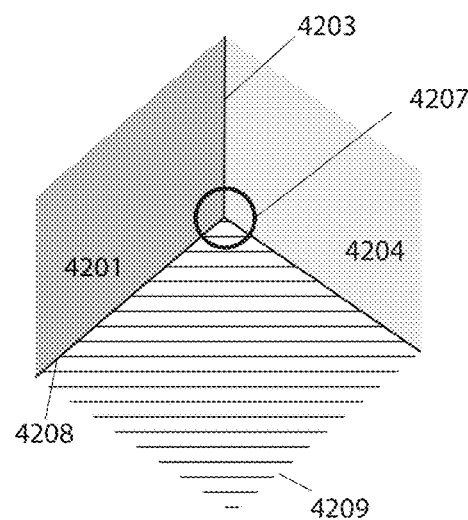

In some embodiments, the processor identifies a transition between the wall and floor (e.g., an edge) and marks it as the perimeter. In some embodiments, the processor may detect an edge and a corner using pixel intensity as changes in intensity are usually observable at edges and corners. FIGS. 42A-42F illustrate an example of how a corner may be detected by a processor by a sliding window that moves across an image. The process begins with the processor considering area 4200 on wall 4201 and observing the changes in color intensity as shown in FIG. 42A. After observing insignificant changes in color intensity, the processor moves on and considers area 4202 with edge 4203 joining walls 4201 and 4204 and observes large changes in color intensity along edge 4203 as illustrated in FIG. 42B. In FIG. 42C the processor moves to the right to consider another area 4205 on wall 4204 and observes no changes in color intensity. In FIG. 42D it returns back to edge 4203 then moves upward to consider area 4206 as shown in FIG. 42E and observes changes in color intensity along edge 4203. Finally, in FIG. 42F the processor moves down to consider area 4207 with edges 4203 and 4208 joining walls 4201 and 4204 and floor 4209. Changes in color intensity are observed along edge 4203 and along edge 4207. Upon discovering changes in color intensity in two directions by the processor, a corner is identified. Upon discovering changes in color intensity in one direction by the processor, an edge is identified. In other instances, changes in pixel intensities may be identified by a processor of a camera. These large changes in intensity may be mathematically represented by entropy where high entropy signifies large changes in pixel intensity within a particular area. The processor may determine the entropy using $$H(X) = -\sum_{i=1}^{n} P(x_i) \log P(x_i),$$

$X=(x_1, x_2, \ldots, x_n)$ is a collection of possible pixel intensities, each pixel intensity represented by a digital number. $P(x_1)$ is the probability of a pixel having pixel intensity value $x_i$. $P(x_1)$ may be determined by counting the number of pixels within a specified area of interest with pixel intensity value $x_i$ and dividing that number by the total number of pixels within the area considered. If there are no changes or very small changes in pixel intensity in an area then $H(X)$ will be very close to a value of zero. Alternatively, the pixel values of one reading (such as those with 90 numbers) may be mapped to a continuous function and the derivative of that function considered to find areas with large changes in pixel values. With the derivative being the slope, a derivative of zero would be indicative of no change in pixel value while a derivative approaching unity would be indicative of a large change in pixel values. Other methods for edge or corner detection may be used by the processor. In some embodiments, other features can be identified to further capture the identity of the environment or objects within the environment. In some instances, features are compared with a previously created map.

The modular robot may, for example, use the map to autonomously navigate the environment during operation, e.g., accessing the map to determine that a candidate route is blocked by an obstacle denoted in the map, to select a route with a route-finding algorithm from a current point to a target point, or the like. To avoid incorrect detection of an obstacle, in some embodiments, each location within the map is assigned an obstacle probability indicating the probability of an obstacle existing in each respective location. The obstacle probability assigned to a particular location increases each time an obstacle is observed in the particular location, and the processor qualifies an obstacle as existing in a particular location only when the obstacle probability is greater than a predetermined threshold. For example, all locations in a map are initially set to an obstacle probability of 0.25 (i.e., 25% chance that an obstacle exists in each location). When an obstacle is observed in a particular location, the obstacle probability increases to 0.325, and if observed a second time in the same particular location the obstacle probability increases to 0.3925, and so on. When the obstacle probability assigned to a particular location is greater than 0.325, the processor qualifies an obstacle as existing in the particular location. In some embodiments, the map is stored in memory for future use. Storage of the map may be in temporary memory such that a stored map is only available during an operational session or in more permanent forms of memory such that the map is available at the next session or startup. In some embodiments, the map is further processed to identify rooms and other segments. Examples of methods for dividing an environment into zones are described in U.S. patent application Ser. Nos. 14/817,952, 16/198,393, and 15/619,449, the entire contents of which are hereby incorporated by reference. In some embodiments, a new map is constructed at each use, or an extant map is updated based on newly acquired data.

The techniques described herein, e.g., such as mapping and depth perceiving techniques, may be implemented in software, in hardware, in a system on a chip, a module, a combination with other hardware on a PCB, in a single silicon chip, a combination of software and one or more silicon chips, a combination of software and a multi-purpose chip, or a specific application chip with built in mapping capabilities. In some embodiments, the implementations may include built-in circuitry for easier and faster processing and GPUs and TPUs capabilities. In some embodiments, a mapping chip or a processing chip with a mapping processing unit may be used.

Some embodiments may reference previous maps during subsequent mapping operations. For example, embodiments may apply Bayesian techniques to simultaneous localization and mapping (SLAM) and update priors in existing maps based on mapping measurements taken in subsequent sessions. In some embodiments, the processor localizes itself during mapping or during operation. In some embodiments, methods of localization are inherently independent from mapping and path planning but may be used in tandem with any mapping or path planning method or may be used independently to localize the modular robot irrespective of the path or map of the environment. In some embodiments, the processor uses quantum SLAM. In some embodiments, the processor may determine the motion of the modular robot using Newton's motion equation $$F = m\frac{d^2x}{dt^2},$$

wherein F is the force causing the modular robot to move, m is the mass of the modular robot, x is the position of the modular robot, t is time, and d signifies the derivative. In some embodiments, the processor may determine the motion of the modular robot using $$F = -\frac{\partial V}{\partial x},$$

wherein V is potential energy causing motion of the modular robot and $\partial$ signifies a partial derivative. In some embodiments, the processor combines the two motion equations to form a motion function $$m\frac{d^2x}{dt^2} = -\frac{\partial V}{\partial x}$$

used by the processor to determine the position of the modular robot at a given time, the equation in accordance with Newton's Second Law. Given the position of the mass (i.e., the robot) at any given time x(t), the processor may determine the velocity $$\left(v = \frac{dx}{dt}\right),$$

momentum (p=mv), and kinetic energy $$\left(T = \frac{1}{2}mv^2\right),$$

among other dynamic variables of the robot. Given the initial state variables, i.e. the position $x(t_0)$ and velocity $x'(t_0)$ of a particle (i.e., the robot), the processor may determine the trajectory of the particle. Using the initial position and velocity of the modular robot, the processor determines the position x of the robot at a later time $(t_0+\Delta t)$ using x $(t_0+\Delta t)=x (t_0)+x'(t_0) \Delta t$. The equation holds true if the velocity is constant in the time interval $[t_0, t_0+\Delta t]$, otherwise it is an approximation. In some embodiments, the processor iteratively repeats the process to determine the trajectory at time $(t_0+2\Delta t)$ and so on. With the motion function being second order in time, x $(t_0)$ and $x'(t_0)$, are required to specify a trajectory. This is equivalent to identifying two space-time points $(x_1, t_1)$ and $(x_f, t_f)$.

Rather than consider a single position x, the processor generalizes to n-dimensions $(x_1, x_2, \ldots, x_n)$ such that the spatial configuration of the modular robot is represented as a point in an n-dimensional configuration space, otherwise known as a Hilbert Space. In some embodiments, the configuration space is a subset of the Hilbert Space. In some embodiments, the processor generalizes the motion equation $$m_j \frac{d^2 x_j}{dt^2} = -\frac{\partial V}{\partial x_j}.$$

In some embodiments, the processor integrates the motion equation to determine the trajectory of the modular robot. Since the trajectory equation applies for all possible paths, a function dependent on not only the position x at time t but also on the path is required. In practice, the modular robot may take any possible path. In some embodiments, the processor uses the Lagrangian function to predict such trajectory as it is a function of position, velocity, and time, and equal to the difference in kinetic energy and potential energy. In some embodiments, the processor determines an action S[x(t)] for each path from $(x_i, t_i)$ to $(x_f, t_f)$ using $$S[x(t)] = \int_{t_i}^{t_f} L(x_i, x_f) dt.$$

Figure 43A:
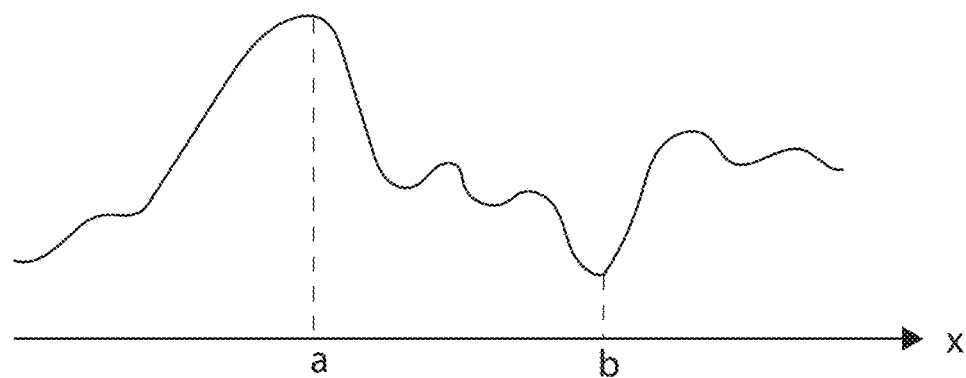
FIGS. 43A-43C illustrate an embodiment of a localization process of a robot, according to some embodiments.

In some embodiments, the processor represents all possible locations resulting from possible actions S (or paths) or the action space by a field $|\Psi(x, t)|^2$. By definition, a field is a physical quantity represented by a number or tensor that has a value for each point in space and time. For example, the surface wind velocity on a weather map can be considered a field since a vector describing the speed and direction of the movement of air is assigned to each point on the map for each time point t. In another example, surface temperature on the planet can be considered a field as a surface temperature exists for each point on the planet at a given time. In the case of the modular robot, the field $|\Psi(x, t)|^2$ describes the likelihood of possible locations of the modular robot at time t in some embodiments. This is shown in FIG. 43A, where possible locations of the modular robot in a one-dimensional space are illustrated. As can be seen in this example, the modular robot is more likely to be at a location x=a with a higher peak than at a location x=b. The illustration provided is one-dimensional for simplicity.

Figure 43B:
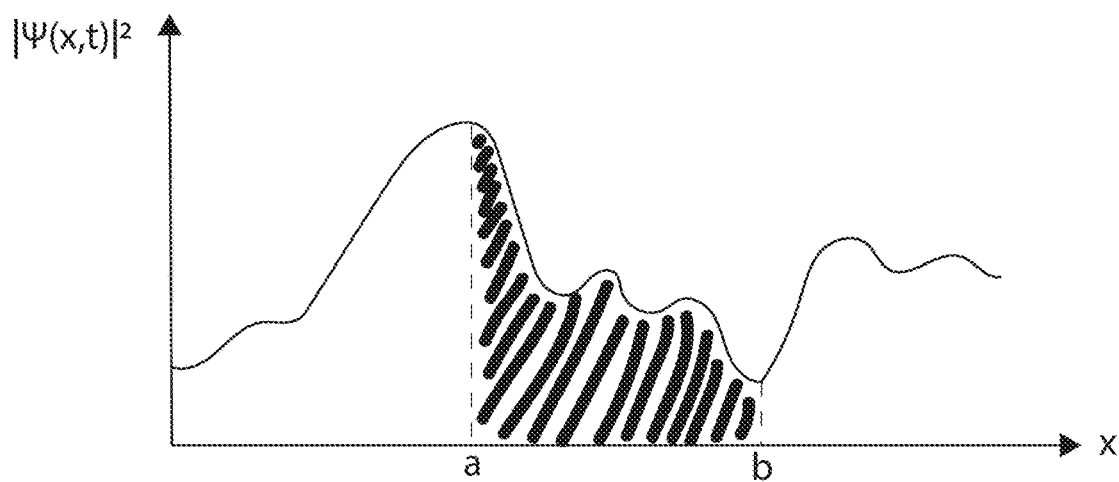

Given that the field $|\Psi(x, t)|^2$ describes the likelihood of possible locations of the modular robot at time t, in some embodiments, the processor determines the likelihood of the location of the modular robot being between two points a and b at a time t $$\int_a^b |\Psi(x, t)|^2 dx,$$

using the area under the curve $|\Psi(x, t)|^2$, as shown in FIG. 43B. In some embodiments, the processor normalizes the function $|\Psi(x, t)|^2$ by multiplying by a value $c=1/\sqrt{A}$, where A is a potential value other than 1. By normalizing, the above integral becomes equal to unity, $$\int_a^b |\Psi(x, t)|^2 dx = 1.$$

In some embodiments, the integral provides the probability of x having a value between a and b at a given time t since the area bound in the integral summates to unity. In some embodiments, the normalized function $|\Psi(x, t)|^2$ may be a probability density function (PDF) and the processor determines the probability of the modular robot being located at a particular location by determining the integral of the PDF, i.e., $$\int_a^b |\Psi(x, t)|^2 dx = P(a < x < b, t).$$

Since $|\Psi(x, t)|^2$ is a linear differential equation that may be normalized, the processor may determine the expectation of the location x of the modular robot in some embodiments using $$\langle x \rangle = \int_{-\infty}^{\infty} x |\Psi(x, t)|^2 dx.$$

Additionally, given the velocity $$v = \frac{dx}{dt},$$

the processor may determine the expected value of velocity of the modular robot in some embodiments using $$\langle v \rangle = \frac{d\langle x \rangle}{dt} = \frac{d}{dt} \int_{-\infty}^{\infty} x|\Psi(x, t)|^2 dx.$$

In some embodiments, the processor obtains readings of the surroundings from one or more sensors internal or external to the modular robot. Readings may be of various forms. For example, readings may be visual readings captured by an image sensor, distance readings taken by a distance sensor, time-of-flight readings taken by a time-of-flight camera, WI-FI signal strength readings taken by a WI-FI module or decibel readings observed by an acoustic sensor. Different types of readings may be used independently or simultaneously for quantum SLAM. In some embodiments, the processor infers a position x of the modular robot in a global coordinate system at time t of the reading, thereby localizing the modular robot. In some embodiments, the location is given by x=(x, y, θ) in two dimensions and x=(x,y,z), θ=($R_x$, $R_y$, $R_z$) in three dimensions, wherein R is a rotation matrix.

Figure 43C:
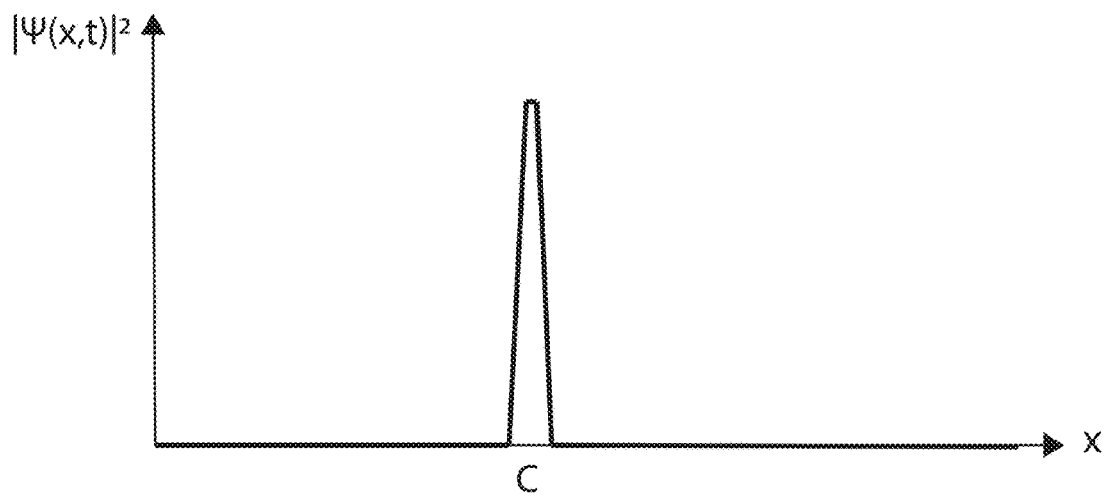

In some embodiments, localization of the modular robot occurs at the time a reading is taken and is represented by a position x with respect to the surroundings, such as objects, obstacles or perimeters, regardless of the method used for localization and the type of sensor or measurement device. For example, if a measurement device of the modular robot measures distance to an object, the instant the measurement is taken the processor localizes the modular robot to be at some position x with respect to the object measured; if the measurement device measures noise in decibels, the processor localizes the modular robot as being at some position x from the originator of the noise; and if the measurement device measures WI-FI strength, the processor localizes the modular robot as being at some position x from the originating point of the WI-FI signal. In some embodiments, the measurement process for localization is similar to a wave propagation. The immediate surroundings of the modular robot are initially observed using at least one sensor followed by further distances into the surroundings as waves propagate, expanding the radius of observation. In some embodiments, the radius r of each propagating wave increases may by a value λ. When the processor obtains a reading that can be used to account for localization, at that instant, the processor collapses the PDF to a Dirac Delta function with a spike at some value C for the location x of the modular robot, as shown in FIG. 43C. The spike at some value C localizes the modular robot as being at location C at that instant. If other readings are taken at that instant, the spike at some value C for the location x is confirmed but after that instant and with movement of the modular robot, the processor reverts the function back to being spread over possible values of x, as shown in FIGS. 43A and 43B for example. In some embodiments, λ is the localization resolution. For example, the processor uses multiples of λ to describe the placement of the sensor against the surroundings. In some embodiments, the resolution of the reading is not the same as the localization resolution; therefore, the processor casts the reading into a possible location of the modular robot in multiples of λ. In some embodiments, the processor uses a probabilistic value to describe the likelihood of what multiple of λ to interpret the reading to. In some embodiments, the processor determines the probabilistic value as logit $$(P(x)) = \log \frac{P(x)}{1 - P(x)},$$

wherein P(x) is the probability of x and $$\frac{P(x)}{1 - P(x)}$$

is the odds of x being true. In this case x is a multiple of lambda.

Figure 44:
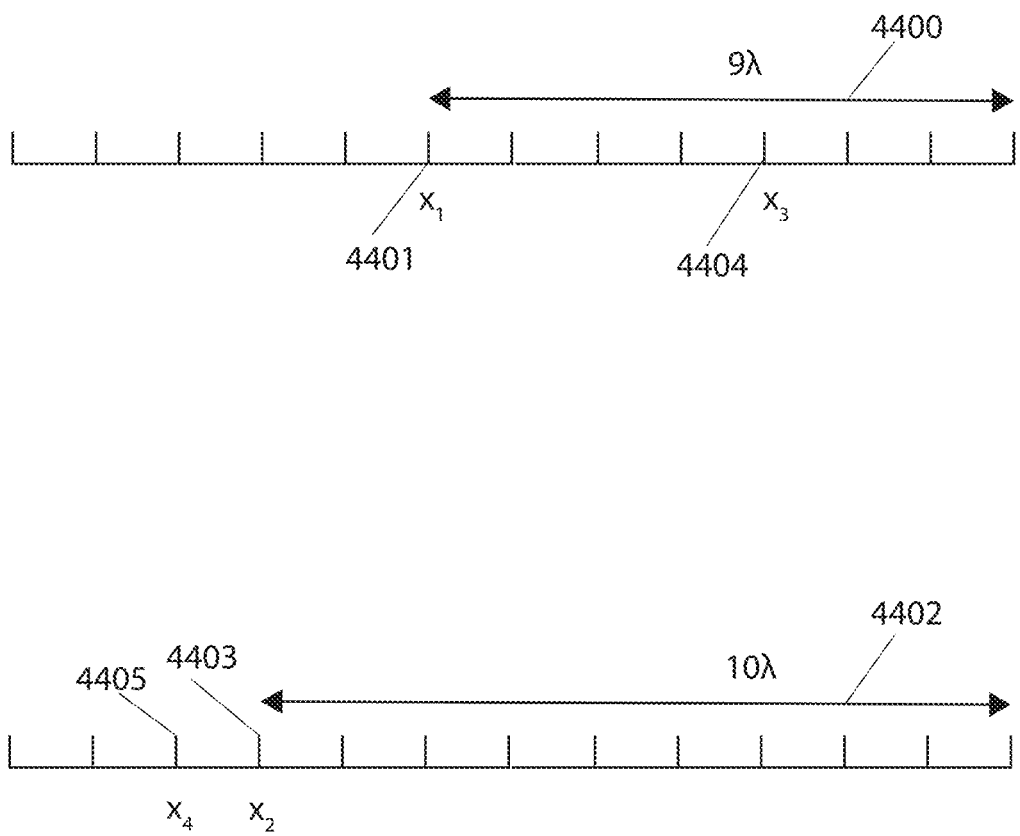
FIG. 44 illustrates an example of alternative localization scenarios wherein localization is given in multiples of $\lambda$, according to some embodiments.

In some embodiments, the processor generates a simulated representation of the environment for each considered possible position of the robot. In some embodiments, the processor compares the measurement against each simulated representation of the environment (e.g., a map) corresponding with a perspective of each of the considered possible positions of the robot. In some embodiments, the processor chooses the position of the robot that makes the most sense as the most feasible position of the robot. In some embodiments, the processor selects additional considered possible positions of the robot as a backup to the most feasible position of the robot. With each measurement, the certainty in the most feasible position of the robot chosen increases or decreases. In some embodiments, the processor retains interpretations of the localization of the modular robot having lower probabilistic values, despite higher probabilistic values being indicative of a better interpretation of the localization of the modular robot. This is important as the modular robot may be localized differently for different multiples of λ. and different localization results in a different map. For example, in FIG. 44 the processor uses a one-dimensional camera reading 4400 of 9λ to localize the modular robot at location 4401 with value $x_1$ while a camera reading 4402 of 10λ is used to localize the modular robot at location 4403 with value $x_2$. Since both readings localize the modular robot to different locations, each reading may result in a different map. In some embodiments, each location may be possible and alternative scenarios may be evaluated by the processor. In some embodiments, the number of alternative scenarios to evaluate may be predetermined or the processor selects the alternative scenarios to evaluate in real-time. For example, the processor evaluates two possible scenarios, one where the modular robot is localized at location 4401 with value $x_1$ and another where the modular robot is localized at location 4403 with value $x_2$. However, other scenarios, such as localization of the modular robot at locations 4404 and 4405 with values $x_3$ and $x_4$, respectively, may be evaluated by the processor as well. In some embodiments, the processor uses more than one dimension for localization. However, as the number of dimensions used increases, the number of alternative scenarios does as well, and localization may become computationally expensive. In some embodiments with low resolution and low dimensionality, the processor monitors 4 to 30 alternatives for example. In some embodiments where the resolution is higher, a higher number of alternative scenarios may be required. In some embodiments, the processor monitors, for example, between 35 to 200 alternative scenarios. In some embodiments, the processor uses an adaptive algorithm to increase and decrease the number of alternative scenarios as needed. In some embodiments, the processor replaces alternative scenarios monitored by other alternatives through a process of fitness proportionate selection wherein the processor uses a fitness function to assign a fitness to possible alternative scenarios. In some embodiments, the fitness level is used to associate a probability of selection with each alternative scenario. In some embodiments, the processor determines the fitness function using $$p_i = \frac{f_i}{\sum_{j=1}^{N} f_j},$$

wherein $f_i$ is the fitness of alternative scenario i of N possible scenarios and $p_i$ is the probability of selection of alternative scenario i. In some embodiments, the processor is less likely to eliminate alternative scenarios with higher fitness level from the alternative scenarios currently monitored.

In some embodiments, wherein more than one reading is used for localization of the modular robot, the location inferred by the processor has a higher certainty of being correct when readings are in-phase and agree with one another. In some embodiments, readings or measurements are a combination of readings or measurements from multiple sensors once processed by the processor. In some embodiments, readings from multiple sensors may disagree and produce imprecise localization by the processor as disagreeing readings place the modular robot at different locations. For example, a spike at some position x of the modular robot results when readings from multiple sensors are in agreement. The agreement of readings from multiple sensors results in a sharp maximum at some position x as the certainty of the localization increases from validation of readings from multiple sensors. However, in some embodiments it is possible that multiple readings from multiple sensors disagree resulting in the processor inferring different locations of the modular robot. For example, the probability distribution may include two spikes, one being sharper than the other. Most readings from various sensors are in agreement forming the sharper spike corresponding with some position x, however, some readings from other sensors are in disagreement, resulting in the second dull spike corresponding with some position y of the modular robot. Values for the position x of the modular robot have higher probability of being the position of the modular robot that values for the position y, as the majority of readings in agreement correspond to values for the position x.

Figure 45:
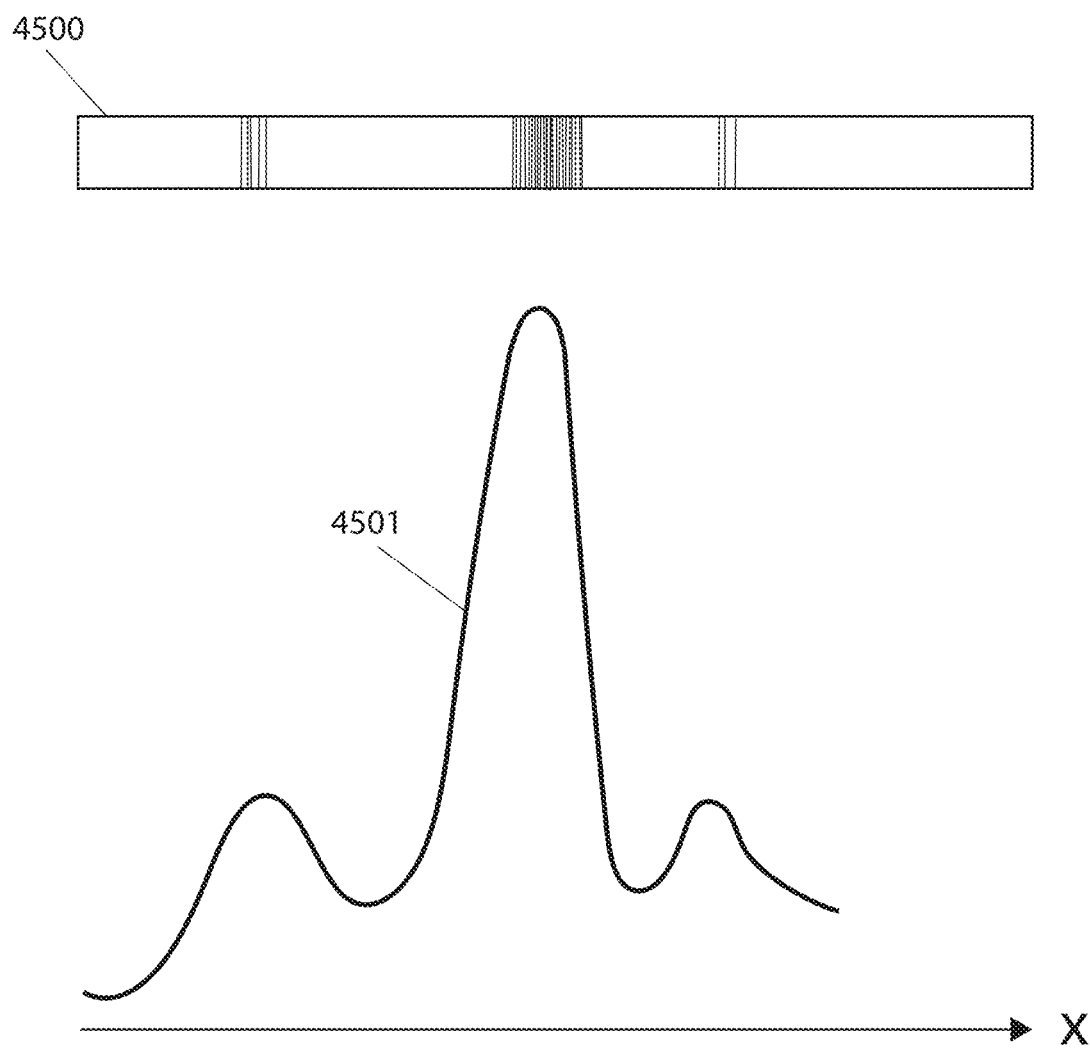
FIG. 45 illustrates an example of discretization of measurements, according to some embodiments.

In some embodiments, with some processing, the processor eliminates possible locations of the modular robot such that the probability distribution function collapses to a Dirac Delta function, such as that shown in FIG. 43C. For example, in certain environments readings of some sensors may be considered less accurate than others and may therefore not considered or if the majority of readings from different sensors are in agreement the minority readings in disagreement are not considered or unrealistic readings are eliminated. In some embodiments, the processor discretizes measurements, as shown in FIG. 45 with discrete representation 4500 of possible positions x of the modular robot in graph 4501. In some embodiments, the processor compares discrete values against a preprogrammed bias function. In some embodiments, the discretized values that are well matched with the noise and bias that are previously given to the modular robot are given more importance by the processor. In some embodiments, a second reading is taken by the same or another sensor and values of the first and the second readings are compared and combined by the processor to form a more reliable reading. In some embodiments, the first reading and second reading are not of the same kind. For example, a first reading is from an odometer and a second reading is from a depth camera. In some embodiments, the processor compares the discretized values that are matched against a bias function to determine how they fit with a second discretized function. In processing of the information, as explained in the above embodiments, the reading that is used is assumed to be accurate enough to localize the modular robot to some location C with a certain resolution.

In between readings, the modular robot is in a state of superposition as it may only be localized by the processor when a reading is taken. Therefore, if the system is interpreted as a Copenhagen Interpretation wherein the physical system does not have definite properties prior to being measured and only the probabilities that readings will produce certain results may be predicted, it may be thought that measurement is what causes the modular robot to be perceived at some location C at a given time or that measurement, in effect, localizes the modular robot. For this reason, preparation and measurement are independent in some embodiments described herein. In some embodiments, preparation includes any action or control that causes the modular robot to take a particular measurement. For example, preparation includes the modular robot driving to a location wherein a particular reading is taken or includes a user placing the modular robot or pushing the modular robot to a location wherein a particular reading is taken. In some embodiments, the modular robot is assumed to be in an eigenstate, the state where the limit of repeated readings converges to a specific value, when a sensor takes a reading of the surroundings. Thus, in some embodiments, preparation puts the system in an eigenstate.

Figure 46:
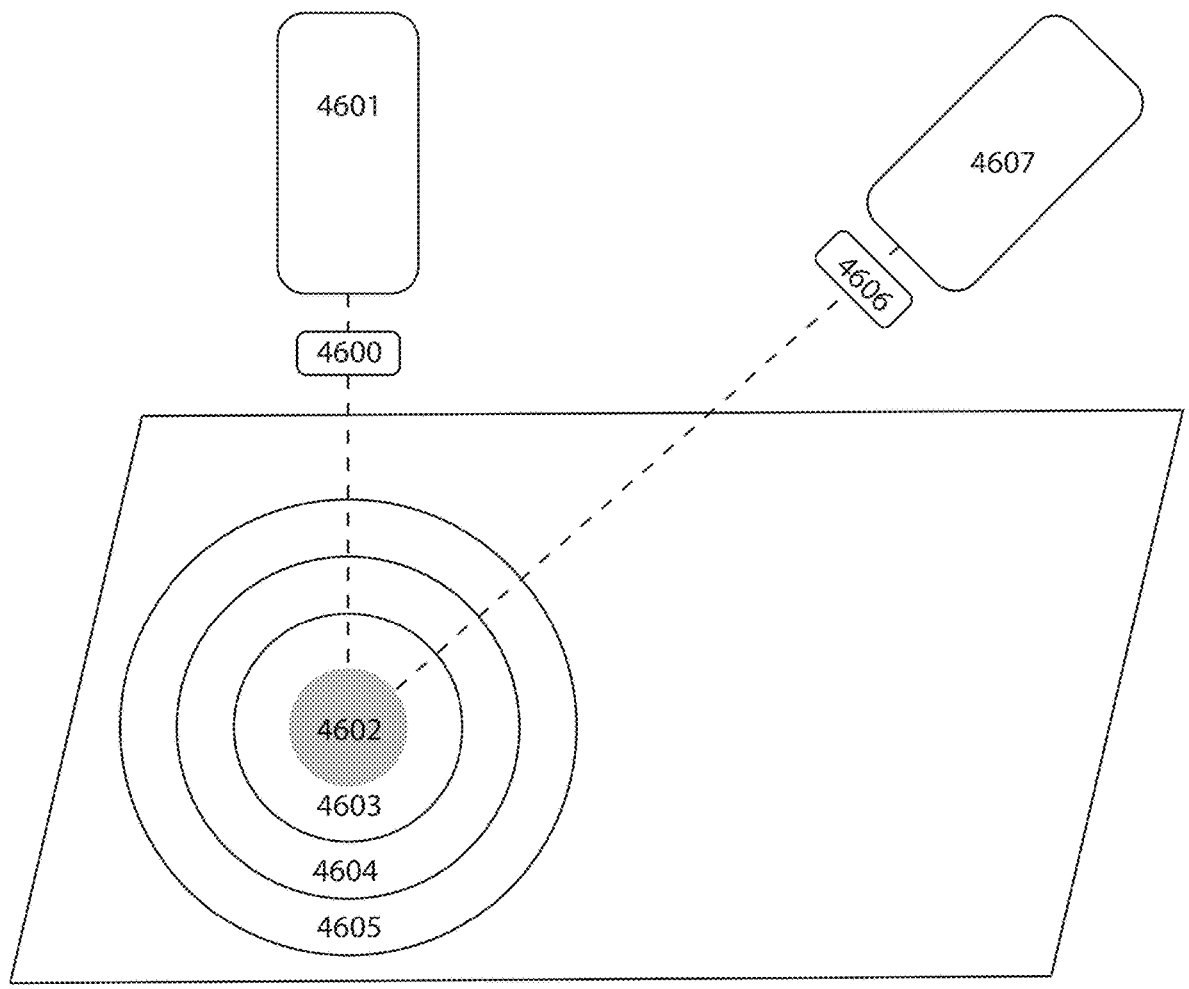
FIG. 46 illustrates an example of preparation of a state, according to some embodiments.

In some embodiments, the collection of actions and/or controls that cause the modular robot to take the same particular reading are said to prepare the same state and are referred to as preparation operators. For example, FIG. 46 illustrates modular robot 4600 being dropped by a machine or other device through a vertically oriented tube 4601 positioned directly above area 4602 on driving surface 4603. There is a high likelihood that this action will result in the modular robot landing directly below tube 4601 in area 4602. It is also possible it may land in areas 4603, 4604 or 4605, though with less likelihood the further away the area is from area 4602 located directly beneath tube 4601. If the action were repeated n times, as n approaches infinity, the limit of the modular robot landing at some area A converges to m/n, where m is the number of times the modular robot lands in area A. The processor determines this convergence for areas 4602, 4603, 4604 and 4605. Based on the results, the area within which the modular robot is most likely located in reality converges to a specific area, the area A with greatest value m. Convergence usually occurs after many repetitions of the same action or experiment. At the beginning of experimentation, observations may not converge. At the beginning of the experiment, results may seem divergent or it may appear that the possibility of the modular robot landing in multiple areas is similar. However, as n increases, the area in which the modular robot is most likely located converges to 4602. The processor determines convergence using $$P(A \mid C) = \lim_{n \to \infty} \frac{m}{n}.$$

This can be thought of as the propensity of the modular robot landing in area A given condition C, which in this case is the action of the modular robot being released through tube 701, or otherwise the preparation operator. There may exist other preparation operators for the same state. For example, the action of modular robot 4606 in FIG. 46 being released through tube 4607 angled at 45 degrees with the same set of probabilities of landing in areas 4602 through to 4605 is said to prepare the same state. In some embodiments, a mathematically equivalent experiment comprising n modular robots dropped at once producing the same results is said to prepare the same state. With the same logic, the limit of the modular robot landing at some area A converges to m/n, with a greater number of modular robots landing in area 4602 as compared to areas 4603, 4604 and 4605. For a modular robot in operation, the processor assumes any actions and/or controls that produce the same results prepare the same state. As an alternative to counting the number of times the modular robot lands in an area A, the processor can apply the convergence in other ways. For example, if the mass of all modular robots were equivalent and each separate area was a weighing scale, the limit of the weight in area A converges as well, where m in this case is the total weight in area A and n is the total weight of all areas combined. The processor determines the number of modular robots in each area by dividing the total weight of an area by the weight of a single modular robot. Given the results of the experiment the processor deduces, for example, that the modular robot lands in area 4602. With the different preparations being mathematically equivalent, as n→∞, preparations are considered interchangeable. To visualize n→∞, repeatedly dropping a large number of modular robots a large number of times is envisioned wherein n×n=∞. Given the different possible preparations, the reading taken remains independent of the preparation or the method by which the modular robot gets to areas 4602 through to 4605, for example. In operation, the processor determines convergence or propensity of landing in an area A over time. While only the probability of the modular robot landing in areas 4602 to 4605 is discussed, the probability of the modular robot being located at very remote areas is not zero as there is always a possibility that the modular robot is located anywhere. However, in some embodiments, the processor compares all possible areas and their corresponding convergence results and eliminates areas with low probabilities, leaving only most intuitive and realistic areas for evaluation.

In some embodiments, having separated measurement and preparation, the processor interprets $\Psi$ discretely. For example, in the case of a vector ket$|X\rangle$ of n linearly independent elements $(x_1, x_2, \ldots, x_n)$ in a subset of a Hilbert Space, a preparation vector ket$|P\rangle$ acts on each element of vector ket$|X\rangle$ ) such that a measurement produces an element in ket$|\Psi\rangle$, an eigenvector describing all possible eigenstates of the modular robot. Therefore, ket$|\Psi\rangle$ is broken down by the processor to vectors acting on the space vector. Using Bra-Ket notation, the processor uses $|\Psi\rangle = C_1|X\rangle + C_2|P1\rangle + C_3|P2\rangle + \ldots$, wherein C is an eigenvalue of scalar coefficient stretching the vector in the space. The processor uses this discrete approach to filter out states of the modular robot with low possibility or without any possibility of being true. By describing localization in a subset of a Hilbert Space, localization of the modular robot is not confined to a Cartesian coordinate system. Different sets of vectors are used by the processor in localization of the modular robot whereby each set of vectors that cannot be represented as multiplication of other vectors increases the dimensionality of the system. For example, in some embodiments, the processor localizes the modular robot against a certain type of floor assuming sensors are capable of processing and distinguishing floor types based on the reflection from the emitted light; against a room in which the modular robot may be working wherein the room is represented as a graph of connected nodes; against a certain height measured relative to the driving surface given different heights are defined in the space; against a certain Wi-Fi strength; against presence or strength of light, sound, people, objects, or any other substance or material; against the slope of the environment; against the amount of power required by the system assuming different locations require different power, as in case of requiring more power for driving up a slope or requiring more power to rotate a wheel or main brush when on carpet; and against amp withdrawal. As a further example, the processor localizes the modular robot against an edge at which two walls meet or a corner where multiple walls meet. In some cases, the readings taken provide less information of the observed surroundings than others but do provide, to some degree, a sense of the surroundings of the modular robot. For example, a sensor captures a reading for which no objects, obstacles, or perimeters exist within the measurement range. Although the sensor does not measure any objects, obstacles, or perimeters, the processor still gains useful information about its surroundings. It can conclude that there are no objects, obstacles, or perimeters between the modular robot and the maximum measurement range, thereby gaining a sense of the surroundings.

In some embodiments, the processor localizes the modular robot within a phase space. In some embodiments, the phase space includes all possible states of the modular robot. In some embodiments, a probability distribution may be used by the processor to approximate the likelihood of the state of the modular robot being within a specific region of the phase space. In some embodiments, the processor determines a phase space probability distribution over all possible states of the modular robot within the phase space using a statistical ensemble including a large collection of virtual, independent copies of the modular robot in various states of the phase space. In some embodiments, the phase space consists of all possible values of position and momentum variables. In some embodiments, the processor chooses samples from the phase space for evaluation. In some embodiments, the phase space is discretized. In some embodiments, the discretized samples are filtered to only include classical mechanical attributes of the system (i.e., the modular robot) into the data structure. In some embodiments, the processor represents the statistical ensemble by a phase space probability density function p(p, q, t), q and p denoting position and velocity vectors. In some embodiments, the processor uses the phase space probability density function p(p, q, t) to determine the probability p(p, q, t)dq dp that the modular robot at time t will be found in the infinitesimal phase space volume dq dp. In some embodiments, the phase space probability density function p(p, q, t) has the properties p(p, q, t)≥0 and $\int p(p, q, t)d(p, q)=1$, $\forall t \geq 0$, and the probability of the position q lying within a position interval a, b is $$P[a \leq q \leq b] = \int_a^b \int p(p, q, t) dp dq.$$

Similarly, the probability of the velocity p lying within a velocity interval c, d is $$P[c \leq q \leq d] = \int_c^d \int p(p, q, t) dq dp.$$

In some embodiments, the processor determines values by integration over the phase space. For example, the processor determines the expectation value of the position q by $\langle q \rangle = \int q\, p(p, q, t) d(p, q)$.

In some embodiments, the processor evolves each state within the ensemble over time t according to an equation of motion. In some embodiments, the processor models the motion of the modular robot using a Hamiltonian dynamical system with generalized coordinates q, p wherein dynamical properties are modeled by a Hamiltonian function H. In some embodiments, the function represents the total energy of the system. In some embodiments, the processor represents the time evolution of a single point in the phase space using Hamilton's equations $$\frac{dp}{dt} = -\frac{\partial H}{\partial q}, \frac{dq}{dt} = \frac{\partial H}{\partial p}.$$

In some embodiments, the processor evolves the entire statistical ensemble of phase space density function p(p, q, t) under a Hamiltonian H using the Liouville equation $$\frac{\partial \rho}{\partial t} = -\{\rho, H\},$$

wherein $\{\bullet,\bullet\}$ denotes the Poisson bracket and H is the Hamiltonian of the system. For two functions $f$, g on the phase space, the Poisson bracket is given by $$\{f, g\} = \sum_{i=1}^{N} \left( \frac{\partial f}{\partial q_i} \frac{\partial g}{\partial p_i} - \frac{\partial f}{\partial p_i} \frac{\partial g}{\partial q_i} \right).$$

In this approach, the processor evolves each possible state in the phase space over time instead of keeping the phase space density constant over time, which is particularly advantageous if sensor readings are sparse in time.

In some embodiments, the processor evolves the phase space probability density function p(p, q, t) over time using the Fokker-Plank equation which describes the time evolution of a probability density function of a particle under drag and random forces. In comparison to the behavior of the modular robot modeled by both the Hamiltonian and Liouville equations, which are purely deterministic, the Fokker-Planck equation includes stochastic behaviour. Given a stochastic process with $dX_t = \mu(X_t,t)dt + \sigma(X_t,t)dW_t$, wherein $X_t$ and $\mu(X_t,t)$ are M-dimensional vectors, $\sigma(X_t, t)$ is a M×P matrix, and $W_t$ is a P-dimensional standard Wiener process, the probability density $\rho(x, t)$ for $X_t$ satisfies the Fokker-Planck equation $$\frac{\partial \rho(x,t)}{\partial t} = -\sum_{i=1}^{M} \frac{\partial}{\partial x_i}[\mu_i(x,t)\rho(x,t)] + \sum_{i=1}^{M}\sum_{j=1}^{M} \frac{\partial^2}{\partial x_i \partial x_j}[D_{ij}(x,t)\rho(x,t)]$$

with drift vector $\mu=(\mu_1, \ldots, \mu_M)$ and diffusion tensor $$D = \frac{1}{2}\sigma\sigma^T.$$

In some embodiments, the processor adds stochastic forces to the motion of the modular robot governed by the Hamiltonian H and the motion of the modular robot is then given by the stochastic differential equation $$dX_t = \begin{pmatrix} dq \\ dp \end{pmatrix} = \begin{pmatrix} +\frac{\partial H}{\partial \Box} \\ -\frac{\partial H}{\partial q} \end{pmatrix} dt = \begin{pmatrix} 0_N \\ \sigma_N(p,q,t) \end{pmatrix} dW_t,$$

wherein $\sigma_N$ is a N×N matrix and $dW_t$ is a N-dimensional Wiener process. This leads to the Fokker-Plank equation $$\frac{\partial \rho}{\partial t} = -\{\rho, H\} + \nabla_p \cdot (D\nabla_p \rho),$$

wherein $\nabla_p$ denotes the gradient with respect to position p, $\nabla \cdot$ denotes divergence, and $$D = \frac{1}{2}\sigma_N \sigma_N^T$$

is the diffusion tensor.

In other embodiments, the processor incorporates stochastic behaviour by modeling the dynamics of the modular robot using Langevin dynamics, which models friction forces and perturbation to the system, instead of Hamiltonian dynamics. The Langevian equations are given by $M\ddot{q} = -\nabla_q U(q) - \gamma p + \sqrt{2\gamma k_B T M} R(t)$, wherein $(-\gamma p)$ are friction forces, R(t) are random forces with zero-mean and delta-correlated stationary Gaussian process, T is the temperature, $k_B$ is Boltzmann's constant, $\gamma$ is a damping constant, and M is a diagonal mass matrix. In some embodiments, the Langevin equation is reformulated as a Fokker-Planck equation $$\frac{\partial \rho}{\partial t} = -\{\rho, H\} + \nabla_p \cdot (\gamma p \rho) + k_B T \nabla_p \cdot (\gamma M \nabla_p \rho)$$

that the processor uses to evolve the phase space probability density function over time. In some embodiments, the second order term $\nabla_p \cdot (\gamma M \nabla_p \rho)$ is a model of classical Brownian motion, modeling a diffusion process. In some embodiments, partial differential equations for evolving the probability density function over time may be solved by the processor using, for example, finite difference and/or finite element methods.

Figure 47A:
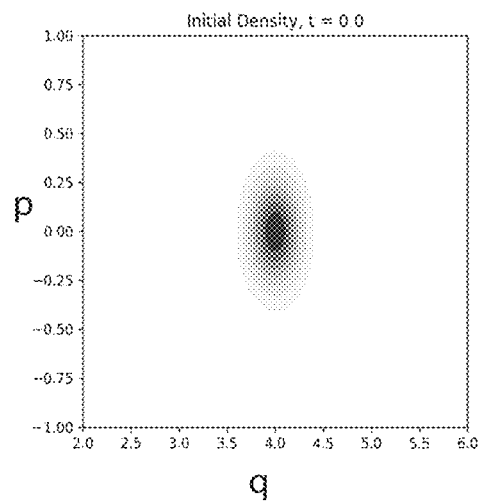
FIG. 47A illustrates an example of an initial phase space probability density of a robotic device, according to some embodiments.
Figure 47B:
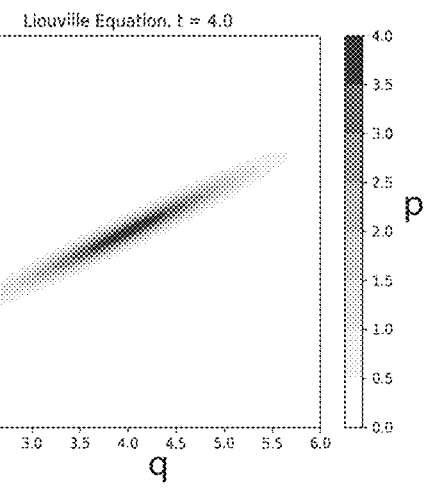
FIGS. 47B-47D illustrates examples of the time evolution of the phase space probability density, according to some embodiments.

FIG. 47A illustrates an example of an initial phase space probability density of a modular robot, a Gaussian in (q, p) space. FIG. 47B illustrates an example of the time evolution of the phase space probability density after four time units when evolved using the Liouville equation incorporating Hamiltonian dynamics, $$\frac{\partial \rho}{\partial t} = -\{\rho, H\}$$

with Hamiltonian $$H = \frac{1}{2}p^2.$$

Figure 47C:
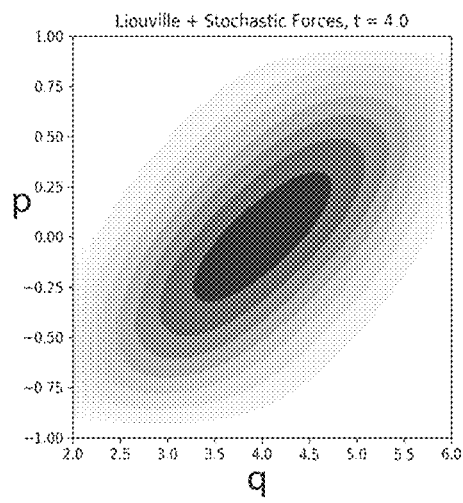
Figure 47D:
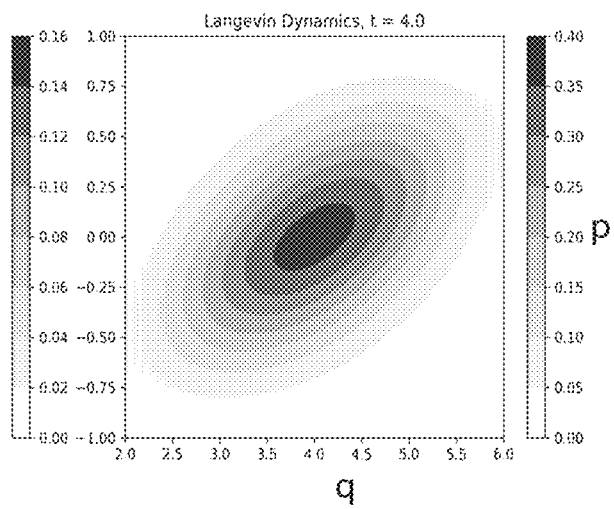

FIG. 47C illustrates an example of the time evolution of the phase space probability density after four time units when evolved using the Fokker-Planck equation incorporating Hamiltonian dynamics, $$\frac{\partial \rho}{\partial t} = -\{\rho, H\} + \nabla_p \cdot (D\nabla_p \rho)$$

with D=0.1. FIG. 47D illustrates an example of the time evolution of the phase space probability density after four time units when evolved using the Fokker-Planck equation incorporating Langevin dynamics, $$\frac{\partial \rho}{\partial t} = -\{\rho, H\} + \nabla_p \cdot (\gamma p \rho) + k_B T \nabla_p \cdot (M \nabla_p \rho)$$

with γ=0.5, T=0.2, and $k_B$=1. FIG. 47B illustrates that the Liouville equation incorporating Hamiltonian dynamics conserves momentum over time, as the initial density in FIG. 47A was only distorted in the q-axis (position). In comparison, FIGS. 47C and 47D illustrate diffusion along the p-axis (velocity) as well, as both evolution equations account for stochastic forces. With the Fokker-Planck equation incorporating Hamiltonian dynamics the density spread more equally (FIG. 47C) as compared to the Fokker-Planck equation incorporating Langevin dynamics where the density remained more confined (FIG. 47D) due to the additional friction forces.

In some embodiments, the processor may update the phase space probability distribution when the processor receives readings (or measurements or observations). Any type of reading that may be represented as a probability distribution that describes the likelihood of the state of the modular robot being in a particular region of the phase space may be used. Readings may include measurements or observations acquired by sensors of the modular robot or external devices such as a Wi-Fi™ camera. Each reading may provide partial information on the likely region of the state of the modular robot within the phase space and/or may exclude the state of the modular robot from being within some region of the phase space. For example, a depth sensor of the modular robot may detect an obstacle in close proximity to the modular robot. Based on this reading and using a map of the phase space, the processor may reduce the likelihood of the state of the modular robot being any state of the phase space at a great distance from an obstacle. In another example, a reading of a floor sensor of the modular robot and a floor map may be used by the processor to adjust the likelihood of the state of the modular robot being within the particular region of the phase space coinciding with the type of floor sensed. In an additional example, a measured Wi-Fi™ signal strength and a map of the expected Wi-Fi™ signal strength within the phase space may be used by the processor to adjust the phase space probability distribution. As a further example, a Wi-Fi™ camera may observe the absence of the modular robot within a particular room. Based on this observation the processor may reduce the likelihood of the state of the modular robot being any state of the phase space that places the modular robot within the particular room. In some embodiments, the processor generates a simulated representation of the environment for each hypothetical state of the robot. In some embodiments, the processor compares the measurement against each simulated representation of the environment (e.g., a floor map, a spatial map, a Wi-Fi map, etc.) corresponding with a perspective of each of the hypothetical states of the robot. In some embodiments, the processor chooses the state of the robot that makes the most sense as the most feasible state of the robot. In some embodiments, the processor selects additional hypothetical states of the robot as a backup to the most feasible state of the robot.

In some embodiments, the processor may update the current phase space probability distribution $\rho(p, q, t_1)$ by re-calculating the phase space probability distribution based on an observation probability distribution $m(p, q, t_i)$ using $$\overline{p}(p, q, t_i) = \frac{\rho(p, q, t_i) \cdot m(p, q, t_i)}{\int \rho(p, q, t_i) m(p, q, t_i) d(p, q)}.$$

In some embodiments, the observation probability distribution may be determined by the processor for a reading at time $t_1$ using an inverse sensor model. In some embodiments, wherein the observation probability distribution does not incorporate the confidence or uncertainty of the reading taken, the processor may incorporate the uncertainty into the observation probability distribution by determining an updated observation probability distribution $$\hat{m} = \frac{1-\alpha}{c} + \alpha m$$

that may be used in re-calculating the current phase space probability distribution, wherein a is the confidence in the reading with a value of 0≤α≤1 and c=∫∫dpdq. At any given time, the processor may estimate a region of the phase space within which the state of the modular robot is likely to be given the phase space probability distribution at the particular time.

Figure 48A:
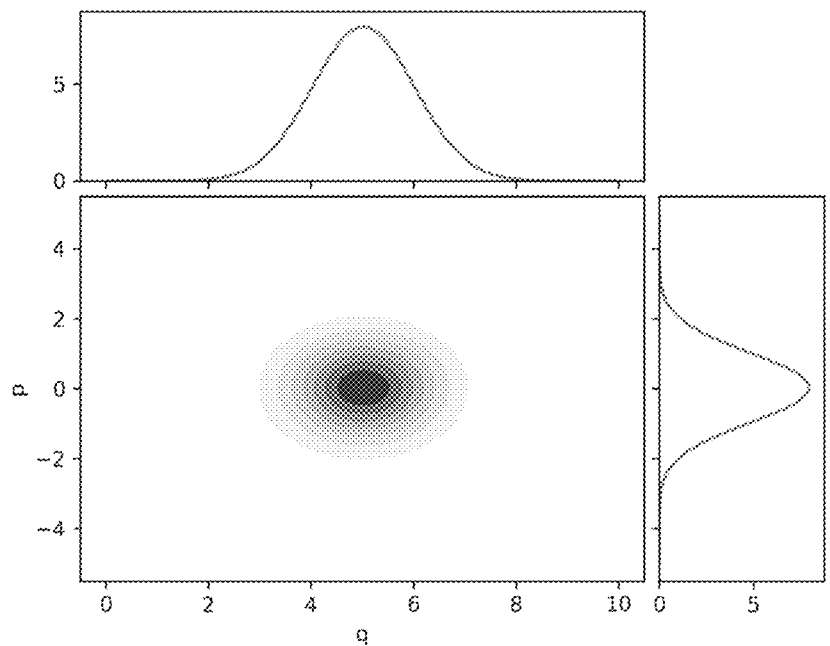
FIGS. 48A-48D illustrate examples of initial phase space probability distributions, according to some embodiments.
Figure 48B:
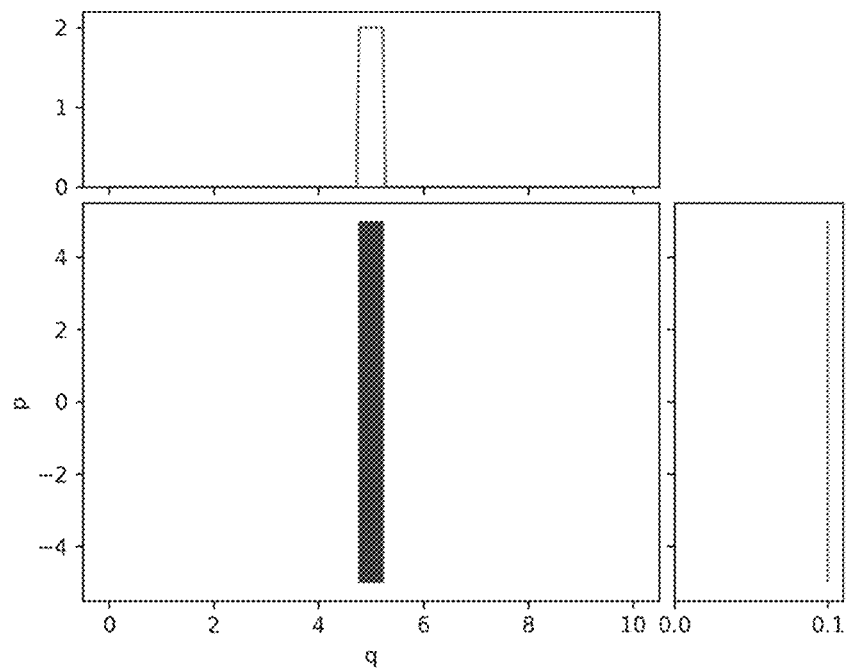
Figure 48C:
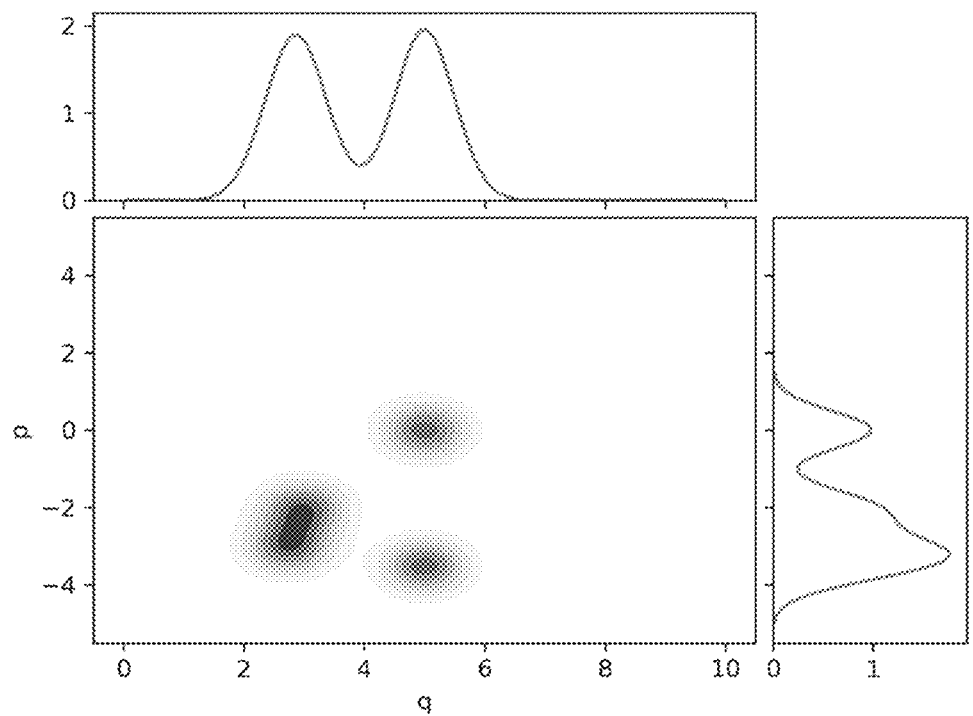
Figure 48D:
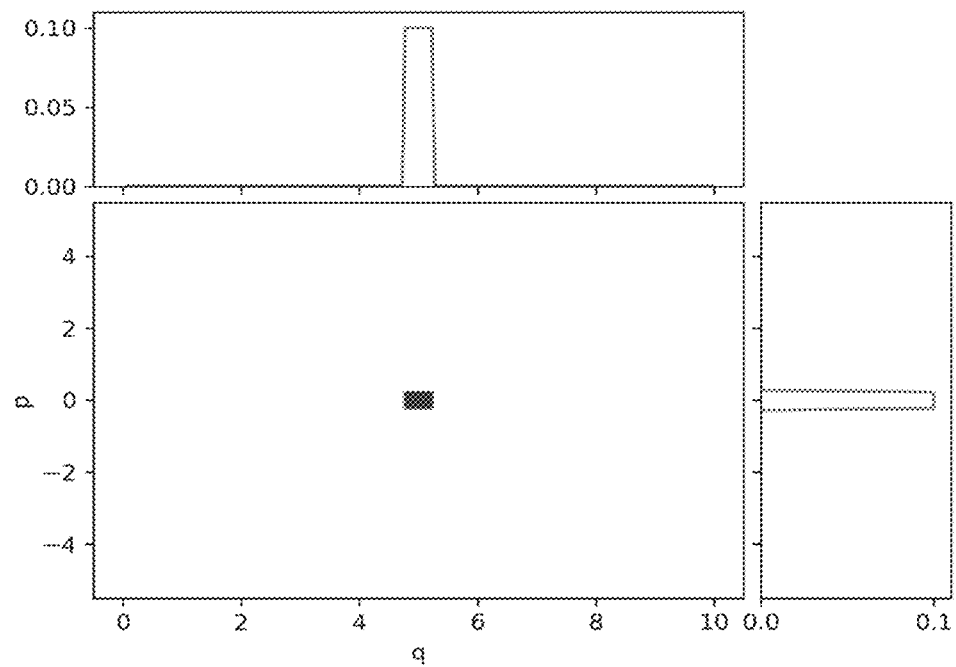

In one example, the processor uses a two-dimensional phase space of the modular robot, including position q and velocity p. The processor confines the position of the modular robot q to an interval [0, 10] and the velocity p to an interval [−5, +5], limited by the top speed of the modular robot, therefore the phase space (p, q) is the rectangle D=[−5, 5]×[0, 10]. The processor uses a Hamiltonian function $$H = \frac{p^2}{2m},$$

with mass m and resulting equations of motion $\dot{p}=0$ and $$\dot{q} = \frac{p}{m}$$

to delineate the motion of the modular robot. The processor adds Langevin-style stochastic forces to obtain motion equations $\dot{p}=-\gamma p+\sqrt{2\gamma mk_B T}R(t)$ and $$\dot{q} = \frac{p}{m},$$

wherein K(t) denotes random forces and m=1. The processor initially generates a uniform phase space probability distribution over the phase space D. FIGS. 48A-48D illustrate examples of initial phase space probability distributions the processor may use. FIG. 48A illustrates a Gaussian distribution over the phase space, centered at q=5, p=0. The modular robot is estimated to be in close proximity to the center point with high probability, the probability decreasing exponentially as the distance of the point from the center point increases. FIG. 48B illustrates uniform distribution for $q\in[4.75, 5.25]$, $p\in[-5, 5]$ over the phase space, wherein there is no assumption on p and q is equally likely to be in [4.75, 5.25]. FIG. 48C illustrates multiple Gaussian distributions and FIG. 48D illustrates a confined spike at q=5, p=0, indicating that the processor is certain of the state of the modular robot.

Figure 49A:
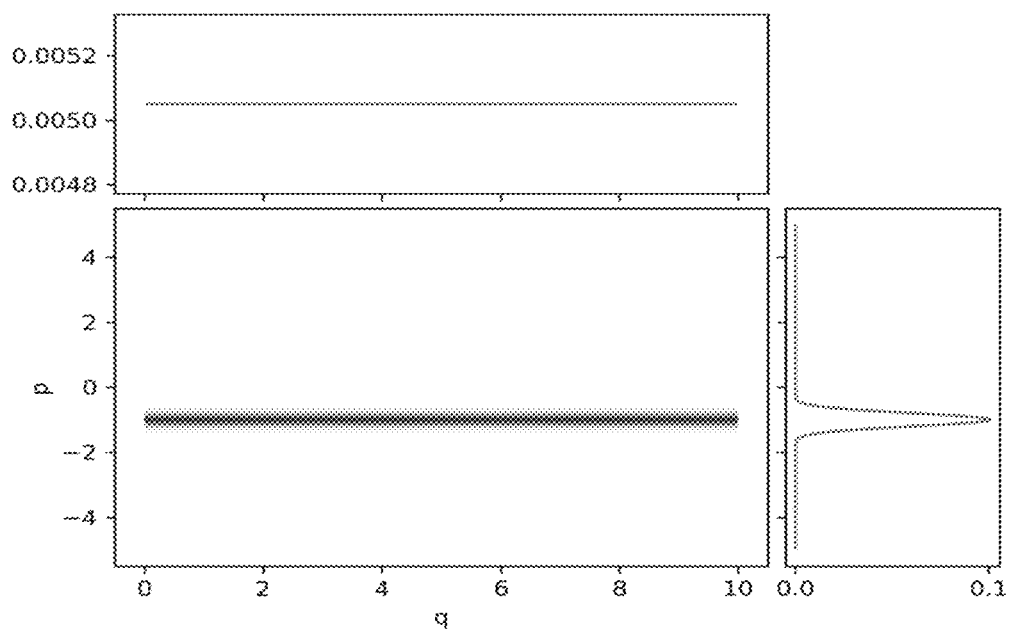
FIGS. 49A and 49B illustrate examples of observation probability distributions, according to some embodiments.
Figure 49B:
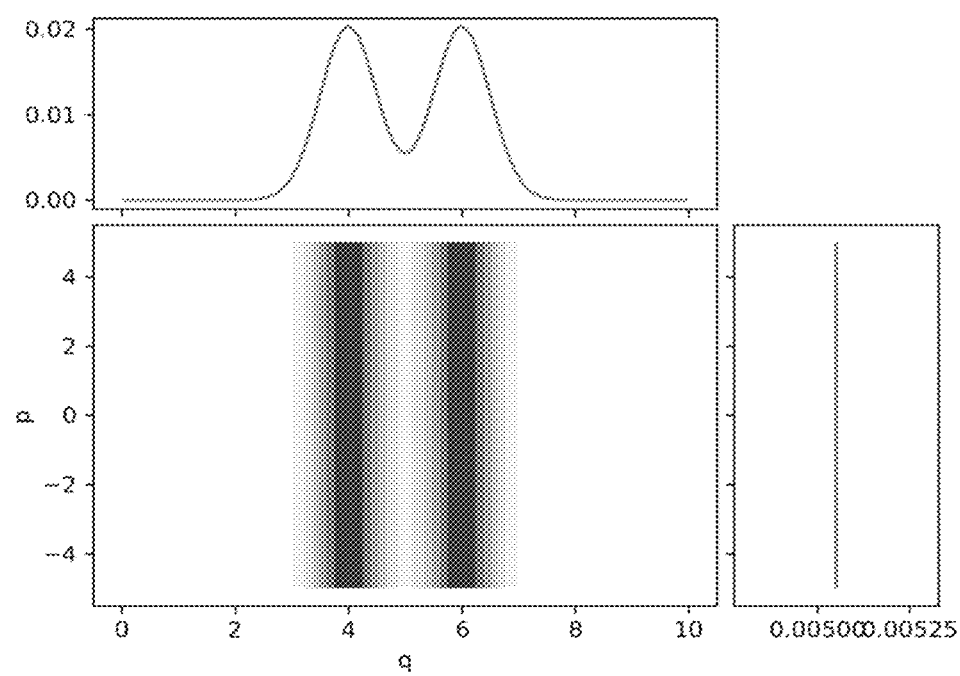

In this example, the processor evolves the phase space probability distribution over time according to Langevin equation $$\frac{\partial \rho}{\partial t} = -\{\rho, H\} + \left(\gamma \frac{\partial}{\partial p}\right)\cdot(p\rho) + \gamma k_B T \frac{\partial^2 \rho}{\partial p^2},$$

wherein $$\{\rho, H\} = p\frac{\partial \rho}{\partial q}$$

and m=1. Thus, the processor solves $$\frac{\partial \rho}{\partial t} = -p\frac{\partial \rho}{\partial q} + \gamma\left(\rho + p\frac{\partial \rho}{\partial p}\right) + \gamma k_B T \frac{\partial^2 \rho}{\partial p^2} \text{ for } t > 0$$

with initial condition $\rho(p, q, 0)=\rho_0$ and homogenous Neumann boundary conditions. The boundary conditions govern what happens when the modular robot reaches an extreme state. In the position state, this may correspond to the modular robot reaching a wall, and in the velocity state, it may correspond to the motor limit. The processor updates the phase space probability distribution each time a new reading is received by the processor. FIGS. 49A and 49B illustrate examples of observation probability distributions for odometry measurements and distance measurements, respectively. FIG. 49A illustrates a narrow Gaussian observation probability distribution for velocity p, reflecting an accurate odometry sensor. Position q is uniform as odometry data does not indicate position. FIG. 49B illustrates a bimodal observation probability distribution for position q including uncertainty for an environment with a wall at q=0 and q=10. Therefore, for a distance measurement of four, the modular robot is either at q=4 or q=6, resulting in the bi-modal distribution. Velocity p is uniform as distance data does not indicate velocity. In some embodiments, the processor may update the phase space at periodic intervals or at predetermined intervals or points in time. In some embodiments, the processor may determine an observation probability distribution of a reading using an inverse sensor model and the phase space probability distribution may be updated by the processor by re-calculating it using the observation probability distribution of the reading.

Figure 50:
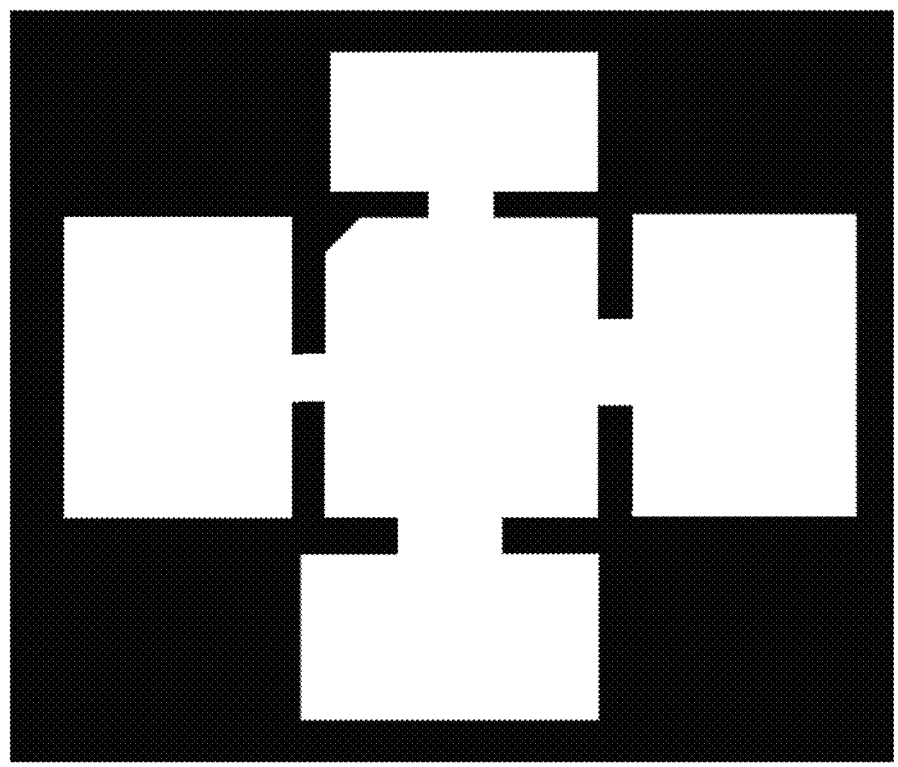
FIG. 50 illustrates an example of a map of an environment, according to some embodiments.
Figure 51A:
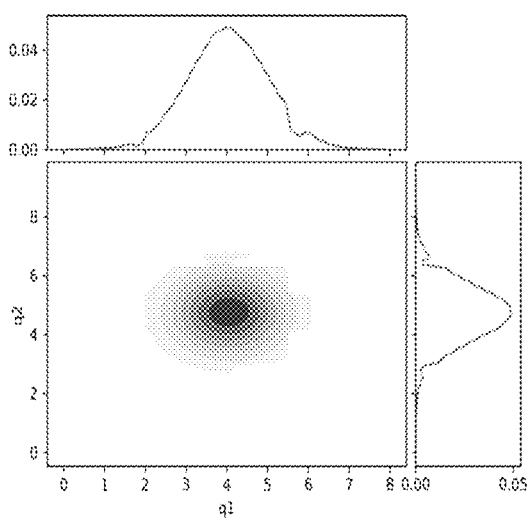
FIGS. 51A-51C illustrate an example of an evolution of a probability density reduced to the $q_1$, $q_2$ space at three different time points, according to some embodiments.
Figure 51B:
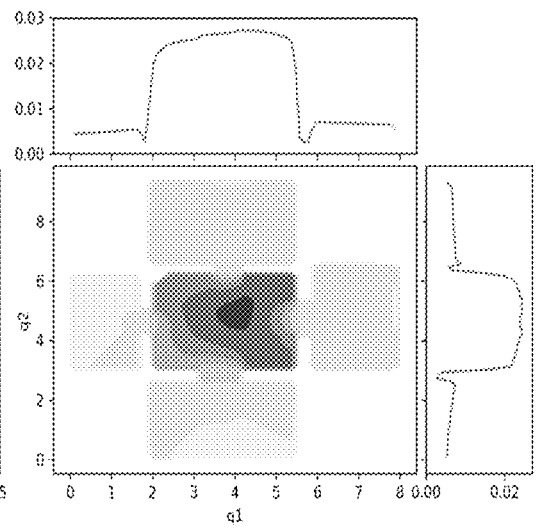
Figure 51C:
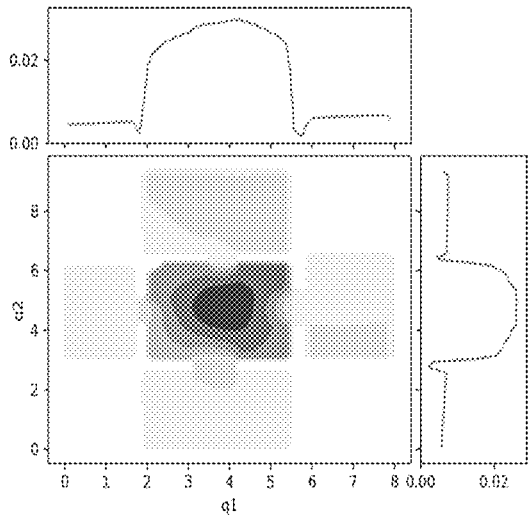
Figure 52A:
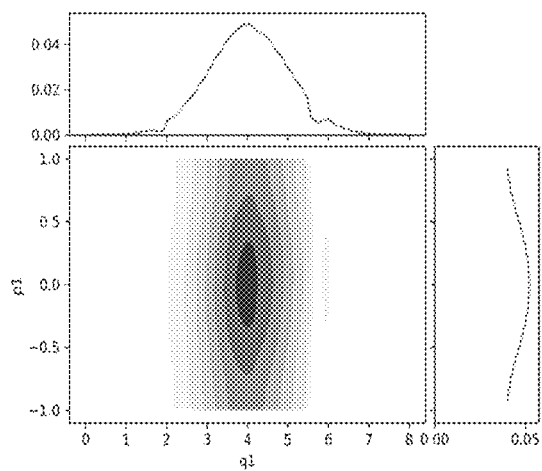
FIGS. 52A-52C illustrate an example of an evolution of a probability density reduced to the $p_1$, $q_1$ space at three different time points, according to some embodiments.
Figure 52B:
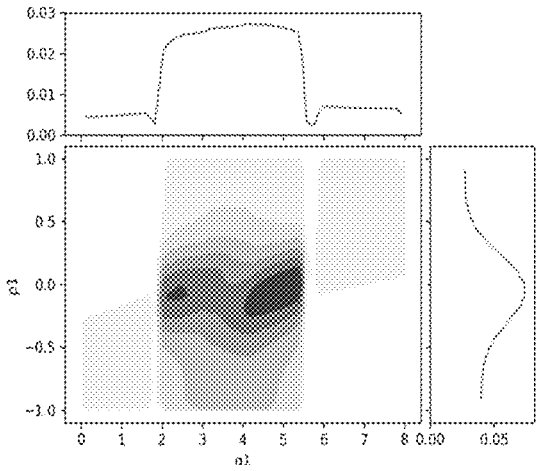
Figure 52C:
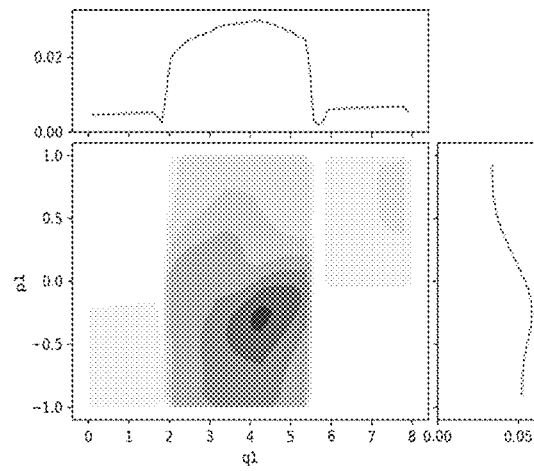
Figure 53A:
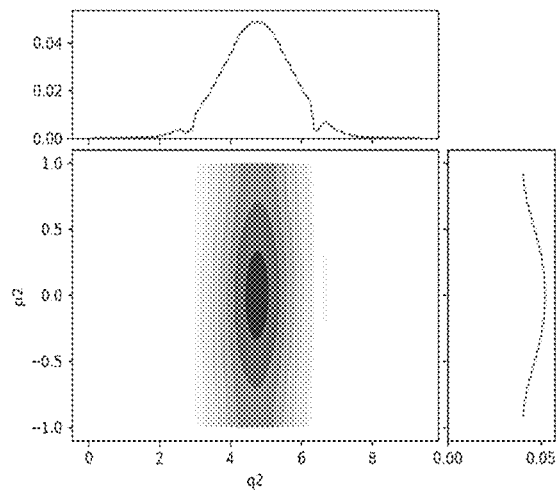
FIGS. 53A-53C illustrate an example of an evolution of a probability density reduced to the $p_2$, $q_2$ space at three different time points, according to some embodiments.
Figure 53B:
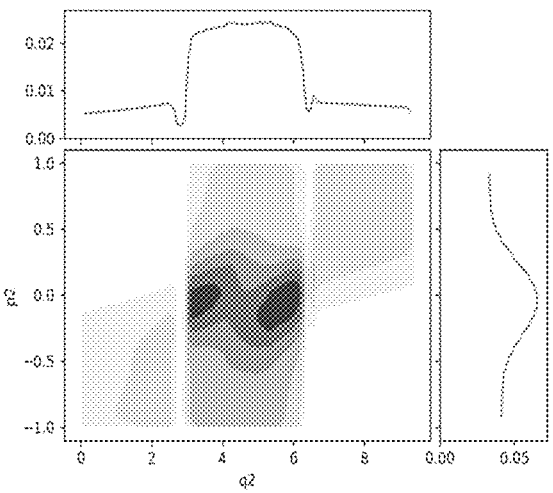
Figure 53C:
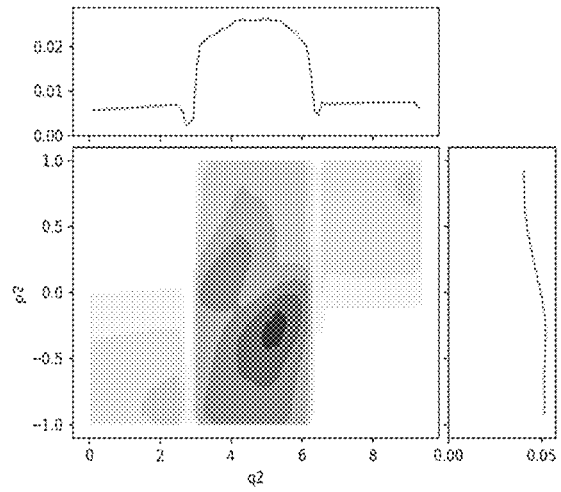
Figure 54:
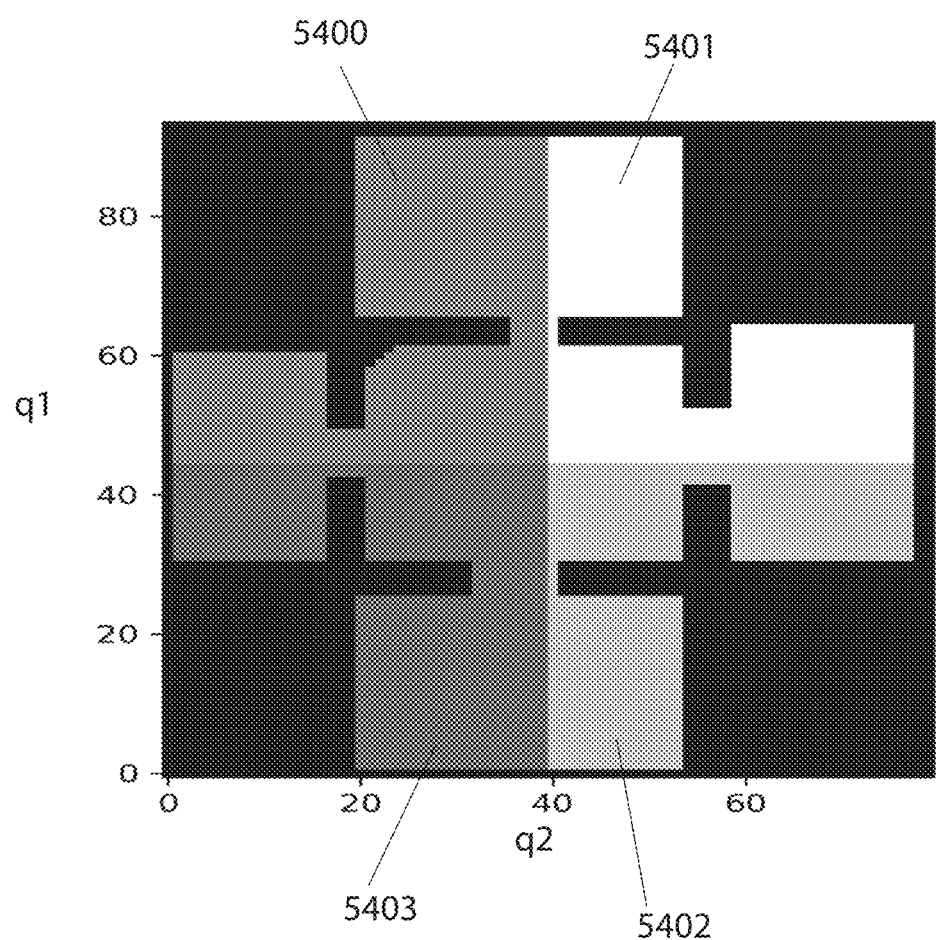
FIG. 54 illustrates an example of a map indicating floor types, according to some embodiments.

The example described may be extended to a four-dimensional phase space with position q=(x, y) and velocity $p=(p_x, p_y)$. The processor solves this four dimensional example using the Fokker-Planck equation $$\frac{\partial \rho}{\partial t} = -\{\rho, H\} + \nabla_p \cdot (\gamma p\rho) + k_B T \nabla_p \cdot (\gamma M \nabla_p \rho)$$

with $M=I_2$ (2D identity matrix), T=0.1, $\gamma$=0.1, and $k_B$=1. In alternative embodiments, the processor uses the Fokker-Planck equation without Hamiltonian and velocity and applies velocity drift field directly through odometry which reduces the dimension by a factor of two. The map of the environment for this example is given in FIG. 50, wherein the white space is the area accessible to the modular robot. The map describes the domain for $q_1$, $q_2\in D$. In this example, the velocity is limited to $p_1$, $p_2\in[-1,1]$. The processor models the initial probability density $\rho(p, q, 0)$ as Gaussian, wherein $\rho$ is a four-dimensional function. FIGS. 51A-51C illustrate the evolution of $\rho$ reduced to the $q_1$, $q_2$ space at three different time points (i.e., the density integrated over $p_1$, $p_2$, $\rho_{red}=\iint\rho(p_1, p_2, q_1, q_2)dp_1dp_2$). It can be seen that with increased time, the initial density focused in the middle of the map starts to flow into other rooms. FIGS. 52A-52C illustrate the evolution of p reduced to the $p_1$, $q_1$ space and FIGS. 53A-53C illustrate the evolution of p reduced to the $p_2$, $q_2$ space at the same three different time points to show how velocity evolves over time with position. The four-dimensional example is repeated but with the addition of floor sensor data observations. FIG. 54 illustrates a map of the environment indicating different floor types 5400, 5401, 5402, and 5403 with respect to $q_1$, $q_2$. Given that the sensor has no error, the processor may strongly predict the area within which the modular robot is located based on the measured floor type, at which point all other hypothesized locations of the modular robot become invalid. For example, the processor may use the distribution $$m(p_1, p_2, q_1, q_2) = \begin{cases} \text{const} > 0, q_1, q_2 \text{ with the observed floor type} \\ 0, \text{else} \end{cases}.$$

If the sensor has an average error rate $\epsilon$, the processor may use the distribution $$m(p_1, p_2, q_1, q_2) = \begin{cases} c_1 > 0, q_1, q_2 \text{ with the observed floor type} \\ c_2 > 0, \text{else} \end{cases}$$

Figure 55:
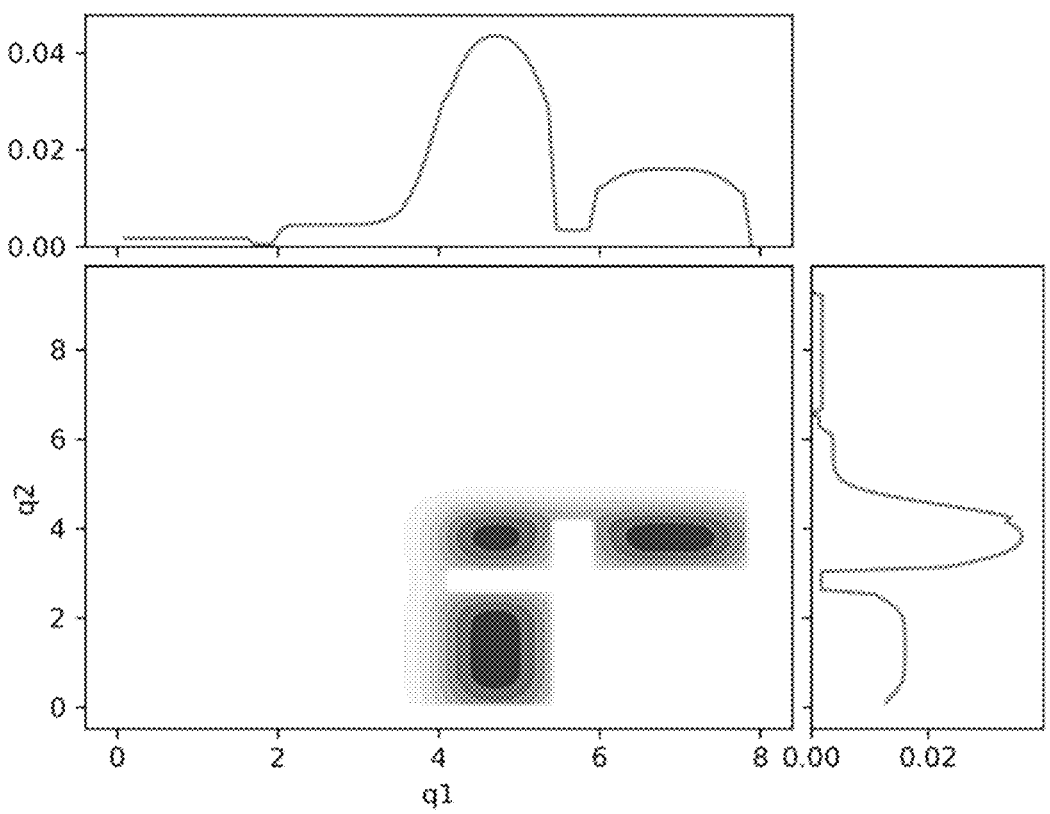
FIG. 55 illustrates an example of an updated probability density after observing floor type, according to some embodiments.
Figure 56:
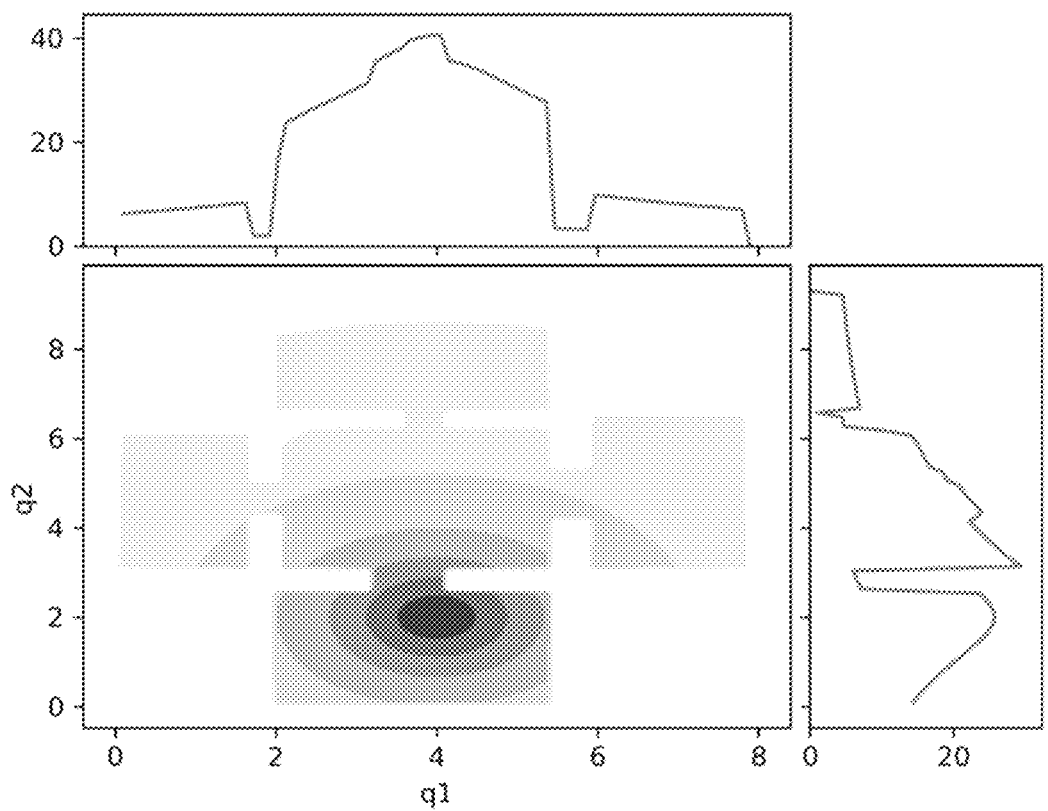
FIG. 56 illustrates an example of a Wi-Fi map, according to some embodiments.
Figure 57:
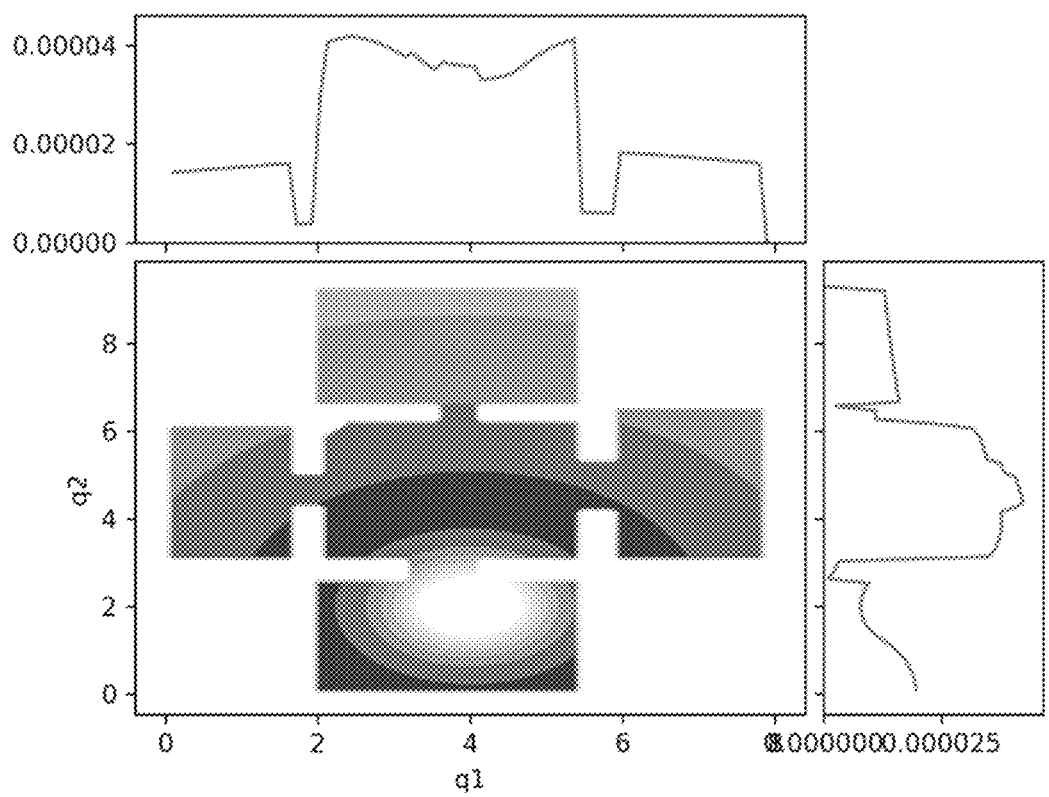
FIG. 57 illustrates an example of an updated probability density after observing Wi-Fi strength, according to some embodiments.
Figure 58:
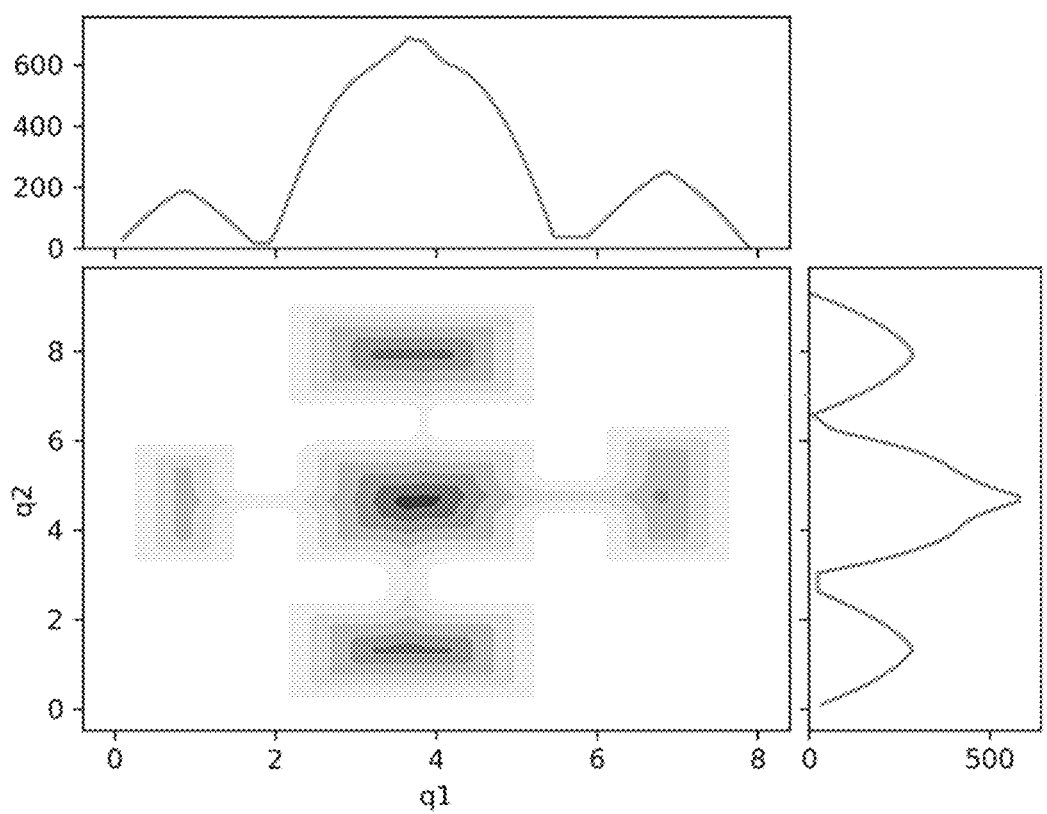
FIG. 58 illustrates an example of a wall distance map, according to some embodiments.
Figure 59:
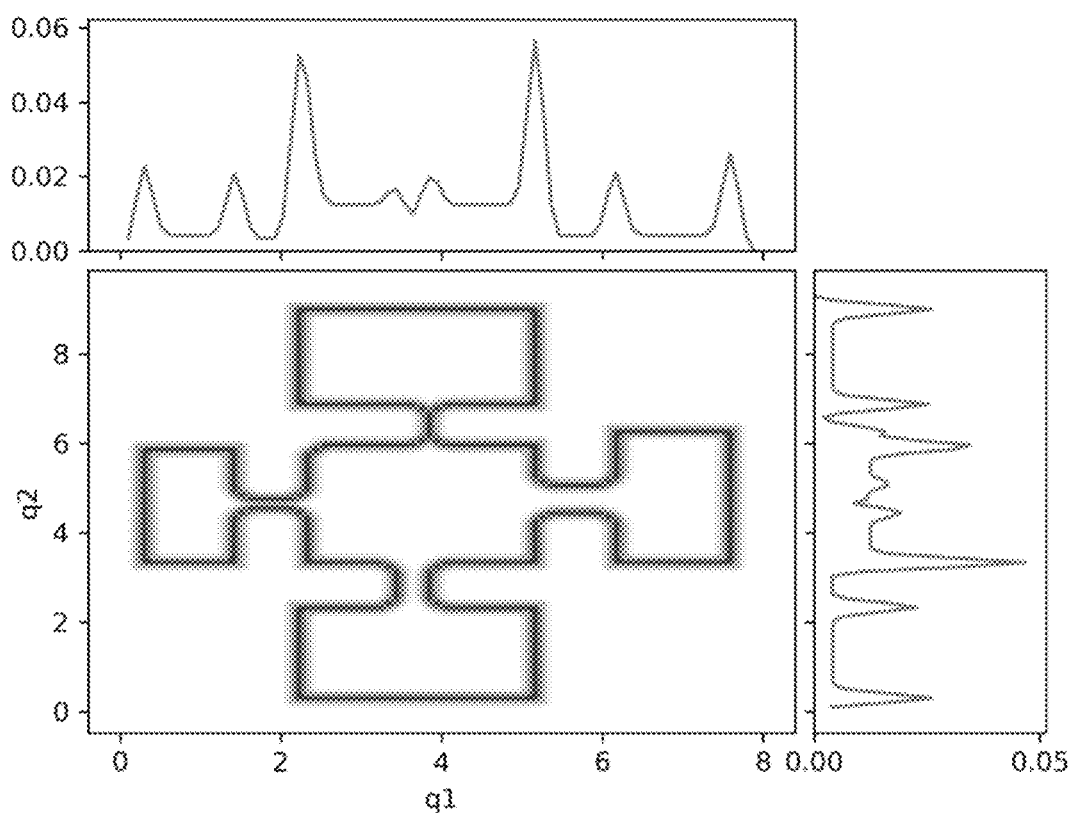
FIG. 59 illustrates an example of an updated probability density after observing distances to a wall, according to some embodiments.

With $c_1$, $c_2$ chosen such that $\int_p\int_{D_{obs}} md(q_1, q_2)d(p_1, P_2)=1-\epsilon$ and $\int_p\int_{D_{obs}^c} md(q_1, q_2)d(p_1,p_2)=\epsilon$. $D_{obs}$ is the $q_1$, $q_2$ with the observed floor type and $D_{obs}^c$ is its complement. By construction, the distribution m has a probability $1-\epsilon$ for $q_1$, $q_2 \in D_{obs}$ and probability $\epsilon$ for $q_1, q_2 \in D_{obs}^c$. Given that the floor sensor measures floor type 5402, the processor updates the probability distribution for position as shown in FIG. 55. Note that the corners of the distribution were smoothened by the processor using a Gaussian kernel, which corresponds to an increased error rate near the borders of an area. Next, Wi-Fi signal strength observations are considered. Given a map of the expected signal strength, such as that in FIG. 56, the processor may generate a density describing the possible location of the modular robot based on a measured Wi-Fi signal strength. The darker areas in FIG. 56 represent stronger Wi-Fi signal strength and the signal source is at $q_1$, $q_2$=4.0, 2.0. Given that the modular robot measures a Wi-Fi signal strength of 0.4, the processor generates the probability distribution for position shown in FIG. 57. The likely area of the modular robot is larger since the Wi-Fi signal does not vary very much. For wall distance measurements, a wall distance map, such as that shown in FIG. 58 may be used by the processor to approximate the area of the modular robot given a distance measured. Given that the modular robot measures a distance of 3 distance units, the processor generates the probability distribution for position shown in FIG. 59. For example, the processor evolves the Fokker-Planck equation over time and as observations are successively taken, the processor re-calculates the density function with each observation wherein parts that do not match the observation are considered less likely and parts that highly match the observations relatively increase in probability. An example of observations over time may be, t=1: observe $p_2$=0.75; t=2: observe $p_2$=0.95 and Wi-Fi signal strength 0.56; t=3: observe wall distance 9.2; t=4: observe floor type 2; t=5: observe floor type 2 and Wi-Fi signal strength 0.28; t=6: observe wall distance 3.5; t=7: observe floor type 4, wall distance 2.5, and Wi-Fi signal strength 0.15; t=8: observe floor type 4, wall distance 4, and Wi-Fi signal strength 0.19; t=8.2: observe floor type 4, wall distance 4, and Wi-Fi signal strength 0.19.

Figure 60:
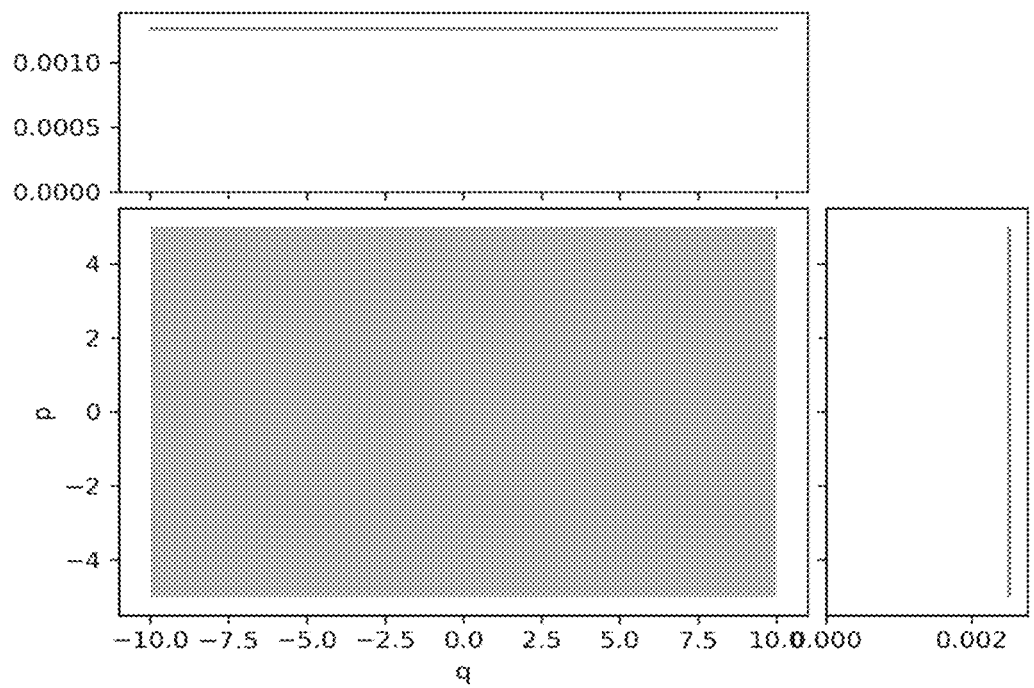
FIGS. 60-63 illustrate an example of an evolution of a probability density of a position of a robotic device as it moves and observes doors, according to some embodiments.
Figure 61:
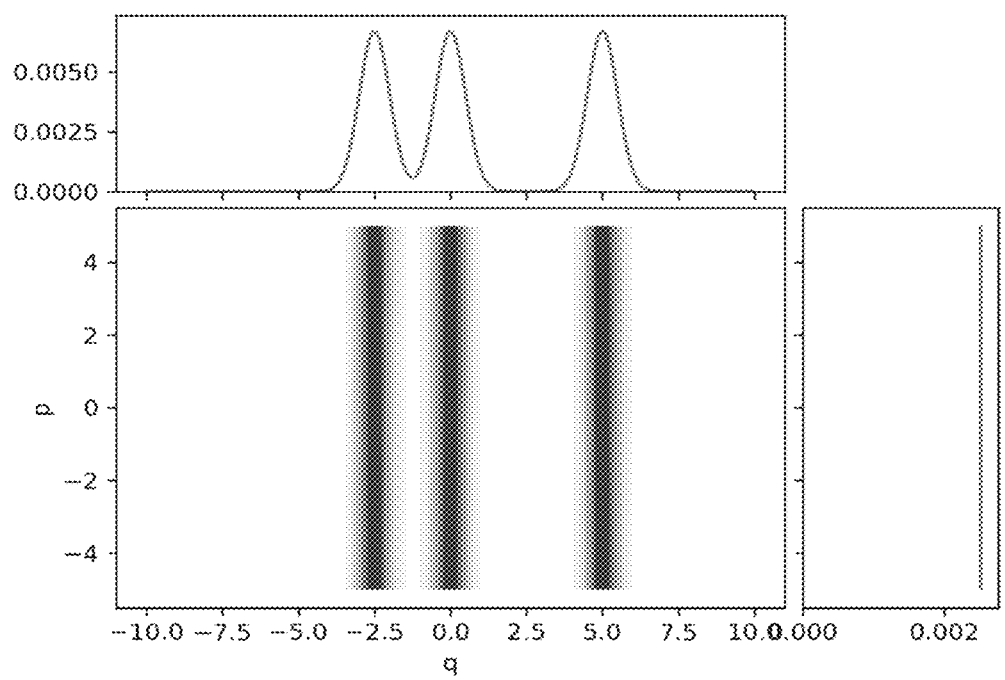
Figure 62:
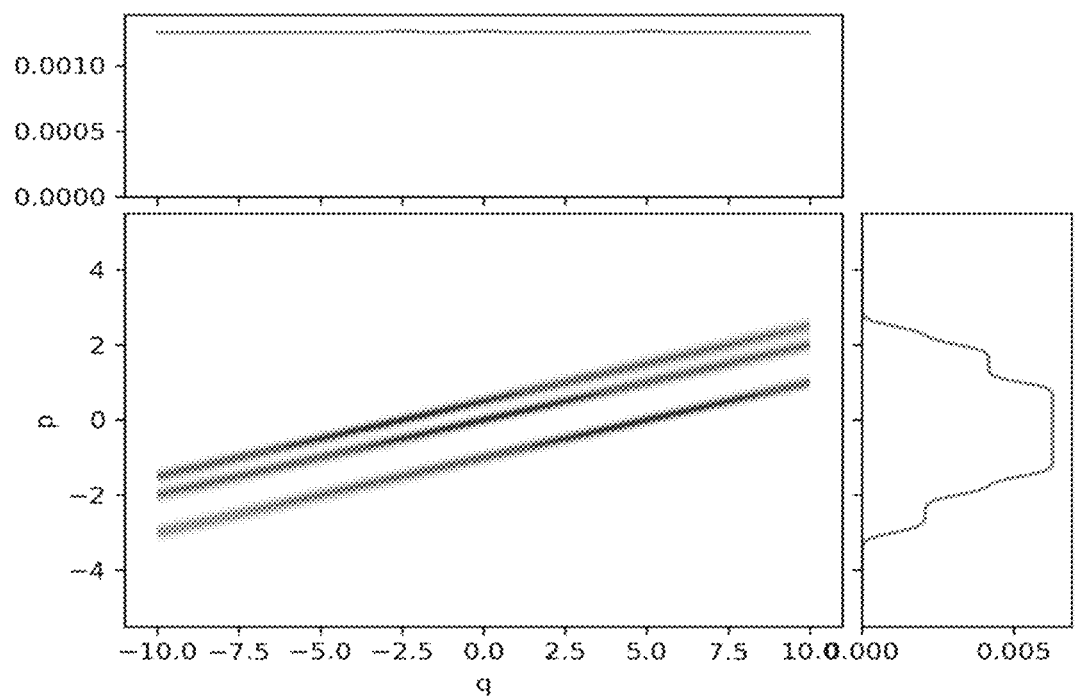
Figure 63:
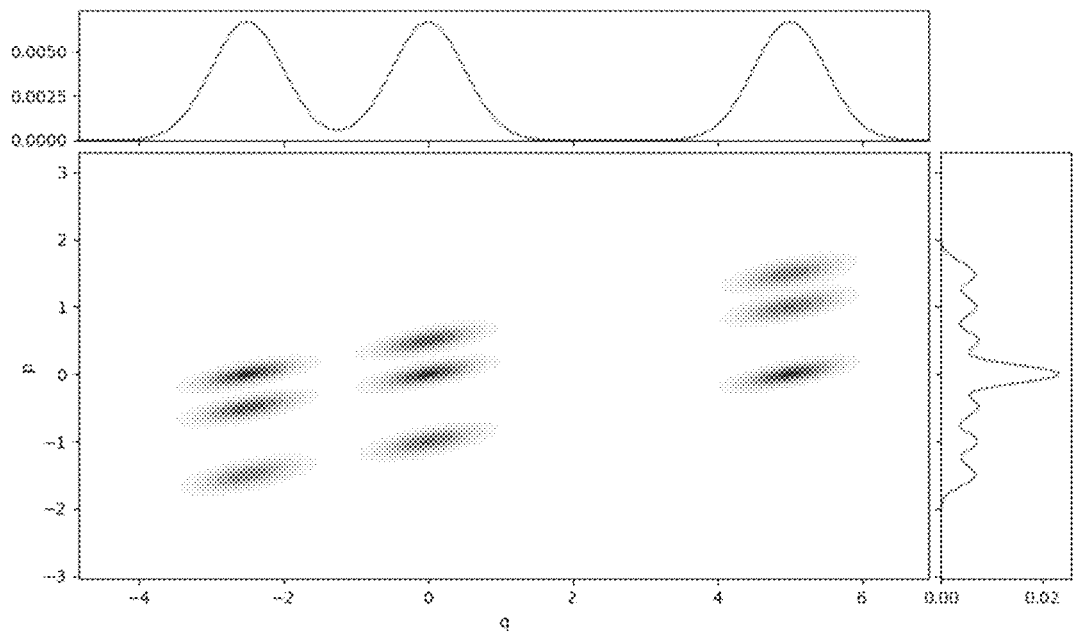

In another example, the modular robot navigates along a long floor (e.g., x-axis, one-dimensional). The processor models the floor using Liouville's equation $$\frac{\partial \rho}{\partial t} = -\{\rho, H\}$$

with Hamiltonian $$H = \frac{1}{2}p^2$$

wherein $q \in [-10, 10]$ and $p \in [-5, 5]$. The floor has three doors at $q_0=-2.5$, $q_1=0$, and $q_2=5.0$ and the processor is capable of determining when it is located at a door based on sensor data observed and the momentum of the modular robot is constant, but unknown. Initially the location of the modular robot is unknown, therefore the processor generates an initial state density such as that in FIG. 60. When the processor determines the modular robot is in front of a door, the possible location of the modular robot is narrowed down, but not the momentum. Therefore, the processor may update the probability density to that shown in FIG. 61. The processor evolves the probability density, and after five seconds the probability is as shown in FIG. 62, wherein the uncertainty in the position space has spread out again given that the momentum is unknown. However, the evolved probability density keeps track of the correlation between position and momentum. When the processor determines the modular robot is in front of a door again, the probability density is updated to FIG. 63, wherein the density has significantly narrowed down, indicating a number of peaks representing possible location and momentum combinations of the modular robot. For the left door, there is equal likelihood for p=0, p=−0.5, and p=−1.5. These momentum values correspond with the modular robot travelling from one of the three doors in five seconds. This is seen for the other two doors as well.

In some embodiments, the processor models motion of the modular robot using equations $\dot{x}=v \cos \omega$, $\dot{y}=v \sin \omega$, and $\dot{\theta}=\omega$, wherein $v$ and $\omega$ are translational and rotational velocities, respectively. In some embodiments, translational and rotational velocities of the modular robot are computed using observed wheel angular velocities $\omega_l$ and $\omega_r$ using $$\begin{pmatrix} v \\ \omega \end{pmatrix} = J \begin{pmatrix} \omega_l \\ \omega_r \end{pmatrix} = \begin{pmatrix} r_l/2 & r_r/2 \\ -r_l/b & r_r/b \end{pmatrix},$$

wherein J is the Jacobian, $r_l$ and $r_r$ are the left and right wheel radii, respectively and b is the distance between the two wheels. Assuming there are stochastic forces on the wheel velocities, the processor evolves the probability density $\rho=(x, y, \theta, \omega_l, \omega_r)$ using $$\frac{\partial \rho}{\partial t} = -\begin{pmatrix} v \cos \theta \\ v \cos \theta \\ \omega \end{pmatrix} \cdot \nabla_q \rho + \nabla_p \cdot (D \nabla_p \rho)$$

wherein $$D = \frac{1}{2} \sigma_N \sigma_N^T$$

is a 2-by-2 diffusion tensor, $q=(x, y, \theta)$ and $p=(\omega_l, \omega_r)$. In some embodiments, the domain is obtained by choosing x, y in the map of the environment, $\theta \in [0, 2\pi)$, and $\omega_l, \omega_r$ as per the modular robot specifications. In some embodiments, solving the equation may be a challenge given it is five-dimensional. In some embodiments, the model may be reduced by replacing odometry by Gaussian density with mean and variance. This reduces the model to a three-dimensional density $\rho=(x,y,\theta)$. In some embodiments, independent equations may be formed for $\omega_l, \omega_r$ by using odometry and inertial measurement unit observations. For example, taking this approach reduces the system to one three-dimensional partial differential equation and two ordinary differential equations. The processor then evolves the probability density over time using $$\frac{\partial \rho}{\partial t} = -\begin{pmatrix} \overline{v} \cos \theta \\ \overline{v} \cos \theta \\ \overline{\omega} \end{pmatrix} \cdot \nabla \rho + \nabla \cdot (D \nabla \rho), t > 0$$

wherein $$D = \begin{pmatrix} dv^2\cos^2\theta & dv^2\sin\theta\cos\theta & 0 \\ dv^2\sin\theta\cos\theta & dv^2\sin^2\theta & 0 \\ 0 & 0 & d\omega^2 \end{pmatrix},$$

$\bar{v}, \bar{\omega}$ represent the current mean velocities, and dv, dω the current deviation. In some embodiments, the processor determines $\bar{v}, \bar{\omega}$ from the mean and deviation of the left and right wheel velocities $\omega_L$ and $\omega_R$ using $$\begin{pmatrix} \bar{v} \\ \bar{\omega} \end{pmatrix} = J \begin{pmatrix} \bar{\omega}_L \\ \bar{\omega}_R \end{pmatrix}.$$

In some embodiments, the processor uses Neumann boundary conditions for x, y and periodic boundary conditions for θ.

Figure 64:
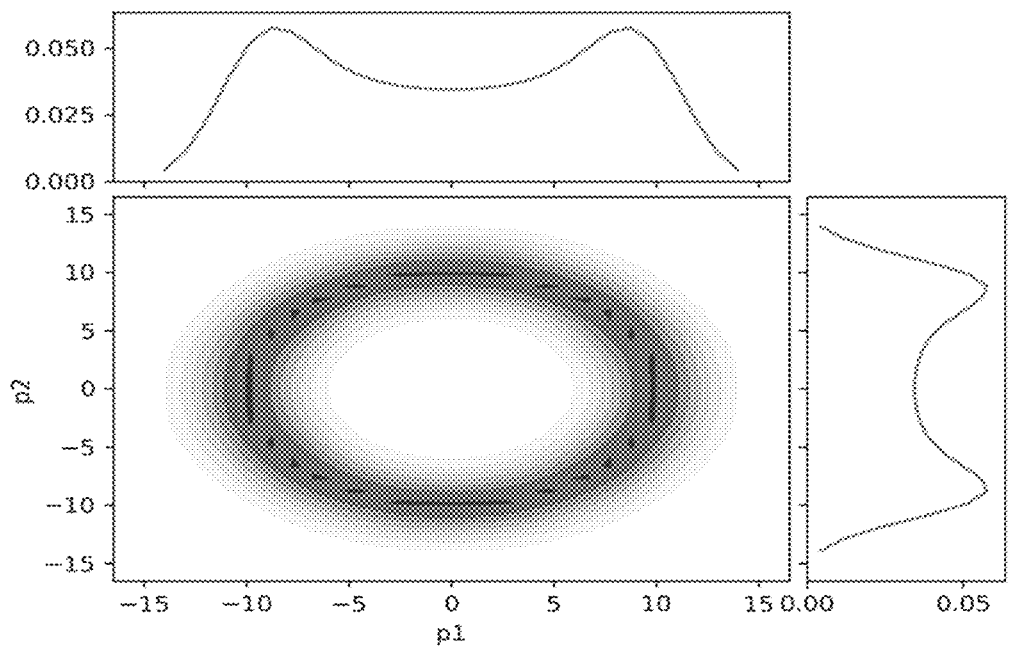
FIG. 64 illustrates an example of a velocity observation probability density, according to some embodiments.
Figure 65:
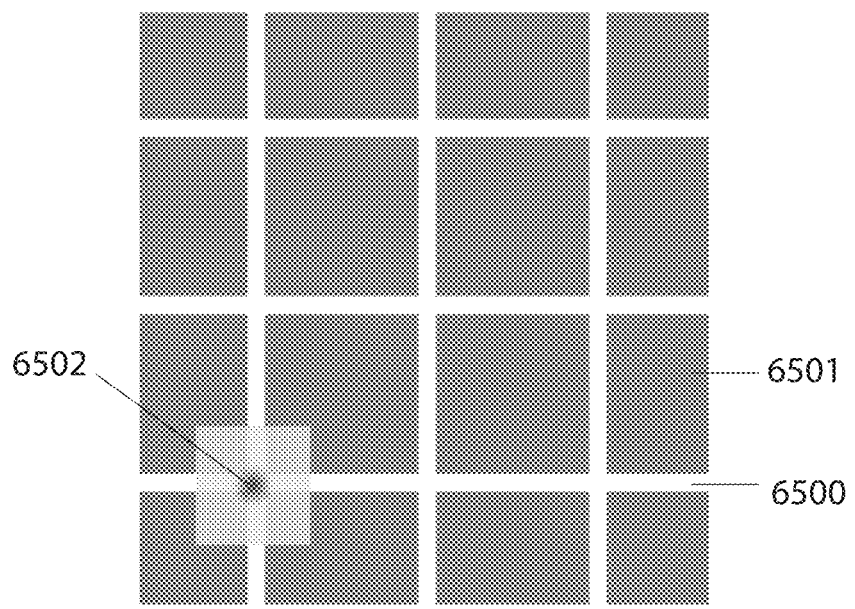
FIG. 65 illustrates an example of a road map, according to some embodiments.

In another example, the processor localizes a modular robot with position coordinate q=(x, y) and momentum coordinate p=p$_y$). For simplification, the mass of the modular robot is 1.0, the earth is assumed to be planar, and q is a position with reference to some arbitrary point and distance. Thus, the processor evolves the probability density ρ over time according to $$\frac{\partial \rho}{\partial t} = -p \cdot \nabla_q \rho + \nabla_p \cdot (D\nabla_p \rho),$$

wherein D is as defined above. The processor uses a moving grid, wherein the general location of the modular robot is only known up to a certain accuracy (e.g., 100 m) and the grid is only applied to the known area. The processor moves the grid along as the probability density evolves over time, centering the grid at the approximate center in the q space of the current probability density every couple time units. Given that momentum is constant over time, the processor uses an interval [−15, 15]×[−15, 15], corresponding to maximum speed of 15 m/s in each spatial direction. The processor uses velocity and GPS position observations to increase accuracy of approximated localization of the modular robot. Velocity measurements provide no information on position, but provide information on $p_x^2 + p_y^2$, the circular probability distribution in the p space, as illustrated in FIG. 64 with |p|=10 and large uncertainty. GPS position measurements provide no direct momentum information but provides a position density. The processor further uses a road map to exclude impossible states of the modular robot. For instance, it is impossible to drive through buildings and if the velocity is high there is a higher likelihood that the modular robot is on specific roads. FIG. 65 illustrates a road map used by the processor in this example, wherein white areas 6500 indicate roads and gray areas 6501 indicate no roads and the maximum off road speed is ±5 m/s. Position 6502 is the current probability density collapsed to the $q_1, q_2$ space. In combining the road map information with the velocity observations, the processor determines that is highly unlikely that with an odometry measurement of |p|=10 that the modular robot is in a position off the road. In some embodiments, other types of information may be used to improve accuracy of localization. For example, a road map to correlate position and velocity, distance to and probability density of other modular robots using similar technology, Wi-Fi map to extract position, and video footage to extract position.

In some embodiments, the processor uses finite differences methods (FDM) to numerically approximate partial differential equations of the form $$\frac{\partial \rho}{\partial t} = -\{\rho, H\} + \nabla_p \cdot (D\nabla_p \rho).$$

Numerical approximation has two components, discretization in space and in time. The finite difference method relies on discretizing a function on a uniform grid. Derivatives are then approximated by difference equations. For example, a convection-diffusion equation in one dimension and u(x, t) with velocity v, diffusion coefficient a, $$\frac{\partial u}{\partial t} = a\frac{\partial^2 u}{\partial x^2} - v\frac{\partial u}{\partial x}$$

on a mesh $x_0, \ldots, x_J$, and times $t_0, \ldots, t_N$ may be approximated by a recurrence equation of the form $$\frac{u_j^{n+1} - u_j^n}{k} = a\frac{u_{j+1}^n - 2u_j^n + u_{j-1}^n}{h^2} - v\frac{u_{j+1}^n - u_{j-1}^n}{2h}$$

with space grid size h and time step k and $u_j^n \approx u(x_j, t_n)$. The left hand side of the recurrence equation is a forward difference at time $t_n$, and the right hand side is a second-order central difference and a first-order central difference for the space derivatives at $x_j$, wherein $$\frac{u_j^{n+1} - u_j^n}{k} \approx \frac{\partial u(x_j, t_n)}{\partial t}, \frac{u_{j+1}^n - 2u_j^n + u_{j-1}^n}{h^2} \approx \frac{\partial^2 u(x_j, t_n)}{\partial x^2},$$

and $$\frac{u_{j+1}^n - u_{j-1}^n}{2h} \approx \frac{\partial u(x_j, t_n)}{\partial x}.$$

This is an explicit method, since the processor may obtain the new approximation $u_j^{n+1}$ without solving any equations. This method is known to be stable for $$h < \frac{2a}{v} \text{ and } k < \frac{h^2}{2a}.$$

The stability conditions place limitations on the time step size k which may be a limitation of the explicit method scheme. If instead the processor uses a central difference at time $$t_{n+\frac{1}{2}},$$

the recurrence equation is $$\frac{u_j^{n+1} - u_j^n}{k} = \frac{1}{2}\left(a\frac{u_{j+1}^{n+1} - 2u_j^{n+1} + u_{j-1}^{n+1}}{h^2} - v\frac{u_{j+1}^{n+1} - u_{j-1}^{n+1}}{2h} + a\frac{u_{j+1}^n - 2u_j^n + u_{j-1}^n}{h^2} - v\frac{u_{j+1}^n - u_{j-1}^n}{2h}\right),$$

know as the Crank-Nicolson method. The processor obtains the new approximation $u_j^{n+1}$ by solving a system of linear equations, thus, the method is implicit and is numerically stable if $$k < \frac{h^2}{a}.$$

In a similar manner, the processor may use a backward difference in time, obtaining a different implicit method $$\frac{u_j^{n+1} - u_j^n}{k} = a\frac{u_{j+1}^{n+1} - 2u_j^{n+1} + u_{j-1}^{n+1}}{h^2} - v\frac{u_{j+1}^{n+1} - u_{j-1}^{n+1}}{2h},$$

which is unconditionally stable for an time step, however, the truncation error may be large. While both implicit methods are less restrictive in terms of time step size, they usually require more computational power as they require solving a system of linear equations at each time step. Further, since the difference equations are based on a uniform grid, the finite difference method places limitations on the shape of the domain.

In some embodiments, the processor uses finite element methods (FEM) to numerically approximate partial differential equations of the form $$\frac{\partial \rho}{\partial t} = -\{\rho, H\} + \nabla_p \cdot (D\nabla_p \rho).$$

In general, the finite element method formulation of the problem results in a system of algebraic equations. This yields approximate values of the unknowns at discrete number of points over the domain. To solve the problem, it subdivides a large problem into smaller, simpler parts that are called finite elements. The simple equations that model these finite elements are then assembled into a larger system of equations that models the entire problem. The method involves constructing a mesh or triangulation of the domain, finding a weak formulation of the partial differential equation (i.e., integration by parts and Green's identity), and deciding for solution space (e.g., piecewise linear on mesh elements). This leads to a discretized version in form of a linear equation. Some advantages over finite differences method includes complicated geometries, more choice in approximation leads, and, in general, to a higher quality of approximation. For example, the processor uses the partial differential equation $$\frac{\partial \rho}{\partial t} = L\rho,$$

with differential operator, e.g., $L=-\{\cdot,H\}+\nabla_p\cdot(D\nabla_p)$. The processor discretizes the abstract equation in space (e.g., by FEM or FDM)

$$\frac{\partial \overline{\rho}}{\partial t} = \overline{L}\overline{\rho},$$

wherein $\overline{\rho}$, $\overline{L}$ are the projections of $\rho$, L on the discretized space. The processor discretizes the equation in time using a numerical time integrator (e.g., Crank-Nicolson)

$$\frac{\overline{\rho}^{n+1} - \overline{\rho}^n}{h} = \frac{1}{2}(\overline{L}\overline{\rho}^{n+1} + \overline{L}\overline{\rho}^n),$$

leading to the equation $$\left(I - \frac{h}{2}\overline{L}\right)\overline{\rho}^{n+1} = \left(I + \frac{h}{2}\overline{L}\right)\overline{\rho}^n,$$

which the processor solves. In a fully discretized system, this is a linear equation. Depending on the space and discretization, this will be a banded, sparse matrix. In some embodiments, the processor employs alternating direction implicit (ADI) splitting to ease the solving process. In FEM, the processor may discretize the space using a mesh, construct a weak formulation involving a test space, and solve its variational form. In FDM, the processor discretizes the derivatives using differences on a lattice grid of the domain. In some instances, the processor may implement FEM/FDM with backward differential formulation (BDF)/Radau (Marlis recommendation), for example mesh generation then construct and solve variational problem with backwards Euler. In other instances, the processor implements FDM with ADI, resulting in a banded, tri-diagonal, symmetric, linear system. The processor may use an upwind scheme if Peclet number (i.e., ratio advection to diffusion) is larger than 2 or smaller than −2.

Boundary conditions are essential in solving the partial differential equations. Boundary conditions are a set of constraints that determine what happens at the boundary of the domain while the partial differential equation describe the behaviour within the domain. In some embodiments, the processor uses one or more the following boundary conditions: reflecting, zero-flux (i.e., homogenous Neumann boundary conditions)

$$\frac{\partial \rho}{\partial \vec{n}} = 0 \text{ for } p, q \in \partial D, \vec{n}$$

unit normal vector on boundary; absorbing boundary conditions (i.e., homogenous Dirichlet boundary conditions) $\rho=0$ for p, $q\in \partial D$; and constant concentration boundary conditions (i.e., Dirichlet) $\rho=\beta_0$ for p, $q\in \partial D$. To integrate the boundary conditions into FDM, the processor modifies the difference equations on the boundary, and when using FEM, they become part of the weak form (i.e., integration by parts) or are integrated in the solution space. In some embodiments, the processor uses Fenics for an efficient solution to partial differential equations.

In some embodiments, the processor uses quantum SLAM. In some embodiments, the processor may determine a probability density over all possible states of the modular robot using a complex-valued wave function for a single-particle system $\Psi(\vec{r}, t)$, wherein $\vec{r}$ may be a vector of space coordinates. In some embodiments, the wave function $\Psi(\vec{r}, t)$ is proportional to the probability density that the particle will be found at a position $\vec{r}$ i.e. $\rho(\vec{r}, t)=|\Psi(\vec{r},t)|^2$. In some embodiments, the processor normalizes the wave function which is equal to the total probability of finding the particle, or in this case the modular robot, somewhere. The total probability of finding the modular robot somewhere adds up to unity $\int |\Psi(\vec{r},t)|^2 d\tau=1$. In some embodiments, the processor may apply Fourier transform to the wave function $\Psi(\vec{r}, t)$ to yield the wave function $\Phi(\vec{p}, t)$ in the momentum space, with associated momentum probability distribution $\sigma(\vec{p}, t)=\Phi|(\vec{p}, t)|^2$. In some embodiments, the processor may evolve the wave function $\Psi(\vec{r}, t)$ using Schrödinger equation $$i\hbar \frac{\partial}{\partial t}\Psi(\vec{r}, t) = \left[-\frac{\hbar^2}{2m}\nabla^2 + V(\vec{r})\right]\Psi(\vec{r}, t),$$

wherein the bracketed object is the Hamilton operator $$\hat{H} = -\frac{\hbar^2}{2m}\nabla^2 + V(\vec{r}),$$

i is me imaginary unit, h is the reduced Planck constant, $\nabla^2$ is the Laplacian, and $V(\vec{r})$ is the potential. An operator is a generalization of the concept of a function and transforms one function into another function. For example, the momentum operator $\hat{p}=-i\hbar\nabla$ and that is why $$-\frac{\hbar^2}{2m}\nabla^2$$

corresponds to kinetic energy. The Hamiltonian function $$H = \frac{p^2}{2m} + V(\vec{r})$$

has corresponding Hamilton operator $$\hat{H} = -\frac{\hbar^2}{2m}\nabla^2 + V(\vec{r}).$$

For conservative systems (constant energy), the time-dependent factor may be separated from the wave function $$\left(e.g., \Psi(\vec{r}, t) = \Phi(\vec{r})e^{-\frac{iEt}{\hbar}}\right.,$$

giving the time-independent Schrodinger equation $$\left[-\frac{\hbar^2}{2m}\nabla^2 + V(\vec{r})\right]\Phi(\vec{r}) = E\Phi(\vec{r}),$$

or otherwise $\hat{H}\Phi=E\Phi$, an eigenvalue equation with eigenfunctions and eigenvalues. The eigenvalue equation provides a basis given by the eigenfunctions $\{\varphi\}$ of the Hamiltonian. Therefore, in some embodiments, the wave function is given by $\Psi(\vec{r}, t)=\Sigma_k c_k(t)\varphi_k(\vec{r})$, corresponding to expressing the wave function in the basis given by energy eigenfunctions. Substituting this equation into the Schrodinger equation, $$c_k(t) = c_k(0)e^{-\frac{iE_k t}{\hbar}}$$

wherein $E_k$ is the eigen-energy to the eigenfunction $\varphi_k$. For example, the probability of measuring a certain energy $E_k$ at time t is given by the coefficient of the eigenfunction $\varphi_k$, $$|c_k(t)|^2 = \left|c_k(0)e^{-\frac{iE_k t}{\hbar}}\right|^2 = |c_k(0)|^2.$$

Thus, the probability for measuring the given energy is constant over time. However, this is only true for the energy eigenvalues, not for other observables. Instead, the probability of finding the system at a certain position $\rho(\vec{r})=|\Psi(\vec{r}, t)|^2$ may be used.

The wave function $\psi$ is an element of a complex Hilbert space H, which is a complete inner product space. Every physical property is associated with a linear, Hermitian operator acting on that Hilbert space. A wave function, or quantum state, may be regarded as an abstract vector in a Hilbert space. In some embodiments, $\psi$ is denoted by the symbol $|\psi\rangle$ (i.e., ket), and correspondingly, the complex conjugate $\phi^*$ is denoted by $\langle\phi|$ (i.e., bra). The integral over the product of two functions is analogous to an inner product of abstract vectors, $\int\phi^*\psi d\tau=\langle\phi|\cdot|\psi\rangle \equiv \langle\phi|\psi\rangle$. In some embodiments, $\langle\phi|$ and $|\psi\rangle$ are state vectors of a system and the processor determines the probability of finding $\langle\phi|$ in state $|\psi\rangle$ using $p(\langle\phi|, |\psi\rangle)=|\langle\phi|\psi\rangle|^2$. For a Hermitian operator $\hat{A}$ eigenkets and eigenvalues are denoted $A|n\rangle=a_n|n\rangle$, wherein $|n\rangle$ is the eigenket associated with the eigenvalue $a_n$. For a Hermitian operator, eigenvalues are real numbers, eigenkets corresponding to different eigenvalues are orthogonal, eigenvalues associated with eigenkets are the same as the eigenvalues associated with eigenbras, i.e. $\langle n|A=\langle n|a_n$. For every physical property (energy, position, momentum, angular momentum, etc.) there exists an associated linear, Hermitian operator $\hat{A}$ (called am observable) which acts on the Hilbert space H. Given A has eigenvalues $a_n$ and eigenvectors $|n\rangle$, and a system in state 144, the processor determines the probability of obtaining $a_n$ as an outcome of a measurement of A using $p(a_n)=|\langle n|\phi\rangle|^2$. In some embodiments, the processor evolves the time-dependent Schrodinger equation using $$i\hbar\frac{\partial|\psi\rangle}{\partial t} = \hat{H}|\psi\rangle.$$

Given a state $|\phi\rangle$ and a measurement of the observable A, the processor determines the expectation value of A using $\langle A \rangle = \langle \phi | A \phi \rangle$, corresponding to $$\langle A \rangle = \frac{\int \phi^* \hat{A} \phi d\tau}{\int \phi^* \phi d\tau}$$

for observation operator $\hat{A}$ and wave function $\phi$. In some embodiments, the processor updates the wave function when observing some observable by collapsing the wave function to the eigenfunctions, or eigenspace, corresponding to the observed eigenvalue.

As described above, for localization of the modular robot, the processor evolves the wave function $\Psi(\vec{r}, t)$ using the Schrödinger equation $$i\hbar \frac{\partial}{\partial t} \Psi(\vec{r}, t) = \left[ -\frac{\hbar^2}{2m} \nabla^2 + V(\vec{r}) \right] \Psi(\vec{r}, t).$$

In some embodiments, a solution is written in terms of eigenfunctions $\psi_n$ with eigenvalues $E_n$ of the time-independent Schrodinger equation $H\psi_n = E_n \psi_n$, wherein $\Psi(\vec{r}, t) = \Sigma_{c_n} c_n e^{-iE_n t/\hbar} \psi_n$ and $c_n = \int \Psi(\vec{r}, 0) \psi^*_n dr$. In some embodiments, the time evolution is expressed as a time evolution via a unitary operator $U(t)$, $\Psi(\vec{r}, t) = U(t)\Psi(\vec{r}, 0)$ wherein $U(t) = e^{-iHt/\hbar}$. In some embodiments, the probability density of the Hilbert space may be updated by the processor each time an observation or measurement is received by the processor. For each observation with observation operator A the processor may perform an eigen-decomposition $A\omega_n = a_n \omega_n$, wherein the eigenvalue corresponds to the observed quantity. In some embodiments, the processor observes a value a with probability $0 \leq p < 1$. In some embodiments, wherein the operator has a finite spectrum or a single eigenvalue is observed, the processor may collapse to the eigenfunction(s) with corresponding probability $$\Psi(\vec{r}, t) \rightarrow \gamma \sum_{n=1}^{N} p(a_n) d_n \omega_n,$$

wherein $d_n = \int \omega^*_n \Psi dr$, p(a) is the probability of observing value a, and $\gamma$ is a normalization constant. In some embodiments, wherein the operator has continuous spectrum, the summation may be replaced by an integration $\Psi(\vec{r}, t) \rightarrow \gamma \int p(a) d_n \omega_n da$, wherein $d_n = \int \omega^*_n \Psi dr$.

For example, consider a modular robot confined to move within an interval $$\left[ -\frac{1}{2}, \frac{1}{2} \right].$$

For simplicity, the processor sets $\hbar = m = 1$, and an infinite well potential and the regular kinetic energy term are assumed. The processor solves the time-independent Schrodinger equations, resulting in wave functions $$\psi_n = \begin{cases} \sqrt{2} \sin\left(k_n\left(x + \frac{1}{2}\right)\right) e^{-i\omega_n t}, & -\frac{1}{2} < x < \frac{1}{2}, \\ 0, & \text{otherwise} \end{cases}$$

wherein $k_n = n\pi$ and $E_n = \omega_n = n^2 \pi^2$. In the momentum space this corresponds to the wave functions $$\phi_n(p, t) = \frac{1}{\sqrt{2\pi}} \int_{-\infty}^{\infty} \psi_n(x, t) e^{-ipx} dx = \frac{1}{\sqrt{\pi}} \frac{n\pi}{n\pi + p} \text{sinc}\left(\frac{1}{2}(n\pi - p)\right).$$

The processor takes suitable functions and computes an expansion in eigenfunctions. Given a vector of coefficients, the processor computes the time evolution of that wave function in eigenbasis. In another example, consider a modular robot free to move on an x-axis. For simplicity, the processor sets $\hbar = m = 1$. The processor solves the time-independent Schrodinger equations, resulting in wave functions $$\psi_E(x, t) = A e^{\frac{i(px - Et)}{\hbar}},$$

wherein energy $$E = \frac{\hbar^2 k^2}{2m}$$

and momentum $p = \hbar k$. For energy E there are two independent, valid functions with $\pm p$. Given the wave function in the position space, in the momentum space, the corresponding wave functions are $$\phi_E(p, t) = e^{\frac{i(px - Et)}{\hbar}},$$

which are the same as the energy eigenfunctions. For a given initial wave function $\psi(x, 0)$, the processor expands the wave function into momentum/energy eigenfunctions $$\phi(p) = \frac{1}{\sqrt{2\pi\hbar}} \int \psi(x, 0) e^{-\frac{ipx}{\hbar}} dx,$$

then the processor gets time dependence by taking the inverse Fourier resulting in $$\psi(x, t) = \frac{1}{\sqrt{2\pi\hbar}} \int \phi(p) e^{\frac{ipx}{\hbar}} e^{-\frac{iEt}{\hbar}} dp.$$

Figure 66A:
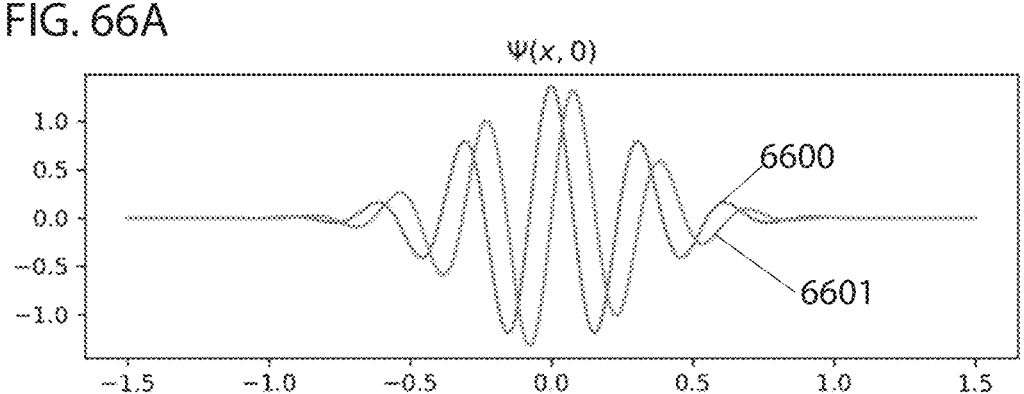
FIGS. 66A-66D illustrate an example of a wave packet, according to some embodiments.
Figure 66B:
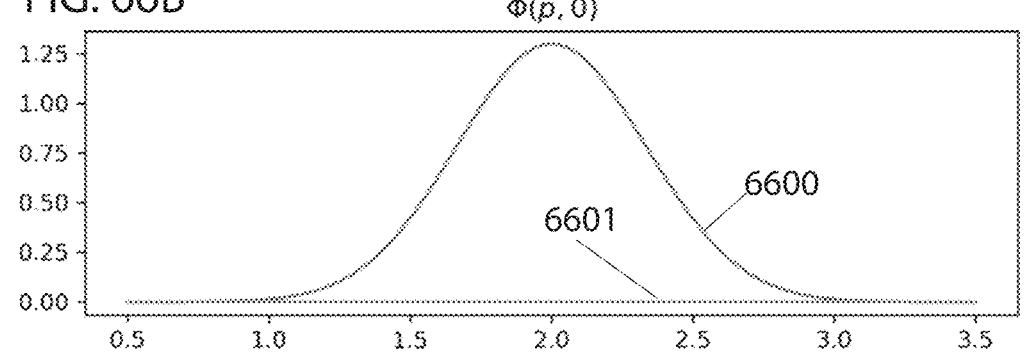
Figure 66C:
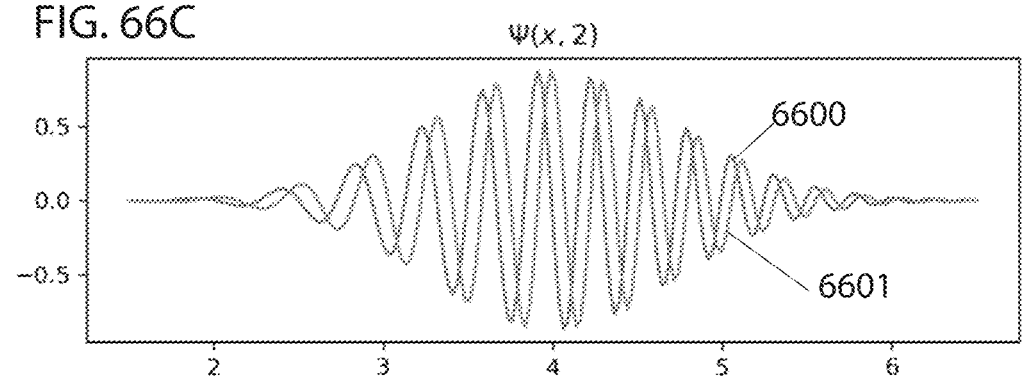
Figure 66D:
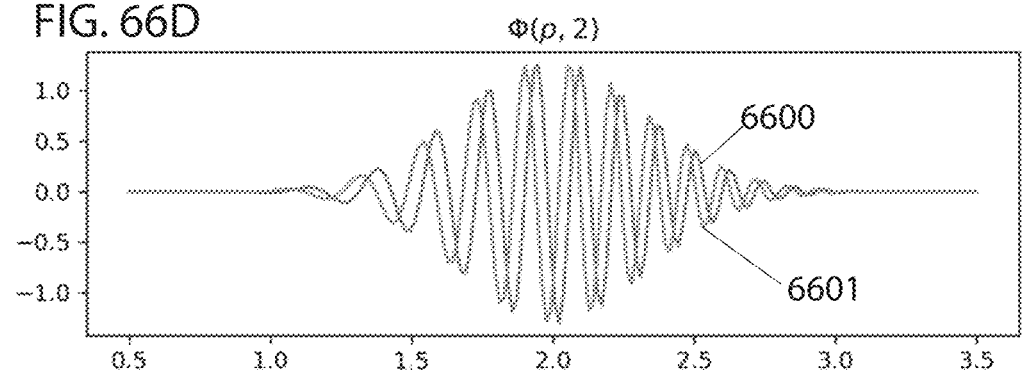

An example of a common type of initial wave function is a Gaussian wave packet, consisting of a momentum eigenfunctions multiplied by a Gaussian in position space $$\psi(x) = A e^{-\left(\frac{x}{a}\right)^2} e^{\frac{ip_0 x}{\hbar}},$$

wherein $p_0$ is the wave function's average momentum value and a is a rough measure of the width of the packet. In the momentum space, this wave function has the form $$\phi(p) = Be^{-\left(\frac{a(p-p_0)}{2\hbar}\right)^2},$$

which is a Gaussian function of momentum, centered on $p_0$ with approximate width $2\hbar/a$. Note Heisenberg's uncertainty principle wherein in the position space width is ~a, and in the momentum space is ~1/a. FIGS. 66A and 66B illustrate an example of a wave packet at a first time point for $\psi(x)$ and $\phi(p)$, respectively, with $x_0$, $p_0=0$, 2, $\hbar=0.1$, m=1, and a=3.6600 are real parts and 6601 are imaginary parts. As time passes, the peak moves with constant velocity $p_0/m$ and the width of the wave packet in the position space increases. This happens because the different momentum components of the packet move with different velocities. In the momentum space, the probability density $|\phi(p, t)|^2$ stays constant over time. See FIGS. 66C and 66D for the same wave packet at time t=2.

Figure 67A:
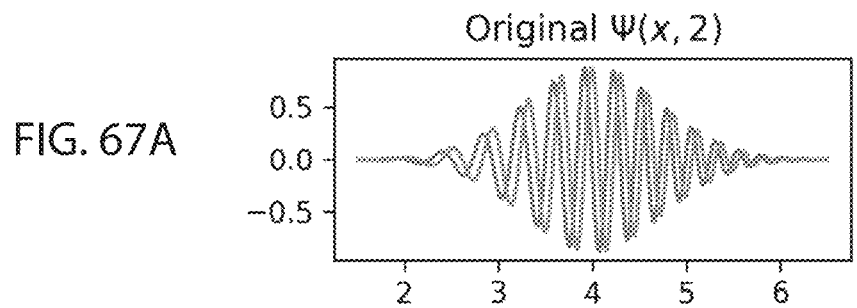
FIGS. 67A-67E illustrate an example of evolution of a wave function in a position and momentum space with observed momentum, according to some embodiments.
Figure 67B:
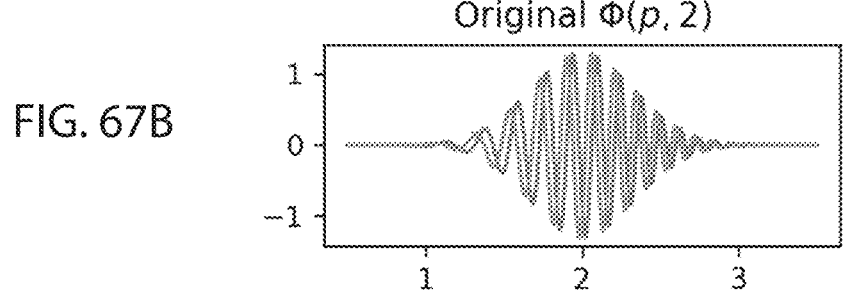
Figure 67C:
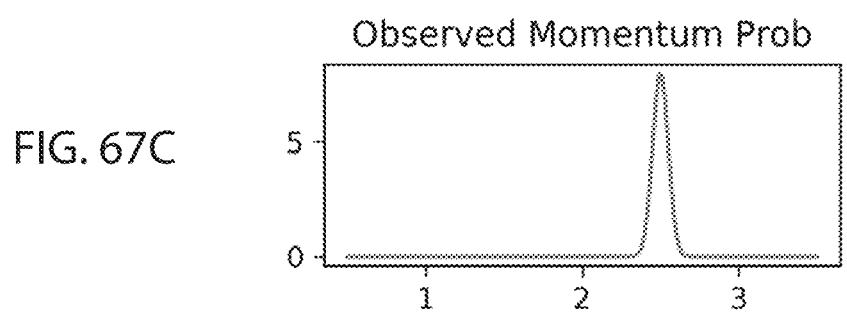
Figure 67D:
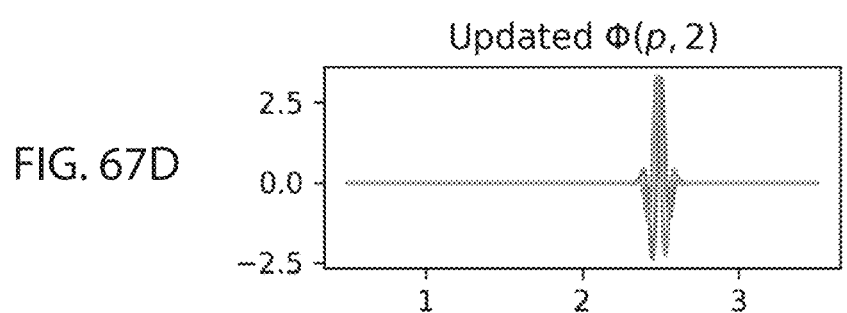
Figure 67E:
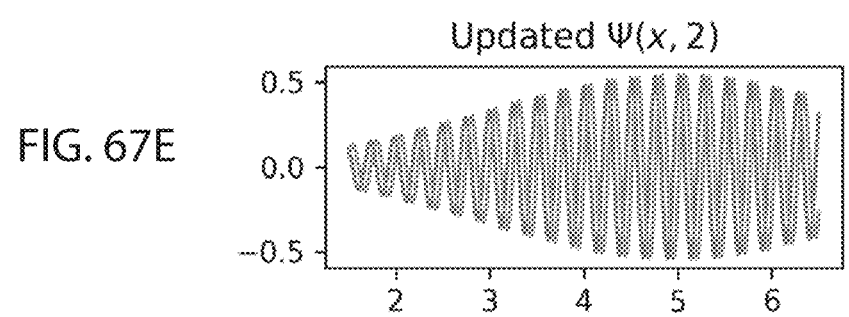
Figure 68A:
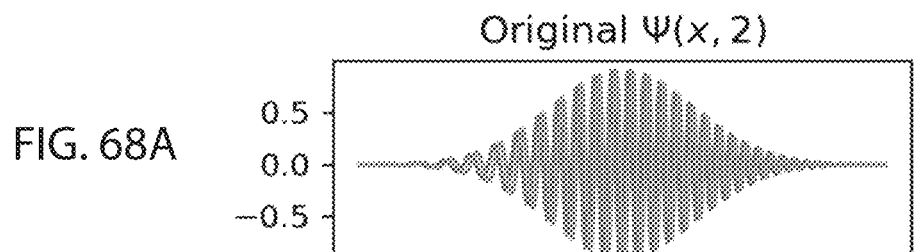
FIGS. 68A-68E illustrate an example of evolution of a wave function in a position and momentum space with observed momentum, according to some embodiments.
Figure 68B:
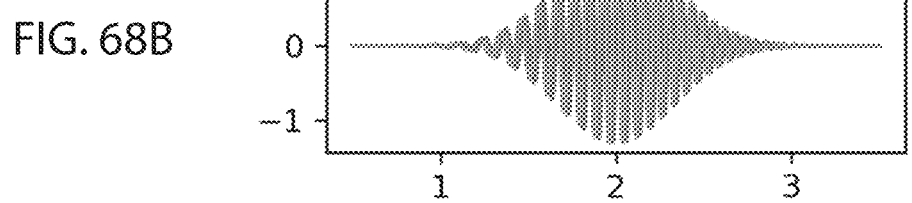
Figure 68C:
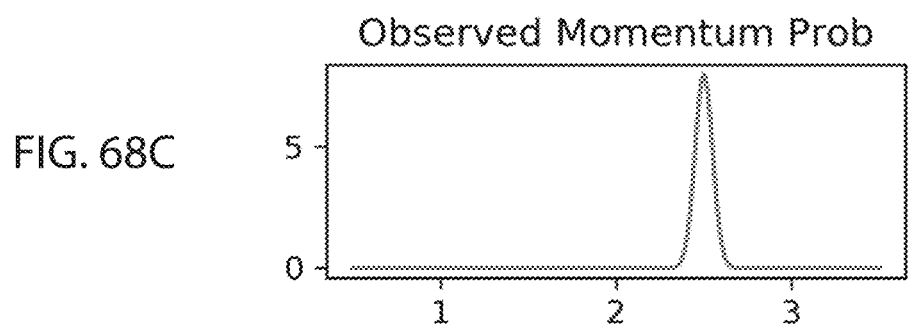
Figure 68D:
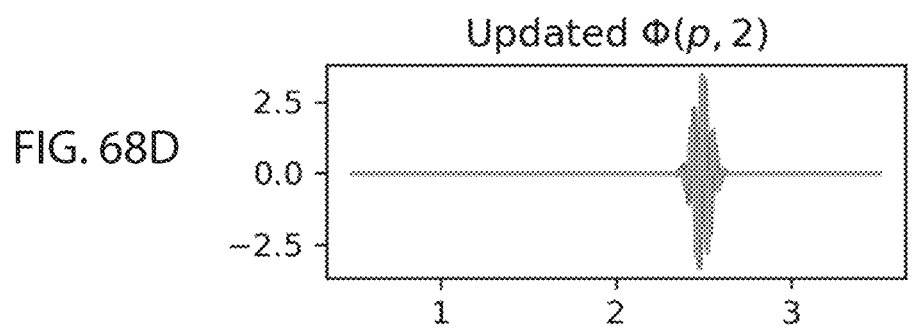
Figure 68E:
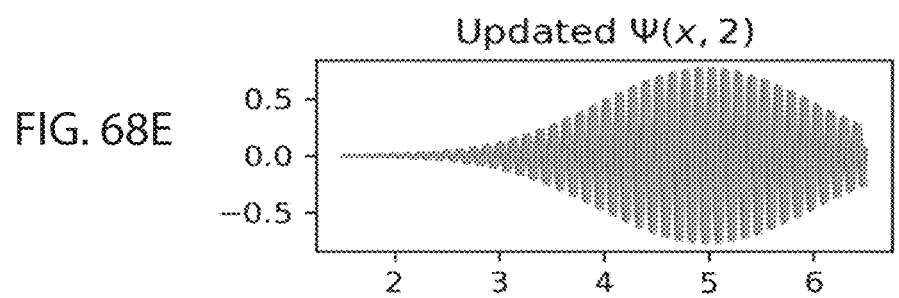
Figure 69A:
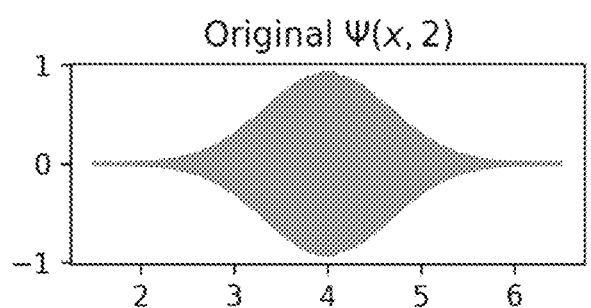
FIGS. 69A-69E illustrate an example of evolution of a wave function in a position and momentum space with observed momentum, according to some embodiments.
Figure 69B:
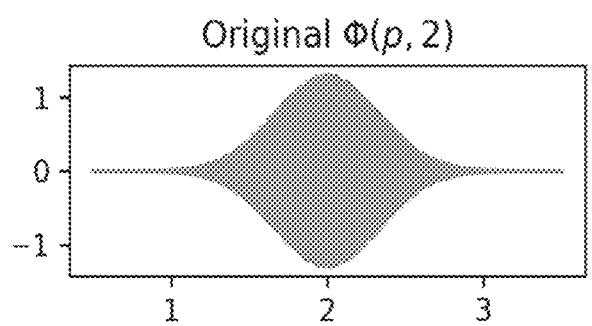
Figure 69C:
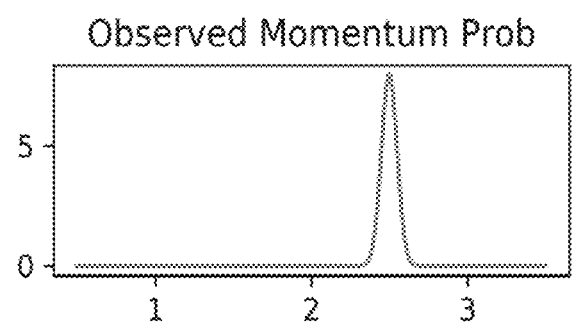
Figure 69D:
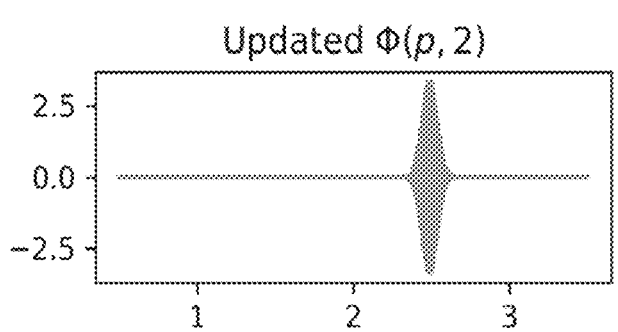
Figure 69E:
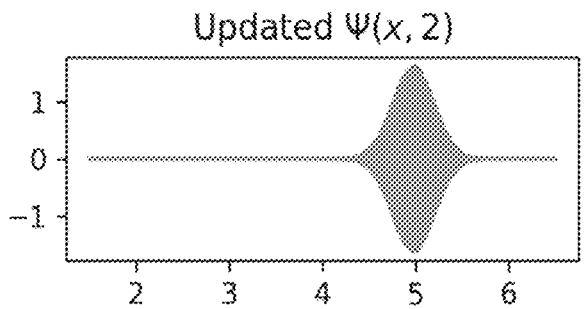
Figure 70A:
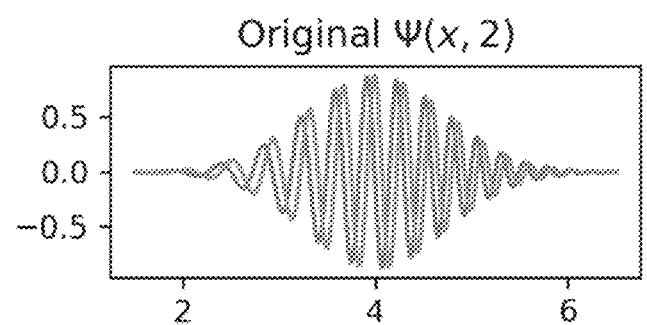
FIGS. 70A-70E illustrate an example of evolution of a wave function in a position and momentum space with observed momentum, according to some embodiments.
Figure 70B:
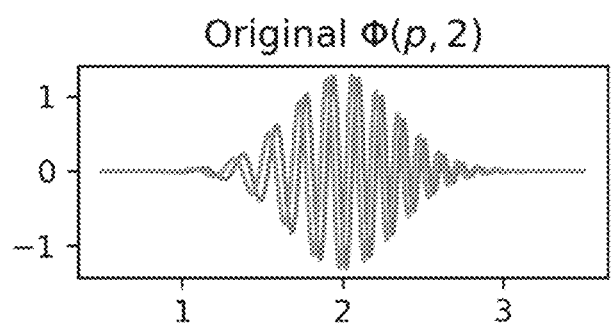
Figure 70C:
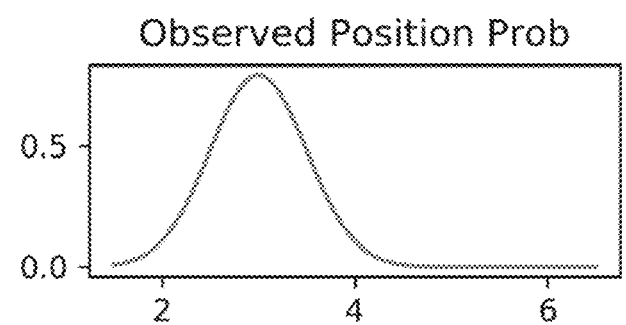
Figure 70D:
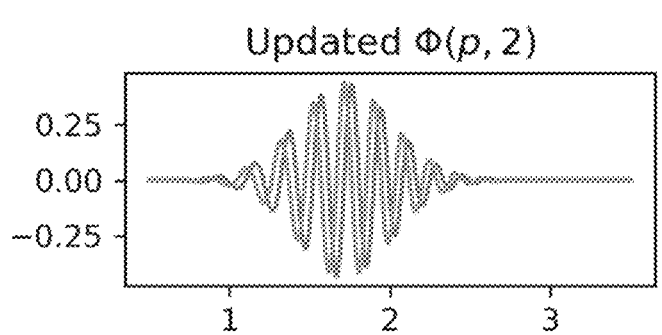
Figure 70E:
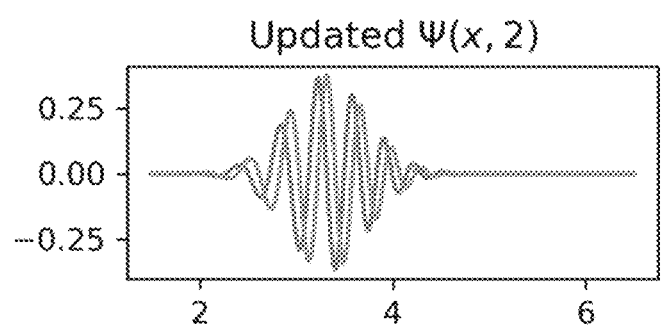

When modeling the modular robot using quantum physics, and the processor observes some observable, the processor collapses the wave function to the subspace of the observation. For example, consider the case wherein the processor observes the momentum of a wave packet. The processor expresses the uncertainty of the measurement by a function $f(p)$ (i.e., the probability that the system has momentum p), wherein $f$ is normalized. The probability distribution of momentum in this example is given by a Gaussian distribution centered around p=2.5 with $\sigma=0.05$, a strong assumption that the momentum is 2.5. Since the observation operator is the momentum operators, the wave function expressed in terms of the eigenfunctions of the observation operator is $\phi(p, t)$. The processor projects $\phi(p, t)$ into the observation space with probability $f$ by determining $\tilde{\phi}(p, t)=f(p)\phi(p, t)$. The processor normalizes the updated $\tilde{\phi}$ and takes the inverse Fourier transform to obtain the wave function in the position space. FIGS. 67A, 67B, 67C, 67D, and 67E illustrate the initial wave function in the position space $\psi(x)$, the initial wave function in the momentum space $\phi(p)$, the observation density in the momentum space, the updated wave function in the momentum space $\tilde{\phi}(p, t)$ after the observation, and the wave function in the position space $\psi(x)$ after observing the momentum, respectively, at time t=2, with $x_0$, $p_0=0$, 2, $\hbar=0.1$, m=1, and a=3. Note that in each figure the darker plots are the real parts while the lighter plots are the imaginary parts. The resulting wave function in the position space (FIG. 67D) may be unexpected after observing a very narrow momentum density (FIG. 67C) as it concludes that the position must have spread further out from the original wave function in the position space (FIG. 67A). This effect is due to Heisenberg's uncertainty principle. With decreasing $\hbar$ this effect diminishes, as can be seen in FIGS. 68A-68E and FIGS. 69A-69E, illustrating the same as FIGS. 67A-67E but with $\hbar=0.05$ and $\hbar=0.001$, respectively. Similar to observing momentum, position may also be observed and incorporated as illustrated in FIGS. 70A-70E which illustrate the initial wave function in the position space $\psi(x)$, the initial wave function in the momentum space $\phi(p)$, the observation density in the position space, the updated wave function in the momentum space $\tilde{\phi}(x, t)$ after the observation, and the wave function in the position space $\psi(p)$ after observing the position, respectively, at time t=2, with $x_0$, $p_0=0$, 2, $\hbar=0.1$, m=1, and a=3.

Figure 71A:
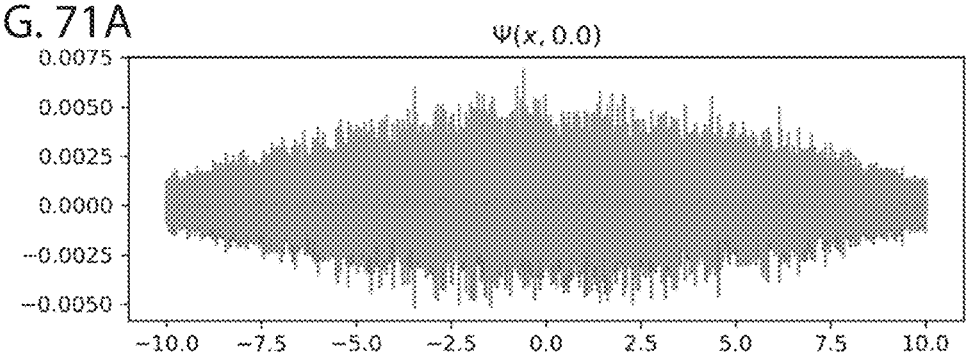
FIGS. 71A and 71B illustrate an example of an initial wave function of a state of a robotic device, according to some embodiments.
Figure 71B:
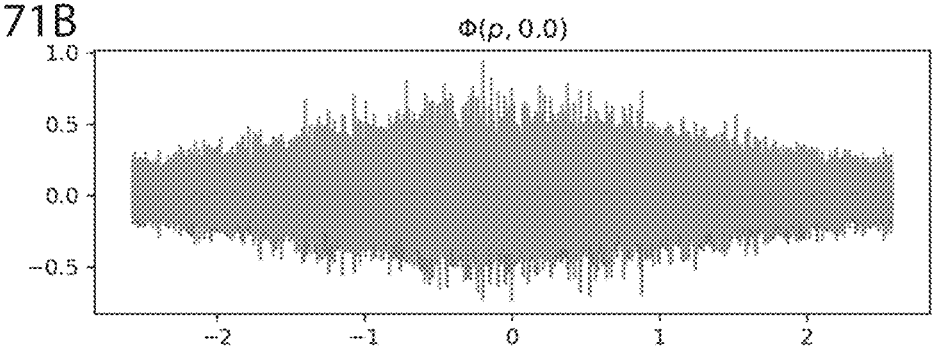
Figure 72A:
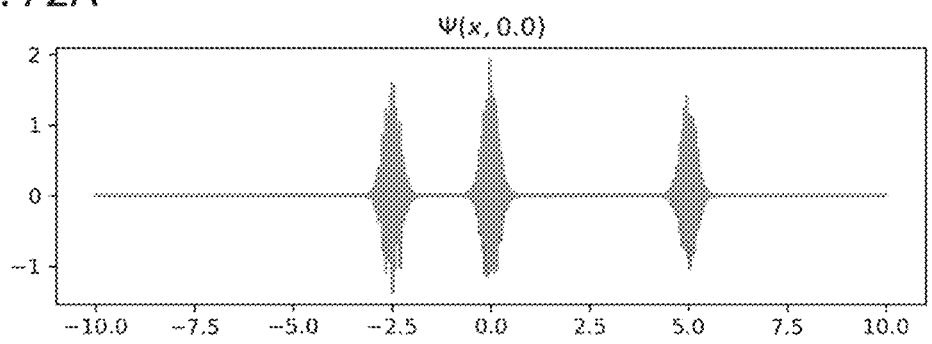
FIGS. 72A and 72B illustrate an example of a wave function of a state of a robotic device after observations, according to some embodiments.
Figure 72B:
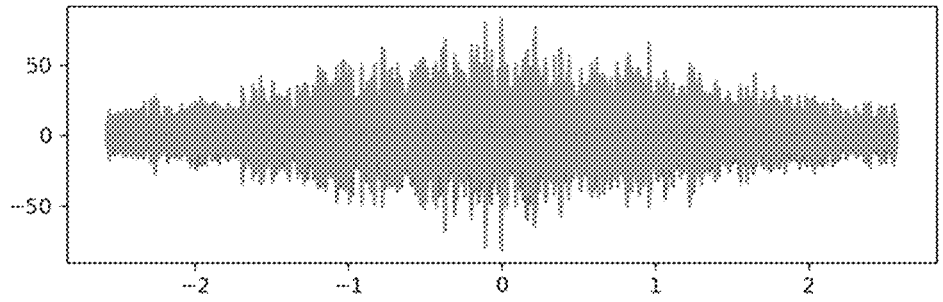
Figure 73A:
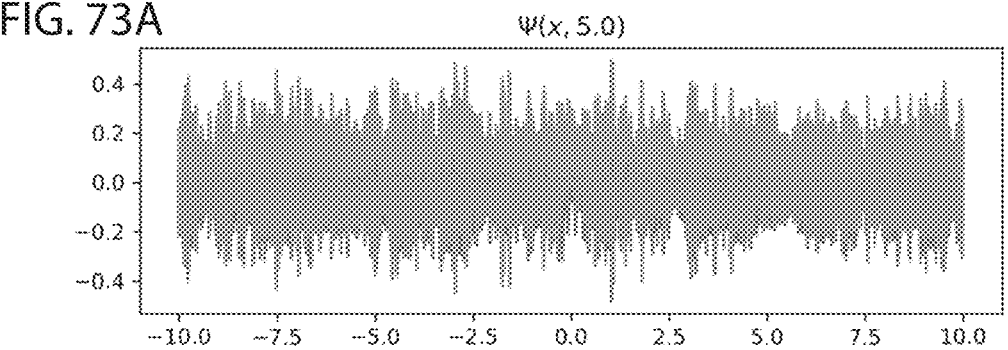
FIGS. 73A and 73B illustrate an example of an evolved wave function of a state of a robotic device, according to some embodiments.
Figure 73B:
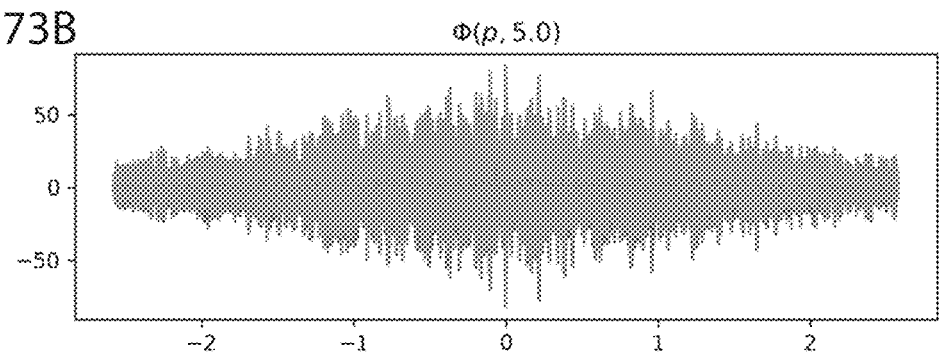
Figure 74A:
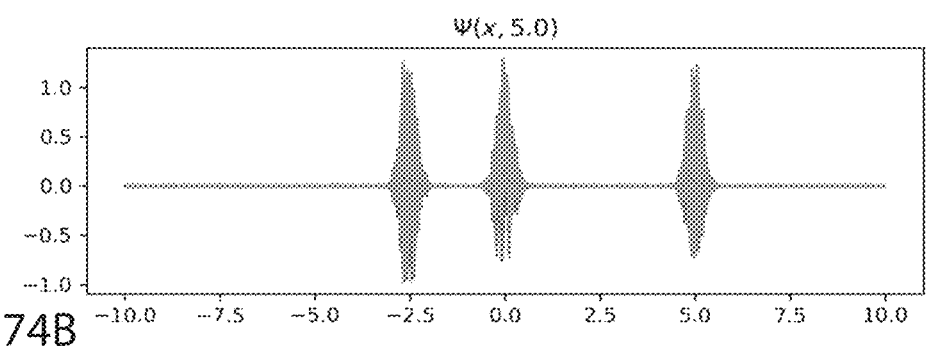
FIGS. 74A, 74B, 75A-75H, and 76A-76F illustrate an example of a wave function of a state of a robotic device after observations, according to some embodiments.
Figure 74B:
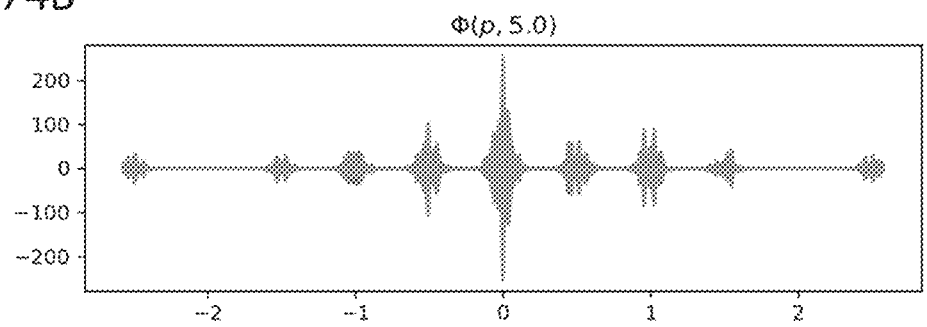
Figure 75A:
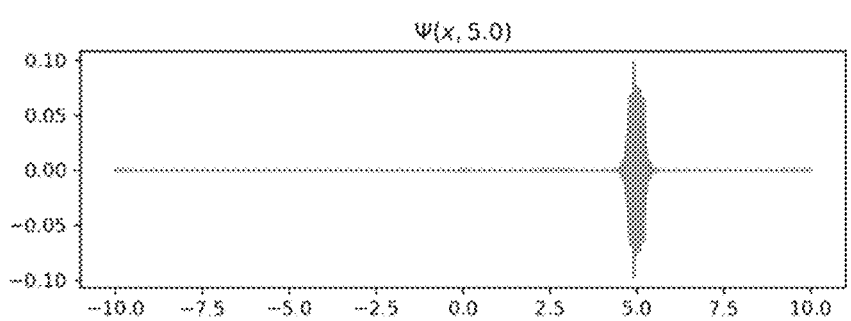
Figure 75B:
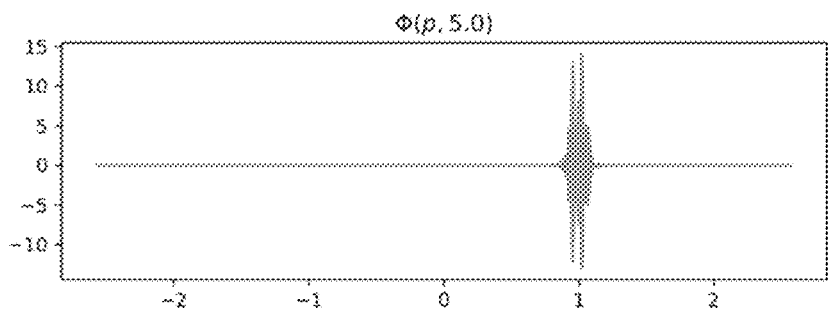
Figure 75C:
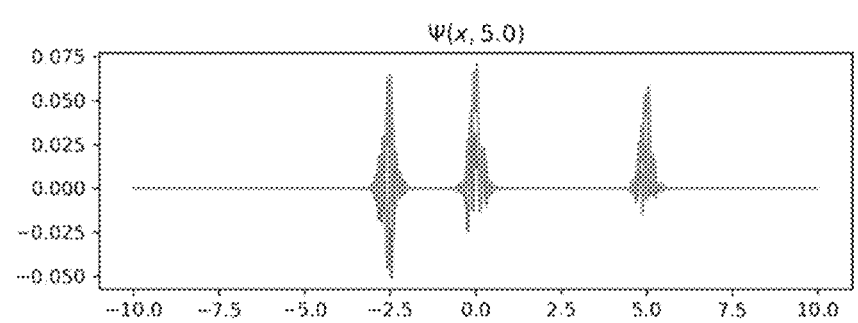
Figure 75D:
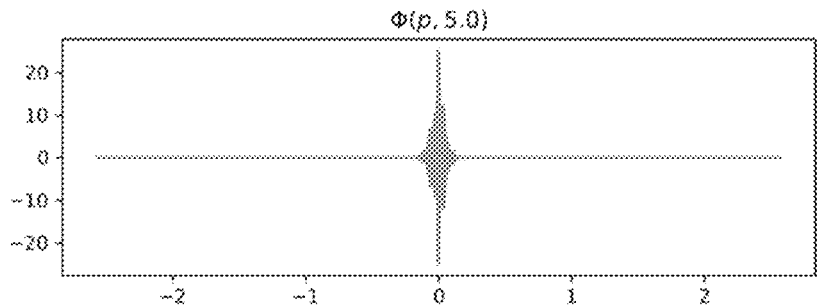
Figure 75E:
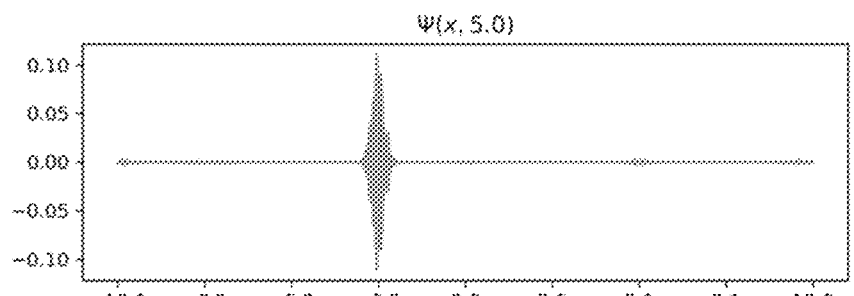
Figure 75F:
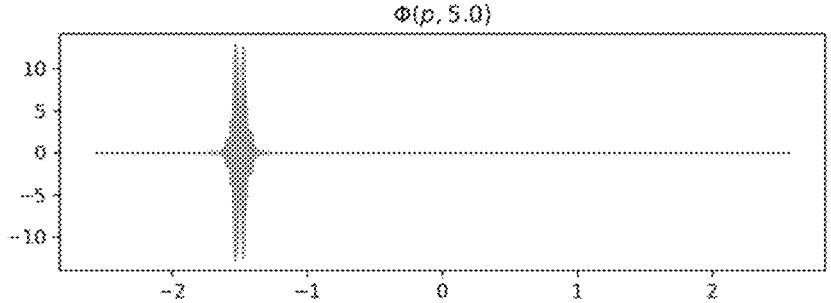
Figure 75G:
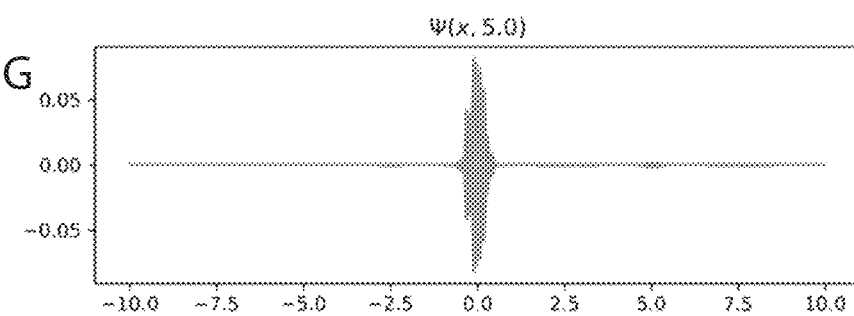
Figure 75H:
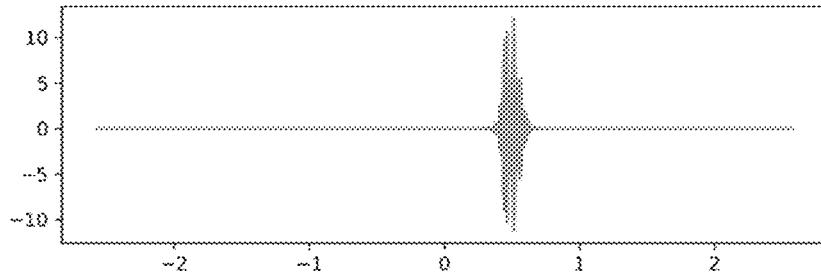
Figure 76A:
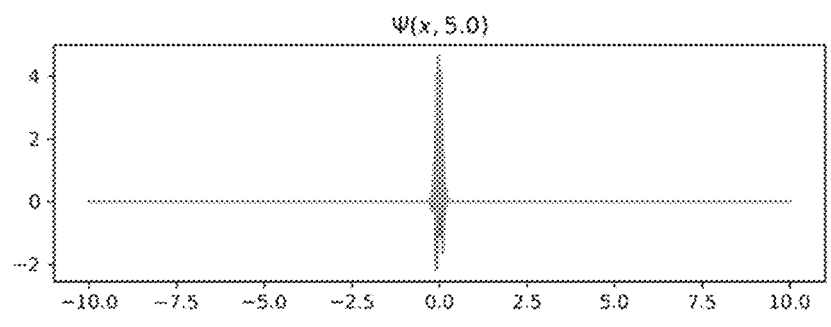
Figure 76B:
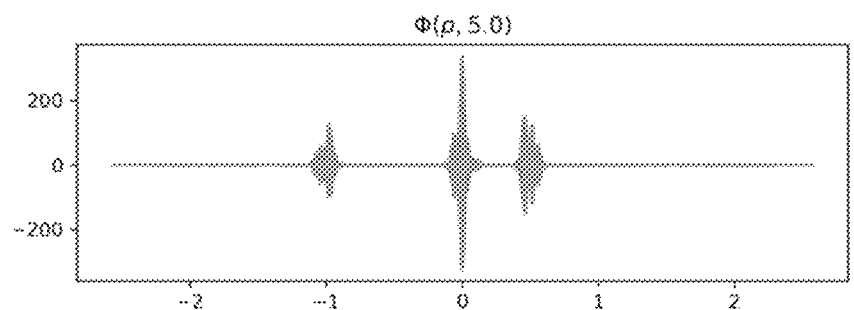
Figure 76C:
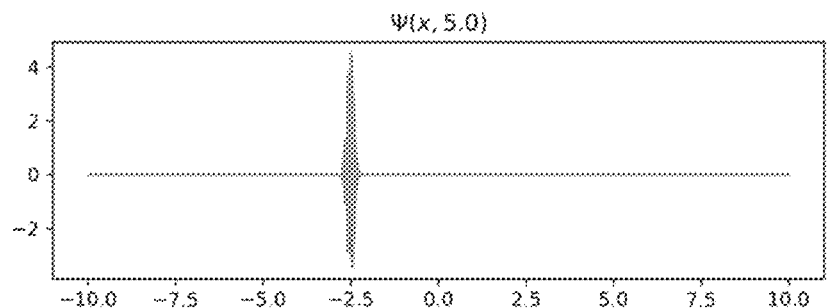
Figure 76D:
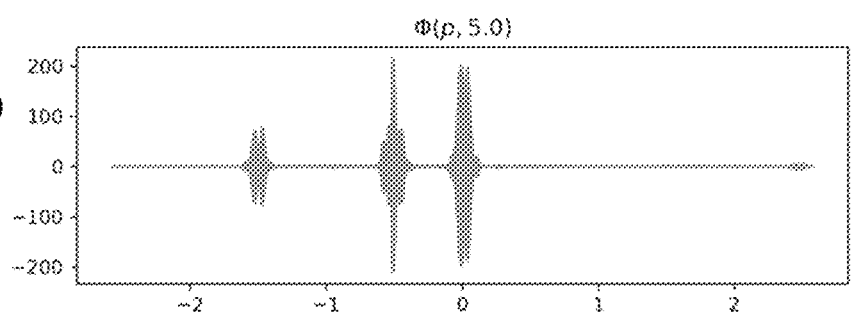
Figure 76E:
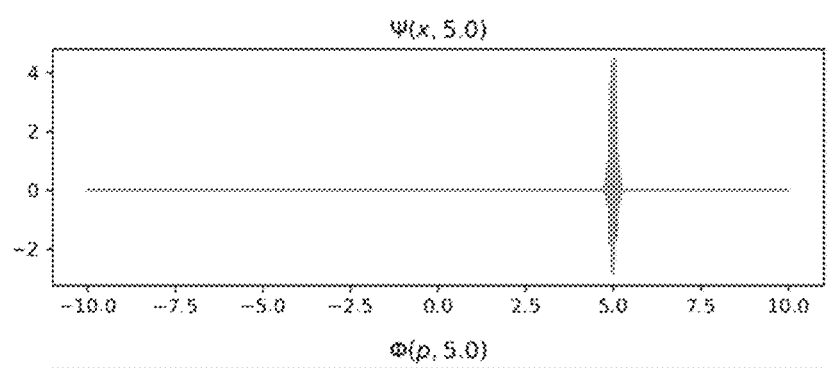
Figure 76F:
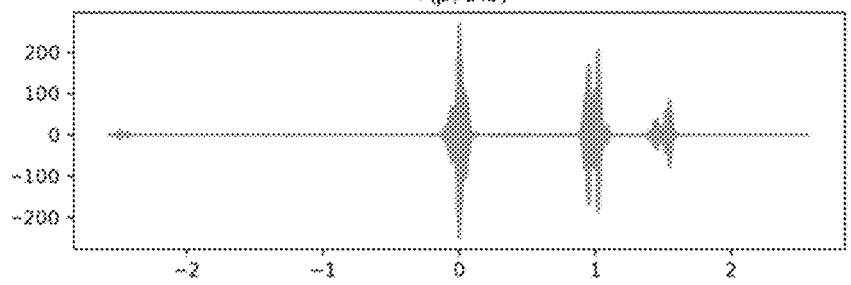

In quantum SLAM, wave functions represent probability amplitude of finding the system in some state. Physical pure states in quantum SLAM are represented as unit-norm vectors in a special complex Hilbert space and time evolution in this vector space is given by application of the evolution operator. Further, in quantum SLAM, any observable should be associated with a self-adjoint linear operator which must yield real eigenvalues, e.g. they must be Hermitian. The probability of each eigenvalue is related to the projection of the physical state on the subspace related to that eigenvalue and observables are differential operators. For example, a modular robot navigates along a one-dimensional floor that includes three doors at doors at $x_0=-2.5$, $x_1=0$, and $x_2=5.0$ and the processor is capable of determining when it is located at a door based on sensor data observed and the momentum of the modular robot is constant, but unknown. Initially the location of the modular robot is unknown, therefore the processor generates initial wave functions of the state shown in FIGS. 71A and 71B. When the processor determines the modular robot is in front of a door, the possible position of the modular robot is narrowed down to three possible positions, but not the momentum, resulting in wave functions shown in FIGS. 72A and 72B. The processor evolves the wave functions with a Hamiltonian operator, and after five seconds the wave functions are as shown in FIGS. 73A and 73B, wherein the position space has spread out again given that the momentum is unknown. However, the evolved probability density keeps track of the correlation between position and momentum. When the processor determines the modular robot is in front of a door again, the wave functions are updated to FIGS. 74A and 74B, wherein the wave functions have significantly narrowed down, indicating a number of peaks representing possible position and momentum combinations of the modular robot. And in fact, if the processor observes another observation, such as momentum p=1.0 at t=5.0, the wave function in the position space also collapses to the only remaining possible combination, the location near x=5.0, as shown in FIGS. 75A and 75B. It can be seen that the processor collapsed the momentum wave function accordingly. Also, the processor reduced the position wave function to a peak at x=5.0. Given constant momentum, the momentum observation of p=1.0, and that the two door observations were 5 seconds apart, the position x=5.0 is the only remaining valid position hypothesis. FIGS. 75C and 75D illustrate the resulting wave function for a momentum observation of p=0.0 at t=5.0 instead. FIGS. 75E and 75F illustrate the resulting wave function for a momentum observation of p=—1.5 at t=5.0 instead. FIGS. 75G and 75H illustrate the resulting wave function for a momentum observation of p=0.5 at t=5.0 instead. Similarly, the processor collapses the momentum wave function when position is observed instead of momentum. FIGS. 76A and 76B illustrate the resulting wave function for a position observation of x=0.0 at t=5.0 instead. FIGS. 76C and 76D illustrate the resulting wave function for a position observation of x=—2.5 at t=5.0 instead. FIGS. 76E and 76F illustrate the resulting wave function for a position observation of x=5.0 at t=5.0 instead.

In some embodiments, wherein the state of the modular robot within the space is initially unknown, the processor may generate a uniform probability distribution over the space. In other instances, any other probability distribution may be generated depending on the information known about the state of the modular robot and the certainty of the information. Over time and as more measurements and observations are received by the processor, the probability distribution over all possible states of the modular robot in the space evolves.

In some embodiments, the processor initially assumes the modular robot is located somewhere within an area greater than the size of the robot, the location being the seed location of the modular robot. This is due to initial uncertainty in the position and heading of the modular robot and the surroundings. As more data is collected and the processor is more certain of the position of the modular robot relative to its surroundings, the processor reduces the size of area within which the modular robot is assumed to be located. On the other hand, as the modular robot moves and noise, such as movement noise, is introduced, the processor increases the area within which the modular robot is assumed to be located as uncertainty in the position of the robot increases. In some embodiments, the processor adjusts the shape of the area within which the modular robot is assumed to be located within based on deviation between the measured and true heading and translation of the modular robot as it moves. In some embodiments, the processor uses information on linear and angular undershoot and overshoot to help determine the shape of the area within which the modular robot is assumed to be located within. Force is needed to cause linear and angular acceleration and a given amount of force can either be spent on linear overshooting or angular overshooting. If the modular robot overshoots linearly it undershoots angularly and vice versa.

Figure 77A:
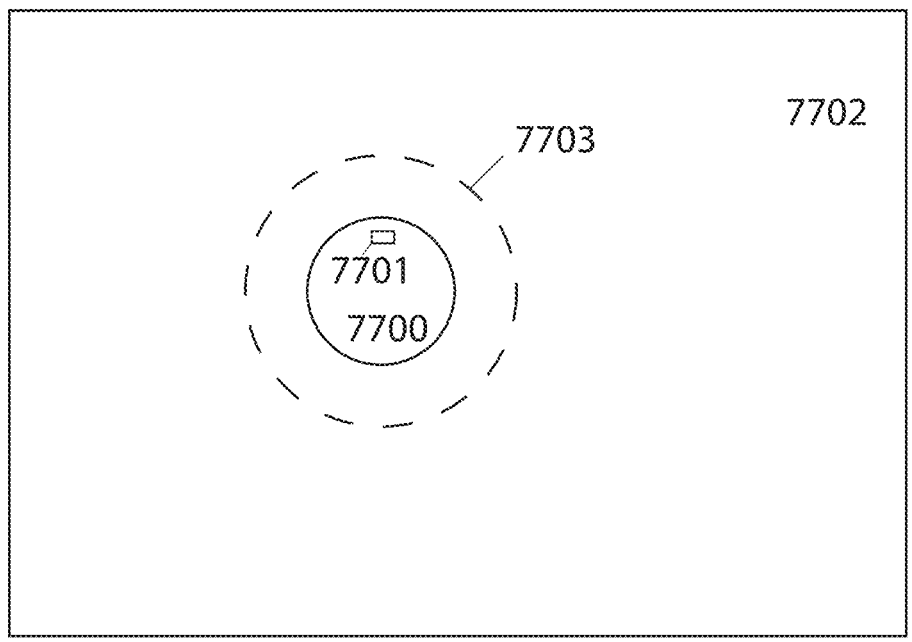
FIGS. 77A-77C illustrate an example of seed localization, according to some embodiments.
Figure 77B:
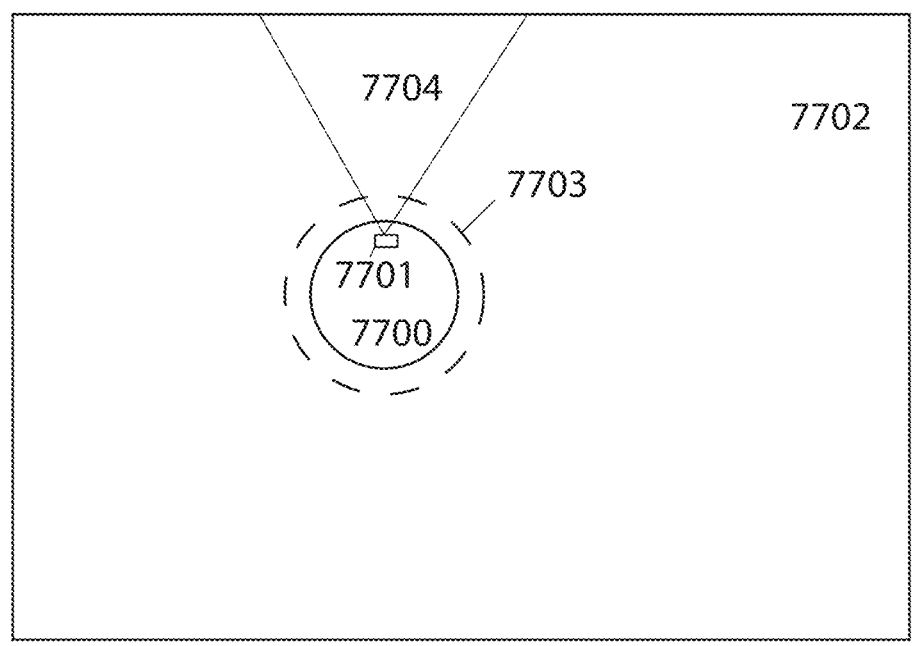
Figure 77C:
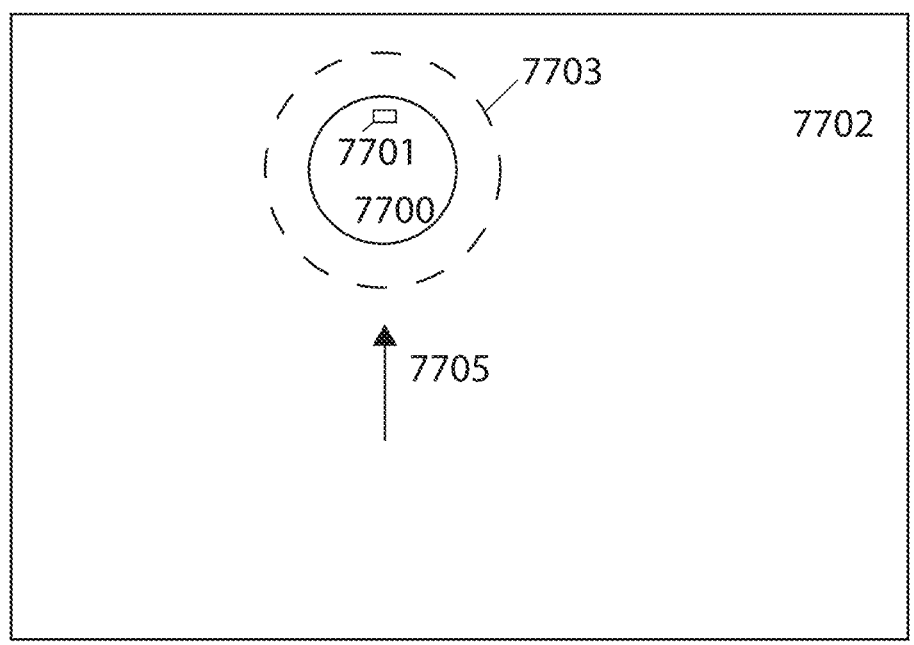
Figure 78:
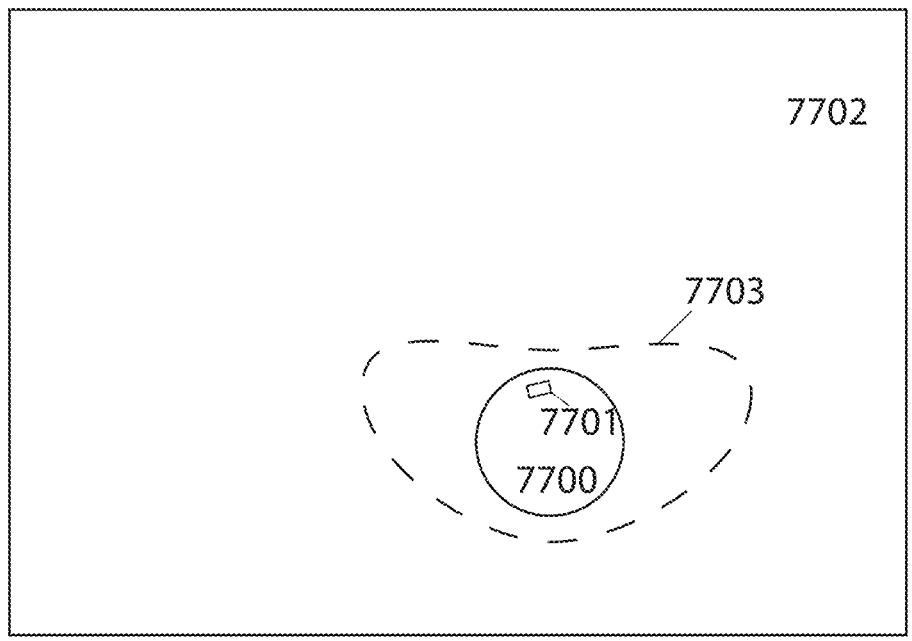
FIG. 78 illustrates an example of a shape of a region with which a robot is located, according to some embodiments.

FIGS. 77A-77C illustrate an example of how the area within which the modular robot is assumed to be located changes in size with the collection of data and movement of the modular robot. FIG. 77A illustrates modular robot 7700 with sensor 7701 within environment 7702. Modular robot 7700 rotates 360 degrees while sensor 7701 captures data of the environment. The processor of modular robot 7700 uses a subset of the data to create a low-resolution map of the environment. Initially, the processor of modular robot 7700 assumes modular robot 7700 is located somewhere within area 7703, greater in size than modular robot 7700 as there is uncertainty in the location of modular robot 7700. For example, the true rotation of the modular robot may not actually be exactly 360 degrees or the modular robot may not actually rotate exactly in place resulting in uncertainties in position and heading of the modular robot relative to the surrounding environment. FIG. 77B illustrates sensor 7701 capturing data of the environment within field of view 7704. As more data is captured and processed, the processor becomes more certain of the predicted location of modular robot 7700 and hence reduces the size of area 7703 within which the modular robot is assumed to be located. FIG. 77C illustrates modular robot 7700 moving within environment 7702 in direction 7705. As modular robot 7700 moves, noise, such as movement noise, is introduced and the processor increases area 7703 within which the modular robot is assumed to be located as uncertainty in the location of the modular robot 7700 increases. FIG. 78 illustrates an example of a shape of area 7703 within which modular robot 7700 with sensor 7701 is assumed to be located. As modular robot 7700 moves within environment 7702, the processor of modular robot 7700 adjusts the shape of area 7703 based on deviation between the measured and true heading and translation of modular robot 7700 as it moves. In some embodiments, the processor uses information on linear and angular undershoot and overshoot to help determine the shape of area 7703.

The multi-dimensionality in quantum localization described above provides robustness that may be useful in various applications. In some embodiments, the processor uses localization for controlling the operation, settings, and functionality of the modular robot. For example, the processor uses localization to control the behavior of the modular robot in different areas, where for instance, certain cleaning functions or settings are desired for different environments. These functions or settings may be triggered once the processor has localized the modular robot against the environment. For example, it may be desirable to run the motor at a higher speed when moving over rough surfaces, such as soft flooring as opposed to hardwood, wherein localization against floor type or against a room may trigger the motor speed. As a further example, localization may also be used in controlling the movement of the modular robot. If the processor localizes the modular robot against a boundary, for example, it may choose to select a path along the boundary or it may trigger a polymorphic or other type of path planning algorithm. Or, localizing the modular robot against a boundary may trigger a path planning algorithm for cleaning central areas of the environment and, once completed, a wall follow algorithm for cleaning along the boundaries of the environment.

The techniques described herein, e.g., such as localization, mapping, and depth perceiving techniques, may be implemented in software, in hardware, in a system on a chip, a module, a combination with other hardware on a PCB, in a single silicon chip, a combination of software and one or more silicon chips, a combination of software and a multi-purpose chip, or a specific application chip with built in mapping capabilities. In some embodiments, the implementations may include built-in circuitry for easier and faster processing and GPUs and TPUs capabilities. In some embodiments, a localization chip or a processing chip with a localization processing unit may be used.

In embodiments, other methods of localization may be used independently or in combination. Examples of localization methods are described in U.S. Patent Application Nos. 62/746,688, 62/688,497 16/297,508, 62/740,573, 62/740,580, 15/955,480, 15/425,130, and 15/955,344 the entire contents of which are hereby incorporated by reference.

Figure 79A:
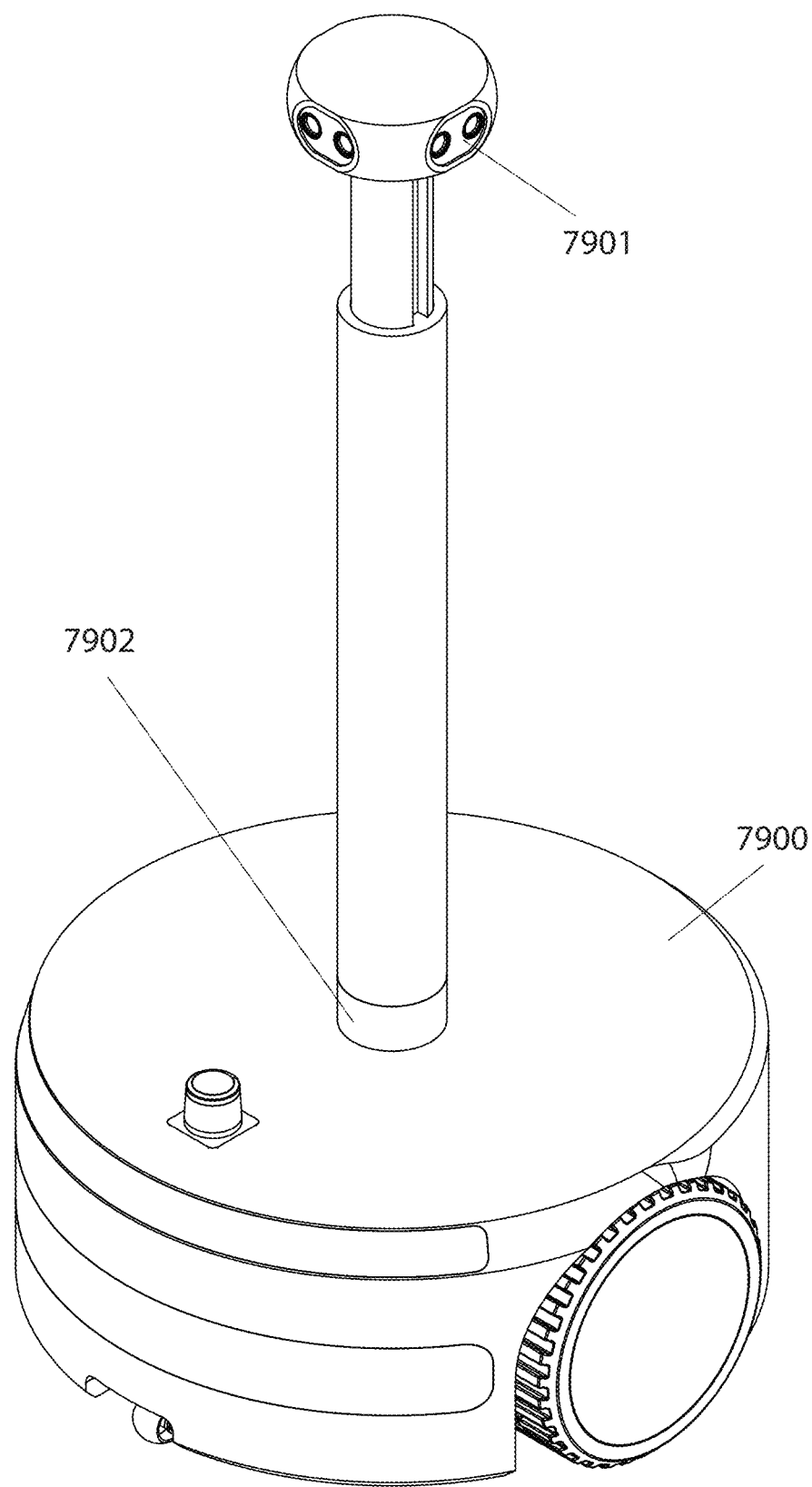
FIGS. 79A and 79B illustrate an example of image capturing and video recording robot, according to some embodiments.
Figure 79B:
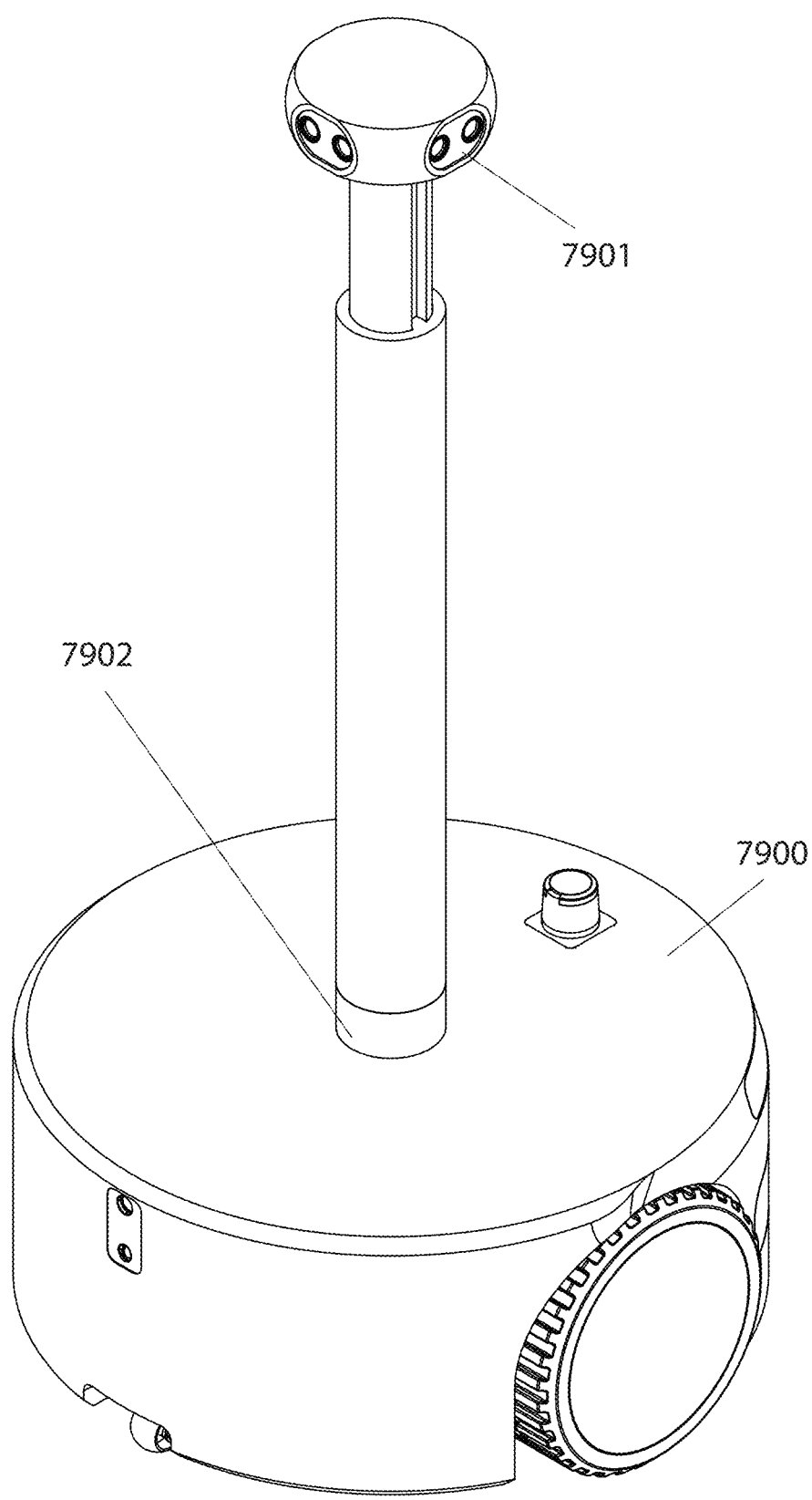

In some embodiments, quantum SLAM techniques (or any mapping and localization methods and techniques) may be combined with virtual reality. For example, the combination may be powerful in the real estate industry. Rather than manually capturing images used for selling a home, for example, consider a robot or communication device capable of mapping a home (as described above) while also capturing videos of the home. In some instances, the processor of the robot or communication device combines the generated map and the video to create a virtual reality of the home for potential buyers to experience. In some instances, the processor of the robot creates the virtual reality and shares it with an application of the communication device paired with the robot. In some embodiments, the processor may autonomously modify the virtual reality of the home by staging it with hypothetical furniture in the virtual reality space. In some embodiments, the processor may remove items captured in the virtual reality space. In some embodiments, the virtual reality is displayed by the application of the communication device and a user may choose VR objects (e.g., furniture) or VR features (e.g., paint color, flooring type) to add or remove from the virtual reality of the home. In some embodiments, the application includes preset staging packages (e.g., modern, luxury, chic, minimalist, etc.) that a user may choose using the application. In some embodiments, the application may be used by a user for interior design purposes. For example, the application may be used by the user to download specific VR objects, such as particular furniture from well-known furniture manufacturers, and place the VR objects within the VR home to determine if it fits within the space. In another example, the processor may be used to create a virtual reality of a street. The application of the communication device may be used by the user to remove cars and add potted flowers in the virtual reality of the street. For example, FIGS. 79A and 79B illustrate front and rear perspective views of an example of modular robot 7900 customized to function as an image capturing and video recording robot including four (or more in other cases) stereovision cameras 7901 to capture 360 degrees of the surrounding area, connected to the robot 7900 by connector 7902. The processor of the modular robot 7900 builds a 3D virtual reality of a home or other spaces using the images and/or videos captured. In some embodiments, the virtual reality of an environment is generated while also mapping the environment as described above.

In some embodiments, the processor determines its actions (e.g., for a robotic surface cleaner, which cleaning tools to use or speed of a main brush or impeller) based on characteristics of the environment using methods similar to those described in U.S. patent application Ser. Nos. 16/239, 410 and 16/163,530, the entire contents of which are hereby incorporated by reference. For example, in some embodiments, the processor of the modular robot uses the data from one or more environmental sensors (e.g., sensors that sense attributes or can observe or provide data from which inferences can be made about characteristics of an environment, such as those of a driving surface, the weather, obstacles, etc.) to determine actions in real-time. Examples of sensors include, but are not limited to, floor sensors, debris sensors, obstacle sensors, cliff sensors, acoustic sensors, cameras, optical sensors, distance sensors, motion sensors, tactile sensors, electrical current sensors, gyroscopes, odometers, optical encoders, IR sensors, and the like. Sensors may sense various attributes of one or more features of an environment, e.g., particulate density, rolling resistance experienced by robot wheels, hardness, location, carpet depth, sliding friction experienced by robot brushes, hardness, color, acoustic reflectivity, optical reflectivity, planarity, acoustic response of a surface to a brush, and the like. In some embodiments, the sensor takes readings of the environment and the processor obtains the sensor data. In some embodiments, the sensed data is associated with location data of the robot indicating the location of the robot at the time the sensor data was obtained. In some embodiments, the processor infers environmental characteristics from the sensory data. In some embodiments, the processor adjusts various operating parameters of actuators, like speed, torque, duty cycle, frequency, slew rate, flow rate, pressure drop, temperature, brush height above the floor, or second or third order time derivatives of the same. For instance, some embodiments adjust the speed of components (e.g., main brush, peripheral brush, wheel, impeller, motor, etc.) based on the environmental characteristics inferred. In some embodiments, the processor activates or deactivates (or modulates intensity of) functions (e.g., vacuuming, mopping, UV, mowing, plowing, mining, etc.) based on the environmental characteristics inferred. In other instances, the processor adjusts a movement path, operational schedule (e.g., time when various designated areas are worked upon, such as when cleaned), and the like based on sensory data. Examples of environmental characteristics include floor type, obstacle density, activity level, room or area type, level of debris accumulation, level of user activity, time of user activity, weather conditions, road conditions, accident frequency, etc.

In some embodiments, the processor of the modular robot determines a movement path of the robot based on the map of the environment. For example, in some embodiments, the modular robot is configured to implement a path planning method that is responsive to stimulus from an observed environment using the processor of the robot. Some embodiments segment a working environment into regions and then dynamically adjust a coverage pattern within each of those regions abased on sensed attributes of the environment. In some embodiments, a topological graph represents the route plan of the robot and is described with a set of vertices and edges, the vertices being linked by edges. Vertices may be represented as distinct points while edges may be lines, arcs or curves. The properties of each vertex and edge may be provided as arguments at run-time based on real-time sensory input of the environment. The topological graph may define the next actions of the robot as it follows along edges linked at vertices. While executing the movement path, in some embodiments, rewards may be assigned as the robot takes actions to transition between states and the net cumulative reward may be used to evaluate a particular movement path comprised of actions and states. The processor may iteratively calculate a state-action value function during execution of the movement path based on the current reward and maximum future reward at the next state. One goal is to find optimal state-action value function and optimal policy by identifying the highest valued action for each state. As different topological graphs including vertices and edges with different properties are executed over time, the number of states experienced, actions taken from each state, and transitions increase. The path devised by the processor iteratively evolves to become more efficient by choosing transitions that result in most favorable outcomes and by avoiding situations that previously resulted in low net reward. After convergence, the evolved movement path is determined to be more efficient than alternate paths that may be devised using real-time sensory input of the working environment.

In some embodiments, the next action or movement of the robot along a path defined by properties of vertices and edges chosen based on real-time sensory input is determined using a Markov Decision Process (MDP). As the robotic device executes an action, it transitions from a current state to a new state and movement from one state to the next is defined by a discrete time slot. This may be represented by a Markov Chain comprised of a sequence of random variables $s_1, s_2, s_3, \ldots$ . The random variables are states the robotic device may experience and form a set S called the state space. The topological graph defining the movement path of the robotic device may therefore be thought of as a sequence of states $s \in S$, where states are connected by paths and are each defined with a discrete time stamp $t \in T$. For the robotic device to transition from a current state s to next state s', the robotic device performs an action $a \in A$ over a time span of t to t', displacing a distance d along an edge of the topological graph. When the state space is defined by a taxicab coordinate system, the distance d is given by the rectilinear distance or L1 norm and displacement is along a line. For a Markov chain, having Markov property, the probability of moving to a next state is dependent only on the present state. This is mathematically represented by $P(s'|s)$. A Markov chain may, therefore, be represented by a topological graph, where the edges of graph t are labelled by the probabilities of transitioning from one state at time t to another at time t'. A Markov chain may be further extended to a MDP through the addition of actions (choices) and rewards (motivation), such that there are multiple actions that may be chosen from a single state and a different reward associated with each action. MDP is a five-tuple comprising a finite set of states S, a finite set of actions A, the probability that action a will lead to state s' at time t' given by P(s'|s), the immediate reward after transitioning from state s to state s' given by r, and the discount factor γ, representing the difference in importance between future and present rewards. The goal of MDP is to find an optimal policy function π that specifies the highest rewarded action a to take for each state s. For a MDP, after completing each action and transitioning to a new state, a reward is assigned and a state-action value function is iteratively calculated as the expected value of the current reward plus the discounted maximum future reward at the next state. The state-action value function provides the value of a state. The processor of the robot does not require any visualization in choosing the next action of the robot, it only involves, in some embodiments, optimization of the state-action value function. In optimizing the state-action value function, the highest rewarded actions from each state are concurrently (e.g., simultaneously) identified and used in deriving the optimal policy. In embodiments, where the time is not considered discrete, the value of the reward may be dependent on sequential time required to complete the action and transition to a new state, where a greater negative reward is assigned for longer times. In such a case, the robot is always incurring negative reward and actions having smaller negative reward are considered superior. (Of course, the selection of sign is arbitrary, and embodiments may also implement the reverse arrangement, which is not to suggest that any other description is limiting.) Events that increase the time required to complete an action and transition to the next state may therefore indirectly increase the amount of negative reward incurred. Other optimization factors may also assign negative reward, including but not limited to, collisions with obstacles, number of U-turns, repeat coverage, transitions between different types of flooring or switching rooms. Once the robot completes its task, and hence the movement path required to complete the task, a predetermined positive reward value is assigned. A net reward value for the executed movement path, consisting of a sequence of states and actions, is then calculated as the sum of the cumulative negative reward from the multiple actions taken while transitioning from one state to another and the positive reward upon completion of the task.

Over time, the goal is to find optimal state-action value function and optimal policy from which actions from different states are selected. For a single state, there may be several actions that can be executed. The sequence of states and actions that result in the maximum net reward provide the optimal state-action value function for a given state. The action for a given state that results in maximum reward provides the optimal policy for the given state. An optimal policy for a state space may then contain the highest valued action corresponding to multiple states. As different movement paths are executed over time, the number of states experienced, actions taken from each state, and transitions increase. The path devised by the processor of the robot may iteratively evolve to become more efficient by choosing transitions that result in most favorable outcomes and by avoiding situations which previously resulted in low net reward. After convergence, assuming the system did not fall into a local minimum or is able to get out of a local minimum, the evolved movement path is trusted to be more efficient than alternate paths which may be devised using real-time sensory input of the working environment. In order to get out of local maximin, stochastic optimization is employed. This provides a reliable and efficient method for a robotic device to devise path plans as their movements are evaluated and optimized in real-time such that the most efficient movements are eventually executed and factors reducing efficiency, including but not limited to, repeat coverage, collisions with obstacles, transitions between different types of flooring, and U-turns, are reduced with the fine-tuning of properties over time.

Figure 80:
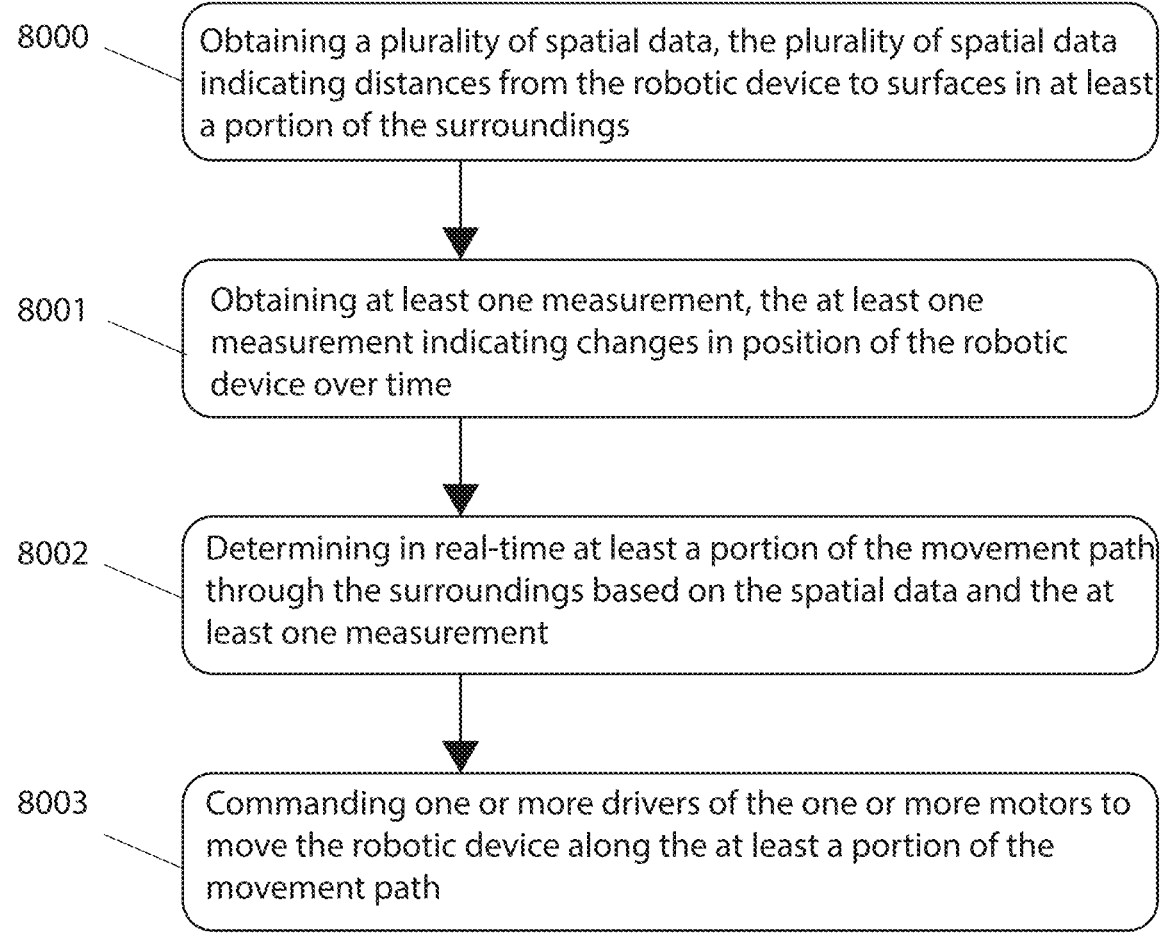
FIG. 80 illustrates a flowchart describing an example of a path planning method, according to some embodiments.

The MDP consisting of a sequence of states and actions followed by rewards is mathematically notated below. Actions are taken to transition from one state to another and after transitioning to each new state a reward is assigned. For a sequence of states and actions, the net reward is the sum of rewards received for the sequence of states and actions, with future rewards discounted. The expected net reward for the execution of a sequence of states and actions is given by a state-action value function. The goal is to find an optimal state-action value function by identifying sequence of states and actions with highest net reward. Since multiple actions can be taken from each state, the goal is to also find an optimal policy that indicates the action from each state with the highest reward value. Consider a sequence of states s and actions a followed by rewards r, $s_t, a_t, r_{t+1}, s_{t+1}, a_{t+1}, r_{t+2}, s_{t+2}, a_{t+2}, r_{t+3}, \ldots a_T, r_T, s_T$. In some embodiments, the processor determines the net return $R_T = r_{t+1} + \gamma^1 r_{t+2} + \ldots + \gamma^{T-t-1} r_T$ to be expected in the future as the sum of the rewards received for the sequence of states and actions beginning from state $s_t$ and ending with terminal state $s_T$, wherein $0 \le \gamma < 1$ is a discount factor applied as distant rewards are less important. In some embodiments, the processor determines the value of a state-action pair using $Q(s, a) = E[R_T | s_t = s, a_t = a]$ which is equivalent to the expected return $R_T$ for the sequence of states and actions beginning with state $s_t$ and action $a_t$ and ending with terminal state $s_T$. By finding the sequence of states and actions which maximize the state-action value function Q (s, a), the processor determines the optimal value function $Q^*(s, a) = \max E[R_T | s_t = s, a_t = a]$. And the optimal policy $\pi^*(s) = \text{argmax } Q^*(s, a)$ for each state can be derived by the processor by identifying the highest valued action which can be taken from each state. To iteratively calculate the state-action value function for a given state s and action a, the processor may apply the Bellman Optimality equation. In some embodiments, the processor uses the optimal value function $Q^*(s, a) = E[r + \gamma \max Q^*(s', a')]$, obeying the Bellman Optimality equation. The equation expresses that the value for a given state s and action a should represent the current reward r observed at state s plus the maximum discounted y future reward for the next state s' the robot would end up in. In some embodiments, the processor uses the optimal value function to iteratively calculate the state-action value for a given state s and action a as the sequence of states and action are executed using $Q_{i+1}(s, a) = E[r + \gamma \max Q_i(s', a')]$. i is the iteration number and begins at i=0, with $Q_0(s', a')$ being initially assumed based, for example, on previous experience, the midpoint of the min and max value possible, or an arbitrary value. Based on the definition of an expected value, the equation is equivalent to $Q_{i+1}(s, a) = \Sigma P(s'|s) [r + \gamma \max Q_i(s', a')]$, wherein P(s'|s) is the probability that action a will lead to state s', as previously described above. In some embodiments, the sequence of states and actions corresponds to the states visited and actions taken while executing the movement path from start to finish, where actions are defined by the properties of vertices and edges chosen based on sensory input of the robot. Over time, as more states are visited and different actions from each state are evaluated the system will converge to find the most optimal action to take from each state thereby forming an optimal policy. Further, as different sequences of states and actions, i.e. movement paths, are evaluated over time, the system will converge to the most optimal sequence of states and actions. Detailed examples of path planning methods are described in U.S. patent application Ser. Nos. 16/041,286, 15/406,890, 14/673,633, 14/817,952, and 16/198,393, the entire contents of which are hereby incorporated by reference. FIG. 80 illustrates a flowchart describing an example of a method for generating a movement path of a robotic device, the method including steps 8000, 8001, 8002, and 8003.

In some embodiments, the processor divides the environment into subareas and orders them for coverage to improve operational efficiency. In some embodiments, the modular robot finishes operating in one subarea before operating in another subarea. For example, in some embodiments, the processor divides the map into a plurality of cells wherein each cell corresponds to an area of the environment. In some embodiments, the processor segments the map into a plurality of zones, each zone having a subset of the plurality of cells. In some embodiments, the processor determines a sequence of the zones among a plurality of candidate sequences based on an effect of the sequence on a cost of a cost function that is based on travel distance of the robot through the sequence. In some embodiments, the robot traverses the zones in the determined sequence. In some embodiments, the cost function is based on other variables, such as actual surface coverage of zones, repeat coverage of zones, and total operational time.

In some embodiments, the processor represents the map of a workspace by a plurality of cells, each cell representing a different location of the workspace. In some embodiments, each cell is defined by an ordered pair representing an angle and a distance from an origin of a coordinate system. In some embodiments, each cell of the workspace can only belong to a single zone and overlap between zones is avoided by construction. In some embodiments, entries in the matrices of zones have a value of zero if cell is empty or a value of one if the cell is occupied (e.g., by an object such as a wall, a building, a car, furniture, etc.). In some embodiments, the processor executes the following iteration for each zone of a sequence of zones, beginning with the first zone to optimize division of zones: expansion of the zone if neighbor cells are empty, movement of the modular robot to a point in the zone closest to the current position of the robot, addition of a new zone coinciding with the travel path of the robot from its current position to a point in the zone closest to the robot if the length of travel from its current position is significant, execution of a surface coverage pattern within the zone, and removal of any uncovered cells from the zone. In another embodiment, the processor determines an optimal coverage plan by minimizing a cost function. In some embodiments, the cost function depends on distance travelled between zones, total coverage, and total operational time. In some embodiments, the cost function is minimized by removing, adding, shrinking, expanding, moving and switching the order of coverage of zones. In some embodiments, the processor uses gradient descent to compute the division of zones that results in minimal cost by iteratively modifying division of zones based on a partial derivative of the cost function with respect to each respective parameter defining the zones. This is repeated until the cost is below a predetermined threshold. In yet another embodiment, the processor determines optimal division of zones by modeling zones as emulsions of liquid. Behaviors of emulsions of liquid, such as minimization of surface tension and surface area and expansion and contraction of the emulsion driven by an internal pressure are used by the processor in modeling the zones. In some embodiments, the processor represents the workspace by a grid map divided into zones. In some embodiments, the grid map is converted into a routing graph consisting of nodes connected by edges. A zone is represented by a set of nodes. The nodes are connected and represent an area on the grid map. A zone is assigned a set of boundary edges wherein a boundary edge connects two nodes. The set of boundary edges define the set of boundary nodes and give information about which are just inside and outside a zone. In some embodiments, a zone can be expanded or reduce by adding or removing nodes. In some embodiments, the processor computes a numerical value assigned to each node. In some embodiments, the value of each node indicates whether to add or remove the node from a zone. In some embodiments, the numerical value computed is dependent on growth and decay of the zone, distance of the node from the center of the zone, order of zone coverage, and a surface smoother score. In some embodiments, the processor computes an order score for each node to determine order of coverage based on the distance between the boundary node of interest and the closest boundary node in the next zone to be covered, the distance between the closest boundary nodes between the current zone and the next zone to be covered, and the distance between the furthest boundary nodes between the current zone and the next zone to be covered. Further details and examples of methods for dividing an environment into subareas are described in U.S. patent application Ser. Nos. 14/817,952, 16/198,393, and 62/740,558, the entire contents of which are hereby incorporated by reference.

In some embodiments, the memory of the modular robot may contain an internal database of obstacles likely to be encountered within the environment. In some embodiments, the database may further include humans likely to be encountered. In some embodiments, the camera of the modular robot or of a communication device held by the modular robot captures images of obstacles (and humans in some cases) in the environment. In some embodiments, the processor (of the robot or the communication device) identifies an obstacle by extracting features of the obstacle and comparing it with features of obstacles stored in the internal database. Similar methods may be applied for identifying humans captured in images. In some embodiments, the processor increases the likelihood of encountering that type of obstacle in the region of the environment in which it was encountered. For example, when a robot encounters a remote, image sensors of the robot capture images of the remote and the processor determines it is a remote based on features of remote extracted from the image matching with features of a remote stored in an internal database. The processor of the robot may mark the region in which the remote was encountered within an internal map as a region with increased likelihood of containing a remote. In some embodiments, regions wherein obstacles are consistently encountered may be classified by the processor as a high obstacle density area. In some embodiments, the processor of the robot may attempt to alter its movement path to avoid areas with high obstacle density. In some embodiments, the date, time, location, and type of obstacle encountered may be catalogued for use in future working sessions. In some embodiments, for example, where obstacles are encountered frequently at a similar time, a robot may plan a working session for such an area when obstacles are encountered less frequently, and may prioritize working in other locations at such times.

In some embodiments, all data are processed on the robot. In other embodiments, some data are processed on at least one separate device, such as a docking station of the robot, a communication device, or another external computing device.

The techniques described herein, e.g., such as localization, mapping, and depth perceiving techniques, may be implemented in software, in hardware, in a system on a chip, a module, a combination with other hardware on a PCB, in a single silicon chip, a combination of software and one or more silicon chips, a combination of software and a multi-purpose chip, or a specific application chip with built in mapping capabilities. In some embodiments, the implementations may include built-in circuitry for easier and faster processing and GPUs and TPUs capabilities. In some embodiments, the localization techniques described herein may be implemented on a localization chip or a processing chip with localization processing unit.

The techniques described herein, e.g., such as localization, mapping, and depth perceiving techniques, may be implemented in software, in hardware, in a system on a chip, a module, a combination with other hardware on a PCB, in a single silicon chip, a combination of software and one or more silicon chips, a combination of software and a multi-purpose chip, or a specific application chip with built in mapping capabilities. In some embodiments, the implementations may include built-in circuitry for easier and faster processing and GPUs and TPUs capabilities. In some embodiments, a localization and mapping chip or a processing chip such as a CPU or MCU with a localization and mapping processing unit may be used.

The methods and techniques described herein may be implemented by various types of robots, as described and illustrated (e.g., FIGS. 1-12) above. As a further example, the methods and techniques described herein may be implemented by a robotic cleaning device. In some embodiments, the robotic cleaning device further includes a main brush and one or more peripheral brushes (in addition to at least some of the components of a robot described above). The main brush may rotate about an axis parallel to the floor and the peripheral brush may rotate about an axis normal to the floor. The main brush may have a contact area that is more than 1.5 times, 2 times, 3 times, or 5 times larger than that of the peripheral brush. During cleaning, power applied to the main brush may be more than 1.5 times, 2 times, 3 times, or 5 times larger than that of the peripheral brush. Some embodiments include a peripheral brush of a robotic cleaning device including a gear train (or other mechanical system affording a mechanical advantage, like belt and pulley systems, contact wheels of different size, and the like) capable of rotation in two directions (e.g., about a given axis of rotation and when assembled into the robot) and connected to (e.g., such that it is configured to drive rotation of the brush) the peripheral brush such that the peripheral brush can be manually (e.g., with less than 1,000 inch-ounces, like less than 500 inch-ounces, such as less than 100 inch-ounces) rotated in two directions when the peripheral brush is powered off or spinning is suspended (e.g., due to entanglement with an obstruction). In some embodiments, manual rotation of the peripheral brush can be by, for example, a user or an obstruction. For example, a user can manually rotate a peripheral brush of a robotic cleaning device when it is turned off in one or two directions to remove any obstructions, such as hair or cables, from the peripheral brush or to access different modules through the bottom of the robotic cleaning device such as a brush guard, battery or front wheel. In some cases, manual rotation may be achieved without gear stripping (e.g., without teeth of gears ceasing to mesh and sliding over one another). In some cases, manual rotation may be achieved with or without the coupled motor turning as well. The ability to rotate in two directions is expected to protect against damage that can be inflicted on the gears by forceful manual rotation of a connected peripheral brush in a direction in which the brush is not configured to operate. In another example, an obstruction can manually rotate a peripheral brush in either direction when the peripheral brush is turned off, such as during the docking process, as the robotic cleaning device moves past the obstruction thereby reducing the possibility of getting stuck due to an obstruction. In some embodiments, the gear train and connected peripheral brush are configured to automatically rotate in one or two directions during operation using an electric power supply. For example, a processor of a robotic cleaning device may command a motor to automatically rotate a peripheral of the robotic cleaning device back and forth in opposite directions to loosen any obstructions that become entangled during operation. In some embodiments, motor acceleration and torque may be lower during such a loosening process than when cleaning, or some embodiments may increase these operational parameters to break the brush free. An obstruction (or otherwise obstacle) may include, but is not limited to, objects, items, or matter that may compromise operation of the robotic device or components thereof in a working environment. Examples are cords, cables, wires, toys, debris, dust, dirt, rocks, hair, thread, liquid substances, or other objects, items or matter that may compromise the functionality or operation (e.g., clogging suction channels, entanglements with brushes, etc.) of components of the robotic device or the robotic device itself. Additionally, obstructions may include objects, items, or matter that may cause damage to the robotic device or components thereof (e.g., due to a collision) or prevent the robotic device or components thereof from functioning or operating properly (e.g., a liquid substance interfering with vacuuming function).

In some embodiments, the gear train includes one or more of spur gears, helical gears, bevel gears, and/or other types of gears that can be used to assemble a gear train capable of rotation in two directions such that the peripheral brush can be manually rotated in two directions when the peripheral brush is powered off or spinning is suspended. Some embodiments may implement similar techniques with harmonic gears, belt-and-pulley stems, contact wheels, or magnetic gears. In some embodiments, the gear train with connected peripheral brush is configured to automatically rotate in one or two directions using an electric supply during operation. For example, a processor of a robotic cleaning device may command a motor to automatically rotate a peripheral brush back and forth upon detecting entanglement with an obstruction (e.g., with less than 720 degrees, or 360 degrees rotation in a given direction in each quarter cycle). In some embodiments, the processor detects entanglement with an obstruction by monitoring the power supplied to the motor of the gear train as entanglement with an obstruction often results in an increase in power supplied to the gear train to maintain the desired peripheral brush speed.

Figure 81:
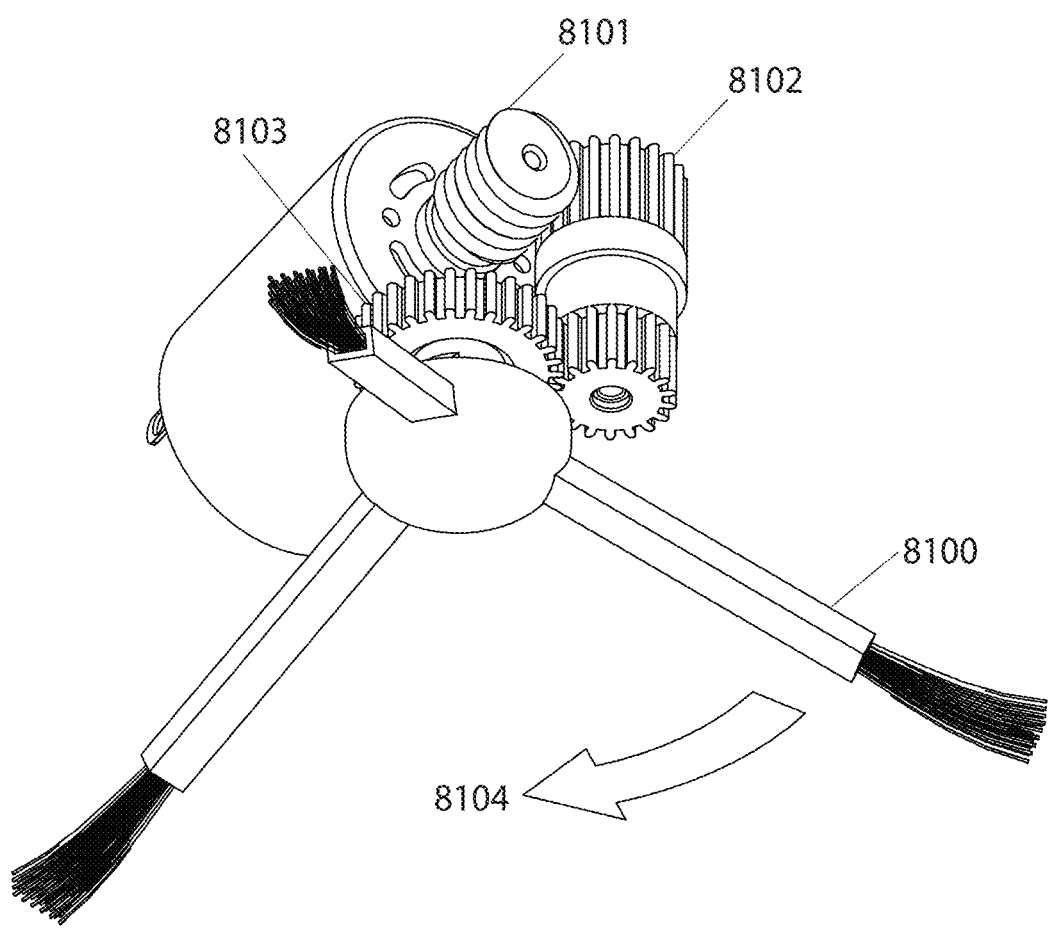
FIG. 81 illustrates a peripheral brush with a gear train comprising a worm gear capable of rotation in one direction, according to some embodiments.

FIG. 81 illustrates peripheral brush 8100 connected to a gear train comprising worm 8101 as the drive gear. Worm 8101 interfaces with worm gear 8102 interfacing with gear 8103 connected to peripheral brush 8100. The gear train and connected peripheral brush 8100 are only capable of rotation in one direction such that peripheral brush 8100 can only rotate in direction 8104 both automatically during electrical operation of the peripheral brush and manually when the peripheral brush is powered off. In other words, the mechanical system of FIG. 81 only permits power to be delivered in one direction, from the motor to the brush. The brush cannot drive rotation of the motor because the direction of transmission of the worm gear is not reversible. The direction of rotation of the gear train is not reversible due to friction forces between worm 8101 and worm gear 8102. The gear teeth of worm gear 8102 lock against the gear teeth of worm 8101 as the force component circumferential to worm 8101 is not sufficient enough to overcome the friction generated from sliding contact between the worm gear pair. Therefore, attempting rotation of peripheral brush 8100 in a direction opposite direction 8104 (e.g., when the motor is not being driven in that opposite direction) may result in gear damage and/or stalling of peripheral brush 8100. In some cases, the motor is configured to be driven in only one direction of rotation.

Figure 82A:
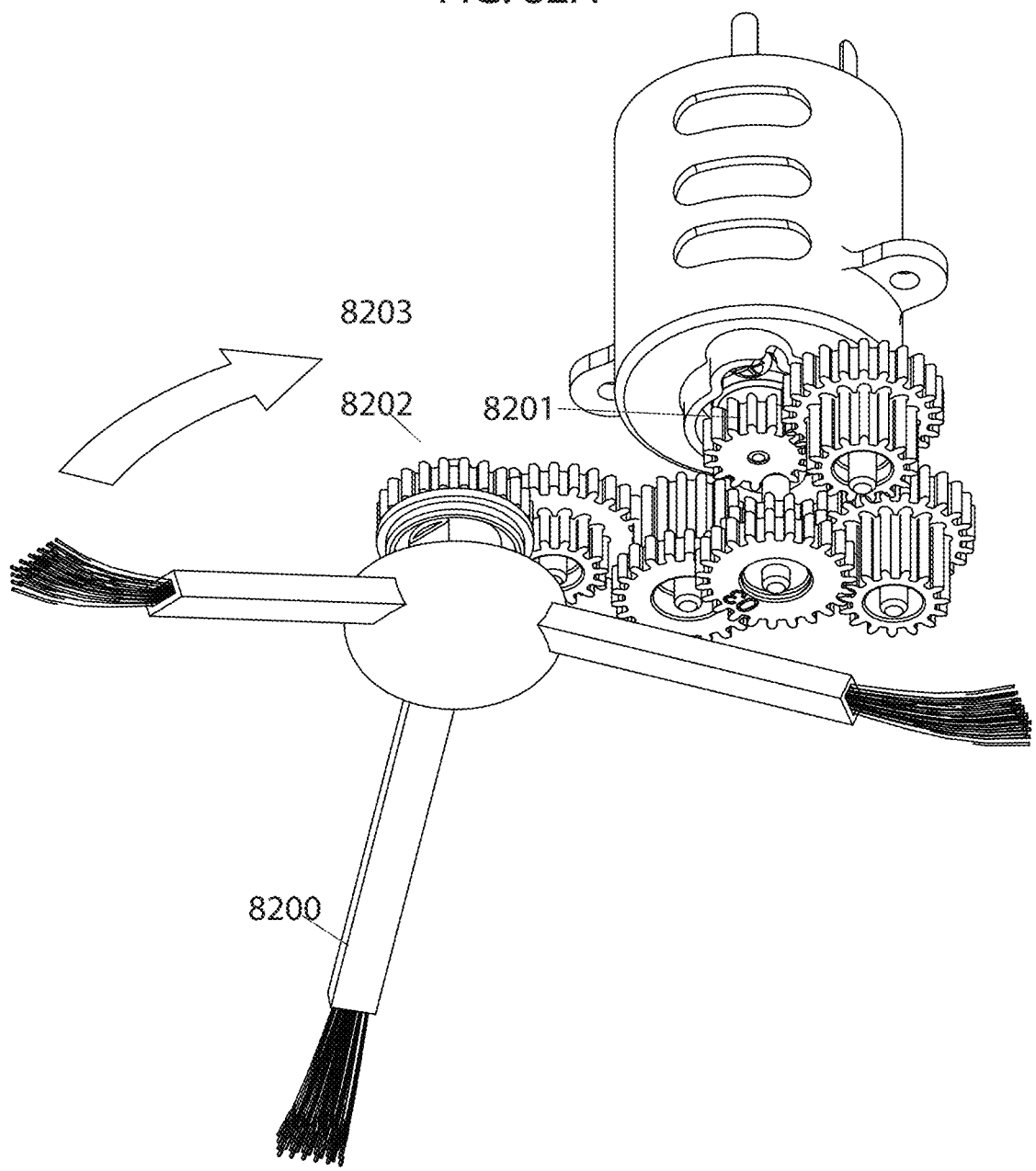

FIG. 82A illustrates peripheral brush 8200 connected to a gear train comprising driving gear 8201. Multiple spur gears connect with one another to rotate spur gear 8202 and connected peripheral brush 8200. In the illustration shown, the gear train and connected peripheral brush 8200 are configured to automatically rotate in direction 8203 using an electric supply during operation. In other embodiments, the gear train and connected peripheral brush 8200 can be configured to automatically rotate in two directions during operation. Since spur gears are used, peripheral brush 8200 may, but need not be, be manually rotated in two directions when the peripheral brush is powered off or spinning is suspended. FIG. 82B illustrates manual rotation of peripheral brush 8200 and connected gear train by user 8204 in directions 8203 and 8205. Manual rotation of peripheral brush 8200 may be required to remove obstructions or to access components through the bottom of the robotic cleaner to which peripheral brush 8200 belongs. In some embodiments, the direction of transmission of the gear train may be reversible, such that the brush may drive rotation of the motor when the brush is rotated by hand, and the motor may drive rotation of the brush when the motor is powered. The illustrated transmission with a reversible direction of transmission is shown for a peripheral brush, but similar techniques may be applied to drive a main brush and wheels.

In some embodiments, different mechanisms are used to oscillate the peripheral brush. Examples of oscillating mechanisms for a peripheral brush are provided in U.S. patent application Ser. No. 15/924,176, the entire contents of which are hereby incorporated by reference.

In some embodiments, the peripheral brush of the robotic cleaner includes one or more arms (three are shown) to which bristles are securely attached such that bristles remain in place when pulled and/or at risk of being plucked from the one or more arms of the peripheral brush. In some embodiments, the arms are hollowed tubes. In some embodiments, the bristles are secured to the one or more arms of the peripheral brush using stitching. In some embodiments, the bristles are bundled together and securely stitched to the one or more arms, forming one or more compact and firm brushes that result in more effective sweeping of debris as bristles are not lost over time and the brush maintains its fullness. In some embodiments, the secure stitching of bristles to the one or more arms of the peripheral brush avoid the bristles from being forcibly plucked during operation when, for example, the bristles become entangled with or caught up with an obstruction (e.g. cable, hair, or carpet) or make contact with a sticky substance or become lodged between objects and the robotic cleaner or when the peripheral brush continues or attempts to continue to rotate when entangled with an obstruction.

In some embodiments, the stitching technique used to stitch the bristles together and/or to the one or more arms of the peripheral brush can vary. For example, stitching the bristles together can include stitching across the bundle of bristles in a straight line in a direction perpendicular to the length of the bristles. In another example, stitching the bristles together can include stitching diagonally across the bristles in two directions. In other instances, other stitching techniques can be used, such as stitching in a crisscross pattern. In some embodiments only one type of stitching technique is used while in other embodiments more than one type of stitching technique is used. In some embodiments, a stitching technique is repeated multiple times. For example, multiple parallel stitching lines along an end of the bundle directed perpendicular to the length of the bristles can be used to increase the fastening strength of the bristles to one another. FIGS. 83A-83D illustrate examples of stitching techniques including across a bundle of bristles 8300 using straight line technique 8301, diagonal technique 8302, crisscross technique 8303, and combined straight line and crisscross techniques 8304, respectively. In some embodiments, the bristles are stitched together and then stitched to the one or more arms of the peripheral brush. In some embodiments, the one or more arms of the peripheral brush include small openings through which the stitching material can be weaved in order to stitch the bristles to the one or more arms. Similar to FIG. 83, any stitching technique can be used in stitching the bristles to the one or more arms. For example, FIG. 84A illustrates arm 8400, with small openings 8401 on the top surface of arm 8400 through which stitching material is weaved in an in and out pattern 8402 to secure bristles 8403 to arm 8400. In FIG. 84B, openings 8401 in arm 8400 are placed on the top surface such that a diagonal stitching technique 8404 can be used to stitch bristles 8403 to arm 8400. In FIG. 84C, openings 8401 in arm 8400 are placed on side surfaces (not shown) such that a straight stitching technique 8405 can be used to stitch bristles 8403 to arm 8400. In FIG. 84D, openings 8401 are placed on the top surface and side surfaces (not shown) of arm 8400 such that crisscross pattern 8406 and straight stitching 8407 techniques can be used simultaneously for extra reinforcement.

In some embodiments, the material used for stitching the bristles to the one or more arms of the peripheral brush can include, but are not limited to, thread, twine, nylon, silicon, metal, glue, or the like.

In some embodiments, other methods for securing the bristles together and/or to the one or more arms of the peripheral brush are used. For example, the bristles can be secured to the one or more arms of the peripheral brush using a clamp spanning across the bristles and secured to the one or more arms. In another example, the bristles are secured to one another and to the one or more arms of the peripheral brush by using heat to melt the bristles into one another and the one or more arms. In another instance, glue can be used to secure the bristles to one another and/or the one or more arms of the peripheral brush. In some embodiments, the bristles are secured to one another using one type of method and secured to the peripheral brush using another type of method. For example, bristles can be glued together on one end and securely attached to the one or more arms of the peripheral brush using stitching. In some embodiments, multiple methods of securing the bristles to one another and/or to the peripheral brush are used simultaneously.

Figure 85:
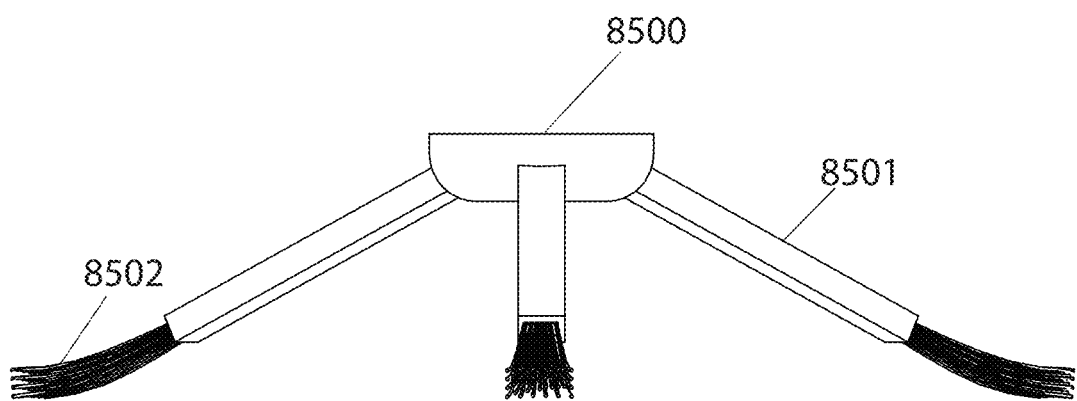
FIGS. 85-87 illustrate examples of a peripheral brush of a robotic cleaner, according to some embodiments.

In some embodiments, the one or more arms of the peripheral brush are hollowed and the bristles extend out from an end of the one or more arms. In some embodiments, the length of the portion of bristles within the hollowed arm varies. In some embodiments, the portion of the bristles within the one or more hollowed arms are secured within the one or more hollowed arms using one or more of the securing methods described herein or using another method of securing the bristles to the one or more arms of the peripheral brush. FIG. 85 illustrates peripheral brush 8500 with hollowed arms 8501 and bristles 8502 extending out from arms 8501. The portion of bristles 8502 within hollowed arms 8501 are secured to hollowed arms 8501.

Figure 86:
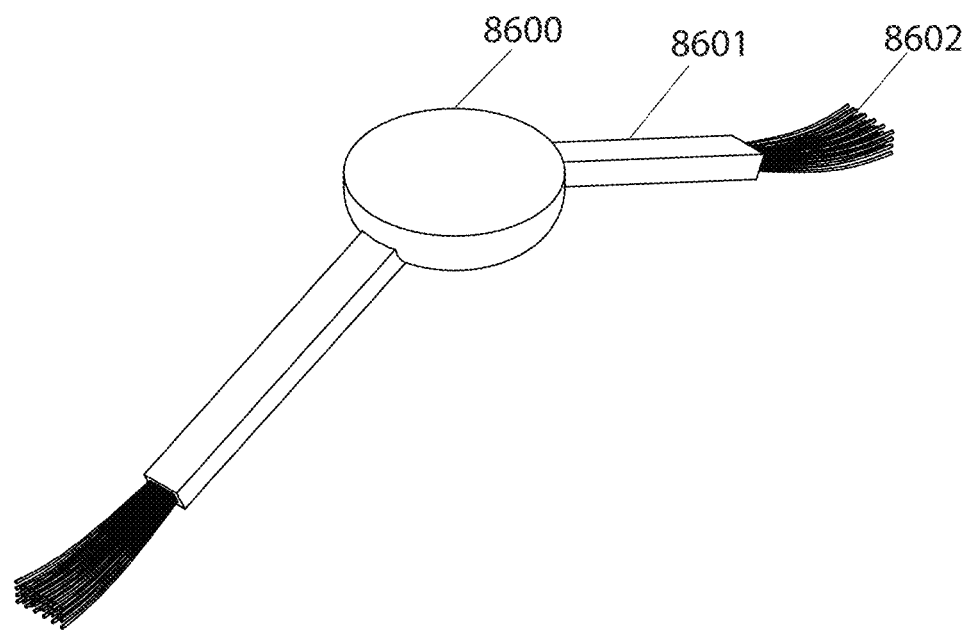
Figure 87:
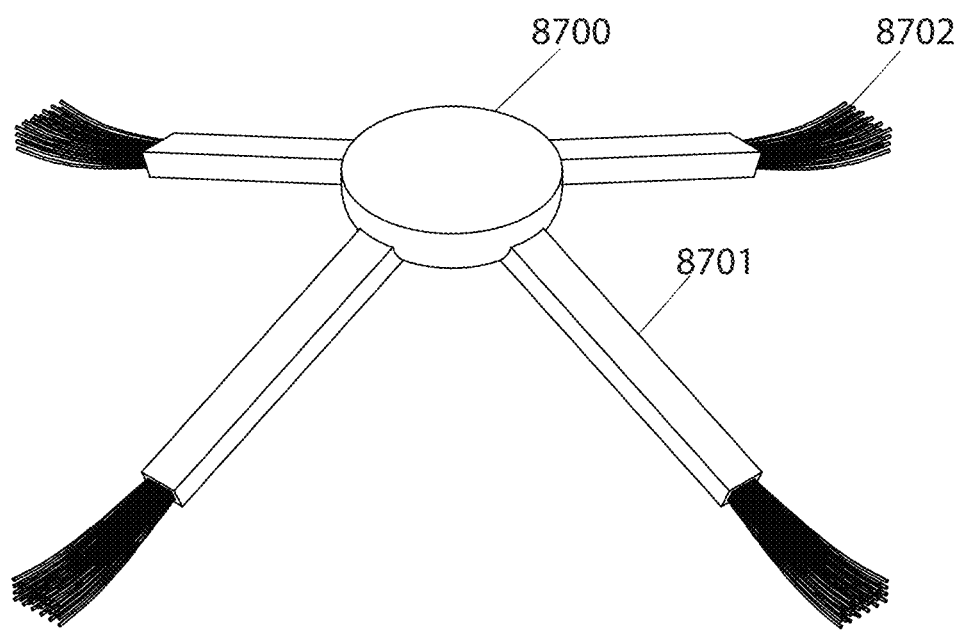

The number of arms of the peripheral brush may vary. In some embodiments, the arms are arranged in a rotationally symmetric array around an axis of rotation of a peripheral brush. Various combinations are possible, for example, some peripheral brushes include one arm while other peripheral brushes include two, five, seven or any other number of reasonable arms. For example, FIG. 86 illustrates peripheral brush 8600 with two arms 8601 and bristles 8602 while FIG. 87 illustrates peripheral brush 8700 with four arms 8701 and bristles 8702.

In some embodiments, wherein the robotic cleaner includes more than one peripheral brush, each peripheral brush can be operated independently. For example, a processor of a robotic device with three peripheral brushes can choose to power peripheral brush one and power off peripheral brush two and three or can choose to power on peripheral brush one and three and power off peripheral brush two. This embodiment is further described in U.S. patent application Ser. No. 16/024,263, the entire contents of which are hereby incorporated by reference, which provides, for example, embodiments of a method and apparatus of a mobile robotic cleaning device using multiple side brushes and embodiments of a mobile robotic cleaning device with the ability to control multiple side brushes independently of one another.

In some embodiments, the length of the one or more arms of the peripheral brush are identical. In alternative embodiments, the length of the one or more arms of the peripheral brush are different. In some embodiments, the one or more arms of the peripheral brush retract or extend to become shorter or elongated. In some embodiments, the bristles of the peripheral brush retract or extend to become shorter or elongated. In some embodiments, the bristles retract or extend from within the one or more hallowed arms of the peripheral brush.

Figure 88A:
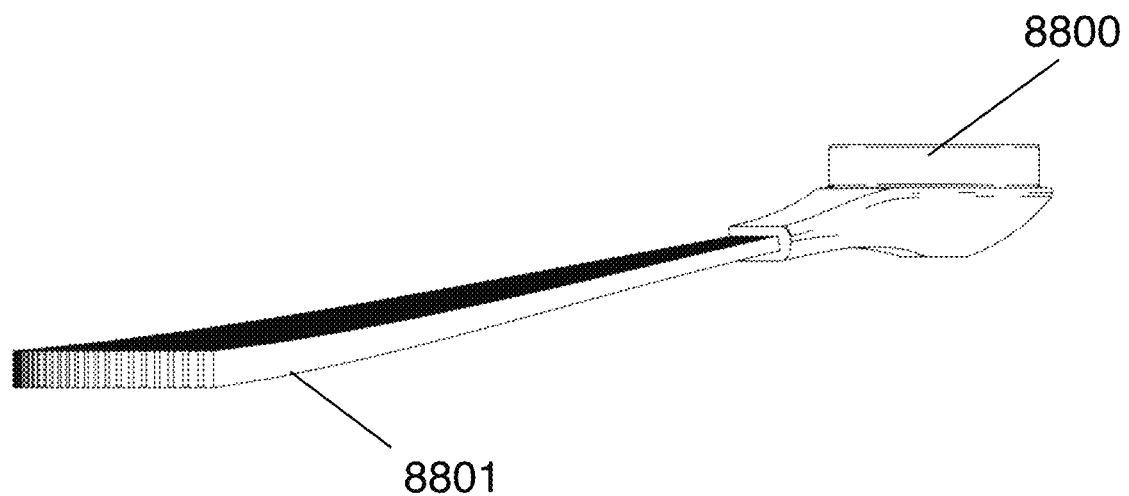
FIGS. 88A and 88B illustrate examples of a peripheral brush with long soft bristles, according to some embodiments.
Figure 88B:
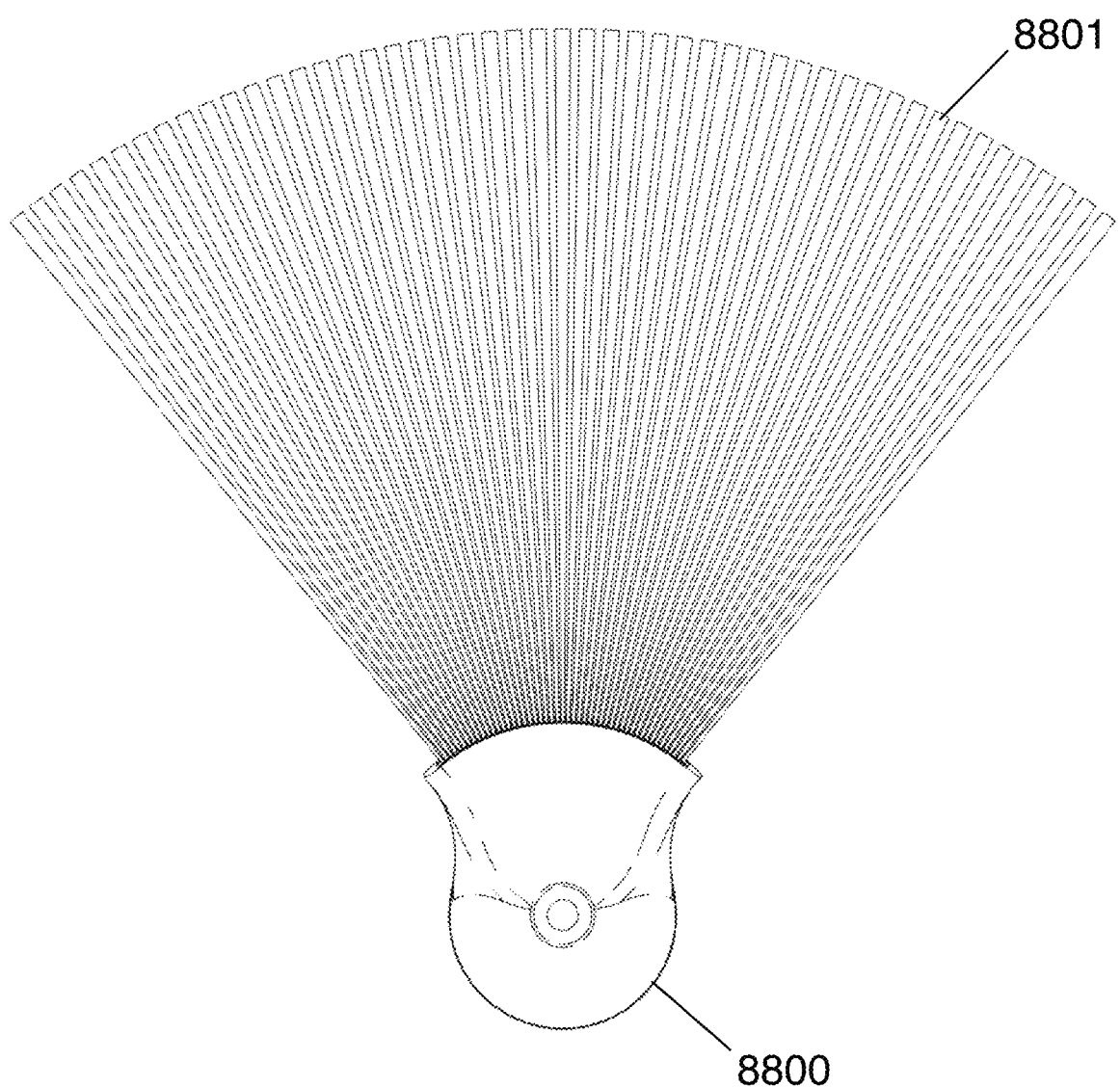

In some embodiments, the length of the portion of exposed bristles is smaller in proportion to the length of the arm such that entanglement with obstruction is more likely to occur with the one or more arms as opposed to the brush bristles thereby maintaining the condition of the brush. In some embodiments, the bristles of the peripheral brush are soft and elongated to prevent bristles from becoming entangled with obstructions as they may sweep over them as opposed to firmer bristles that are more likely to become lodged or entangled with obstructions. For example, FIGS. 88A and 88B illustrate side and top views of peripheral brush 8800 with long soft bristles 8801. Examples of peripheral brushes with long soft bristles are further described in U.S. patent application Ser. No. 16/203,385, the entire contents of which is hereby incorporated by reference.

In some embodiments, the peripheral brush is easily attached and removed to a chassis of a robotic cleaner by, for example, snapping into and out of the chassis of the robotic cleaner, e.g., by engaging the brush via a resilient latch. In alternative embodiments, the peripheral brush is attached to the chassis by, for example, screws, glue, sliding into a socket or by other means.

In some embodiments, the one or more peripheral brushes are substantially parallel and in close proximity to the adjacent bottom surface of the robotic cleaning device such that the likelihood of entanglement with obstructions is minimized. The close proximity between the one or more peripheral brushes and adjacent bottom surface of the robotic cleaner may reduce the likelihood of capturing obstructions between the two as there is no room for such obstructions to fit. In some embodiments, the portion of the bottom surface of the robotic cleaning device to which the peripheral brush is coupled is formed to follow the same form as the peripheral brush such that the arms and bristles of the peripheral brush are parallel and in close proximity to the adjacent bottom surface of the robotic cleaning surface. In some embodiments, the arms are parallel and in close proximity to the adjacent bottom surface of the robotic cleaning surface and the bristles are substantially parallel and in close proximity to the adjacent bottom surface.

In some embodiments, the motor is angled such that the angles of bundles with respect to the driving surface plane is different as the bundle rotates 360 degrees, for optimal cleaning. In some embodiments, the robotic cleaner includes various numbers of peripheral brushes. For example, the robotic cleaner can include one, three, five, or any reasonable number of peripheral brushes. In some embodiments, the one or more peripheral brushes include a side brush cover to prevent interaction with obstructions. An example of a side brush cover is provided in U.S. patent application Ser. No. 15/647,472, the entire contents of which are hereby incorporated by reference.

In some embodiments, the processor of the robotic cleaner monitors the current drawn by the driving motor of the one or more peripheral brushes. In some embodiments, the processor detects when the current drawn by the driving motor of the one or more peripheral brushes increases beyond a predetermined current and in response suspends spinning of the one or more peripheral brushes, turns off the power to the one or more peripheral brushes, turns off the robotic cleaner and/or executes another response. When a peripheral brush operates normally, the current drawn by its driving motor generally remains within an expected range, however, when the peripheral brush is jammed due to, for example, entanglement with or lodging against an obstruction (e.g., a cord, carpet, etc.), the driving motor draws more current as the motor attempts to continue to rotate. The processor monitoring current drawn by the driving motors of the one or more peripheral brushes can prevent damage to the robotic cleaner.

Figure 89:
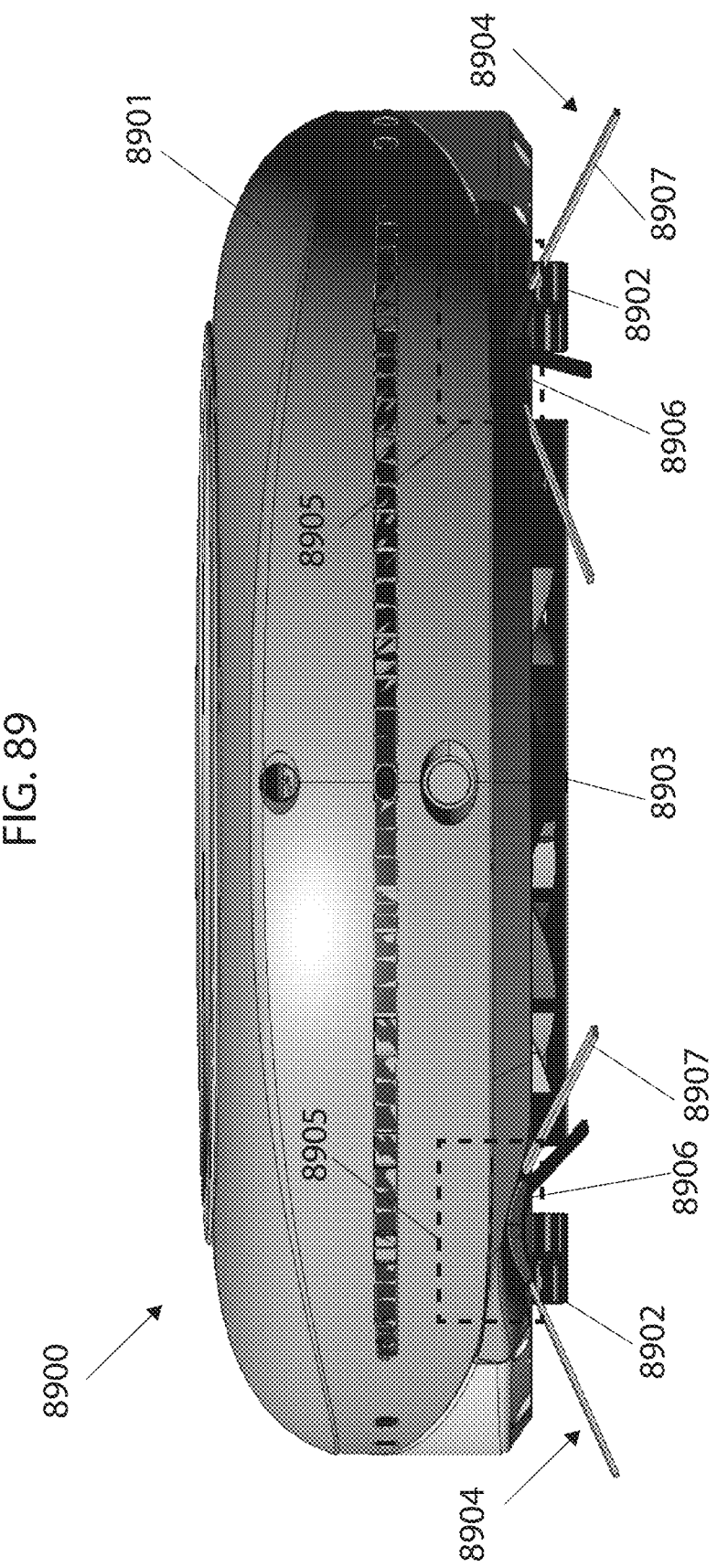
FIG. 89 illustrates an example of a robotic cleaning device with main brush and side brushes, according to some embodiments.

FIG. 89 illustrates an example of a robotic cleaner with peripheral brushes that may implement the methods and techniques described herein. Robotic cleaning device 8900 includes, among other components, a chassis 8901, wheels 8902, a main brush 8903, and two peripheral brushes 8904 attached to chassis 8901. The portions of the bottom surface 8905 of the robotic cleaning device to which peripheral brushes 8904 are coupled is formed to follow the same form as peripheral brushes 8904 such that arms 8906 and bristles 8907 of peripheral brushes 8904 are substantially parallel and in close proximity to the adjacent bottom surface of the robotic cleaning surface. In this case, arms 8906 are parallel and in close proximity to adjacent bottom surface 8905 of the robotic cleaning surface and bristles 8907 are substantially parallel and in close proximity to adjacent bottom surface 8905. In this way, the likelihood of entanglement with an obstruction or lodging of an obstruction is reduced. In some cases, the angle 8908 is further reduced.

Figure 90:
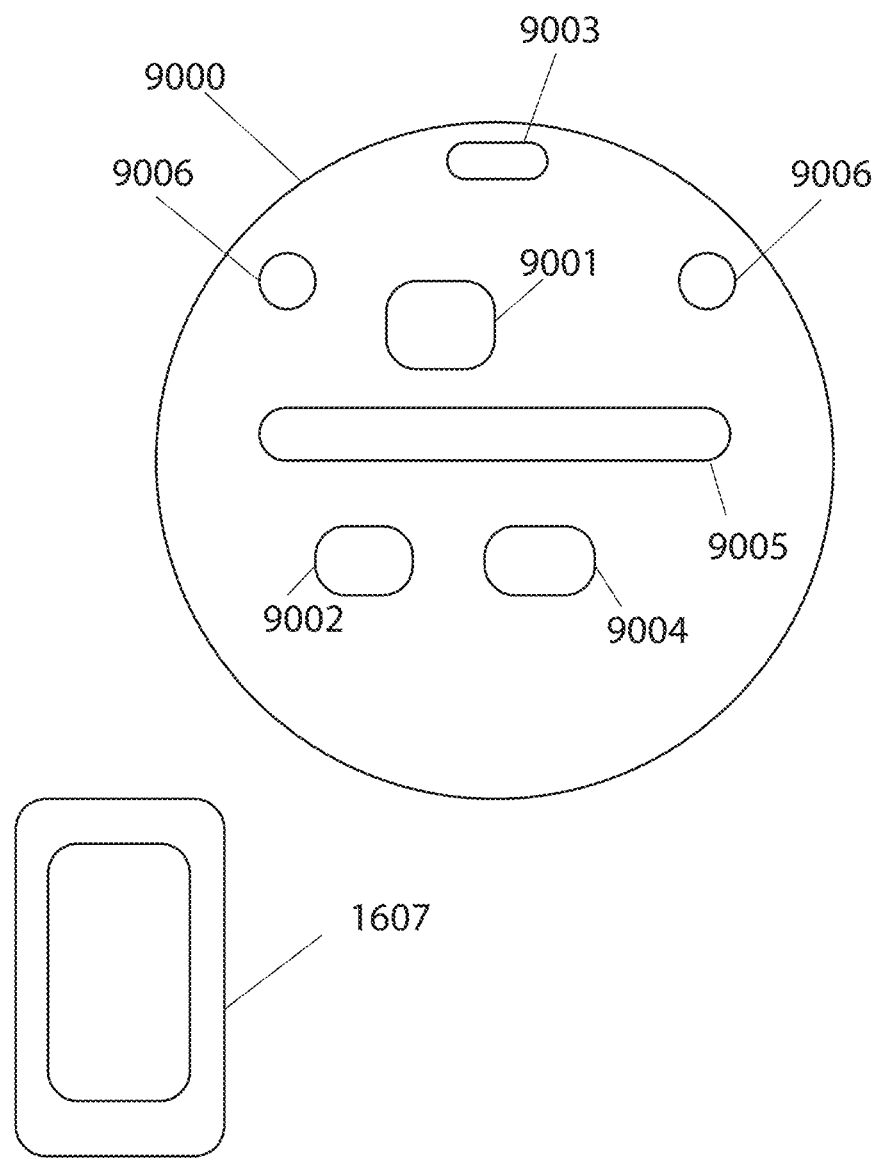
FIG. 90 illustrates an example of a robotic cleaning device and a communication device paired with the robotic cleaning device according to some embodiments by which the techniques described herein may be implemented.

FIG. 90 illustrates an example of a robotic cleaning device 9000 with a processor 9001, memory 9002, one or more sensors 9003, actuator 9004, main brush 9005, and side brushes 9006. In some embodiments, the robotic cleaner 9000 may include the features of a robotic cleaner described herein. In some embodiments, program code stored in the memory 9002 and executed by the processor 9001 may effectuate the operations described herein. Some embodiments additionally include communication device 9007 (e.g., mobile device, laptop, remote control, specialized computer, desktop computer, tablet, etc.) having a touchscreen 9008 and that executes an application by which the user interfaces with robotic cleaner 9000. In some embodiments, processor 9001 and memory 9002 implement some of the functionality described herein. In some embodiments, a user may provide instructions to robotic cleaner 9000 to perform certain tasks or to use certain settings at certain times or in certain areas of the environment using an application of communication device 9007 wirelessly paired with robotic cleaner 9000.

Figure 91A:
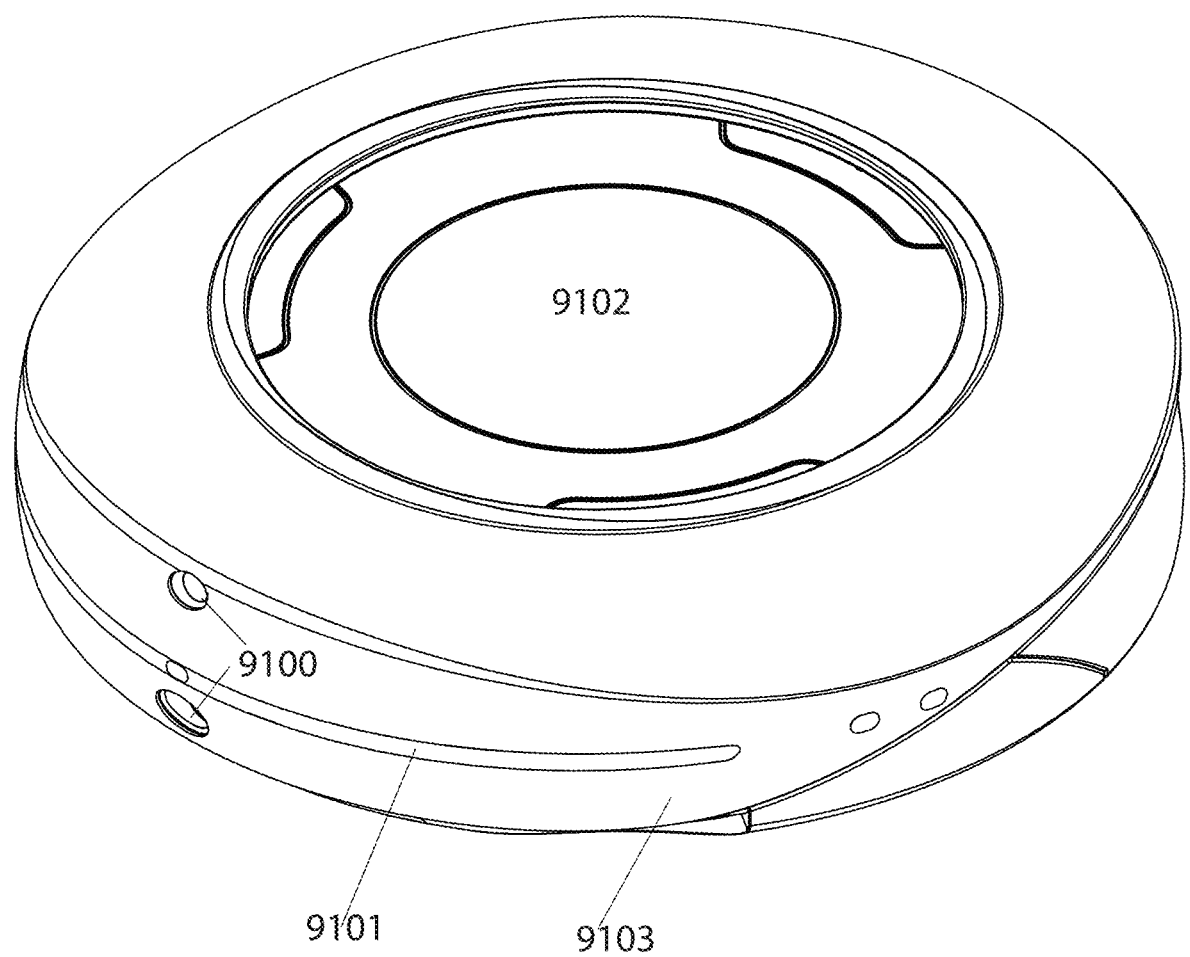
FIGS. 91A-91E illustrate an example a robotic surface cleaner according to some embodiments by which the techniques described herein may be implemented.
Figure 91B:
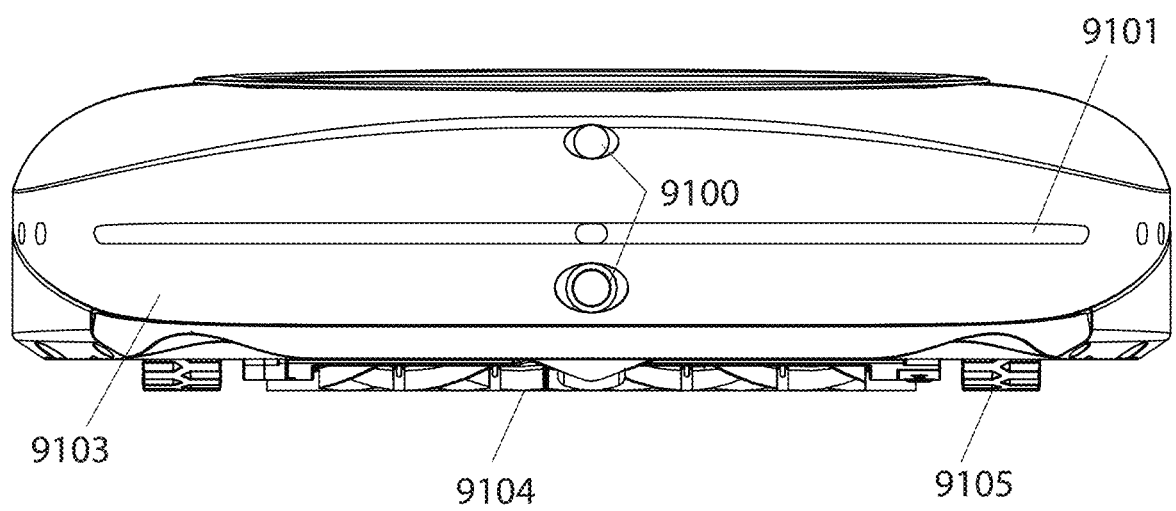
Figure 91C:
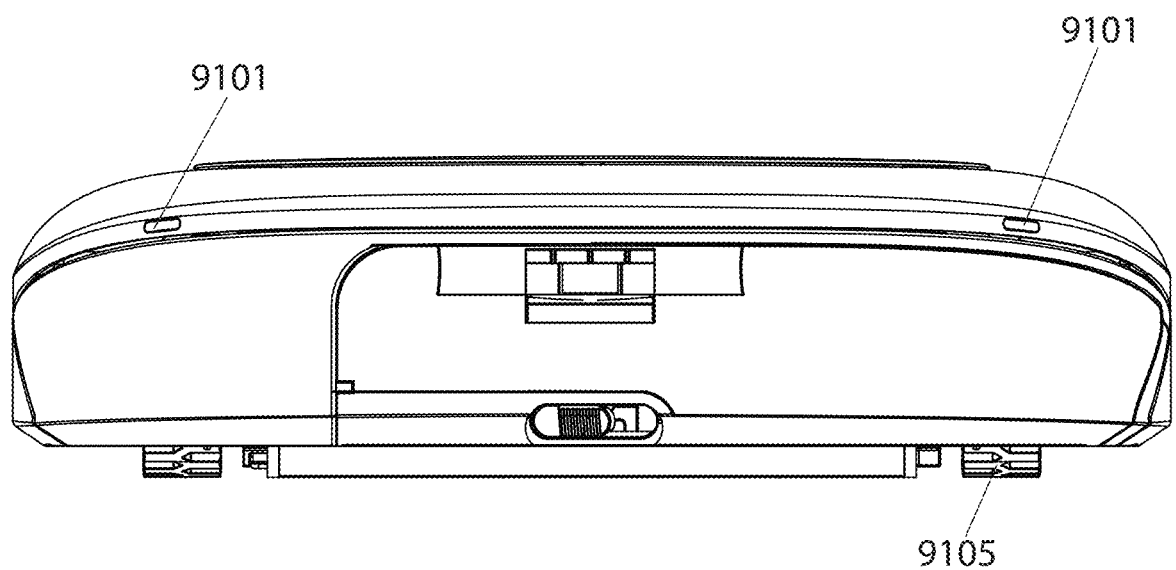
Figure 91D:
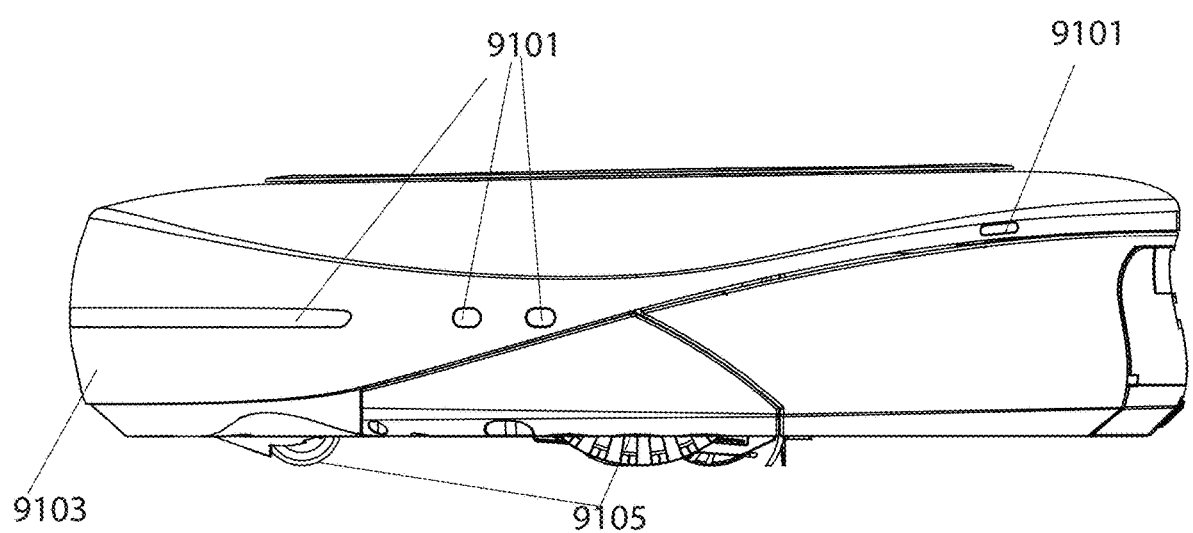
Figure 91E:
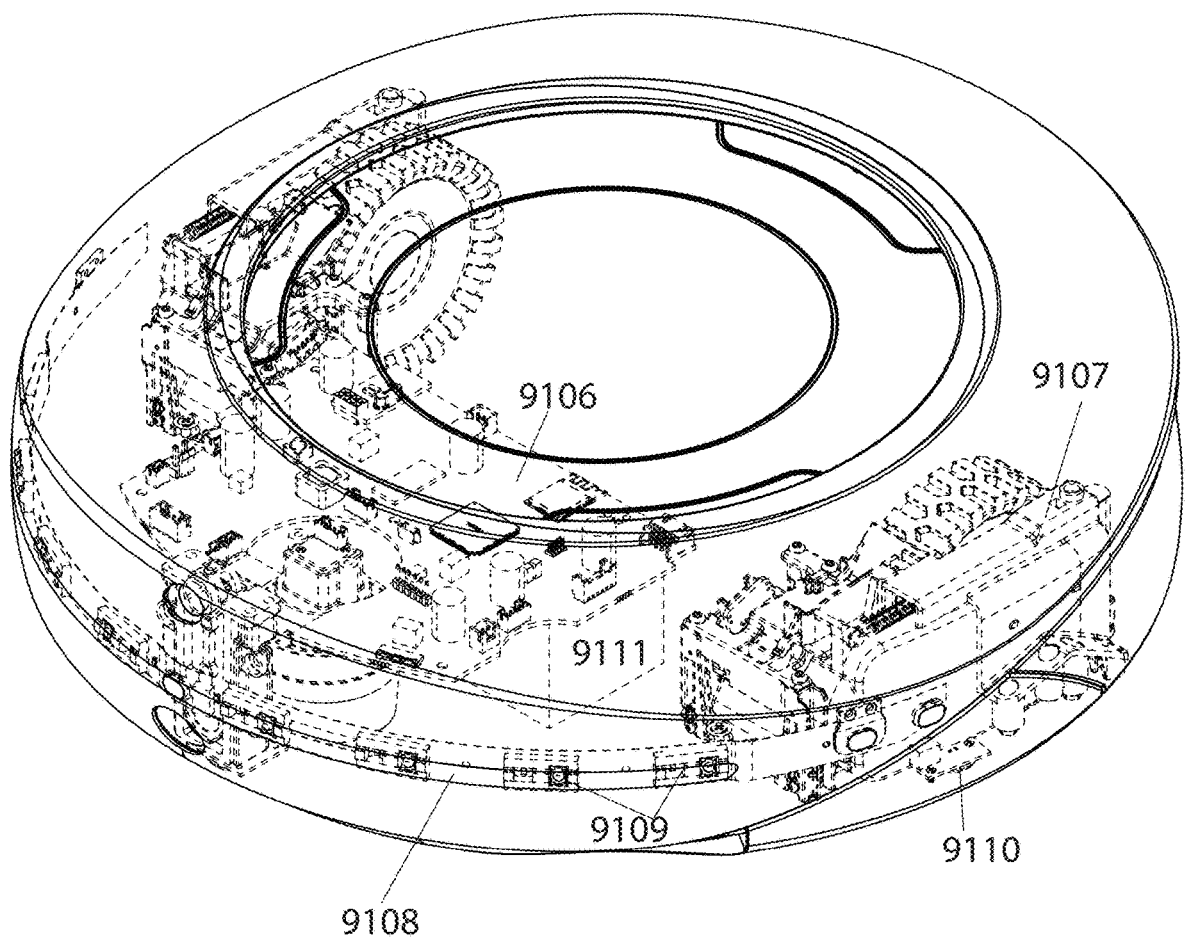

FIGS. 91A-91D illustrate a top perspective, front, rear, and side view of an example of a robotic surface cleaner including camera and LIDAR module 9100, sensor windows 9101 behind which obstacle sensors are positioned, graphical user interface 9102, bumper 9103, cleaning tool 9104, and wheels 9105 (drive and castor wheels). FIG. 91E illustrates internal components including PCB 9106, wheel suspension modules 9107, sensor array 9108 with sensors 9109 (e.g., TSSP sensors, TOF sensors, LED transmitters and receivers) positioned around the front perimeter of the robot, floor sensor 9110, and battery 9111.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The present techniques will be better understood with reference to the following enumerated embodiments:

1. A robot, comprising: a chassis; a set of wheels coupled to the chassis; one or more electric motors electrically coupled to the set of wheels; a network card providing wireless connectivity to the internet; a plurality of sensors; a processor electronically coupled to the plurality of sensors and configured to receive sensor readings; and a tangible, non-transitory, machine readable medium storing instructions that when executed by the processor effectuates operations comprising: capturing, with at least one exteroceptive sensor, a first image and a second image, wherein: the first image is captured from a first position and orientation and the second image is captured from a second position and orientation, different from the first position and orientation; and the first image and second image comprise unprocessed raw pixel intensity values or processed depth values; determining, with the processor, an overlapping area of a field of view of the first image and of a field of view of the second image by comparing the raw pixel intensity values or depth values of the first image to the raw pixel intensity values or depth values of the second image; combining, with the processor, the first image and the second image at the overlapping area to generate a digital spatial representation of the environment, wherein: the digital spatial representation of the environment comprises areas of the environment already explored by the robot; and the digital spatial representation indicates locations of physical objects and boundaries of the environment already explored by the robot; and estimating, with the processor using a statistical ensemble of simulated positions of the robot, a corrected position of the robot within the digital spatial representation of the environment to replace a last known position of the robot within the digital spatial representation of the environment, wherein: estimating the corrected position occurs if the processor loses knowledge of the position of the robot in the digital spatial representation of the environment during a movement from the last known position to a new intended position while performing a task; the processor loses the position of the robot due to a drift in intended trajectory; each simulated position comprises a function of angular and linear error in trajectory convolved with the new intended position; and the processor checks sensor readings received from at least one sensor against each simulated digital spatial representation of the environment corresponding with a perspective of each simulated position of the robot to choose a most feasible position of the robot as the corrected position within the digital spatial representation of the environment.

2. The robot of embodiment 1, wherein the sensor readings comprise one or more of: visual and depth readings.

3. The robot of embodiments 1-2, wherein the statistical ensemble reduces to at least one position when the sensor readings of at least one sensor are captured.

4. The robot of embodiments 1-3, wherein the most feasible position of the robot is the position with the highest probability of being the true position of the robot.

5. The robot of embodiments 1-4, wherein certainty of the location of the robot decreases with movement of the robot and increases with the number of sensor readings in agreement.

6. The robot of embodiments 1-5, wherein determining an area of overlap of the field of view of the first image and the field of view of the second image comprises aligning the raw pixel intensity values or depth values of the first image and the raw pixel intensity values or depth values of the second image.

7. The robot of embodiment 6, wherein aligning the raw pixel intensity values or depth values of the first image and the raw pixel intensity values or depth values of the second image comprises: determining, with the processor, aggregate amounts of difference between overlapping portions of the first image and the second image at candidate alignments displaced from an approximate alignment; and selecting, with the processor, a candidate alignment that produces a lowest aggregate amount of difference among the candidate alignments or selecting, with the processor, a candidate alignment that produces an aggregate amount of difference less than a threshold.

8. The robot of embodiments 1-7, wherein the operations further comprise: determining, with the processor, a movement path of the robot in real-time based on the digital spatial representation of the environment and observations of the environment; and controlling, with the processor, an actuator of the robot to cause the robot to move along the movement path.

9. The robot of embodiment 8, wherein determining the movement path comprises determining lengths of segments of the movement path, the segments having a linear or arc motion trajectory.

10. The robot of embodiment 8, wherein the movement path comprises a boustrophedon pattern including segments with motion trajectories in alternating directions.

11. A tangible, non-transitory, machine readable medium storing instructions that when executed by a processor effectuates operations comprising: capturing, with at least one exteroceptive sensor, a first image and a second image, wherein: the first image is captured from a first position and orientation and the second image is captured from a second position and orientation, different from the first position and orientation; and the first image and second image comprise unprocessed raw pixel intensity values or processed depth values; determining, with the processor, an overlapping area of a field of view of the first image and of a field of view of the second image by comparing the raw pixel intensity values or depth values of the first image to the raw pixel intensity values or depth values of the second image; combining, with the processor, the first image and the second image at the overlapping area to generate a digital spatial representation of the environment, wherein: the digital spatial representation of the environment comprises areas of the environment already explored by the robot; and the digital spatial representation indicates locations of physical objects and boundaries of the environment already explored by the robot; and estimating, with the processor using a statistical ensemble of simulated positions of the robot, a corrected position of the robot within the digital spatial representation of the environment to replace a last known position of the robot within the digital spatial representation of the environment, wherein: estimating the corrected position occurs if the processor loses knowledge of the position of the robot in the digital spatial representation of the environment during a movement from the last known position to a new intended position while performing a task; the processor loses the position of the robot due to a drift in intended trajectory; each simulated position comprises a function of angular and linear error in trajectory convolved with the new intended position; and the processor checks sensor readings received from the at least one sensor against each simulated digital spatial representation of the environment corresponding with a perspective of each simulated position of the robot to choose a most feasible position of the robot as the corrected position within the digital spatial representation of the environment.

12. The media of embodiment 11, wherein the sensor readings comprise one or more of: visual and depth readings.

13. The media of embodiments 11-12, wherein the statistical ensemble reduces to at least one position when the sensor readings of the at least one sensor are captured.

14. The media of embodiments 11-13, wherein the most feasible position of the robot is the position with the highest probability of being the true position of the robot.

15. The media of embodiments 11-14, wherein certainty of the location of the robot decreases with movement of the robot and increases with the number of sensor readings in agreement.

16. The media of embodiments 11-15, wherein determining an area of overlap of the field of view of the first image and the field of view of the second image comprises aligning the raw pixel intensity values or depth values of the first image and the raw pixel intensity values or depth values of the second image.

17. The media of embodiment 16, wherein aligning the raw pixel intensity values or depth values of the first image and the raw pixel intensity values or depth values of the second image comprises: determining, with the processor, aggregate amounts of difference between overlapping portions of the first image and the second image at candidate alignments displaced from an approximate alignment; and selecting, with the processor, a candidate alignment that produces a lowest aggregate amount of difference among the candidate alignments or selecting, with the processor, a candidate alignment that produces an aggregate amount of difference less than a threshold.

18. The media of embodiments 11-17, wherein the operations further comprise: determining, with the processor, a movement path of the robot in real-time based on the digital spatial representation of the environment and observations of the environment; and controlling, with the processor, an actuator of the robot to cause the robot to move along the movement path.

19. The media of embodiment 18, wherein determining the movement path comprises determining lengths of segments of the movement path, the segments having a linear or arc motion trajectory.

20. The media of embodiment 18, wherein the movement path comprises a boustrophedon pattern including segments with motion trajectories in alternating directions.

The invention claimed is:

1. A robot, comprising:
   a chassis;
   a set of wheels coupled to the chassis;
   one or more electric motors electrically coupled to the set of wheels;
   a network card providing wireless connectivity to the internet;
   a plurality of sensors;
   a processor electronically coupled to the plurality of sensors and configured to receive sensor readings; and
   a tangible, non-transitory, machine readable medium storing instructions that when executed by the processor effectuates operations comprising:
      capturing, with at least one exteroceptive sensor of the plurality of sensors, a first image and a second image of an environment of the robot, wherein:
         the first image is captured from a first position and orientation and the second image is captured from a second position and orientation, different from the first position and orientation; and
         the first image and second image comprise unprocessed raw pixel intensity values or processed depth values;
      determining, with the processor, an overlapping area of a field of view of the first image and of a field of view of the second image by comparing the raw pixel intensity values or the processed depth values of the first image to the raw pixel intensity values or depth values of the second image;

combining, with the processor, the first image and the second image at the overlapping area to generate a digital spatial representation of the environment, wherein:

the digital spatial representation of the environment comprises areas of the environment captured within the first image and the second image; and the digital spatial representation indicates locations of physical objects and boundaries of the environment captured within the first image and the second image; and estimating, with the processor using a statistical ensemble of simulated locations of the robot within the environment, a corrected location of the robot within the digital spatial representation of the environment to replace a last known location of the robot within the digital spatial representation of the environment, wherein:

the simulated locations of the robot comprise all possible locations within the environment at which the robot can be located;

the statistical ensemble comprises probabilities of the robot being actually located at each of the simulated locations of the robot;

estimating the corrected location of the robot occurs when the processor loses a current location of the robot in the digital spatial representation of the environment during a movement from the last known location to a new intended location while performing a task;

the processor loses the current position of the robot due to a drift in intended trajectory; and the processor checks sensor readings received from at least one sensor of the plurality of sensors against each simulated digital spatial representation of the environment corresponding with a perspective of each simulated location of the robot to determine the corrected location of the robot within the digital spatial representation of the environment.

2. The robot of claim 1, wherein the sensor readings comprise one or more of: visual readings and depth readings captured with the at least one exteroceptive sensor.

3. The robot of claim 1, wherein the statistical ensemble reduces to at least one location when the sensor readings of the at least one sensor of the plurality of sensors are captured.

4. The robot of claim 1, wherein the corrected location of the robot is a simulated location of all the simulated locations with the highest probability of being the actual location of the robot based on a best match between the sensor readings from the at least one sensor of the plurality of sensors and a simulated digital spatial representation of the environment corresponding with a perspective of the particular simulated location.

5. The robot of claim 1, wherein certainty of a location of the robot decreases with movement of the robot and increases with a number of sensor readings captured.

6. The robot of claim 1, wherein determining the area of overlap of the field of view of the first image and the field of view of the second image comprises aligning the raw pixel intensity values or depth values of the first image and the raw pixel intensity values or depth values of the second image.

7. The robot of claim 6, wherein aligning the raw pixel intensity values or depth values of the first image and the raw pixel intensity values or depth values of the second image comprises:

determining, with the processor, aggregate amounts of difference between overlapping portions of the first image and the second image at candidate alignments displaced from an approximate alignment; and selecting, with the processor, the candidate alignment that produces a lowest aggregate amount of difference among the candidate alignments or selecting, with the processor, a candidate alignment that produces an aggregate amount of difference less than a threshold.

8. The robot of claim 1, wherein the operations further comprise:

determining, with the processor, a movement path of the robot in real-time based on the digital spatial representation of the environment and sensor readings captured with at least some of the plurality of sensors; and controlling, with the processor, the one or more electric motors of the robot to cause the robot to move along the movement path.

9. The robot of claim 8, wherein determining the movement path comprises determining lengths of segments of the movement path, the segments having a linear or arc motion trajectory.

10. The robot of claim 8, wherein the movement path comprises a boustrophedon pattern including segments with motion trajectories in alternating directions.

11. A tangible, non-transitory, machine readable medium storing instructions that when executed by a processor effectuates operations comprising:

capturing, with at least one exteroceptive sensor of the plurality of sensors, a first image and a second image of an environment of the robot, wherein:

the first image is captured from a first position and orientation and the second image is captured from a second position and orientation, different from the first position and orientation; and the first image and second image comprise unprocessed raw pixel intensity values or processed depth values;

determining, with the processor, an overlapping area of a field of view of the first image and of a field of view of the second image by comparing the raw pixel intensity values or the processed depth values of the first image to the raw pixel intensity values or depth values of the second image;

combining, with the processor, the first image and the second image at the overlapping area to generate a digital spatial representation of the environment, wherein:

the digital spatial representation of the environment comprises areas of the environment captured within the first image and the second image; and the digital spatial representation indicates locations of physical objects and boundaries of the environment captured within the first image and the second image; and estimating, with the processor using a statistical ensemble of simulated locations of the robot within the environment, a corrected location of the robot within the digital spatial representation of the environment to replace a last known location of the robot within the digital spatial representation of the environment, wherein:

the simulated locations of the robot comprise all possible locations within the environment at which the robot can be located;

the statistical ensemble comprises probabilities of the robot being actually located at each of the simulated locations of the robot;

estimating the corrected location of the robot occurs when the processor loses a current location of the robot in the digital spatial representation of the environment during a movement from the last known location to a new intended location while performing a task;

the processor loses the current position of the robot due to a drift in intended trajectory; and the processor checks sensor readings received from at least one sensor of the plurality of sensors against each simulated digital spatial representation of the environment corresponding with a perspective of each simulated location of the robot to determine the corrected position of the robot within the digital spatial representation of the environment.

12. The media of claim 11, wherein the sensor readings comprise one or more of: visual readings and depth readings captured with the at least one exteroceptive sensor.

13. The media of claim 11, wherein the statistical ensemble reduces to at least one position when the sensor readings of the at least one sensor of the plurality of sensors are captured.

14. The media of claim 11, wherein corrected location of the robot is a simulated location of all the simulated locations with the highest probability of being the actual location of the robot based on a best match between the sensor readings from the at least one sensor of the plurality of sensors and a simulated digital spatial representation of the environment corresponding with a perspective of the particular simulated location.

15. The media of claim 11, wherein certainty of a location of the robot decreases with movement of the robot and increases with a number of sensor readings captured.

16. The media of claim 11, wherein determining the area of overlap of the field of view of the first image and the field of view of the second image comprises aligning the raw pixel intensity values or depth values of the first image and the raw pixel intensity values or depth values of the second image.

17. The media of claim 16, wherein aligning the raw pixel intensity values or depth values of the first image and the raw pixel intensity values or depth values of the second image comprises:

determining, with the processor, aggregate amounts of difference between overlapping portions of the first image and the second image at candidate alignments displaced from an approximate alignment; and selecting, with the processor, the candidate alignment that produces a lowest aggregate amount of difference among the candidate alignments or selecting, with the processor, a candidate alignment that produces an aggregate amount of difference less than a threshold.

18. The media of claim 11, wherein the operations further comprise:

determining, with the processor, a movement path of the robot in real-time based on the digital spatial representation of the environment and sensor readings captured with at least some of the plurality of sensors; and controlling, with the processor, the one or more electric motors of the robot to cause the robot to move along the movement path.

19. The media of claim 18, wherein determining the movement path comprises determining lengths of segments of the movement path, the segments having a linear or arc motion trajectory.

20. The media of claim 18, wherein the movement path comprises a boustrophedon pattern including segments with motion trajectories in alternating directions.

* * * * *